US011754031B2

(12) United States Patent
Nook et al.

(10) Patent No.: US 11,754,031 B2
(45) Date of Patent: Sep. 12, 2023

(54) RECHARGEABLE BATTERY JUMP STARTING DEVICE WITH DEPLETED OR DISCHARGED BATTERY PRE-CONDITIONING SYSTEM

(71) Applicant: THE NOCO COMPANY, Glenwillow, OH (US)

(72) Inventors: Jonathan Lewis Nook, Gates Mills, OH (US); William Knight Nook, Sr., Shaker Heights, OH (US); James Richard Stanfield, Glendale, AZ (US); Derek Michael Underhill, Tempe, AZ (US)

(73) Assignee: The Noco Company, Glenwillow, OH (US)

( * ) Notice: Subject to any disclaimer, the term of this patent is extended or adjusted under 35 U.S.C. 154(b) by 0 days.

(21) Appl. No.: 17/820,664

(22) Filed: Aug. 18, 2022

(65) Prior Publication Data

US 2023/0057431 A1 Feb. 23, 2023

Related U.S. Application Data

(63) Continuation of application No. 16/648,511, filed as application No. PCT/US2018/052189 on Sep. 21, (Continued)

(51) Int. Cl.
*F02N 11/12* (2006.01)
*H02J 9/00* (2006.01)
(Continued)

(52) U.S. Cl.
CPC .............. *F02N 11/12* (2013.01); *F02N 11/14* (2013.01); *H02J 1/122* (2020.01); *H02J 7/00* (2013.01);
(Continued)

(58) Field of Classification Search
CPC .. F02N 2011/0881; F02N 11/12; F02N 11/14; H02J 7/00302; H02J 1/22;
(Continued)

(56) References Cited

U.S. PATENT DOCUMENTS 5,083,076 A 1/1992 Scott
5,637,978 A 6/1997 Kellett et al.
(Continued)

FOREIGN PATENT DOCUMENTS

AU 2016102104 A4 1/2017
CN 104345244 A 2/2015
(Continued)

OTHER PUBLICATIONS

IP Australia, Appl. No. 2018338196, Examination Report No. 1, dated Oct. 9, 2020.

(Continued)

*Primary Examiner* — Arnold M Kinkead
(74) *Attorney, Agent, or Firm* — Jones Day

(57) ABSTRACT

A rechargeable battery jump starting device is provided that includes a first 12V battery, a second 12V battery, a supplemental power supply, a first switching circuit electrically coupled to the first and second 12V batteries and configured to select the first 12V battery and/or the second 12V battery to provide either a 12V operating voltage or a 24V operating voltage, and a second switching circuit for switching in the supplemental power supply with the first 12V battery and/or the second 12V battery for increasing the 12V operating voltage or the 24V operating voltage for jump starting a depleted or discharged vehicle battery.

20 Claims, 103 Drawing Sheets

Related U.S. Application Data

2018, now Pat. No. 11,462,928, and a continuation-in-part of application No. PCT/US2018/034902, filed on May 29, 2018, and a continuation-in-part of application No. PCT/US2018/035029, filed on May 30, 2018, and a continuation-in-part of application No. PCT/US2018/040919, filed on Jul. 5, 2018, and a continuation-in-part of application No. PCT/US2018/042474, filed on Jul. 17, 2018, and a continuation-in-part of application No. PCT/US2018/049548, filed on Sep. 5, 2018, and a continuation-in-part of application No. PCT/US2018/050904, filed on Sep. 13, 2018, and a continuation-in-part of application No. PCT/US2018/051655, filed on Sep. 19, 2018, and a continuation-in-part of application No. PCT/US2018/051834, filed on Sep. 20, 2018, and a continuation-in-part of application No. PCT/US2018/051964, filed on Sep. 20, 2018.

(60) Provisional application No. 62/561,850, filed on Sep. 22, 2017, provisional application No. 62/561,751, filed on Sep. 22, 2017, provisional application No. 62/562,713, filed on Sep. 25, 2017, provisional application No. 62/567,479, filed on Oct. 3, 2017, provisional application No. 62/568,044, filed on Oct. 4, 2017, provisional application No. 62/568,537, filed on Oct. 5, 2017, provisional application No. 62/569,355, filed on Oct. 6, 2017, provisional application No. 62/569,243, filed on Oct. 6, 2017, provisional application No. 62/568,967, filed on Oct. 6, 2017, provisional application No. 62/637,615, filed on Mar. 2, 2018.

(51) Int. Cl.

| | |
|---|---|
| ***H02J 7/00*** | (2006.01) |
| ***H02J 1/10*** | (2006.01) |
| ***H02J 7/34*** | (2006.01) |
| ***F02N 11/14*** | (2006.01) |
| ***F02N 11/08*** | (2006.01) |

(52) U.S. Cl.
CPC ............ *H02J 7/007* (2013.01); *H02J 7/0031* (2013.01); *H02J 7/0042* (2013.01); *H02J 7/00047* (2020.01); *H02J 7/0048* (2020.01); *H02J 7/00302* (2020.01); *H02J 7/00306* (2020.01); *H02J 7/00309* (2020.01); *H02J 7/342* (2020.01); *H02J 9/00* (2013.01); *F02N 2011/0881* (2013.01); *H02J 7/00304* (2020.01)

(58) Field of Classification Search
CPC .......... H02J 7/00; H02J 7/0042; H02J 7/0031; H02J 7/342; H02J 7/0048; H02J 7/00309; H02J 7/00306; H02J 7/00304; H02J 7/00047; H02J 9/00; H02J 7/007
USPC ........................................ 307/66, 10.7, 10.1
See application file for complete search history.

(56) References Cited

U.S. PATENT DOCUMENTS

| | | | | |
|---|---|---|---|---|
| 5,883,491 | A | 3/1999 | Silverman | |
| 2014/0084844 | A1 | 3/2014 | Weflen | |
| 2014/0138960 | A1 | 5/2014 | Huang | |
| 2015/0130400 | A1 | 5/2015 | Inskeep | |
| 2015/0171632 | A1 | 6/2015 | Fry et al. | |
| 2016/0001666 | A1 | 1/2016 | Nook et al. | |
| 2016/0049819 | A1 | 2/2016 | Butler et al. | |
| 2017/0346140 | A1 | 11/2017 | Koebler | |
| 2018/0083469 | A1* | 3/2018 | Bauer .................. | F02N 19/001 |

FOREIGN PATENT DOCUMENTS

| | | |
|---|---|---|
| JP | 2011-047338 | 3/2011 |
| JP | 3182855 U | 4/2013 |
| WO | WO 2001/082446 | 11/2001 |
| WO | WO 2017/015586 | 1/2017 |

OTHER PUBLICATIONS

Canadian Intellectual Property Office, Appl. 3,076,499, Examiner's Report, dated May 3, 2021.

Canadian Intellectual Property Office, Appl. 3,076,499, Examiner's Report, dated Feb. 16, 2022.

European Patent Office, Appl. No. 18857693.8, Communication pursuant to Article 94(3), dated Jul. 31, 2020.

Japan Patent Office, Appl. No. 2020-516463, Notification of Reasons for Refusal, dated May 18, 2021.

Japan Patent Office, Appl. No. 2021-214315, Notification of Reasons for Refusal, dated Nov. 1, 2022.

Patent Cooperation Treaty, PCT/US18/52189, International Search Report and Written Opinion, dated Jan. 18, 2019.

UK Patent Office, Appl. No. GB2004122.4, Examination Report, dated Feb. 17, 2022.

UK Patent Office, Appl. No. GB2217248.0, Combined Search and Examination Report, dated Dec. 13, 2022.

IP Australia, Appl. No. 2022200449, Examination Report No. 1, dated Jan. 18, 2023.

CNIPA, Appl. 201880075601.5, First Office Action, dated Dec. 20, 2022.

Japanese Patent Office, Appl. 2021-214315, Office Action, dated May 9, 2023.

* cited by examiner

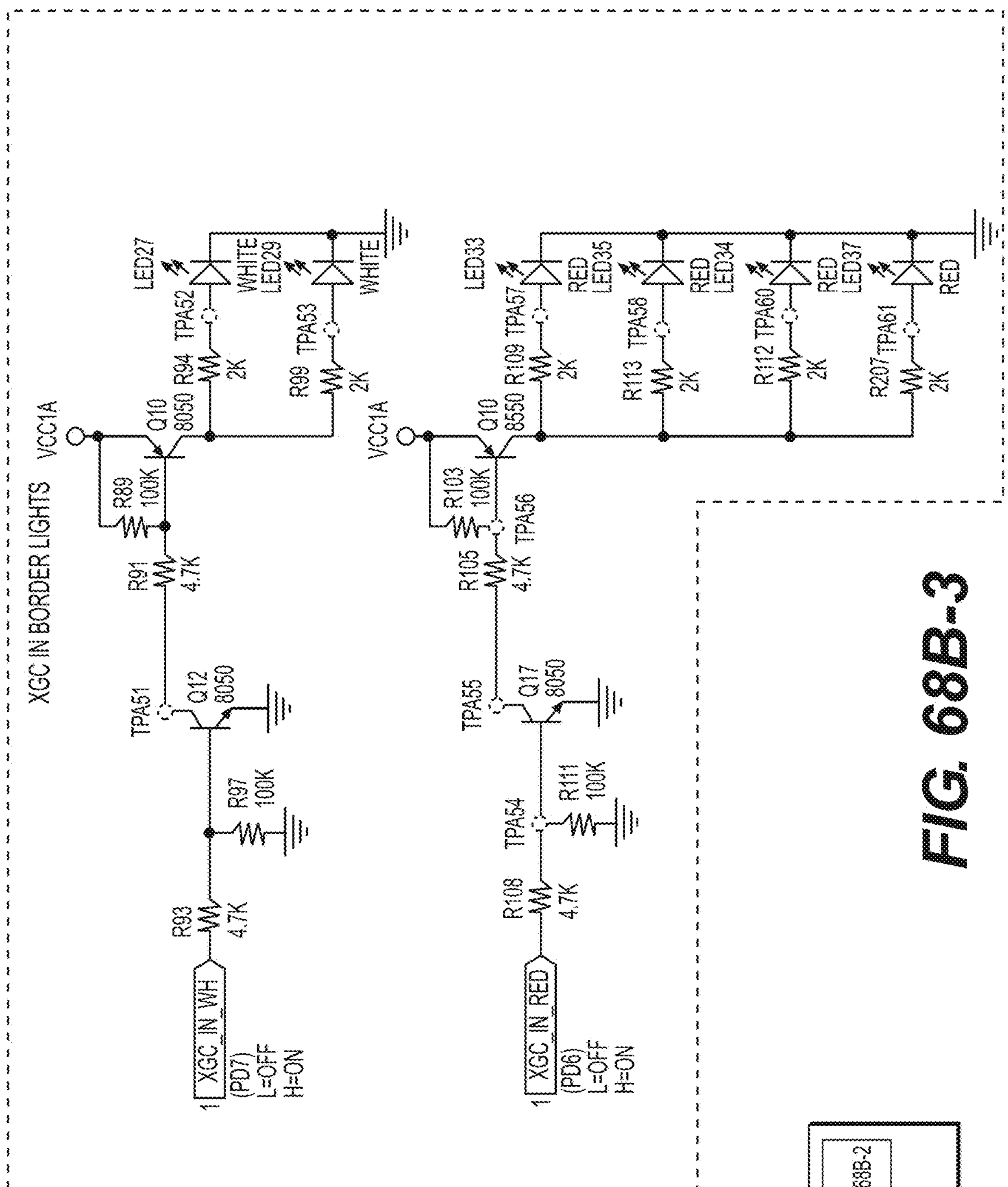
*FIG. 68B-3*
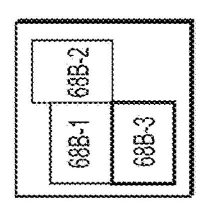

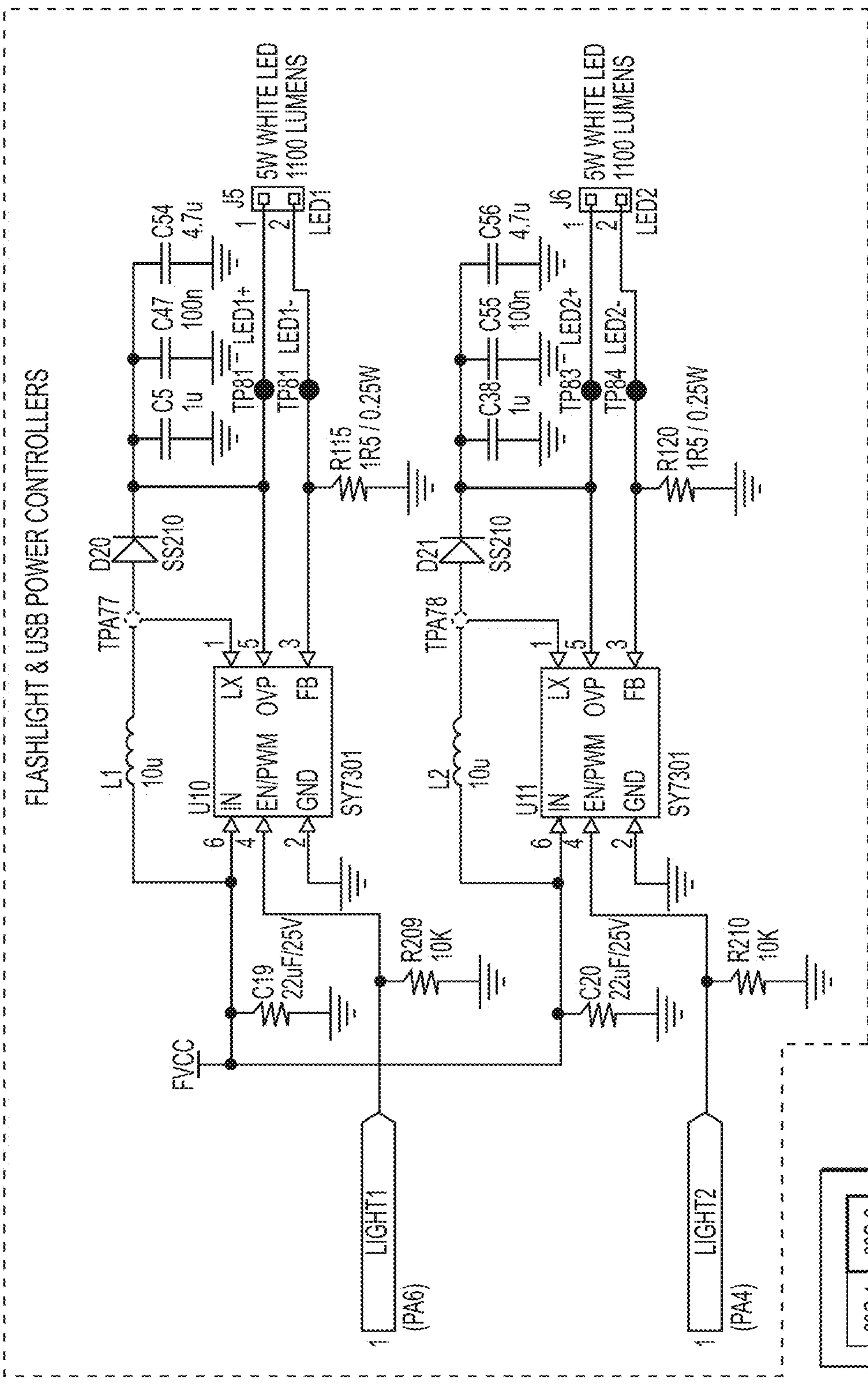
FIG. 68C-2
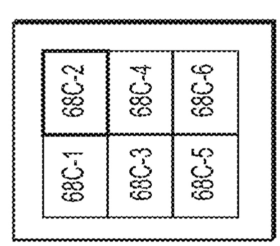

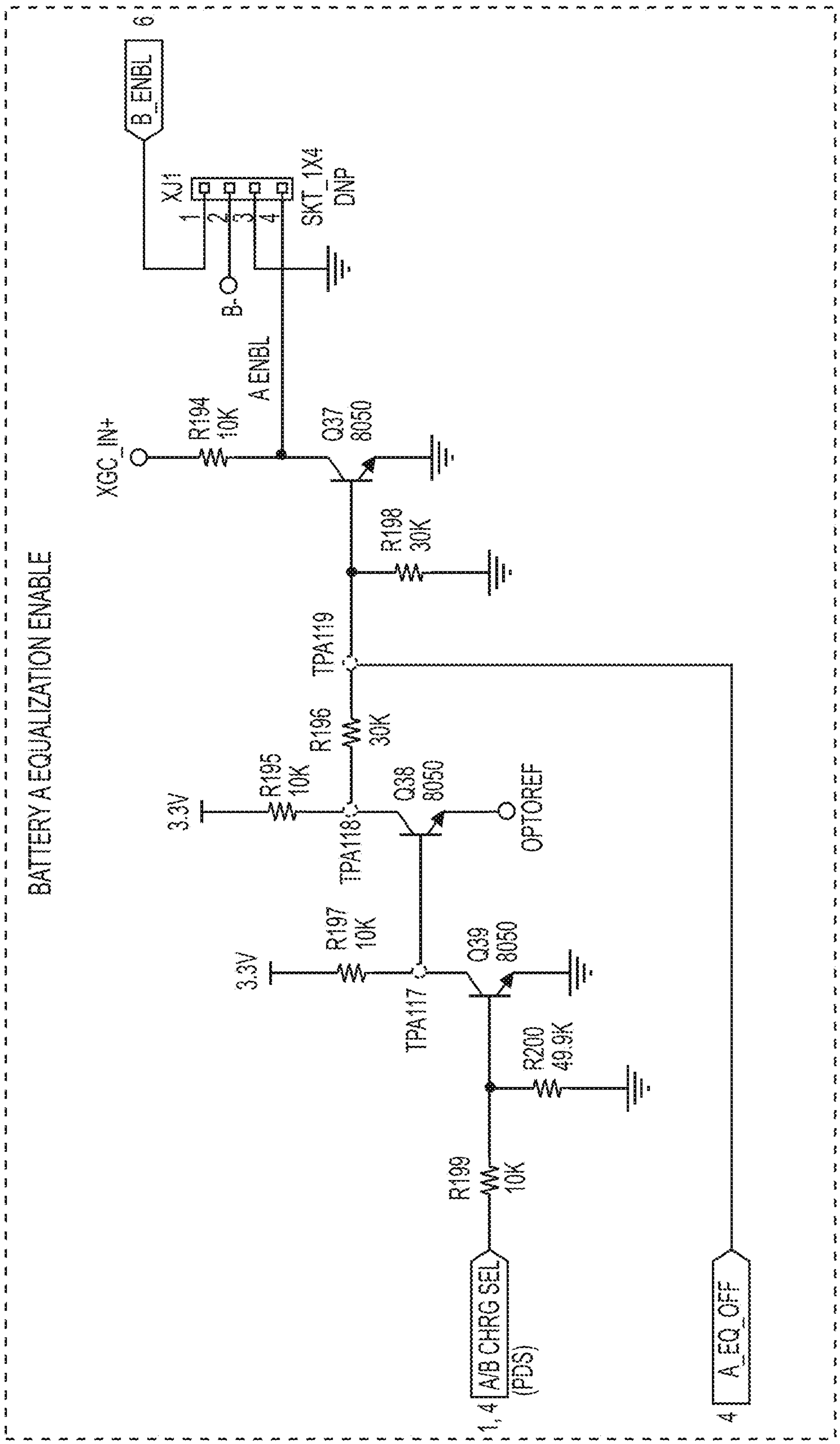
FIG. 68E-1
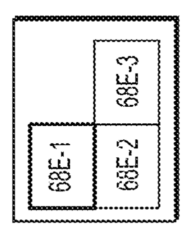

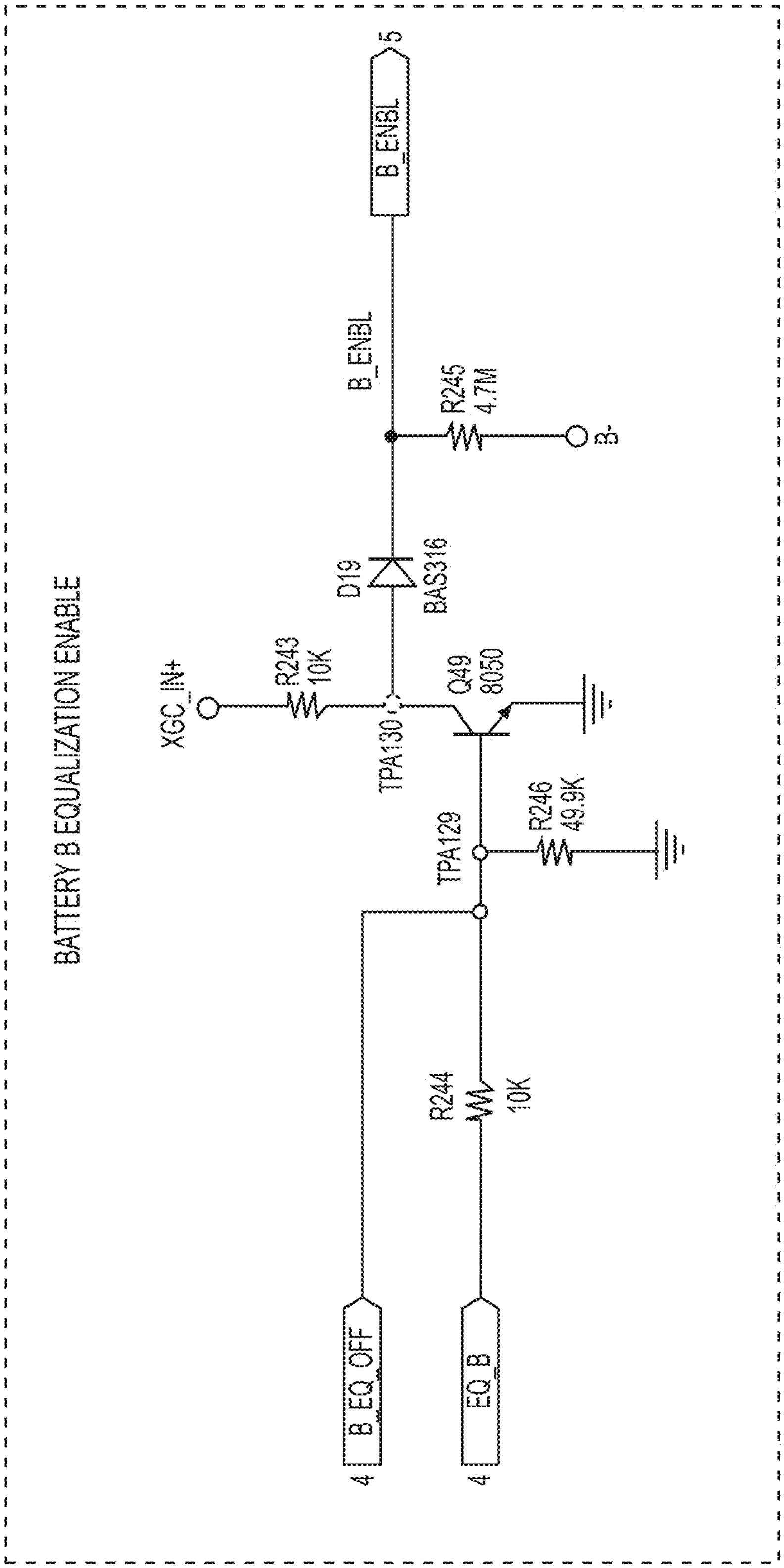
FIG. 68F-1
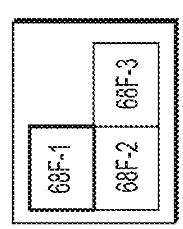

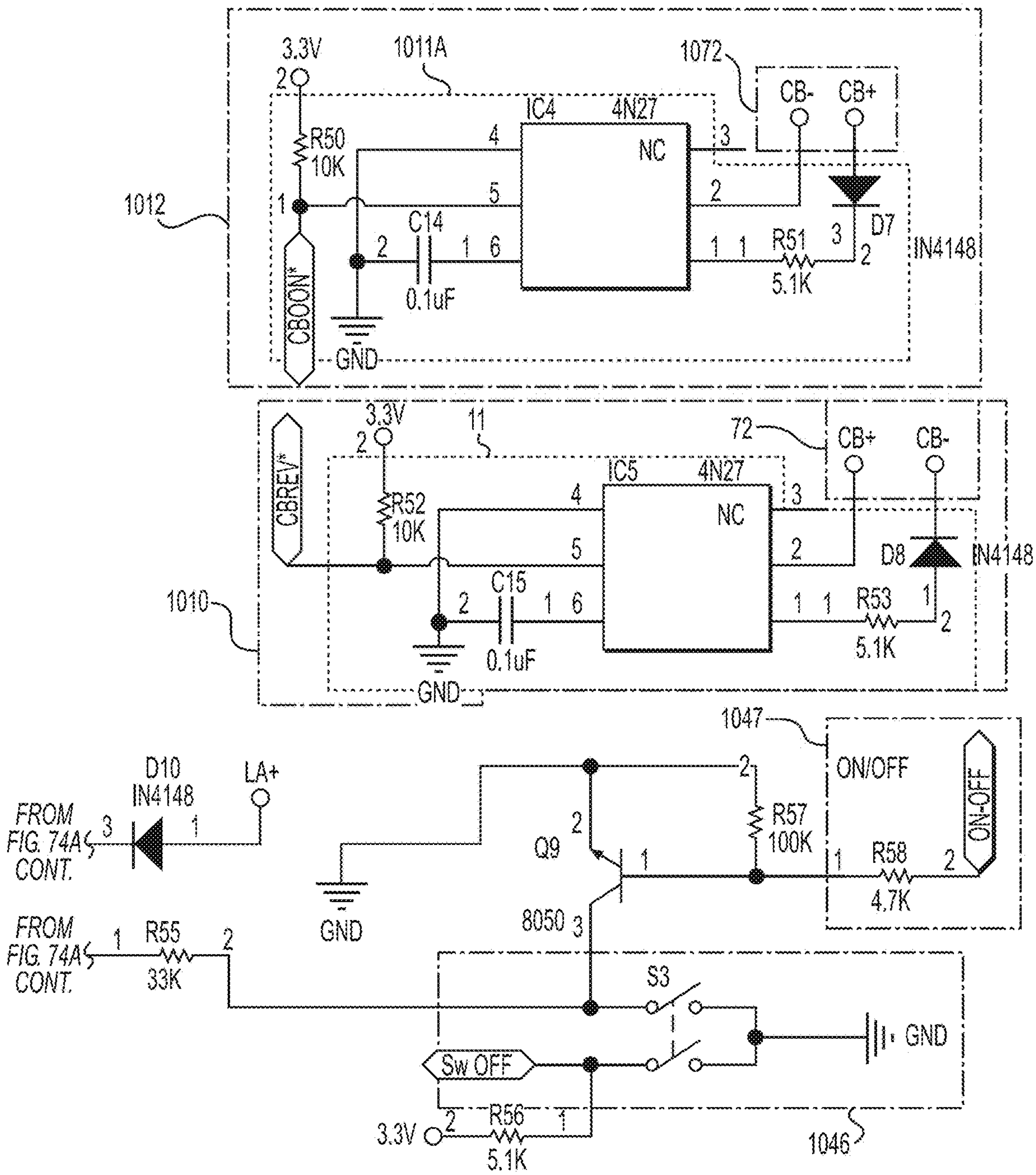
FIG. 74A CONT.
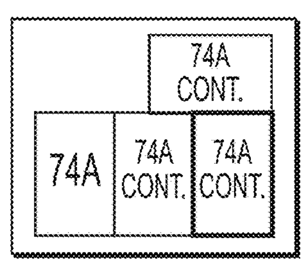

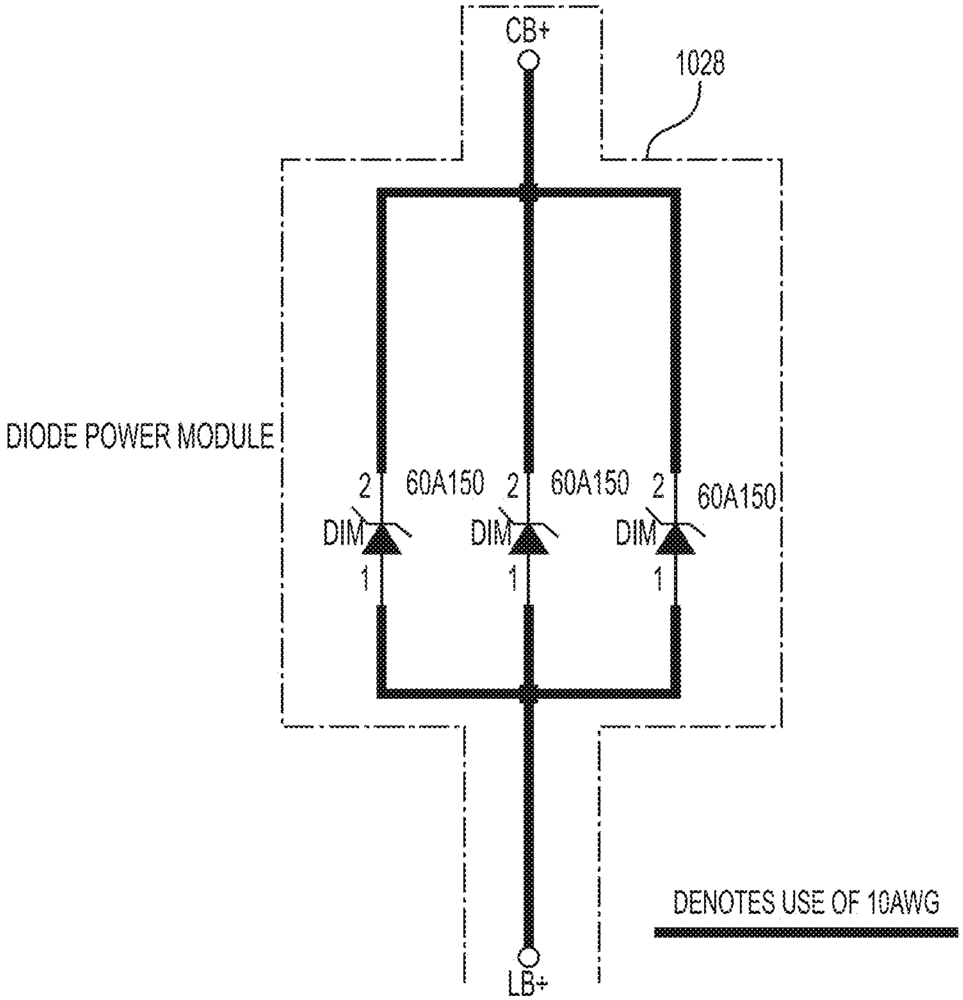
FIG. 74B
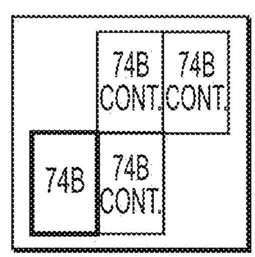

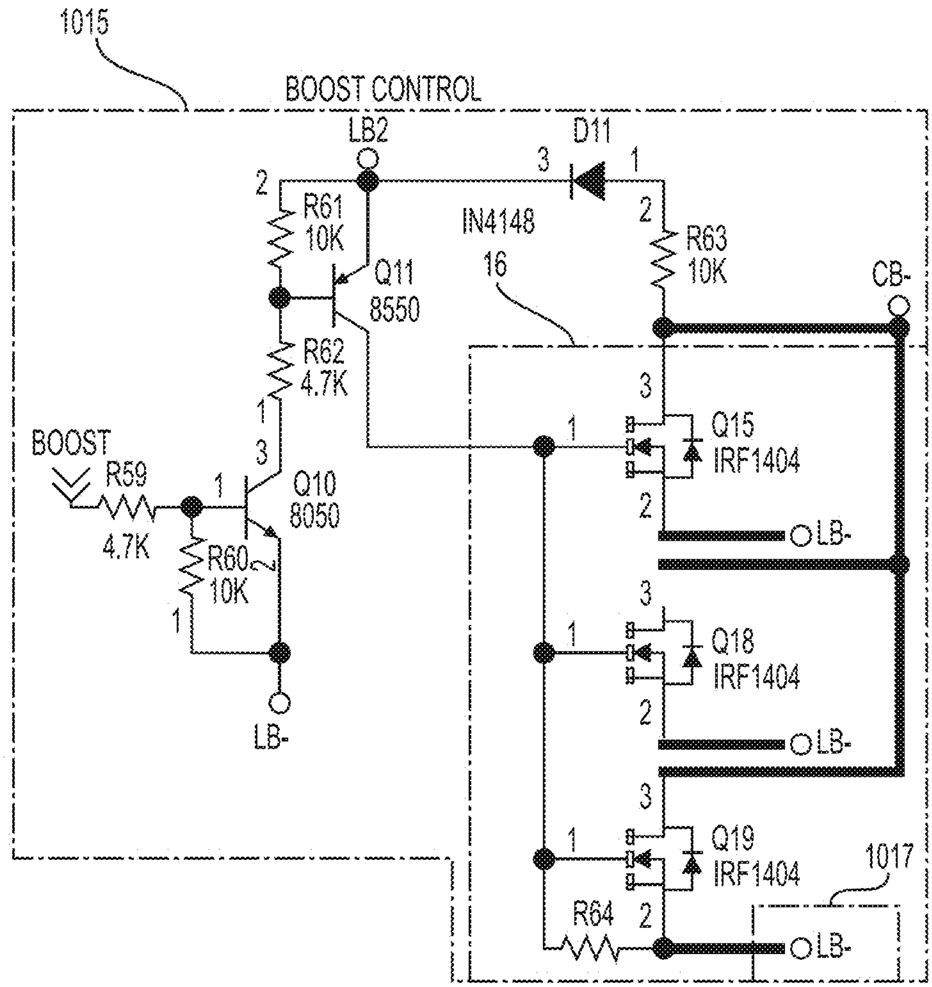
FIG. 74B CONT.
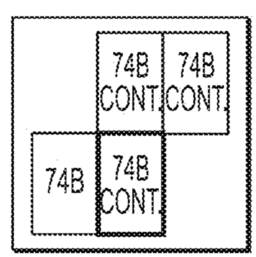

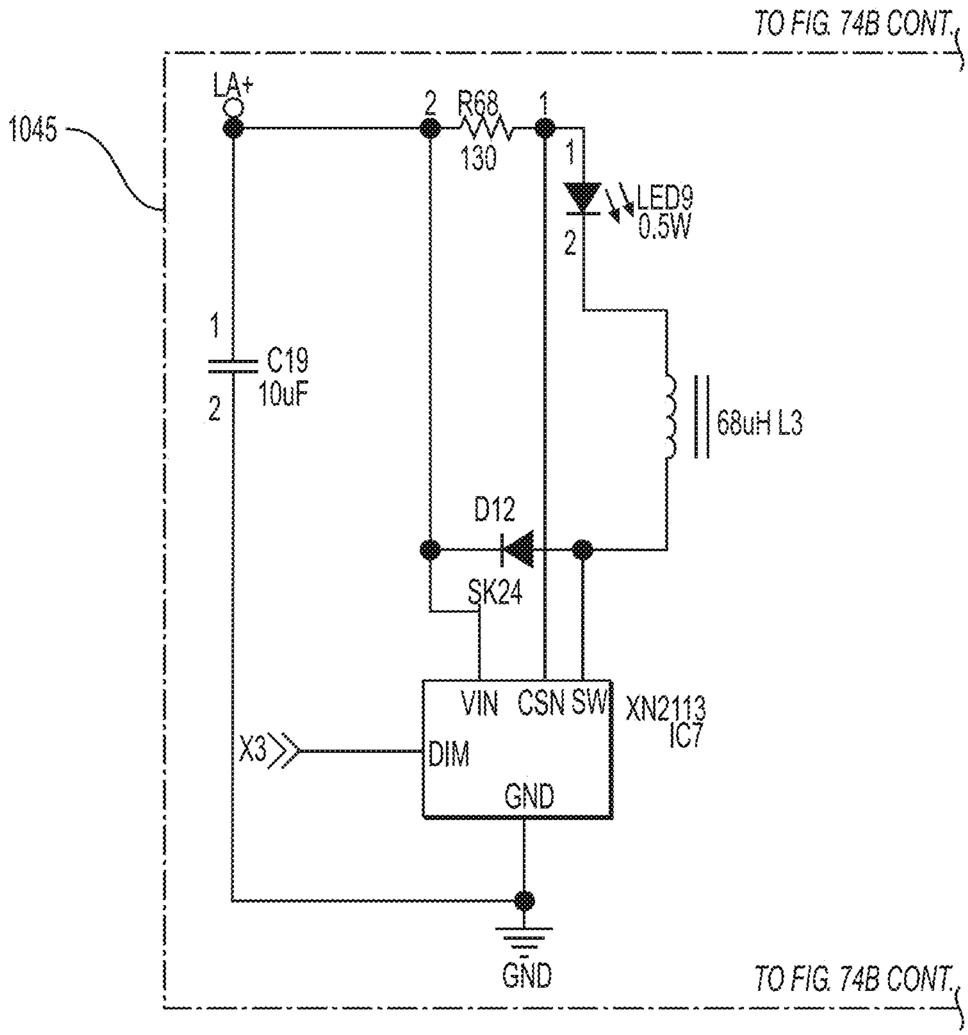
FIG. 74B CONT.
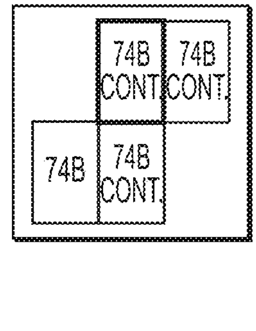

| | | |
|---|---|---|
| 74C | 74C CONT. | 74C CONT. |

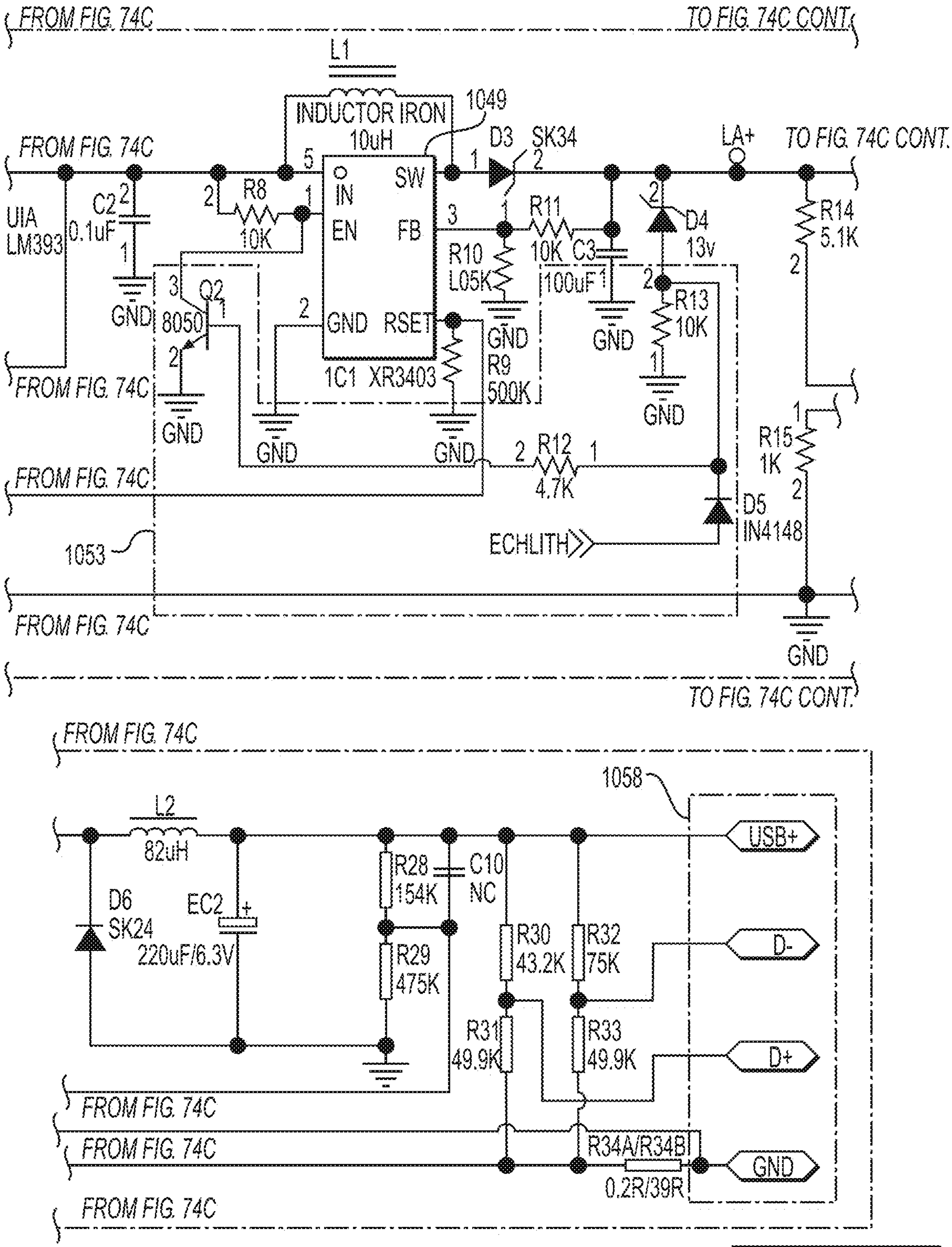
FIG. 74C CONT.
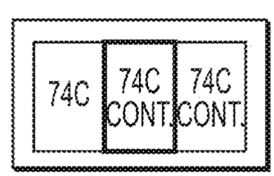

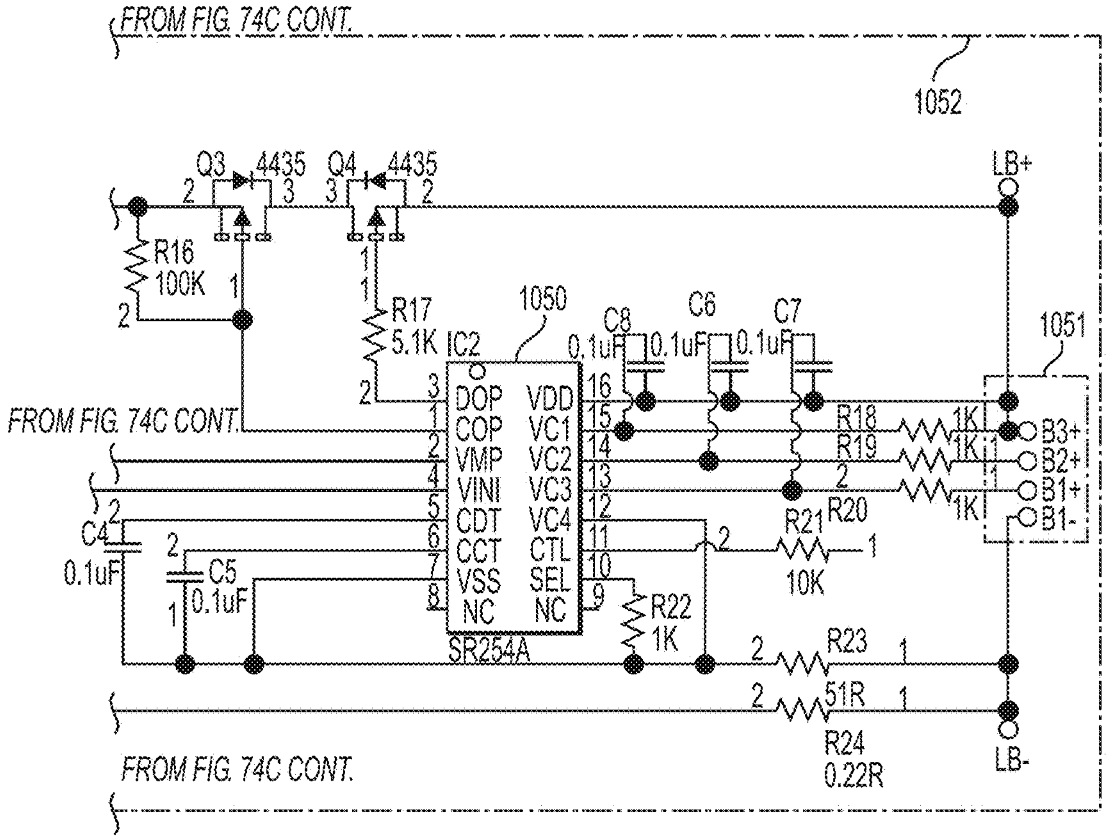
FIG. 74C CONT.
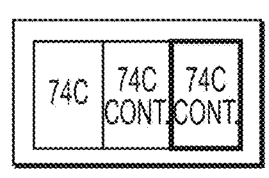

RECHARGEABLE BATTERY JUMP STARTING DEVICE WITH DEPLETED OR DISCHARGED BATTERY PRE-CONDITIONING SYSTEM

RELATED APPLICATIONS

This application is a continuation of U.S. application Ser. No. 17/820,664 filed on Mar. 18, 2020, which is a national stage entry of PCT/US2018/052189 filed on Sep. 21, 2018, which claims priority to PCT/US2018/051964 filed on Sep. 20, 2018, PCT/US2018/051834 filed on Sep. 20, 2018, PCT/US2018/051655 filed on Sep. 19, 2018, PCT/US2018/050904 filed on Sep. 13, 2018, PCT/US2018/049548 filed on Sep. 5, 2018, PCT/US2018/042474 filed on Jul. 17, 2018, PCT/US2018/040919 filed on Jul. 5, 2018, PCT/US2018/035029 filed on May 30, 2018, PCT/US2018/034902 filed on May 29, 2018, U.S. provisional application No. 62/637,615 filed Mar. 2, 2018, U.S. provisional application No. 62/569,355 filed Oct. 6, 2017, U.S. provisional application No. 62/569,243 filed Oct. 6, 2017, U.S. provisional application No. 62/568,967 filed Oct. 6, 2017, U.S. provisional application No. 62/568,537 filed Oct. 5, 2017, U.S. provisional application No. 62/568,044 filed Oct. 4, 2017, U.S. provisional application No. 62/567,479 filed Oct. 3, 2017, U.S. provisional application No. 62/562,713 filed Sep. 25, 2017, U.S. provisional application No. 62/561,850 filed Sep. 22, 2017, U.S. provisional application No. 62/561,751 filed Sep. 22, 2017, which are all hereby incorporated by reference herein in their entirety.

FIELD

The present invention is directed to a rechargeable battery jump starting device with a depleted or discharged battery pre-conditioning system. For example, the rechargeable battery jump starting device is a portable rechargeable battery jump starting device configured for jump starting automobiles, heavy equipment, commercial vehicles, commercial equipment, trucks, buses, commercial trucks, front loaders, dozers, back hoes, excavators, rollers, fork lift, specialized commercial equipment, logging equipment, airplanes, jets, and other battery started vehicles and equipment.

BACKGROUND

Currently, there exist battery jump starters for light duty applications such as jump starting automobiles. These light duty jump starters have a power circuit comprising battery cables, which can be connected to a depleted (i.e. weak) or discharged vehicle or equipment battery.

Further, there exist heavy duty battery jump starters using conventional lead acid batteries. These jump starters are very heavy in weight (e.g. hundreds of pounds) and these jump starters are large dimensionally requiring same to be moved, for example, using a fork lift. The current heavy duty battery jump starters are not portable in any manner.

Thus, there exists a need for a portable heavy duty rechargeable battery jump starting device having significantly reduced weight and size to replace conventional heavy duty battery jump starters.

Further, there exists a need for a portable heavy duty rechargeable battery jump starting device having detachable positive and negative heavy duty cables.

In addition, there exists a need for a rechargeable battery jump starting device having a master switch back light system to assist a user viewing the selectable positions of the control switch for selecting a particular operating mode of the portable rechargeable battery jump starting device in day light, sunshine, low light, and darkness.

Further, there exists a need for a portable rechargeable battery jump starting device having a 12V operational mode and a 24V operational mode.

Also, there exists a need for a rechargeable battery jump starting device having a dual battery diode bridge or a back-charge diode module.

Further, there exists a need for a rechargeable battery jump starting device having a leapfrog charging system.

In addition, there exists a need for a rechargeable battery jump starting device having an electrically conductive frame, for example, a highly conductive rigid frame for conducting as much power as possible from the battery(ies) of the rechargeable battery jump starting device to a depleted or discharged battery being jump charged.

Also, there exists a need for a rechargeable battery jump starting device including an improved battery assembly, for example, a Li-ion battery assembly.

In addition, there exists a need for a heavy duty rechargeable battery jump starting device with an improved depleted or discharged battery detection system.

Further, there exists a need for a rechargeable battery jump starting device with a depleted or discharged battery pre-conditioning system facilitate jump charging the depleted or discharged battery or jump starting a vehicle or equipment having the depleted or discharged battery.

The above needed features of the rechargeable battery jump starting device can be used or applied to the rechargeable battery jump starting device disclosed in U.S. Pat. No. 9,007,015, which is fully incorporate by reference herein in its entirety. U.S. Pat. No. 9,007,015 relates generally to apparatus for jump-starting a vehicle having a depleted or discharged battery. Prior art devices are known, which provide either a pair of electrical connector cables that connect a fully-charged battery of another vehicle to the engine start circuit of the dead battery vehicle, or portable booster devices which include a fully-charged battery which can be connected in circuit with the vehicle's engine starter through a pair of cables.

Problems with the prior art arose when either the jumper terminals or clamps of the cables were inadvertently brought into contact with each other while the other ends were connected to a charged battery, or when the positive and negative terminals were connected to the opposite polarity terminals in the vehicle to be jumped, thereby causing a short circuit resulting in sparking and potential damage to batteries and/or bodily injury.

Various attempts to eliminate these problems have been made in the prior art. U.S. Pat. No. 6,212,054 issued Apr. 3, 2001, discloses a battery booster pack that is polarity sensitive and can detect proper and improper connections before providing a path for electric current flow. The device uses a set of LEDs connected to optical couplers oriented by a control circuit. The control circuit controls a solenoid assembly controlling the path of power current. The control circuit causes power current to flow through the solenoid assembly only if the points of contact of booster cable clamp connections have been properly made.

U.S. Pat. No. 6,632,103 issued Oct. 14, 2003, discloses an adaptive booster cable connected with two pairs of clips, wherein the two pairs of clips are respectively attached to two batteries to transmit power from one battery to the other battery. The adaptive booster cable includes a polarity detecting unit connected to each clip, a switching unit and a current detecting unit both provided between the two pairs of clips. After the polarity of each clip is sensed by the polarity detecting unit, the switching unit generates a proper connection between the two batteries. Therefore, the positive and negative terminals of the two batteries are correctly connected based on the detected result of the polarity detecting unit.

U.S. Pat. No. 8,493,021 issued Jul. 23, 2013, discloses apparatus that monitors the voltage of the battery of a vehicle to be jump started and the current delivered by the jump starter batteries to determine if a proper connection has been established and to provide fault monitoring. Only if the proper polarity is detected can the system operate. The voltage is monitored to determine open circuit, disconnected conductive clamps, shunt cable fault, and solenoid fault conditions. The current through the shunt cable is monitored to determine if there is a battery explosion risk, and for excessive current conditions presenting an overheating condition, which may result in fire. The system includes an internal battery to provide the power to the battery of the vehicle to be jump started. Once the vehicle is started, the unit automatically electrically disconnects from the vehicle's battery.

U.S. Pat. No. 5,189,359 issued Feb. 23, 1993, discloses a jumper cable device having two bridge rectifiers for developing a reference voltage, a four-input decoder for determining which terminals are to be connected based on a comparison of the voltage at each of the four terminals to the reference voltage, and a pair of relays for effecting the correct connection depending on the determination of the decoder. No connection will be made unless only one terminal of each battery has a higher voltage than the reference voltage, indicating "positive" terminals, and one has a lower voltage than the reference voltage, indicating "negative" terminals, and that, therefore, the two high voltage terminals may be connected and the two lower voltage terminals may be connected. Current flows once the appropriate relay device is closed. The relay device is preferably a MOSFET combined with a series array of photodiodes that develop MOSFET gate-closing potential when the decoder output causes an LED to light.

U.S. Pat. No. 5,795,182 issued Aug. 18, 1998, discloses a polarity independent set of battery jumper cables for jumping a first battery to a second battery. The apparatus includes a relative polarity detector for detecting whether two batteries are configured cross or parallel. A three-position high current capacity crossbar pivot switch is responsive to the relative polarity detector for automatically connecting the plus terminals of the two batteries together and the minus terminals of the two batteries together regardless of whether the configuration detected is cross or parallel, and an undercurrent detector and a delay circuit for returning the device to its ready and unconnected state after the device has been disconnected from one of the batteries. The crossbar pivot switch includes two pairs of contacts, and a pivot arm that pivots about two separate points to ensure full electrical contact between the pairs of contacts. The invention can also be used to produce a battery charger that may be connected to a battery without regard to the polarity of the battery.

U.S. Pat. No. 6,262,492 issued Jul. 17, 2001, discloses a car battery jumper cable for accurately coupling an effective power source to a failed or not charged battery, which includes a relay switching circuit connected to the power source and the battery by two current conductor pairs. First and second voltage polarity recognition circuits are respectively connected to the power source and the battery by a respective voltage conductor pair to recognize the polarity of the power source and the battery. A logic recognition circuit produces a control signal subject to the polarity of the power source and the battery, and a driving circuit controlled by the control signal from the logic recognition circuit drives the relay switching circuit, enabling the two poles of the power source to be accurately coupled to the two poles of the battery.

U.S. Pat. No. 5,635,817 issued Jun. 3, 1997, discloses a vehicle battery charging device that includes a control housing having cables including a current limiting device to prevent exceeding of a predetermined maximum charging current of about 40 to 60 amps. The control housing includes a polarity detecting device to verify the correct polarity of the connection of the terminals of the two batteries and to electrically disconnect the two batteries if there is an incorrect polarity.

U.S. Pat. No. 8,199,024 issued Jun. 12, 2012, discloses a safety circuit in a low-voltage connecting system that leaves the two low-voltage systems disconnected until it determines that it is safe to make a connection. When the safety circuit determines that no unsafe conditions exist and that it is safe to connect the two low-voltage systems, the safety circuit may connect the two systems by way of a "soft start" that provides a connection between the two systems over a period of time that reduces or prevents inductive voltage spikes on one or more of the low-voltage systems. When one of the low-voltage systems has a completely-discharged battery incorporated into it, a method is used for detection of proper polarity of the connections between the low-voltage systems. The polarity of the discharged battery is determined by passing one or more test currents through it and determining whether a corresponding voltage rise is observed.

U.S. Pat. No. 5,793,185 issued Aug. 11, 1998, discloses a hand-held jump starter having control components and circuits to prevent overcharging and incorrect connection to batteries.

While the prior art attempted solutions to the abovementioned problems as discussed above, each of the prior art solutions suffers from other shortcomings, either in complexity, cost or potential for malfunction. Accordingly, there exists a need in the art for further improvements to vehicle jump start devices.

SUMMARY

The presently described subject matter is directed to a battery jump starting device.

The presently described subject matter is directed to a portable rechargeable battery jump starting device.

The presently described subject matter is directed to an improved battery jump starting device.

The presently described subject matter is directed to an improved portable rechargeable battery jump starting device.

The presently described subject matter is directed to a heavy duty battery jump starting device.

The presently described subject matter is directed to a heavy duty portable rechargeable battery jump starting device.

The presently described subject matter is directed to a battery jump starting device such as a portable rechargeable battery jump starting device, the device comprising or consisting of one or more batteries connected to a highly electrically conductive frame.

The presently described subject matter is directed to a battery jump starting device such as a portable rechargeable jump starting device, the device comprising or consisting of one or more rechargeable batteries connected to a highly electrically conductive frame.

The presently described subject matter is directed to a battery jump starting device such as a portable rechargeable battery jump starting device, the device comprising or consisting of one or more rechargeable batteries connected to a highly electrically conductive frame, the highly electrically conductive frame connected to or connectable to positive and negative battery cables.

The presently described subject matter is directed to a battery jump starting device such as portable rechargeable battery jump starting device, the device comprising or consisting of one or more rechargeable batteries connected to a highly electrically conductive frame, the highly electrically conductive frame connected to or electrically connectable to positive and negative battery cables.

The presently described subject matter is directed to a battery jump starting device such as a portable rechargeable battery jump starting device, the device comprising or consisting of a rechargeable battery assembly comprising or consisting of one or more rechargeable batteries connected to a highly electrically conductive frame.

The presently described subject matter is directed to a battery jump starting device such as a portable rechargeable battery jump starting device, the device comprising or consisting of a rechargeable battery assembly comprising or consisting of one or more rechargeable batteries connected to a highly electrically conductive frame, the highly electrically conductive frame connected to or connectable to positive and negative battery cables.

The presently described subject matter is directed to a battery jump starting device such as a portable rechargeable battery jump starting device, the device comprising or consisting of one or more rechargeable Lithium-ion batteries ("Li-ion") connected to a highly electrically conductive frame.

The presently described subject matter is directed to a battery jump starting device such as a portable rechargeable battery jump starting device, the device comprising or consisting of one or more rechargeable Lithium-ion batteries ("Li-ion") connected to a highly electrically conductive frame.

The presently described subject matter is directed to a battery jump starting device such as a portable rechargeable battery jump starting device, the device comprising or consisting of one or more rechargeable Lithium-ion batteries ("Li-ion") connected to a highly electrically conductive frame or a high electrical current capacity frame.

The presently described subject matter is directed to a battery jump starting device such as a portable rechargeable battery jump starting device, the device comprising or consisting of two or more rechargeable batteries connected to a highly electrically conductive frame.

The presently described subject matter is directed to a battery jump starting device such as a portable rechargeable battery jump starting device, the device comprising or consisting of two or more rechargeable Li-ion batteries connected to a highly electrically conductive frame.

The presently described subject matter is directed to a battery jump starting device such as a portable rechargeable battery jump starting device, the device comprising two or more rechargeable Li-ion batteries connected to a highly electrically conductive frame.

The presently described subject matter is directed to a battery jump starting device such as a portable rechargeable battery jump starting device, the device comprising or consisting of two or more rechargeable Li-ion batteries connected to a highly electrically conductive frame or a high current capacity frame.

The presently described subject matter is directed to a battery jump starting device such as a portable rechargeable battery jump starting device, the device comprising or consisting of one or more rechargeable batteries connected to a highly electrically conductive frame at least partially surrounding the one or more batteries.

The presently described subject matter is directed to a battery jump starting device such as a portable rechargeable battery jump starting device, the device comprising or consisting of one or more rechargeable batteries connected to a highly electrically conductive rigid frame configured to at least partially surround the one or more batteries.

The presently described subject matter is directed to a battery jump starting device such as a portable rechargeable battery jump starting device, the device comprising or consisting of one or more rechargeable batteries connected to a highly electrically conductive frame configured to fully surround the one or more batteries.

The presently described subject matter is directed to a battery jump starting device such as a portable rechargeable battery jump starting device, the device comprising or consisting of one or more rechargeable batteries connected to a highly electrically conductive frame configured to fully surround the one or more rechargeable batteries.

The presently described subject matter is directed to a battery jump starting device such as a portable rechargeable battery jump starting device, the device comprising or consisting of one or more rechargeable Li-ion batteries connected to a highly electrically conductive frame configured to at least partially surround the one or more rechargeable batteries.

The presently described subject matter is directed to a battery jump starting device such as a portable rechargeable battery jump starting device, the device comprising or consisting of one or more rechargeable Li-ion batteries connected to a highly electrically conductive frame configured to at least partially surround the one or more rechargeable batteries.

The presently described subject matter is directed to a battery jump starting device such as a portable rechargeable battery jump starting device, the device comprising or consisting of one or more rechargeable Li-ion batteries connected to a highly electrically conductive frame configured to fully surround the one or more rechargeable batteries.

The presently described subject matter is directed to a battery jump starting device such as a portable rechargeable battery jump starting device, the device comprising or consisting of one or more rechargeable Li-ion batteries connected to a highly electrically conductive frame configured to fully surround the one or more rechargeable batteries.

The presently described subject matter is directed to a battery jump starting device such as a portable rechargeable battery jump starting device, the device comprising or consisting of one or more rechargeable batteries connected to a highly electrically conductive rigid frame.

The presently described subject matter is directed to a battery jump starting device such as a portable rechargeable battery jump starting device, the device comprising or consisting of one or more rechargeable batteries connected to a highly electrically conductive rigid frame comprising one or more conductive frame members.

The presently described subject matter is directed to a battery jump starting device such as a portable rechargeable battery jump starting device, the device comprising or consisting of one or more rechargeable batteries connected to a highly electrically conductive frame comprising one or more conductive frame members.

The presently described subject matter is directed to a battery jump starting device such as a portable rechargeable battery jump starting device, the device comprising or consisting of one or more rechargeable batteries connected to a highly electrically conductive frame comprising one or more conductors such as conductive metal plate, rod, bar, and/or tubing.

The presently described subject matter is directed to a battery jump starting device such as a portable rechargeable battery jump starting device, the device comprising or consisting of one or more rechargeable batteries connected to a highly electrically conductive frame comprising one or more conductors such as conductive copper (Cu) plate, rod, bar and/or tubing.

The presently described subject matter is directed to a battery jump starting device such as a portable rechargeable battery jump starting device, the device comprising or consisting of one or more batteries connected to a highly electrically conductive rigid frame comprising one or more rigid conductors such as conductive copper (Cu) plate, rod, bar and/or tubing.

The presently described subject matter is directed to a highly conductive cam-lock electrical connecting device.

The presently described subject matter is directed to a highly conductive cam-lock electrical connecting device for use in a battery jump starting device such as a portable rechargeable battery jump starting device.

The presently described subject matter is directed to a highly conductive cam-lock electrical connecting device in combination with a battery jump starting device such as a portable rechargeable battery jump starting device.

The presently described subject matter is directed to a highly conductive cam-lock electrical connecting device comprising or consisting of a male cam-lock end detachably connected to a female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the connecting arrangement is configured to tighten when the male cam-lock end is rotated within the female cam-lock device.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the receptacle of the female cam-lock end is provided with internal threading for cooperating with the tooth of the male cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the receptacle of the female cam-lock end is provided with internal threading for cooperating with the tooth of the male cam-lock end, wherein the male cam-lock end includes an end face portion and the female cam-lock end includes an end face portion, wherein the end face portions engage each other when the cam-lock connection device is fully tightened.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a rubber molded cover fitted over the male cam-lock end and another rubber molded cover fitted over the female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a rubber molded cover fitted over the male cam-lock end and another rubber molded cover fitted over the female cam-lock end, wherein the female cam-lock end is provided with an outer threaded portion and a nut for securing the rubber molded cover on the female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a rubber molded cover fitted over the male cam-lock end and another rubber molded cover fitted over the female cam-lock end, wherein the male cam-lock end is provided with one or more outwardly extending protrusions cooperating with one or more inner slots in the rubber molded cover.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the slot is provided with an inner surface serving as a stop for the tooth of the pin of the female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable, including a battery jump starting device, wherein the female cam-lock end is connected to a battery jump starting device.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable, including a battery jump starting device, wherein the female cam-lock end is connected to a battery jump starting device, wherein the battery jump starting device comprises a highly electrically conductive rigid frame connected to one or more batteries, and wherein the female cam-lock is connected to the highly electrically conductive frame.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable, including a battery jump starting device, wherein the female cam-lock end is connected to a battery jump starting device, wherein the battery jump starting device comprises a highly electrically conductive rigid frame connected to one or more batteries, and wherein the female cam-lock is connected to the highly electrically conductive frame, wherein the battery jump starting device, comprising a positive battery cable having a positive battery clamp, the positive battery cable connected to the highly electrically conductive rigid frame; and a negative battery cable having a negative battery clamp, the negative battery cable being connected to the highly electrically conductive rigid frame.

The presently described subject matter is directed to an improved electrical control switch for an electronic device The presently described subject matter is directed to an improved electrical control switch for use with a battery jump starting device such as a portable rechargeable battery jump starting device.

The presently described subject matter is directed to an improved electrical control switch in combination with a battery jump starting device such as a portable rechargeable battery jump starting device.

The present described subject matter is directed to an improved electrical control switch having a control knob provided with backlighting.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, wherein the control knob comprises a light blocking opaque portion and a clear portion or see through portion configured for serving as the light window.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising a printed circuit board located behind the control knob, the backlight being a light emitting diode (LED) mounted on the printed circuit board.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the electronic device is a battery jump starting device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump staring device comprises a cover; a battery disposed within the cover; a positive cable having a positive clamp, the positive cable connected to the battery; and a negative cable having a negative clamp, the negative cable connected to the highly electrically conductive rigid frame.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump starting device comprises a cover; a first 12V battery disposed within the cover; a second 12V battery disposed within the cover; a positive cable having a positive clamp, the positive cable connected to the battery; and a negative cable having a negative clamp, the negative cable connected to the highly electrically conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump starting device comprises a cover; a first 12V battery disposed within the cover; a second 12V battery disposed within the cover; a highly electrically conductive rigid frame connected to the first 12V battery and the second 12V battery; a backlight LED for lighting up the clear portion or see through portion of the control knob, the backlight LED being mounted on the printed circuit board; a positive cable having a positive clamp, the positive cable connected to the battery; a negative cable having a negative clamp, the negative cable connected to the highly electrically conductive rigid frame; and a printed circuit board disposed within the cover, wherein the control switch extends through the cover, the control switch being electrically connected to the highly electrically conductive rigid frame, the control knob configured to selectively rotate between a 12V operating position and a 24V operating position, the control switch configured to selectively operate the device in a 12V mode or 24V mode.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, wherein the system is configured to light up the backlight when the system is turned on.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators, and wherein the one or more backlight indicators are configured for selectively displaying a voltage mode of operation of the device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators, and wherein the one or more backlight indicators are configured for variably displaying the real time operating voltage of the device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators, and wherein the one or more backlight indicators are configured for lighting up when the device is turned on.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump staring device comprises a cover; a battery disposed within the cover; a positive cable having a positive clamp, the positive cable connected to the battery; and a negative cable having a negative clamp, the negative cable connected to the highly electrically conductive rigid frame, wherein the battery is a first 12V battery and a second 12V battery.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump staring device comprises a cover; a battery disposed within the cover; a positive cable having a positive clamp, the positive cable connected to the battery; and a negative cable having a negative clamp, the negative cable connected to the highly electrically conductive rigid frame, wherein the battery is a Li-ion battery.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, the electronic device being a battery jump charging device comprising a cover; a first 12V battery disposed within the cover; a second 12V battery disposed within the cover; a positive cable having a positive clamp, the positive cable connected to the battery; and a negative cable having a negative clamp, the negative cable connected to the highly electrically conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode, further comprising a highly electrically conductive rigid frame electrically connected to the first 12V battery, second 12V battery, and the control switch, and configured to selectively operate the device in a 12V mode or 24V mode.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, the electronic device being a battery jump charging device comprising a cover; a first 12V battery disposed within the cover; a second 12V battery disposed within the cover; a positive cable having a positive clamp, the positive cable connected to the battery; and a negative cable having a negative clamp, the negative cable connected to the highly electrically conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode, further comprising a highly electrically conductive rigid frame electrically connected to the first 12V battery, second 12V battery, and the control switch, and configured to selectively operate the device in a 12V mode or 24V mode, and further comprising an interface disposed between the control knob and the cover of the device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, the electronic device being a battery jump charging device comprising a cover; a first 12V battery disposed within the cover; a second 12V battery disposed within the cover; a positive cable having a positive clamp, the positive cable connected to the battery; and a negative cable having a negative clamp, the negative cable connected to the highly electrically conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode, further comprising a highly electrically conductive rigid frame electrically connected to the first 12V battery, second 12V battery, and the control switch, and configured to selectively operate the device in a 12V mode or 24V mode, and further comprising an interface disposed between the control knob and the cover of the device, wherein the interface comprises a 12V backlight indicator and a 24V backlight indicator, the device configured to selectively turn on the 12V backlight indicator or 24V backlight indicator when a 12V or 24V mode of operation is selected by rotating the control know of the control switch.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, and wherein the interface is provided with at least two visual indicators each located at the different positions, respectively, to indicate different operating modes of the device, the at least two visual indicators are configured to selectively light up when the control knob is selectively rotated to one of the different positions on the interface by one of the at least two backlights.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the interface is provided with at least two visual indicators each located at the different positions, respectively, to indicate different operating modes of the device, the at least two visual indicators are configured to selectively light up when the control knob is selectively rotated to one of the different positions on the interface by one of the at least two backlights, and wherein the at least two visual indicators are provided by at least two light windows through the display located at the different positions, respectively, the at least two visual indicators selectively light up when the control knob is selectively rotated to one of the different positions on the interface by one of the at least two backlights.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the interface is provided with at least two visual indicators each located at the different positions, respectively, to indicate different operating modes of the device, the at least two visual indicators are configured to selectively light up when the control knob is selectively rotated to one of the different positions on the interface by one of the at least two backlights, wherein the at least two visual indicators are provided by at least two light windows through the display located at the different positions, respectively, the at least two visual indicators selectively light up when the control knob is selectively rotated to one of the different positions on the interface by one of the at least two backlights, and wherein one of the at least two visual indicators is the symbol 12V to indicate a 12 volt operation mode of the device and another of the at least two visual indicators is the symbol 24V to indicate a 24 volt operation mode of the device.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the interface comprises a printed circuit board located on or adjacent to a back side of the interface, the interface having at least two lights located at the different positions on the interface.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the interface comprises a printed circuit board located on or adjacent to a back side of the interface, the interface having at least two lights located at the different positions on the interface, and wherein the at least two backlights are at least two light emitting diodes (LEDs) connected to the printed circuit board.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, and wherein the control knob comprises a light blocking opaque portion having a clear portion or see through portion configured to serve as the light window.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, further comprising: a first 12V battery disposed within the cover; a second 12V battery disposed within the cover; a highly conductive frame having a positive conductive pathway and a negative conductive pathway, the highly conductive frame electrically is selectively connected to the first 12V battery and/or the second 12V battery when the device is jump charging a battery to be charged; a positive battery cable having a positive battery clamp, the positive battery cable connected to the positive conductive pathway of the highly conductive frame; and a negative battery cable having a negative battery clamp, the negative battery cable connected to the negative conductive pathway of the highly conductive rigid frame, wherein the control switch is connected to the highly conductive frame to selectively operate the first 12V battery and/or the second 12V battery, the control knob configured to rotate between a 12V operating mode position and a 24V operating mode position to selectively operate the device in a 12V mode or 24V mode.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, and wherein the device is configured to light up one of the at least two backlights on the interface when the device is turned on.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, and wherein the interface is configured to display an real time operating voltage of the device during operation of the device.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, further comprising: a first 12V battery disposed within the cover; a second 12V battery disposed within the cover; a highly conductive frame having a positive conductive pathway and a negative conductive pathway, the highly conductive frame electrically is selectively connected to the first 12V battery and/or the second 12V battery when the device is jump charging a battery to be charged; a positive battery cable having a positive battery clamp, the positive battery cable connected to the positive conductive pathway of the highly conductive frame; and a negative battery cable having a negative battery clamp, the negative battery cable connected to the negative conductive pathway of the highly conductive rigid frame, wherein the control switch is connected to the highly conductive frame to selectively operate the first 12V battery and/or the second 12V battery, the control knob configured to rotate between a 12V operating mode position and a 24V operating mode position to selectively operate the device in a 12V mode or 24V mode, wherein the first 12V battery and second 12V battery are Li-ion batteries.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, and wherein the control knob is made of an opaque material and the light window is defined by a slot in the control knob filled light transmitting material.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the control knob is made of an opaque material and the light window is defined by a slot in the control knob filled light transmitting material, wherein the control knob comprises a round outer edge, and wherein the slot is a radially oriented slot extending from the outer edge of the control knob inwardly.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the control knob is made of an opaque material and the light window is defined by a slot in the control knob filled light transmitting material, wherein the control knob comprises a round outer edge, wherein the slot is a radially oriented slot extending from the outer edge of the control knob inwardly, and wherein the control knob comprises a finger gripping protrusion, and wherein the slot extends along a length axis of the protrusion.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, further comprising an electrical switch located between the power source and the at least two backlights, the electrical switch is configured to light up one of the at least two backlights when the control knob is selectively rotated to one of the different positions on the interface.

The presently described subject matter is directed to an electrical optical position sensing switch system for an electronic device.

The presently described subject matter is directed to an improved electrical optical position sensing switch system for use in a battery jump starting device such as a portable rechargeable jump starting device.

The presently described subject matter is directed to an improved electrical optical position sensing switch system in combination with a battery jump starting device such as a portable rechargeable jump starting device.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, further comprising an enable circuit configured to reduce parasite current when the system is in an “off” state, wherein the circuit comprises a transistor acting as an electrical switch when the system is in an “on” state.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, further comprising an enable circuit configured to reduce parasite current when the system is in an “off” state, wherein the circuit comprises a transistor acting as an electrical switch when the system is in an “on” state, wherein the circuit is configured so that when the transistor is “on”, current flows from the first battery to the second battery when the batteries are connected in parallel.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, further comprising an enable circuit configured to reduce parasite current when the system is in an “off” state, wherein the circuit comprises a transistor acting as an electrical switch when the system is in an “on” state, wherein the circuit is configured so that when the transistor is “on”, current flows from the first battery to the second battery when the batteries are connected in parallel, wherein the circuit is configured so that no current flows from the first battery to the second battery when the batteries are connected in series.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, wherein the circuit is configured so that when there is current flow or lack thereof, this allows the optical coupler to provide a signal to the microcontroller indicating to the microcontroller which position the control switch is in.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, wherein the circuit is configured so that when there is current flow or lack thereof, this allows the optical coupler to provide a signal to the microcontroller indicating to the microcontroller which position the control switch is in, wherein the circuit is configured so that an opposite signal is provided as a separate input to the microcontroller so that the microcontroller can determine when the control switch is an “in between” position between a 12V position and a 24V position.

The presently described subject matter is directed to an electronic device with a dual battery diode bridge system.

The presently described subject matter is directed to a rechargeable battery jump starting device with a dual battery diode bridge system.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, further comprising a conductive frame connected to the first 12V battery, the second 12V battery, and the electrical control switch.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, further comprising a conductive frame connected to the first 12V battery, the second 12V battery, and the electrical control switch, wherein the conductive frame comprises a plurality of conductive frame members.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery, further comprising a conductive frame connected to the first 12V battery, the second 12V battery, and the electrical control switch.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery, further comprising a conductive frame connected to the first 12V battery, the second 12V battery, and the electrical control switch, wherein the conductive frame comprises a plurality of conductive frame members.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery, further comprising a conductive frame connected to the first 12V battery, the second 12V battery, and the electrical control switch, wherein the conductive frame comprises a plurality of conductive frame members, wherein the back-charge diode module comprising an upper frame member, lower frame member, and a center frame member located between the upper frame member and lower frame member and spaced apart from each other, the first channel of diodes are connected between the upper frame member and center frame member, the second channel of diodes are connected between the lower frame member and the center frame member.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery, further comprising a conductive frame connected to the first 12V battery, the second 12V battery, and the electrical control switch, wherein the conductive frame comprises a plurality of conductive frame members, wherein the back-charge diode module comprising an upper frame member, lower frame member, and a center frame member located between the upper frame member and lower frame member and spaced apart from each other, the first channel of diodes are connected between the upper frame member and center frame member, the second channel of diodes are connected between the lower frame member and the center frame member, wherein the center frame member is connected to a positive battery cable.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery, further comprising a conductive frame connected to the first 12V battery, the second 12V battery, and the electrical control switch, wherein the conductive frame comprises a plurality of conductive frame members, wherein the back-charge diode module comprising an upper frame member, lower frame member, and a center frame member located between the upper frame member and lower frame member and spaced apart from each other, the first channel of diodes are connected between the upper frame member and center frame member, the second channel of diodes are connected between the lower frame member and the center frame member, wherein the center frame member is connected to a positive battery cable, wherein the center frame member is connected to a positive cam lock configured for releasably connecting the positive battery cable to the positive cam lock.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, further comprising a smart switch connected to the first 12V battery and the second 12V battery, the smart switch configured for switching on current flow from the first 12V battery and/or the second 12V battery only upon detecting that the positive battery clamp and negative battery clamp are correctly connected to the correct polarity battery terminals of the vehicle battery being jump started.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein a negative terminal of the first 12V battery is permanently connected to the smart switch.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein a negative terminal of the first 12V battery is permanently connected to the smart switch, and wherein the negative terminal of the second 12V battery is selectively connected to the smart switch via the electrical control switch.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein a positive terminal of the second 12V battery is permanently connected to the back-charge diode bridge.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein a positive terminal of the second 12V battery is permanently connected to the back-charge diode bridge, and wherein a positive terminal of the first 12V battery is selectively connected to the back-charge diode bridge via the electrical control switch.

The presently described subject matter is directed to a portable battery jump starting device such as a portable rechargeable battery jump starting device, the device comprising or consisting of a first 12V battery; a second 12V battery; a highly electrically conductive frame connected to the first 12V battery and second 12V battery; an electrical control switch electrically connected to the highly electrically conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the highly electrically conductive frame; and a dual battery diode bridge connected to the highly electrically conductive frame, the dual battery diode bridge having two channels of diodes supporting the first 12V battery and the second 12V battery for protecting against back-charge after jump starting a vehicle.

The presently described subject matter is directed to a battery jump starting device such as a portable rechargeable battery jump starting device, the device comprising or consisting of a first 12V battery; a second 12V battery; a highly electrically conductive frame connected to the first 12V battery and second 12V battery; an electrical control switch electrically connected to the highly electrically conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the highly electrically conductive frame; and a dual battery diode bridge connected to the highly electrically conductive frame, the dual battery diode bridge having two channels of diodes supporting the first 12V battery and the second 12V battery for protecting against back-charge after jump starting a vehicle, wherein dual battery diode bridge is a back-charge diode module.

The presently described subject matter is directed to a battery jump starting device such as a portable rechargeable battery jump starting device, the device comprising or consisting of a first 12V battery; a second 12V battery; a highly electrically conductive frame connected to the first 12V battery and second 12V battery; an electrical control switch electrically connected to the highly electrically conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the highly electrically conductive frame; and a dual battery diode bridge connected to the highly electrically conductive frame, the dual battery diode bridge having two channels of diodes supporting the first 12V battery and the second 12V battery for protecting against back-charge after jump starting a vehicle, wherein the back-charge diode module comprises an upper channel of diodes supporting current through the first 12V battery and a lower channel of diodes supporting current through the second 12V battery.

The presently described subject matter is directed to a battery jump starting device such as a portable rechargeable battery jump starting device, the device comprising or consisting of a first 12V battery; a second 12V battery; a highly electrically conductive frame connected to the first 12V battery and second 12V battery; an electrical control switch electrically connected to the highly electrically conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the highly electrically conductive frame; and a dual battery diode bridge connected to the highly electrically conductive frame, the dual battery diode bridge having two channels of diodes supporting the first 12V battery and the second 12V battery for protecting against back-charge after jump starting a vehicle, wherein the back-charge diode module comprises an upper channel of diodes supporting current through the first 12V battery and a lower channel of diodes supporting current through the second 12V battery, wherein the upper channel of diodes and lower channel of diodes are connected to a bar of the highly electrically conductive frame leading to a positive output of the battery jump starting device for combining current from the upper channel of diodes and lower channel of diodes.

The presently described subject matter is directed to a battery jump starting device such as a portable rechargeable battery jump starting device, the device comprising or consisting of a first 12V battery; a second 12V battery; a highly electrically conductive frame connected to the first 12V battery and second 12V battery; an electrical control switch electrically connected to the conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the highly electrically conductive frame; and a dual battery diode bridge connected to the highly electrically conductive frame, the dual battery diode bridge having two channels of diodes supporting the first 12V battery and the second 12V battery for protecting against back-charge after jump starting a vehicle, wherein dual battery diode bridge is a back-charge diode module, wherein the back-charge diode module comprises an upper conductive bar electrically connected to the upper channel of diodes, a lower conductive bar electrically connected to the lower channel of diodes, and a center conductive bar located between the upper conductive bar and lower conductive bar and electrically connected to both the upper channel of diodes and lower channel of diodes.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or a conductive frame, the charger configured for sequentially charging the first 12V battery and the second 12V battery.

The presently described subject matter is directed to a portable battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to incrementally charge the first 12V battery and the second 12V battery to maintain the first 12V battery and second 12V battery closed to the same potential during the charging sequence.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is operated to first charge the first 12V battery or second 12V battery, whichever has the lowest voltage or charge.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to incrementally charge the first 12V battery and the second 12V battery to maintain the first 12V battery and second 12V battery closed to the same potential during the charging sequence, wherein the charger is operated to first charge the first 12V battery or second 12V battery, whichever has the lowest voltage or charge.

The presently described subject matter is directed to a portable battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to sequentially charge the first 12V battery and second 12V battery incrementally in fixed voltage increases.

The presently described subject matter is directed to a battery jump starting device, the portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to sequentially charge the first 12V battery and second 12V battery incrementally in varying voltage increases.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to sequentially charge the first 12V battery and second 12V battery incrementally in random voltage increases.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to sequentially charge the first 12V battery and second 12V battery incrementally in fixed voltage increases, wherein the charger is configured to sequentially charge the first 12V battery and second 12V battery incrementally in 100 millivolt (mV) increases.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is operated to first charge the first 12V battery or second 12V battery, whichever has the lowest voltage or charge, wherein voltage charging increments are a portion or fraction of a total voltage charge required to fully charge the first 12V battery or second 12V battery.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, further comprising a programmable microcontroller electrically connected to the charger for controlling operation of the charger.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, further comprising a peak voltage shutoff to prevent overcharging the first 12V battery and second 12V battery.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to sequentially charge the first 12V battery and second 12V battery incrementally in varying voltage increases, wherein the programmable microcontroller is configured to provided charge timeouts.

The presently described subject matter is directed to a leapfrog charging system and method for an electronic device.

The presently described subject matter is directed to a leapfrog charging system and method for use in a battery jump starting device such as a portable rechargeable battery jump starting device.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the charge sequence is an incremental charge sequence.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the charge sequence is an incremental charge sequence, wherein the incremental charge sequence charges the first 12V battery or second 12V battery in increments less than a total charge increment to fully charge the first 12V battery or second 12V battery.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the charging sequence is a back-and-forth charging sequence between the first 12V battery and second 12V battery.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the charging sequence includes back-to-back charges of a same battery of the first 12V battery and second 12V battery two or more times prior to sequencing to the other battery.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the sequence is a programmed sequence.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the charging sequence includes one or more charging pauses.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the sequence is a programmed sequence, wherein charging time increments, voltage increase amounts, and charging rates are all adjustable in the programmed sequence.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the charger configured for sequentially charging the first 12V battery and the second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the leapfrog charger is configured to incrementally charge the first 12V battery and the second 12V battery to maintain the first 12V battery and second 12V battery close to the same potential during sequentially charging the first 12V battery and the second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the charger is configured to first charge the first 12V battery or second 12V battery, whichever has the lowest voltage or charge.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the leap frog charger is configured to sequentially charge the first 12V battery and second 12V battery incrementally in fixed voltage increases.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, and wherein the leapfrog charger is configured to sequentially charge the first 12V battery and second 12V battery incrementally in varying voltage increases.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the leapfrog charger is configured to sequentially charge the first 12V battery and second 12V battery incrementally in random voltage increases.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the leapfrog charger is configured to sequentially charge the first 12V battery and second 12V battery incrementally in 100 millivolt (mV) increases.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein voltage charging increments are a portion or fraction of a total voltage charge required to fully charge the first 12V battery or second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, further comprising a programmable microcontroller electrically connected to the leapfrog charger for controlling operation of the charger.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; a leapfrog charger connected to the first 12V battery and second 12V battery, the leapfrog charger configured for sequentially charging the first 12V battery and the second 12V battery; and, a programmable microcontroller electrically connected to the leapfrog charger for controlling operation of the charger, wherein the programmable microcontroller is configured to provided charge timeouts.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; a leapfrog charger connected to the first 12V battery and second 12V battery, the leapfrog charger configured for sequentially charging the first 12V battery and the second 12V battery; and a peak voltage shutoff to prevent over-charging the first 12V battery and second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the charging sequence is a back-and-forth charging sequence between the first 12V battery and second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the charging sequence is a back-and-forth charging sequence between the first 12V battery and second 12V battery, and wherein the charging sequence includes back-to-back charges of a same battery of the first 12V battery and second 12V battery two or more times prior to sequencing to the other battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the charging sequence includes one or more charging pauses.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein charging time increments, voltage increase amounts, and charging rates are all adjustable in a programmed sequence.

The presently described subject matter is directed to a highly conductive frame for use in an electronic device.

The presently described subject matter is directed to a highly conductive frame for use with or part of a battery assembly of an electronic device.

The presently described subject matter is directed to a highly conductive frame for use in a battery jump starting device such as a portable rechargeable battery jump starting device.

The presently described subject matter is directed to a highly conductive frame in combination with a battery jump starting device such as a portable rechargeable battery jump starting device.

The presently described subject matter is directed to a highly conductive frame for connecting a battery to positive and negative cables for use in a battery jump starting device such as a portable rechargeable battery jump starting device.

The presently describe subject matter is directed to a battery assembly comprising or consisting of a battery connected to a highly conductive frame.

The presently describe subject matter is directed to a battery assembly comprising or consisting of a battery connected to a highly conductive frame for use in a battery jump starting device such as a portable rechargeable battery jump starting device.

The presently described subject matter is directed to a battery jump starting device such as a portable rechargeable jump starting device, the device comprising or consisting of a first 12V battery; a second 12V battery; and a highly conductive frame connected to the first 12V battery and second 12V battery.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, further comprising an electrical control switch electrically connected to the highly conductive frame, the first 12V battery, and the second 12V battery, the electrical control switch having a parallel switch position for connecting the first 12V battery and second 12V battery in parallel, the electrical control switch having a series switch position for connecting the first 12V battery and second 12V battery in series.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame is semi-rigid.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame is rigid.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame is a three-dimensional (3D) frame structure.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame comprises multiple highly conductive frame members connected together.

The presently described subject matter is directed to a battery jump starting device such as a portable rechargeable jump starting device, the device comprising or consisting of a first 12V battery; a second 12V battery; and a highly conductive frame connected to the first 12V battery and second 12V battery, wherein the highly conductive frame comprises multiple highly conductive frame members, wherein at least one conductive frame member includes a through hole.

The presently described subject matter is directed to a battery jump starting device such as a portable rechargeable jump starting device, the device comprising or consisting of a first 12V battery; a second 12V battery; and a highly conductive frame connected to the first 12V battery and second 12V battery, wherein the highly conductive frame comprises multiple highly conductive frame members, wherein at least one conductive frame member includes at least one through hole located at one or more ends of the at least one conductive frame member.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame comprises multiple highly conductive frame members, wherein at least one of the multiple highly conductive frame member includes at least one through hole, wherein the at least one through hole is located at one end of the highly conductive frame member, wherein adjacent highly conductive frame members are fastened together using a highly conductive bolt and nut fastener.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame comprises multiple highly conductive frame members, wherein at least one frame member is provided with at least one flattened end having a through hole.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame comprises multiple highly conductive frame members, wherein at least one conductive frame member includes a through hole, wherein the at least one frame member is provided on at least one end with a ring-shaped through hole.

The presently described subject matter is directed to a battery jump starting device such as a portable rechargeable jump starting device, the device comprising or consisting of a first 12V battery; a second 12V battery; and a highly conductive frame connected to the first 12V battery and second 12V battery, wherein other electrical components of the portable jump starting device bolt onto the highly conductive frame.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, further comprising an electrical control switch electrically connected to the highly conductive frame, the first 12V battery, and the second 12V battery, the electrical control switch having a parallel switch position for connecting the first 12V battery and second 12V battery in parallel, the electrical control switch having a series switch position for connecting the first 12V battery and second 12V battery in series, wherein the control switch bolts onto the highly conductive frame.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame comprises multiple highly conductive frame members, wherein the highly conductive frame members are made of flat metal stock material.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together, and wherein the electrically conductive frame members are one or more selected from the group of electrically conductive bars, plates, rods, and tubes.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together, and wherein the electrically conductive frame members are flat conductive bars having one or more bends along a length of the conductive frame members.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together, and wherein the electrically conductive frame members are located adjacent to sides of the rechargeable battery.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together, wherein the electrically conductive frame members are located adjacent to sides of the rechargeable battery, and, wherein the electrically conductive frame at least partially surround the rechargeable battery.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together, and wherein the electrically conductive frame members are each provided with a through hole located in at least one end of the respective frame member for accommodating a fastener for connecting the electrically conductive frame members together or connecting the respective frame member to an electrical component.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the positive conductive frame is connected to a positive cam-lock for removably connecting with the positive cable and the negative conductive frame is connected to a negative cam-lock for removably connecting with the negative cable.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the rechargeable battery is a rechargeable battery assembly comprising one or more rechargeable battery cells, a positive electrically conductive bar connected to the positive terminal of the rechargeable battery, and a negative electrically conductive bar connected to the negative terminal of the rechargeable battery.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the rechargeable battery is a rechargeable battery assembly comprising one or more rechargeable battery cells, a positive electrically conductive bar connected to the positive terminal of the rechargeable battery, and a negative electrically conductive bar connected to the negative terminal of the rechargeable battery, and wherein the positive electrically conductive bar and negative electrically conductive bar are both oriented transversely relative to a length of the one or more rechargeable battery cells.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the rechargeable battery is a rechargeable battery assembly comprising one or more rechargeable battery cells, a positive electrically conductive bar connected to the positive terminal of the rechargeable battery, and a negative electrically conductive bar connected to the negative terminal of the rechargeable battery, wherein the positive electrically conductive bar and negative electrically conductive bar are both oriented transversely relative to a length of the one or more rechargeable battery cells, and wherein the electrically conductive bars are wider relative to a width of the one or more rechargeable battery cells and each protrudes from a side of the rechargeable battery assembly.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the rechargeable battery is a rechargeable battery assembly comprising one or more rechargeable battery cells, a positive electrically conductive bar connected to the positive terminal of the rechargeable battery, and a negative electrically conductive bar connected to the negative terminal of the rechargeable battery, and wherein the positive electrically conductive bar and negative electrically conductive bar are each provided with a through hole for connection with the electrically conductive frame.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, further comprising a switch connected between the negative conductor bar and the negative cable for selectively electrically connecting the negative conductor bar to the negative cable during operation of the rechargeable battery jump starting device.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, further comprising a switch connected between the negative conductor bar and the negative cable for selectively electrically connecting the negative conductor bar to the negative cable during operation of the rechargeable battery jump starting device, wherein the switch is a smart switch for electrically connecting the negative conductor bar to the negative cable only upon detecting that the positive battery clamp and negative battery clamp are correctly connected to the correct polarity terminal of the vehicle battery being jump started (i.e. positive battery clamp connected to positive vehicle battery terminal and negative battery clamp connected to negative vehicle battery terminal).

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of rechargeable battery assembly and a negative conductive frame connected at one end to the negative terminal of the rechargeable battery assembly; a positive cam-lock connected to an opposite end of the positive conductive frame; a negative cam-lock connected to an opposite end of the negative conductive frame; a positive battery cable removably connected at one end to the positive cam-lock; a negative battery cable removably connected at one end to the negative cam-lock; a positive battery clamp connected to an opposite end of the positive cable; and a negative battery clamp connected to an opposite end of the negative cable.

The presently described subject matter is directed to a battery assembly for an electronic device.

The presently described subject matter is directed to a battery assembly for use in an electronic device.

The presently described subject matter is directed to a battery assembly for use in a battery jump starting device such as a portable rechargeable battery jump starting device.

The presently described subject matter is directed to a battery assembly in combination with a battery jump starting device such as a portable rechargeable battery jump starting device.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the positive highly conductive member and negative highly conductive member are both oriented transversely relative to a length of the positive and negative foil, respectively.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the positive highly conductive member and negative highly conductive member are both oriented transversely relative to a length of the positive and negative foil, respectively, wherein the highly conductive members are wider than the positive and negative foil, respectively.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the highly conductive members are oriented flat against opposite ends of the at least one battery cell.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the highly conductive members are provided with a through hole for connection with the electronic device using a bolt and nut fastener.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the highly conductive members are made from plate or bar type material.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the positive foil at least partially wraps around the positive highly conductive member, and the negative foil at least partially wraps around the negative highly conductive member.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the positive foil at least partially wraps around the positive highly conductive member, and the negative foil at least partially wraps around the negative highly conductive member, wherein the positive foil and negative foil fully wrap around the positive highly conductive member and the negative highly conducive member, respectively.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the positive foil is soldered or welded to the positive highly conductive member and the negative foil is soldered or welded to the negative highly conductive member.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the at least one battery cell is multiple battery cells layered one on top of the other.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the battery assembly is covered with heat shrink material.

The presently described subject matter is directed to a rechargeable battery jump starting device comprising or consisting of a power circuit including a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; and an electrically conductive frame connected to the battery assembly.

The presently described subject matter is directed to a rechargeable battery jump starting device comprising or consisting of a power circuit including a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; and an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable.

The presently described subject matter is directed to a rechargeable battery jump starting device comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable.

The presently described subject matter is directed to a rechargeable battery jump starting device comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the electrically conductive frame comprises a positive conductive pathway from the positive terminal connector of the battery assembly to the connection with the positive battery cable and a negative conductive pathway from the negative terminal connector of the battery assembly to the connection with the negative battery cable.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive electrically conductive bar and negative electrically conductive bars are both oriented transversely relative to a length of the one or more rechargeable battery cells.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive electrically conductive bar and negative electrically conductive bars are both oriented transversely relative to a length of the one or more rechargeable battery cells, and wherein the electrically conductive bars are wider relative to a width of the one or more rechargeable battery cells and each protrude from a side of the rechargeable battery assembly.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive terminal connector is a positive foil end of the one or more rechargeable battery cells and the negative terminal connector is a negative foil end of the one or more rechargeable battery cells.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein a side of the positive electrically conductive bar is connected flat against the positive foil end of the one or more battery cells and a side of the negative electrically conductive bar is connected flat against the negative foil end of the one or more batteries.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive electrically conductive bar and negative electrically conductive bar are each provided with a through hole for connection with the electrically conductive frame.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive terminal connector is a positive foil end of the one or more rechargeable battery cells and the negative terminal connector is a negative foil end of the one or more rechargeable battery cells, wherein the positive foil end at least partially wraps around the positive electrically conductive bar, and the negative foil end at least partially wraps around the negative electrically conductive bar.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive terminal connector is a positive foil end of the one or more rechargeable battery cells and the negative terminal connector is a negative foil end of the one or more rechargeable battery cells, wherein the positive foil end at least partially wraps around the positive electrically conductive bar, and the negative foil end at least partially wraps around the negative electrically conductive bar, wherein the positive foil end fully wraps around the positive electrically conductive bar and the negative foil end fully wraps around the negative electrically conducive bar of the rechargeable battery assembly.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive foil end is soldered or welded to the positive electrically conductive bar and the negative foil end is soldered or welded to the negative electrically conductive bar.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the one or more battery cells are multiple battery cells connected in series and layered one on top of the other to provide the rechargeable battery assembly.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the layered multiple battery cells are covered with heat shrink material.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the electrically conductive frame comprises multiple electrically conductive frame members connected together.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the electrically conductive frame comprises multiple electrically conductive frame members connected together, wherein the frame members are electrically conductive bars bent along multiple axes.

The presently described subject matter is directed to a rechargeable battery assembly for use in a rechargeable jump starting device, the rechargeable battery assembly comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector.

The presently described subject matter is directed to a rechargeable battery jump starting device with an improved vehicle or equipment battery detection device.

The presently described subject matter is directed to a rechargeable battery jump charging device with a vehicle battery detection system, comprising or consisting of a detection circuit for detecting a forward voltage drop across the back-charge diodes, the detection circuit comprising an op amp subtractor or difference amplifier whose output is fed into a comparator, wherein, if a forward voltage drop is detected across the back-charge diodes, and if the voltage is above a certain threshold or external load of a vehicle battery connected to jumper cables, then the comparator puts out a "high" signal, allowing the jump starter to continue normal operation.

The presently described subject matter is directed to a rechargeable battery jump starting device with a vehicle battery detection system, comprising or consisting of a detection circuit for detecting a forward voltage drop across the back-charge diodes, the detection circuit comprising an op amp subtractor or difference amplifier whose output is fed into a comparator, wherein, if a forward voltage drop is detected across the back-charge diodes, and if the voltage is above a certain threshold or external load of a vehicle battery connected to jumper cables, then the comparator puts out a "high" signal, allowing the jump starter to continue normal operation, and wherein, if the voltage is above the threshold, then internal jumper battery terminals continue being connected to the jumper cables through a smart-switch and the "back-charge" diodes and an internal battery negative terminal remains connected to a negative jumper cable.

The presently described subject matter is directed to a rechargeable battery jump starting device with a vehicle battery detection system, comprising or consisting of a detection circuit for detecting a forward voltage drop across the back-charge diodes, the detection circuit comprising an op amp subtractor or difference amplifier whose output is fed into a comparator, wherein, if a forward voltage drop is detected across the back-charge diodes, and if the voltage is above a certain threshold or external load of a vehicle battery connected to jumper cables, then the comparator puts out a "high" signal, allowing the jump starter to continue normal operation, and wherein, if the forward voltage drop sensed is below a certain threshold, then the comparator puts out a "low" signal, instructing a jump starter logic controlled by a micro-controller unit to open a smart-switch, disconnecting a negative battery terminal from a negative jumper cable, thus removing internal battery voltage from being applied across the jumper cables and rendering the cable terminals inactive or dead.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein the vehicle or equipment battery positive terminal connector is a positive battery clamp and the vehicle or equipment battery positive terminal connector is a negative battery clamp.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, further comprising a smart switch selectively connecting the negative terminal of the first rechargeable battery and the vehicle or equipment negative terminal battery connector.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein the vehicle or equipment battery positive terminal connector is a positive battery clamp and the vehicle or equipment battery positive terminal connector is a negative battery clamp, wherein, if the voltage is above the threshold, then the negative terminal of the first rechargeable battery continues being selectively connected to the vehicle or equipment negative terminal battery connector by the smart switch while the negative terminal of the first rechargeable battery remains connected to the vehicle or equipment negative terminal battery connector.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, further comprising a microcontroller unit having a jump starting device logic controlled by the microcontroller unit.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, further comprising a microcontroller unit having a jump starting device logic controlled by the microcontroller unit, and wherein, if the forward voltage drop detected is below a certain threshold, then the comparator puts out a "low" signal, instructing the jump starting device logic controlled by the microcontroller unit to open the smart switch, disconnecting the negative battery terminal of the rechargeable battery of the rechargeable battery jump starting device from the negative battery cable, thus removing internal battery voltage from being applied across the positive and negative battery terminal connectors and rendering the positive and negative battery terminal connectors inactive or dead.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein the back-charge diode array is connected along the positive battery cable.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, wherein the smart switch is connected along the negative battery cable.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein the back-charge diode array is connected along the positive battery cable, wherein the smart switch is connected along the negative battery cable.

The presently described subject matter is directed to a rechargeable battery jump starting device with a vehicle battery detection system, comprising or consisting of a detection circuit for detecting a forward voltage drop across the back-charge diodes, the detection circuit comprising an op amp subtractor or difference amplifier whose output is fed into a comparator, wherein, if a forward voltage drop is detected across the back-charge diodes, and if the voltage is above a certain threshold or external load of a vehicle battery connected to jumper cables, then the comparator puts out a "high" signal, allowing the jump starter to continue normal operation, and wherein, if the forward voltage drop sensed is below a certain threshold, then the comparator puts out a "low" signal, instructing a jump starter logic controlled by a micro-controller unit to open a smart-switch, disconnecting a negative battery terminal from a negative jumper cable, thus removing internal battery voltage from being applied across the jumper cables and rendering the cable terminals inactive or dead, and wherein a highly conductive frame connects the first rechargeable battery to the back-charge diode array.

The presently described subject matter is directed to a rechargeable battery jump starting device with a vehicle battery detection system, comprising or consisting of a detection circuit for detecting a forward voltage drop across the back-charge diodes, the detection circuit comprising an op amp subtractor or difference amplifier whose output is fed into a comparator, wherein, if a forward voltage drop is detected across the back-charge diodes, and if the voltage is above a certain threshold or external load of a vehicle battery connected to jumper cables, then the comparator puts out a "high" signal, allowing the jump starter to continue normal operation, and wherein, if the forward voltage drop sensed is below a certain threshold, then the comparator puts out a "low" signal, instructing a jump starter logic controlled by a micro-controller unit to open a smart-switch, disconnecting a negative battery terminal from a negative jumper cable, thus removing internal battery voltage from being applied across the jumper cables and rendering the cable terminals inactive or dead, wherein a highly conductive frame connects the first rechargeable battery to the back-charge diode array, and wherein highly conductive frame supports the back-charge diode array.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein a highly conductive frame connects the first rechargeable battery to the smart switch.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein a highly conductive frame connects the first rechargeable battery to the smart switch, and wherein the highly conductive frame connects the first rechargeable battery to the back-charge diode array.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, further comprising a second rechargeable battery; and an electrical control switch electrically connected to the first battery and the second battery, the electrical control switch having a parallel switch position for connecting the first battery and second battery in parallel, the electrical control switch having a series switch position for connecting the first battery and second battery in series.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, further comprising a second rechargeable battery; and an electrical control switch electrically connected to the first battery and the second battery, the electrical control switch having a parallel switch position for connecting the first battery and second battery in parallel, the electrical control switch having a series switch position for connecting the first battery and second battery in series, further comprising a highly conductive frame connecting the first rechargeable battery, second rechargeable battery, and the electrical control switch, the highly conductive frame selectively connecting one or both of the positive terminals of the first rechargeable battery and second rechargeable battery to the back-charge diode array, and selectively connecting one or both of the negative terminals of the first rechargeable battery and the second rechargeable battery to a smart switch.

The present described subject matter is directed to an apparatus for boosting a discharged vehicle battery for jump starting a vehicle engine comprising or consisting of a mode for pre-conditioning the discharged vehicle battery.

The present described subject matter is directed to an apparatus for boosting a discharged vehicle battery for jump starting a vehicle engine comprising or consisting of a circuit for pre-conditioning the discharged vehicle battery.

The present described subject matter is directed to an apparatus for boosting a discharged vehicle battery for jump starting a vehicle engine comprising or consisting of a 12V or 24V power supply and a supplement power supply for selectively or automatically increasing an operating voltage during a pre-conditioning stage of the discharged vehicle battery.

The present described subject matter is directed to an apparatus for boosting a discharged vehicle battery for jump starting a vehicle engine comprising or consisting of a 12V or 24V power supply and a supplement power supply for selectively or automatically increasing an operating voltage during a pre-conditioning stage of the discharged vehicle battery prior to an engine jump start stage.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, wherein the discharged vehicle battery pre-conditioning control is configured for selectively switching in and out the additional power supply during the pre-conditioning stage of boosting the discharged vehicle battery.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, wherein the discharged vehicle battery pre-conditioning control is configured for automatically switching in and out the additional power supply during the pre-conditioning stage of boosting the discharged vehicle battery.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, wherein the 12V or 24V power supply is a battery or battery pack.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, wherein the battery pack comprises multiple batteries.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, wherein the battery pack comprises multiple batteries, and, wherein the battery pack comprises multiple Li-ion batteries.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, wherein the 12V or 24V power supply and the supplemental power supply are configured as a single battery pack.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, wherein the 12V or 24V power supply and the supplemental power supply are configured as separate battery packs.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, wherein said internal power supply comprises a lithium ion battery.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, wherein said internal power supply comprises a lithium ion battery, wherein said lithium ion battery comprises a battery pack of multiple lithium ion batteries.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, wherein said power switch comprises a plurality of FETs in parallel.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, wherein said vehicle isolation sensor and reverse polarity sensor comprise optically coupled isolator phototransistors.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a plurality of power diodes coupled between said output port and said internal power supply to prevent back-charging of said internal power supply from an electrical system connected to said output port.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a temperature sensor configured to detect temperature of said internal power supply and to provide a temperature signal to said microcontroller.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a voltage measurement circuit configured to measure output voltage of said internal power supply and to provide a voltage measurement signal to said microcontroller.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a voltage regulator configured to convert output voltage of said internal power supply to a voltage level appropriate to provide operating power to internal components of the apparatus.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a USB output port configured to provide charging power from said internal power supply to a USB-chargeable device.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a USB charging port configured to provide charging power from an external power source to said internal power supply.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a flashlight circuit configured to provide a source of light to a user.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a flashlight circuit configured to provide a source of light to a user, wherein said source of light is at least one LED.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a flashlight circuit configured to provide a source of light to a user, wherein said source of light is at least one LED, wherein said microcontroller is configured to control said at least one LED to provide a visual alarm indicating an emergency situation.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a plurality of visual indicators configured to display remaining capacity status of said internal power supply.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a plurality of visual indicators configured to display remaining capacity status of said internal power supply, wherein said plurality of visual indicators comprises a plurality of LEDs providing output light of different colors.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a visual indicator configured to warn a user when a vehicle battery is connected with reverse polarity.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising separate visual indicators configured to display the power on status of the apparatus, and the jump start boost power status of power supplied to said output port.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a manual override switch configured to activate a manual override mode to enable a user to connect jump start power to said output port when said vehicle battery isolation sensor is unable to detect presence of a vehicle battery.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a manual override switch configured to activate a manual override mode to enable a user to connect jump start power to said output port when said vehicle battery isolation sensor is unable to detect presence of a vehicle battery, wherein said microcontroller is configured to detect actuation of said manual override switch for at least a predetermined period of time before activation of said manual override mode.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a jumper cable device including a plug configured to plug into said output port, a pair of cables integrated with the plug at one respective end thereof and being configured to be connected to terminals of a battery at another respective end thereof.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a jumper cable device including a plug configured to plug into said output port, a pair of cables integrated with the plug at one respective end thereof and being configured to be connected to terminals of a battery at another respective end thereof, wherein said jumper cable device further comprises a pair of ring terminals configured to respectively connect said pair of cables at said another end thereof with one of a battery terminal and a battery terminal clamp.

The presently described subject matter is directed to an apparatus for boosting a discharged vehicle battery for jump starting a vehicle engine, comprising a 12V or 24V power supply; a supplemental power supply to increase voltage of the 12V or 24V power supply; a discharged vehicle battery pre-conditioning control for switching in and out the supplemental power supply with the 12V or 24V power supply for increasing an operating voltage during a pre-conditioning stage of boosting the discharged vehicle battery; and a device for connecting the apparatus to the discharged vehicle battery for jump starting the vehicle engine, further comprising an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs and to provide an output signal indicating whether positive and negative terminals of said vehicle battery are properly connected with said positive and negative polarity outputs of said output port; a power switch connected between said internal power supply and said output port; and a microcontroller configured to receive input signals from said vehicle isolation sensor and said reverse polarity sensor, and to provide an output signal to said power switch, such that said power switch is turned on to cause said internal power supply to be connected to said output port in response to signals from said sensors indicating the presence of a vehicle battery at said output port and proper polarity connection of positive and negative terminals of said vehicle battery with said positive and negative polarity outputs, and is not turned on when signals from said sensors indicate either the absence of a vehicle battery at said output port or improper polarity connection of positive and negative terminals of said vehicle battery with said positive and negative polarity outputs, further comprising a jumper cable device including a plug configured to plug into said output port, a pair of cables integrated with the plug at one respective end thereof and being configured to be connected to terminals of a battery at another respective end thereof, wherein said jumper cable device further comprises a pair of ring terminals configured to respectively connect said pair of cables at said another end thereof with one of a battery terminal and a battery terminal clamp, wherein said output port and said plug are dimensioned so that the plug will fit into the output port only in one specific orientation.

The presently described subject matter is directed to a method of pre-conditioning a discharged vehicle battery for jump starting an engine of a vehicle, the method comprising or consisting of providing a 12V or 24V power supply; providing a supplemental power supply to increase voltage of the 12V or 24V power supply; switching in and out the additional power supply with the 12V or 24V power supply to increase an operating voltage during a pre-conditioning stage of boosting the discharged vehicle battery; and connecting the apparatus to the discharged vehicle battery for jump starting the vehicle engine.

The presently described subject matter is directed to a method of pre-conditioning a discharged vehicle battery for jump starting an engine of a vehicle, the method comprising or consisting of providing a 12V or 24V power supply; providing a supplemental power supply to increase voltage of the 12V or 24V power supply; switching in and out the additional power supply with the 12V or 24V power supply to increase an operating voltage during a pre-conditioning stage of boosting the discharged vehicle battery; and connecting the apparatus to the discharged vehicle battery for jump starting the vehicle engine, wherein the pre-conditioning stage occurs prior to an engine jump start phase.

The presently described subject matter is directed to a method of pre-conditioning a discharged vehicle battery for jump starting an engine of a vehicle, the method comprising or consisting of providing a 12V or 24V power supply; providing a supplemental power supply to increase voltage of the 12V or 24V power supply; switching in and out the additional power supply with the 12V or 24V power supply to increase an operating voltage during a pre-conditioning stage of boosting the discharged vehicle battery; and connecting the apparatus to the discharged vehicle battery for jump starting the vehicle engine, wherein the pre-condition stage occurs prior to an engine jump start phase, wherein the engine jump start phase comprises turning on an ignition of the engine and cranking the engine with an engine starter.

The presently described subject matter is directed to a method of pre-conditioning a discharged vehicle battery for jump starting an engine of a vehicle, the method comprising or consisting of providing a 12V or 24V power supply; providing a supplemental power supply to increase voltage of the 12V or 24V power supply; switching in and out the additional power supply with the 12V or 24V power supply to increase an operating voltage during a pre-conditioning stage of boosting the discharged vehicle battery; and connecting the apparatus to the discharged vehicle battery for jump starting the vehicle engine, wherein the discharged vehicle battery pre-conditioning control is configured for selectively switching in and out the additional power supply during the pre-conditioning stage of boosting the discharged vehicle battery.

The presently described subject matter is directed to a method of pre-conditioning a discharged vehicle battery for jump starting an engine of a vehicle, the method comprising or consisting of providing a 12V or 24V power supply; providing a supplemental power supply to increase voltage of the 12V or 24V power supply; switching in and out the additional power supply with the 12V or 24V power supply to increase an operating voltage during a pre-conditioning stage of boosting the discharged vehicle battery; and connecting the apparatus to the discharged vehicle battery for jump starting the vehicle engine wherein the discharged vehicle battery pre-conditioning control is configured for automatically switching in and out the additional power supply during the pre-conditioning stage of boosting the discharged vehicle battery.

The presently described subject matter is directed to a method of pre-conditioning a discharged vehicle battery for jump starting an engine of a vehicle, the method comprising or consisting of providing a 12V or 24V power supply; providing a supplemental power supply to increase voltage of the 12V or 24V power supply; switching in and out the additional power supply with the 12V or 24V power supply to increase an operating voltage during a pre-conditioning stage of boosting the discharged vehicle battery; and connecting the apparatus to the discharged vehicle battery for jump starting the vehicle engine, wherein the 12V or 24V power supply is a battery or battery pack.

The presently described subject matter is directed to a method of pre-conditioning a discharged vehicle battery for jump starting an engine of a vehicle, the method comprising or consisting of providing a 12V or 24V power supply; providing a supplemental power supply to increase voltage of the 12V or 24V power supply; switching in and out the additional power supply with the 12V or 24V power supply to increase an operating voltage during a pre-conditioning stage of boosting the discharged vehicle battery; and connecting the apparatus to the discharged vehicle battery for jump starting the vehicle engine, wherein the battery pack comprises multiple batteries.

The presently described subject matter is directed to a method of pre-conditioning a discharged vehicle battery for jump starting an engine of a vehicle, the method comprising or consisting of providing a 12V or 24V power supply; providing a supplemental power supply to increase voltage of the 12V or 24V power supply; switching in and out the additional power supply with the 12V or 24V power supply to increase an operating voltage during a pre-conditioning stage of boosting the discharged vehicle battery; and connecting the apparatus to the discharged vehicle battery for jump starting the vehicle engine, wherein the battery pack comprise multiple batteries, and wherein the battery pack comprises multiple Li-ion batteries.

The presently described subject matter is directed to a method of pre-conditioning a discharged vehicle battery for jump starting an engine of a vehicle, the method comprising or consisting of providing a 12V or 24V power supply; providing a supplemental power supply to increase voltage of the 12V or 24V power supply; switching in and out the additional power supply with the 12V or 24V power supply to increase an operating voltage during a pre-conditioning stage of boosting the discharged vehicle battery; and connecting the apparatus to the discharged vehicle battery for jump starting the vehicle engine, wherein the 12V or 24V power supply and the supplemental power supply are configured as a single battery pack.

The presently described subject matter is directed to a method of pre-conditioning a discharged vehicle battery for jump starting an engine of a vehicle, the method comprising or consisting of providing a 12V or 24V power supply; providing a supplemental power supply to increase voltage of the 12V or 24V power supply; switching in and out the additional power supply with the 12V or 24V power supply to increase an operating voltage during a pre-conditioning stage of boosting the discharged vehicle battery; and connecting the apparatus to the discharged vehicle battery for jump starting the vehicle engine, wherein the 12V or 24V power supply and the supplemental power supply are configured as separate battery packs.

In accordance with one aspect of the invention, apparatus is provided for jump starting a vehicle engine, including: an internal power supply; an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs; a power FET switch connected between said internal power supply and said output port; and a microcontroller configured to receive input signals from said vehicle isolation sensor and said reverse polarity sensor, and to provide an output signal to said power FET switch, such that said power FET switch is turned on to connect said internal power supply to said output port in response to signals from said sensors indicating the presence of a vehicle battery at said output port and proper polarity connection of positive and negative terminals of said vehicle battery with said positive and negative polarity outputs.

In accordance with another aspect of the invention, the internal power supply is a rechargeable lithium ion battery pack.

In accordance with yet another aspect of the invention, a jumper cable device is provided, having a plug configured to plug into an output port of a handheld battery charger booster device having an internal power supply; a pair of cables integrated with the plug at one respective end thereof; said pair of cables being configured to be separately connected to terminals of a battery at another respective end thereof.

The present invention also combines the MCU controlled switching in of an additional battery cell to be used in a "pre-conditioning" stage or step of the battery to be jump started. Also included is the controlled impedance of the conductive section for this pre-conditioning stage or step. The controlled impedance provides safety for this stage or step.

The battery jump starting device according to the present invention is configured to maximize the amount of power transmission from one or more batteries (e.g. Li-ion battery or batteries) to a battery (e.g. vehicle battery) being jump started. This requires a power circuit having a high or very high electrically conductive path from the one or more batteries to the battery clamps of the battery jump starting device. This physically requires the use of high or very high conductivity conductors such as metal (e.g. copper, aluminum) plates, bars, rods, and tubing. For example, a highly conductive rigid frame connects the one or more batteries to the positive and negative cables of the battery jump starting device during operation thereof.

The "rigidity" and "strength" of the highly conductive rigid frame provides structurally stability during storage and use of the battery jump starting device. This is important especially during use when high level of current is flowing through the highly conductive rigid frame potentially heating and softening the rigid frame. It is highly desired that the highly conductive rigid frame maintains its structurally stability and configuration during such use so as to avoid the risk of contact and electrically shorting with other electrical components of the battery jump starting device. This is especially true when making a compact and portable configuration of the battery assembly and the battery jump starting device itself to allow minimizing distances between electrical components located with the battery jump starting device.

The battery assembly comprising or consisting of the one or more batteries and the highly conductive frame can provide a "compact battery assembly" for use in the battery jump starting device. The battery assembly can be removably connected (i.e. detachable) as a unit to the battery jump starting device for replacement or servicing thereof. For example, the highly conductive frame is configured to wrap around and partially or fully enclose the one or more batteries to provide a compact configuration (i.e. one or more batteries nested within conductive frame). The highly conductive frame can surround the one or more batteries in one or more planes or axes. For example, the highly conductive frame wraps around the sides of the one or more batteries. As another example, the highly conductive frame wraps around the sides and the top and/or bottom of the one or more batteries capturing the one or more batteries on five or six sides (i.e. length sides, width sides, top side and/or bottom side). The highly conductive frame can be a single piece construction or multiple pieces connected or assembled together. For example, the highly conductive frame is constructed of multiple highly conductive frame members connected or assembled together.

BRIEF DESCRIPTION OF DRAWINGS

FIGS. 68A-1 thru 68F-3 show schematic circuit diagrams of the rechargeable battery jump starting device shown in FIG. 26.

FIGS. 74A-2C are schematic circuit diagrams of an example embodiment of a handheld vehicle battery boost apparatus in accordance with an aspect of the invention;

DETAILED DESCRIPTION

Figure 1:
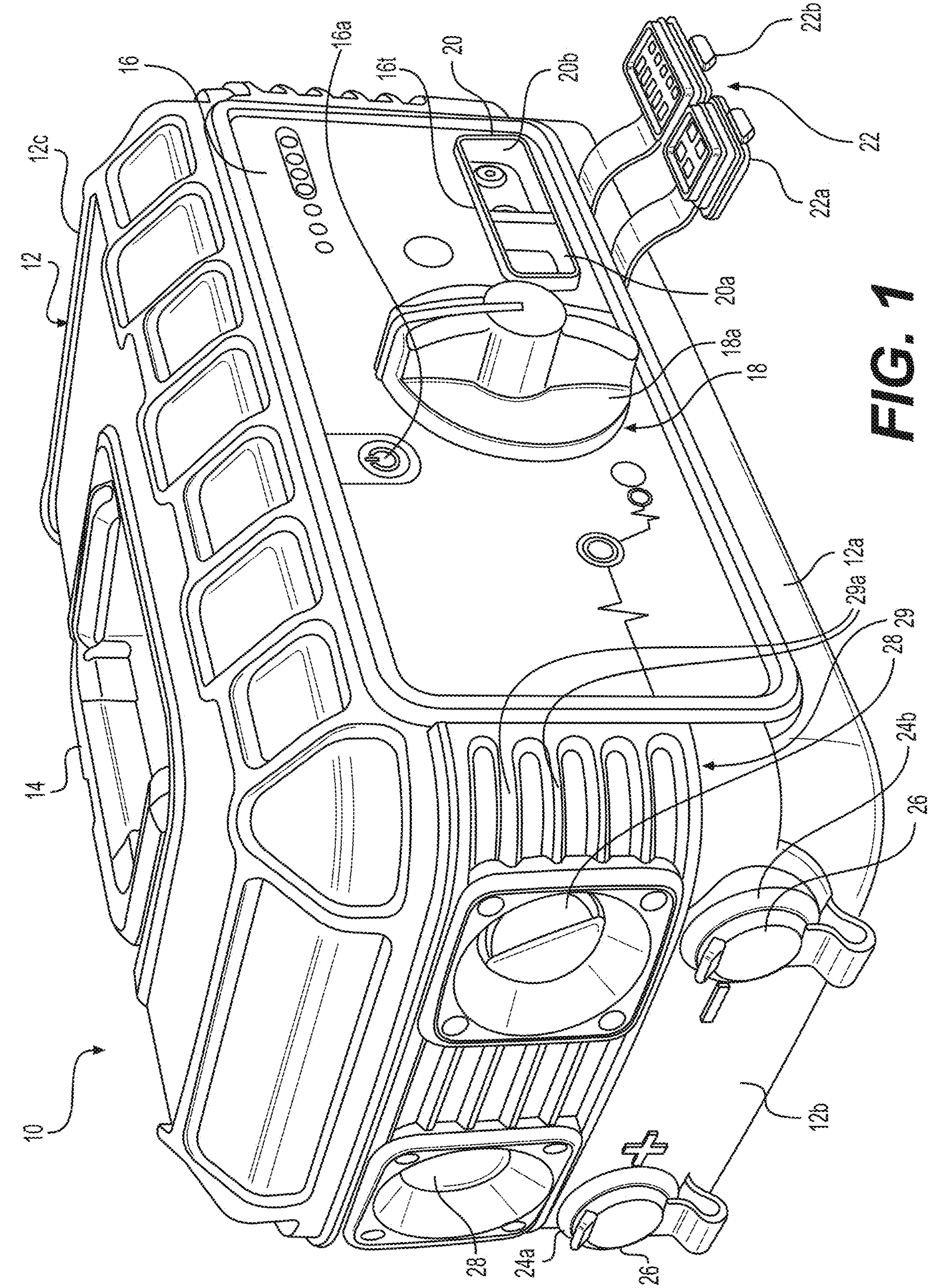
FIG. 1 is a front perspective view of a battery jump starting device according to the present invention.

The battery jump starting device 10 according to the present invention is shown in FIGS. 1-8.

The battery jump starting device 10 comprises a cover 12 fitted with a handle 14, and having the particular design shown in FIGS. 1-8.

The battery jump starting device 10 comprises a front interface 16, a power button **16*a* for turning the power on or off, and an electrical control switch 18 having a control knob 18*a* for operating the control switch 18. The main operational portion of the control switch 18 is located internally within the cover 12. The control switch 18 is configured so that a user can selectively rotate the control knob 18*a*** to either a first position (12V mode) or a second position (24V mode) depending on the particular voltage system of the vehicle being jump started (e.g. 12V, 24V vehicle electrical system).

Figure 69:
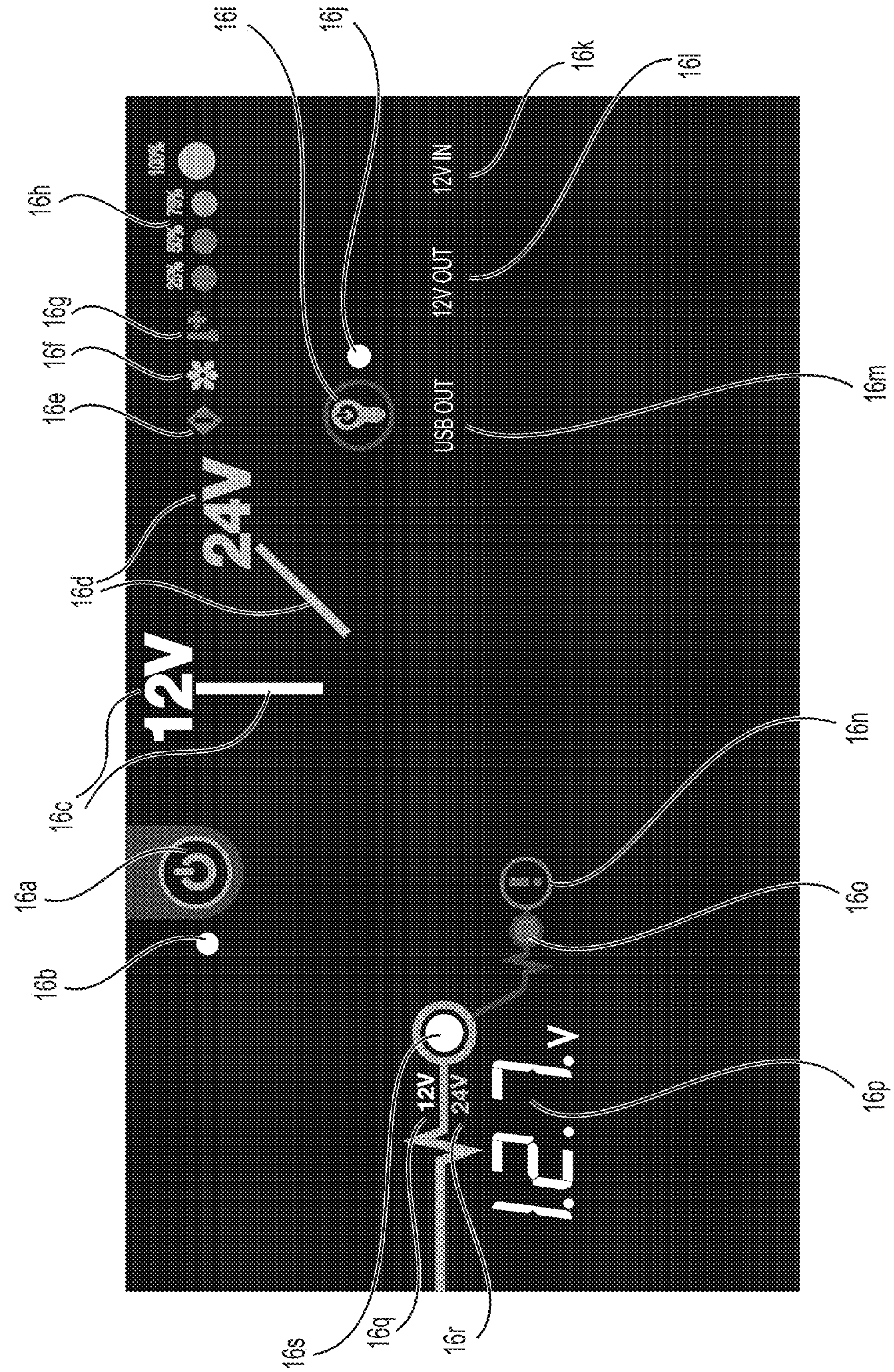
FIG. 69 is a detailed front view of an example embodiment of a display for use with the rechargeable jump starting devices shown in FIGS. 10, 110, and 310.

The detailed features of the interface 16 are shown in FIG. 69. The interface 16, includes:

1) Power Button **16*a*;**
2) Power LED **16*b*** (e.g. White colored LED);
3) 12V Mode LED **16*c*** (e.g. White colored LED);
4) 24V Mode LED **16*d* at same location as 16*c*** (e.g. Blue colored LED);
5) Error LED **16*e*** (e.g. Red colored LED);
6) Cold Error LED **16*f*** (e.g. Blue colored LED);
7) Hot Error LED **16*g*** (e.g. Red colored LED);
8) Internal Battery Fuel Gauge LEDs **16*h*** (e.g. Red, Red, Amber, Green colored LEDs);
9) Flashlight Mode Button **16*i*;**
10) Flashlight LED **16*j*** (e.g. White colored LED);
11) 12V IN LED **16*k*** (e.g. White/Red colored LED);
12) 12V OUT LED **16*l*** (e.g. White/Red colored LED);
13) USB OUT LED **16*m*** (e.g. White colored LED);
14) Manual Override Button **16*n*:**
15) Manual Override LED **16*o*** (e.g. Red colored LED):
16) Voltmeter Display LED **16*p*** (e.g. White colored LED);
17) 12V Mode LED **16*q*** (e.g. White colored LED);
18) 24V Mode LED **16*r*** (e.g. Blue colored LED); and
19) Boost LED **16*s*** (e.g. White colored LED).

The above features can be modified with different colored LEDs and/or other arrangements on the face of the interface 16.

Figure 2:
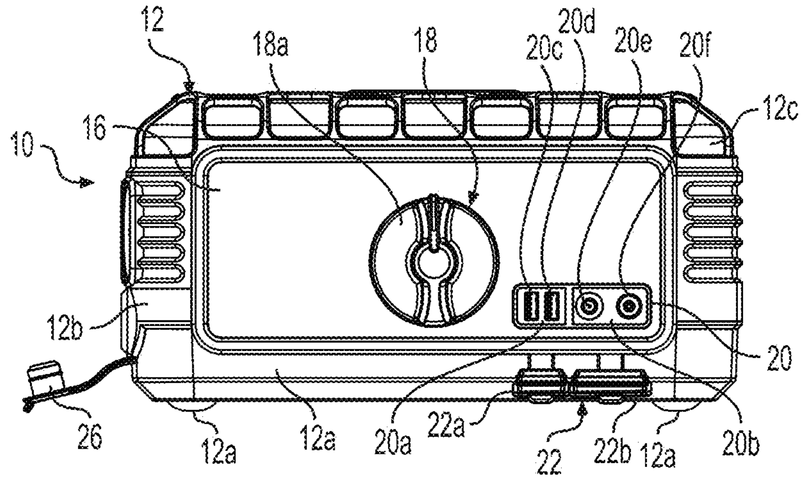
FIG. 2 is a front elevational view of a battery jump starting device shown in FIG.
Figure 3:
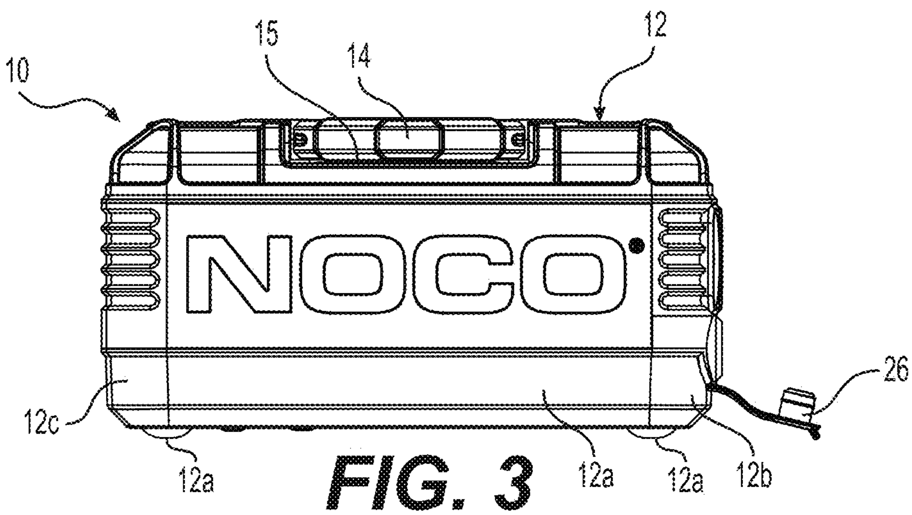
FIG. 3 is a rear elevational view of the battery jump starting device shown in FIG.

The battery jump starting device 10 further comprises a port 20 having left side port **20*a* and right side port 20*b*, as shown in FIG. 2. The port 20 is configured to extend through a through hole 16***t* located in the lower right corner of the interface 16. The left side port 20*a* accommodates dual 2.1 amp (A) USB OUT ports 20*c*, 20*d* and the right side port 20*b* accommodates an 18A 12V XGC OUT port 20*e* and a 5 A 12V XGC IN port 20*f*, as shown in FIG. 2.

The cover 12 is provided with the resilient sealing cap 22, including left side sealing cap 22*a* for sealing left side port 20*a* and right side sealing cap 22*b* for sealing right side port 20*b* during non-use of the battery jump starting device 10.

Figure 4:
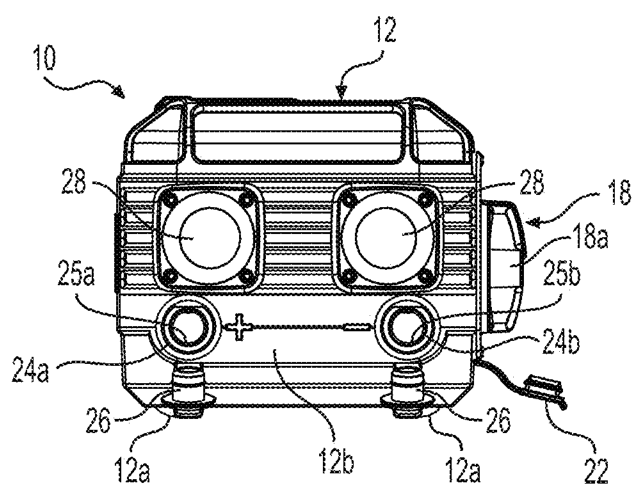
FIG. 4 is a left side elevational view of the battery jump starting device shown in FIG. 1.
Figure 5:
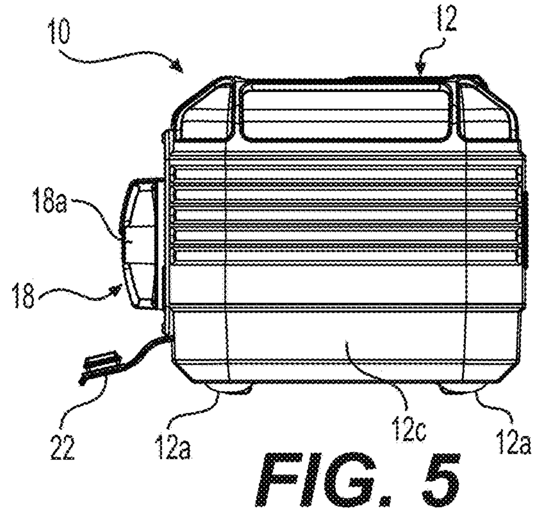
FIG. 5 is a right side elevational view of the battery jump staring device shown in FIG. 1.
Figure 6:
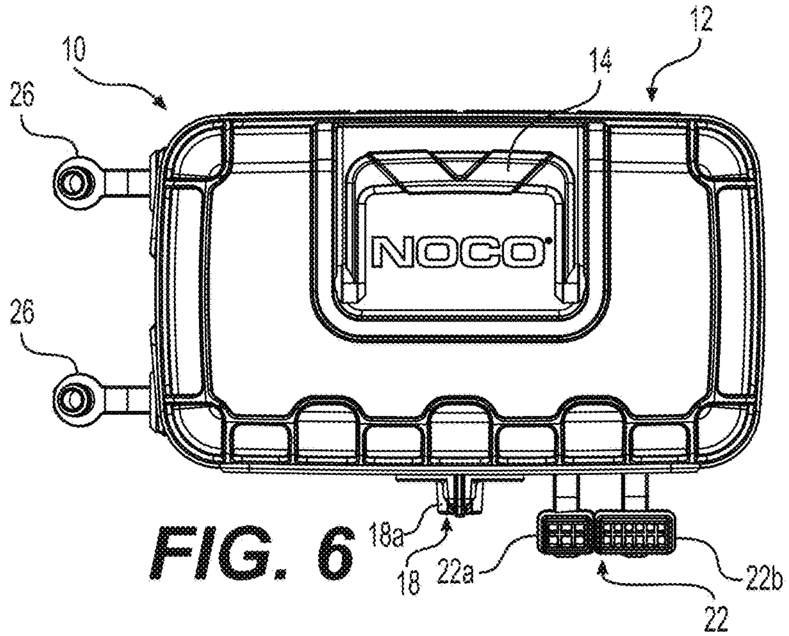
FIG. 6 is a top planar view of the battery jump starting device shown in FIG. 1.
Figure 7:
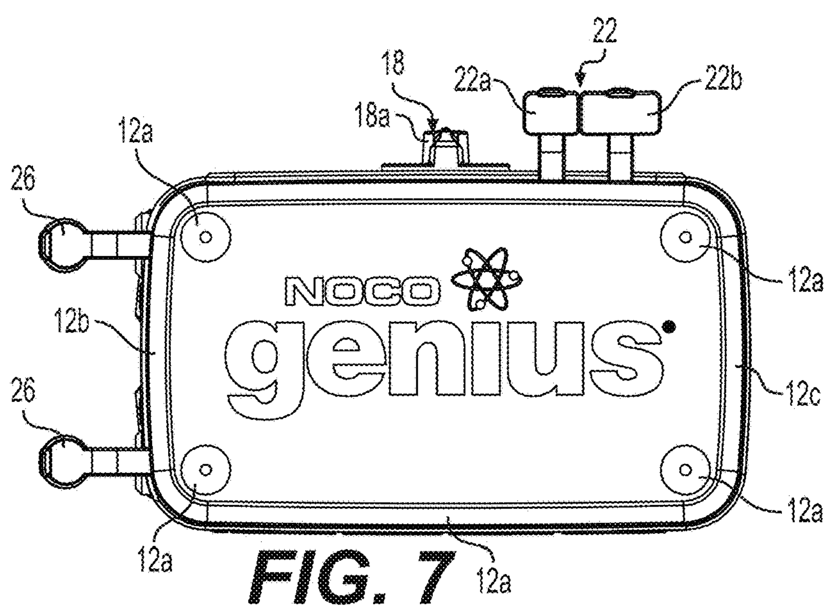
FIG. 7 is a bottom planar view of the battery jump starting device shown in FIG. 1.
Figure 8:
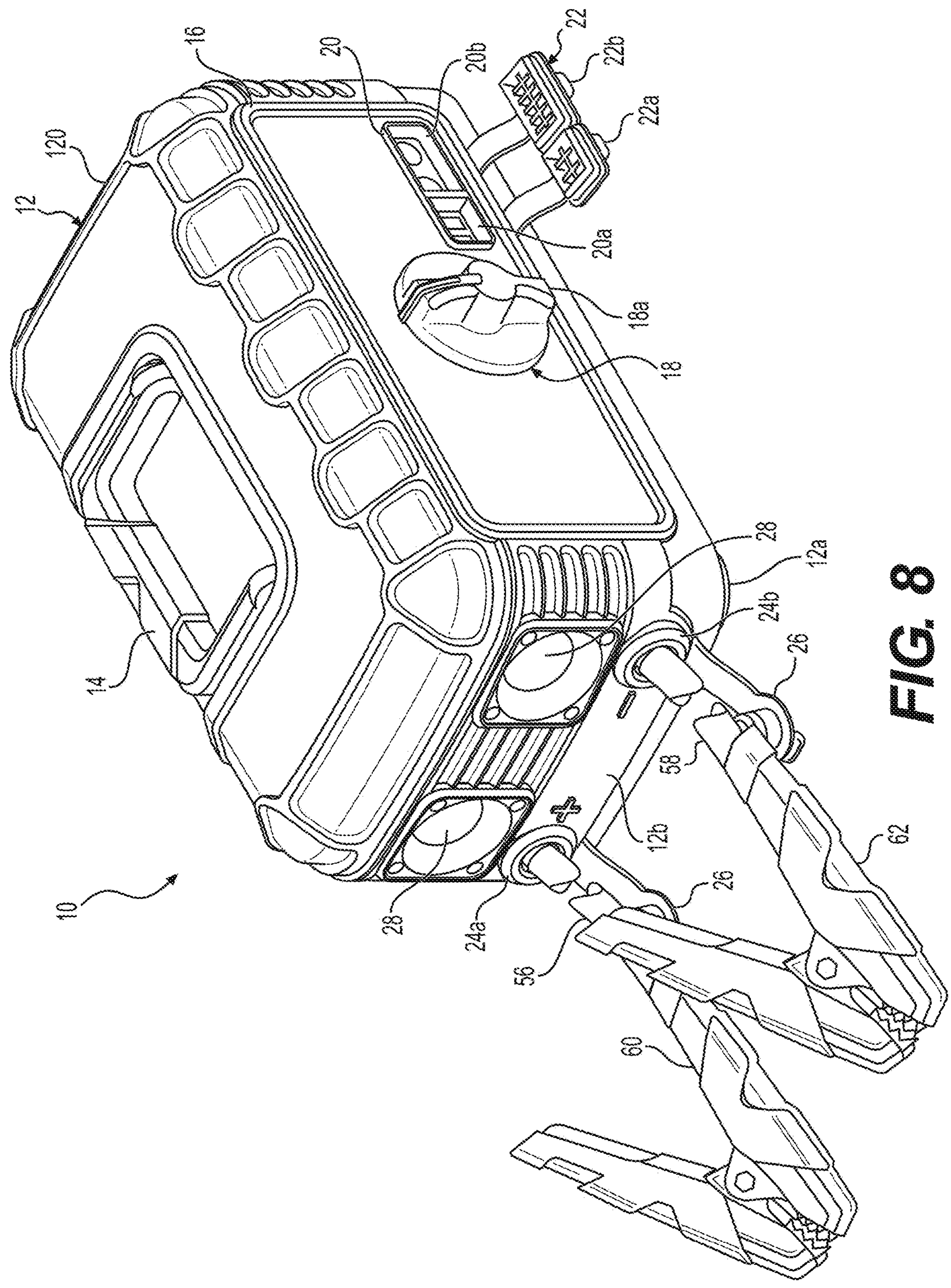
FIG. 8 is a perspective view of the battery jump starting device shown in FIG. 1 with detachable battery cables attached to the battery jump starting device.

The left side of the battery jump starting device 10 is also fitted with a pair of light emitting diodes 28 (LEDS) for using the battery jump starting device 10 as a work light. For example, the LEDs 28 are dual 1100 Lumen high-intensity LED floodlights), as shown in FIGS. 1, 4, and 8. The LEDs 28 are configured to have seven (7) operational modes, including 100% intensity, 50% intensity, 10% intensity, SOS mode (emergency protocol), blink mode, strobe mode, and Off mode.

The left side of the battery jump starting device 10 is fitted with a heat sink 29 (FIG. 1) for dissipating heat from the LEDs 28. For example, the heat sink 29 is made of a heat conductive material (e.g. molded or die cast aluminum heat sink). The heat sink 29 is provided with ribs 29*a* (FIG. 1) to facilitate the heat sink 29 transferring heat to the surrounding atmosphere to prevent the LEDs 28 from overheating.

The battery jump starting device 10 is shown in FIG. 1 without battery cables having battery clamps for connecting the battery jump starting device 10 to a battery of a vehicle to be jump started. The battery jump starting device can be configured to removably or detachably connect to a set of battery cables each having a battery clamps (e.g. positive battery cable with a positive clamp, negative battery cable with a negative clamp). Alternatively, the battery jump starting device can be fitted with battery cables hard wired directly to the device and being non-removable or non-detachable.

Figure 11:
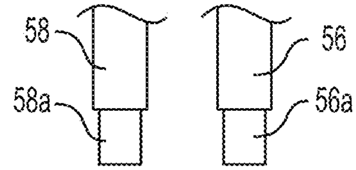
FIG. 11 is a top view of the connection ends of the detachable battery cables shown in FIG. 9.

As shown in FIGS. 1 and 4, the left side of the battery jump starting device 10 is provided with a POSITIVE (+) cam-lock 24*a* and a NEGATIVE (–) cam-lock 24*b*. The cam-locks 24*a*, 24*b* include receptacles 25*a*, 25*b* (FIG. 4) configured for removably or detachably connecting with connecting end 56*a* (FIG. 11) of the positive battery cable 56 (FIG. 8) and the connecting end 58*a* of negative battery cable 58, respectively. The cam-locks 24*a*, 24*b* are fitted with sealing caps 26 (FIG. 1) for closing and sealing the receptacles 25*a*, 25*b* of the cam-locks 24*a*, 24*b*, respectively, during non-use of the battery jump starting device 10 to keep dirt and moisture from entering the receptacles 25*a*, 25*b*.

Figure 9:
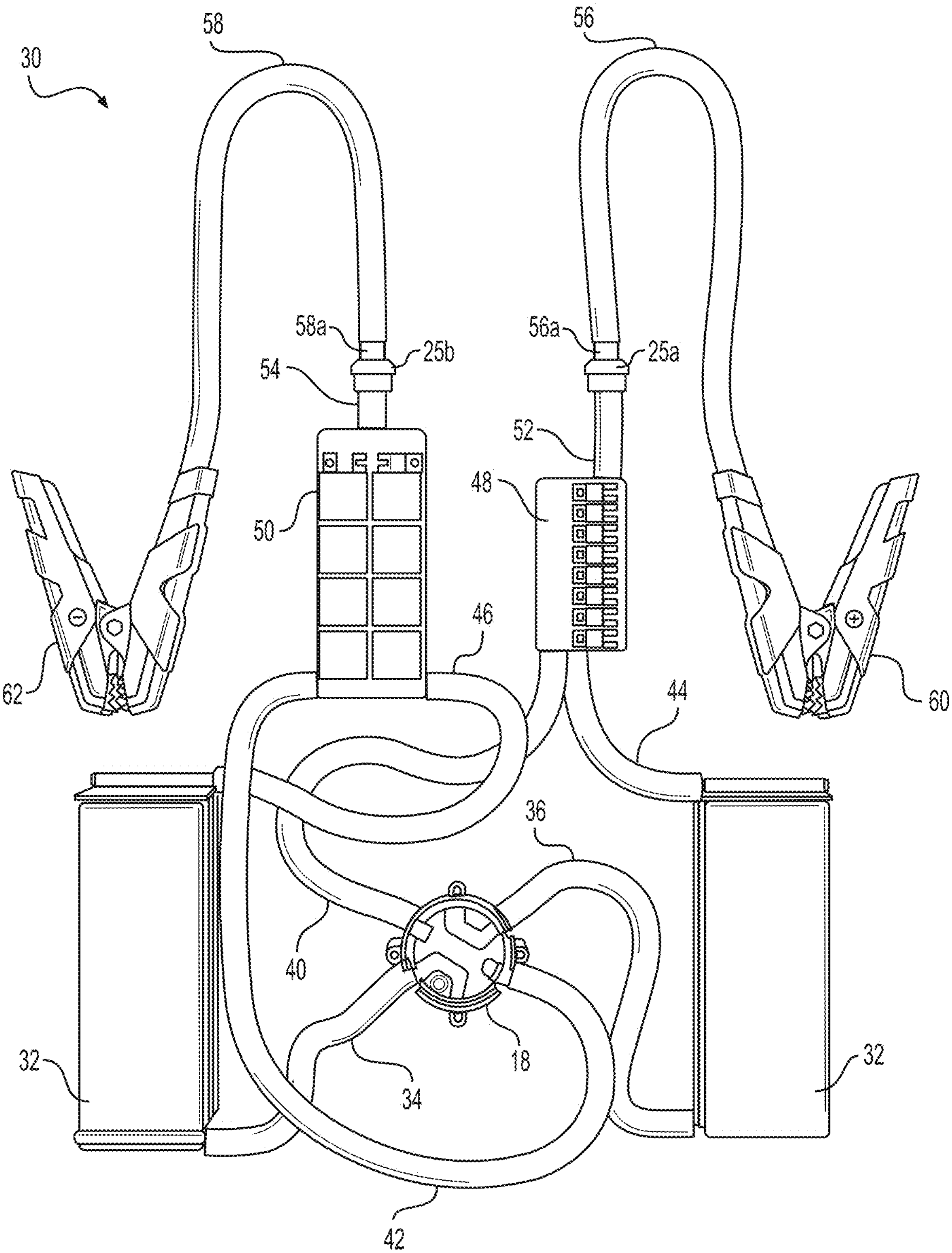
FIG. 9 is a top view of the layout of interior components of the battery jump starting device shown in FIG. 1 having detachable battery cables.

The power circuit 30 of the battery jump starting device 10 is shown in FIG. 9.

The power circuit 30 comprises two (2) separate rechargeable Lithium ion (Li-ion) batteries 32 (e.g. two (2) 12V Li-ion batteries) connected to the control switch 18 via a pair of cables 34, 36 (e.g. insulated electrical copper cables), respectively.

The power circuit 30 further comprises a reverse current diode array 48 (i.e. a reverse flow protection device or back-charge diode array) connected to the control switch via the cable 40 and the right side battery 32 via cable 44.

The power circuit 30 even further comprises a smart switch 50 (e.g. 500 A solenoid device) connected to the control switch 18 via cable 42 and the left side battery 32 via cable 46.

The positive battery cable 56 having a positive battery clamp 60 is removably or detachably connected to the positive cam-lock 24*a* (FIG. 9), which is connected to the reverse current diode array 48 via cable section 52.

The negative battery cable 58 having a negative battery clamp 62 is detachably connected to the negative cam-lock 24*b* (FIG. 9), which is connected to the smart switch 50 via cable section 54.

In the above described first embodiment of the power circuit 30, the electrical components of the power circuit 30 are connected together via cables (e.g. heavy gauge flexible insulated copper cables). The ends of cables are soldered and/or mechanically fastened to the respective electrical components to provide highly conductive electrical connections between all the electrical components.

Figure 10:
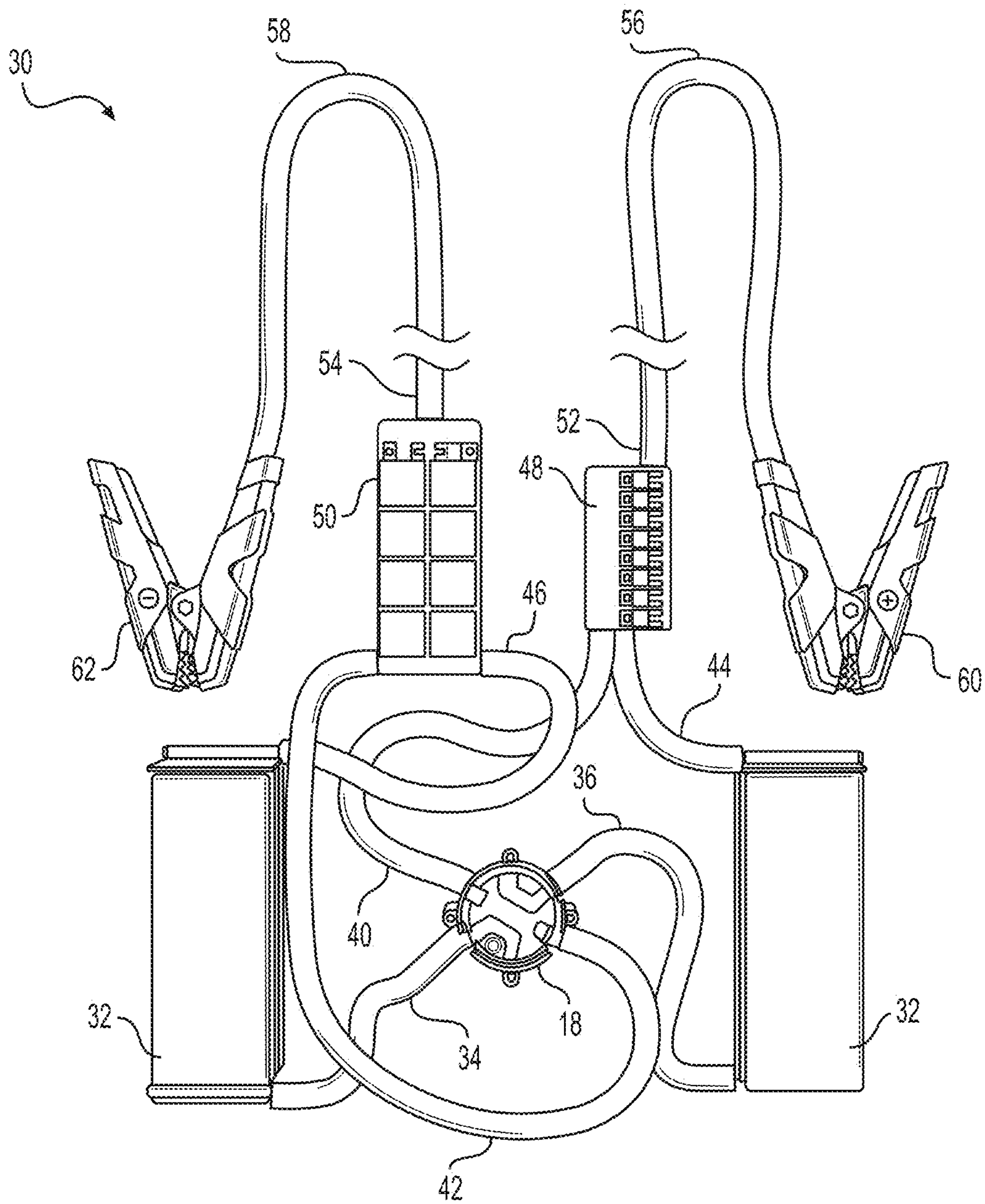
FIG. 10 is a top view of the layout of interior components of the battery jump starting device shown in FIG. 1 having non-detachable battery cables.

In a modified first embodiment shown in FIG. 10, the battery cables 56, 58 are directly hard wired to the reverse current diode array 48 and smart switch 50, respectively, eliminating the cam-locks 24*a*, 24*b*, so that the battery cables 56, 58 are no longer removable or detachable.

The cables 56, 58 shown in FIG. 9 are configured to cooperate with the cam-locks 24*a*, 24*b*. For example, the cables 56, 58 are provided with cable ends 56*a*, 58*a* (e.g. insulation removed) for fitting into the receptacles 25*a*, 25*b* of the cam-locks 24*a*, 24*b*.

Figure 16:
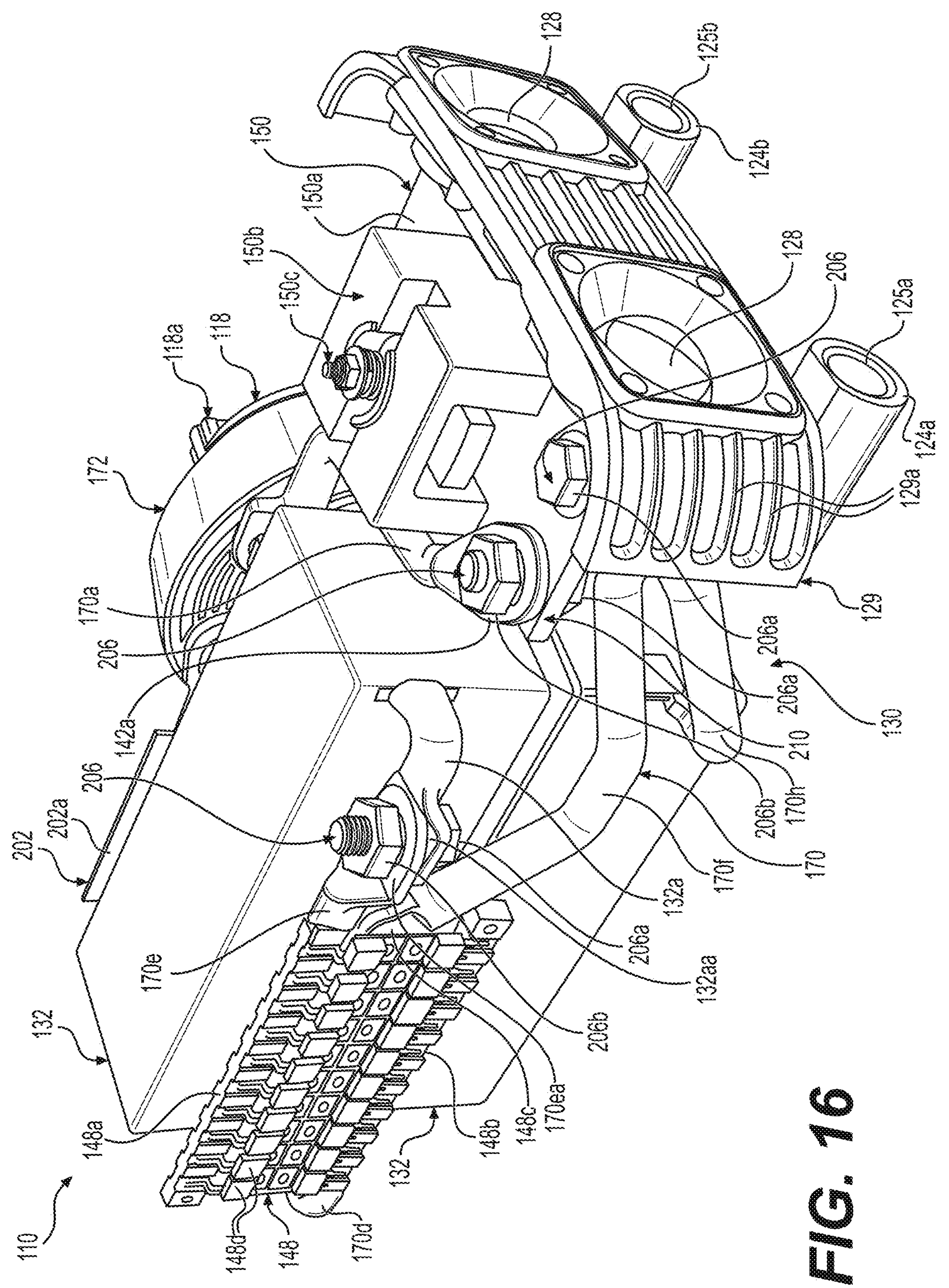
FIG. 16 is a rear and left side perspective view of a second embodiment of the battery jump starting device according to the present invention with the cover removed.

In a second embodiment of the rechargeable jump starting device 110 and power circuit 130 to be described below, the cables 34, 36, 40, 42, 44, 46 (FIG. 9) of the first embodiment of the rechargeable jump starting device 10 located between the Li-ion batteries 32 and the reverse current diode array 48 and smart switch 50, respectively, and the cables 52 and 54 between the reverse current diode array 48 and the smart switch 50, respectively, are replaced with a highly electrically conductive rigid frame 170 (FIG. 16). For example, the highly electrically conductive frame 170 of the second embodiment of the rechargeable jump starting device 110 (FIG. 16) comprises frame members 170 *a-h* shown in FIGS. 16-25. Another highly electrically conductive frame 370 of the third embodiment of the rechargeable jump starting device 310 (FIG. 26) comprises frame members 370*a-h* shown in FIGS. 56-62.

Control Switch

The control switch 18 is shown in FIGS. 12-15. The control switch 18 comprises the following:

1) control knob 18*a;*
2) front housing 72;
3) rear housing 74;
4) rotor 76 having a collar 76*a*, legs 76*b*, and legs 76*c;*
5) springs 78;
6) pivoting contact 80 each having two (2) points of contact (e.g. slots 80*c*);
7) separate terminals 82, 84, 86, 88;
8) connected terminals 90, 92;
9) conductive bar 94
10) O-ring 96;
11) O-ring 98; and
12) O-ring 100.

The control knob 18*a* comprises rear extension portions 18*b*, 18*c*. The extension portion 18*c* has a T-shaped cross section to connect into a T-shaped recess 76*e* (FIG. 12) in rotor 76 when assembled. The rotor 76 is provided with a flange 76*a* configured to accommodate the rear extension portion 18*b* (e.g. round cross-section) therein.

The pair of legs 76*c* (e.g. U-shaped legs) of the rotor 76 partially accommodate the springs 78, respectively, and the springs 78 apply force against the pivoting contacts 80 to maintain same is highly conductive contact with the selected contacts 82*b*-92*c* of the terminals 82-92.

The pivoting contacts 80 each have a pivoting contact plate 80*a* having a centered slot 80*b* configured to accommodate an end of each leg 76*b* of the rotor 76. When the rotor 76 is turned, each leg 76*b* actuates and pivots each pivoting contact plate 80*a*.

Further, the pivoting contact plates 80*a* each having a pair of spaced apart through holes 80*c* (e.g. oval-shaped through holes) serving as two (s) points of contact with selected contacts 82*c*-92*c* of the terminals 82-92.

The terminals 82-92 have threaded posts 82*a*-92*a*, spacer plates 82*b*-92*b*, and conductive bar 94, respectively, configured so that the contacts 82*c*-92*c* are all located in the same plane (i.e. plane transverse to longitudinal axis of the control switch 18) to allow selective pivoting movement of the pivoting contacts 80. The threaded posts 82*a*-92*a* of the terminals 82-92 are inserted through the through holes 74*a*, respectively, of the rear housing 74.

Figure 12:
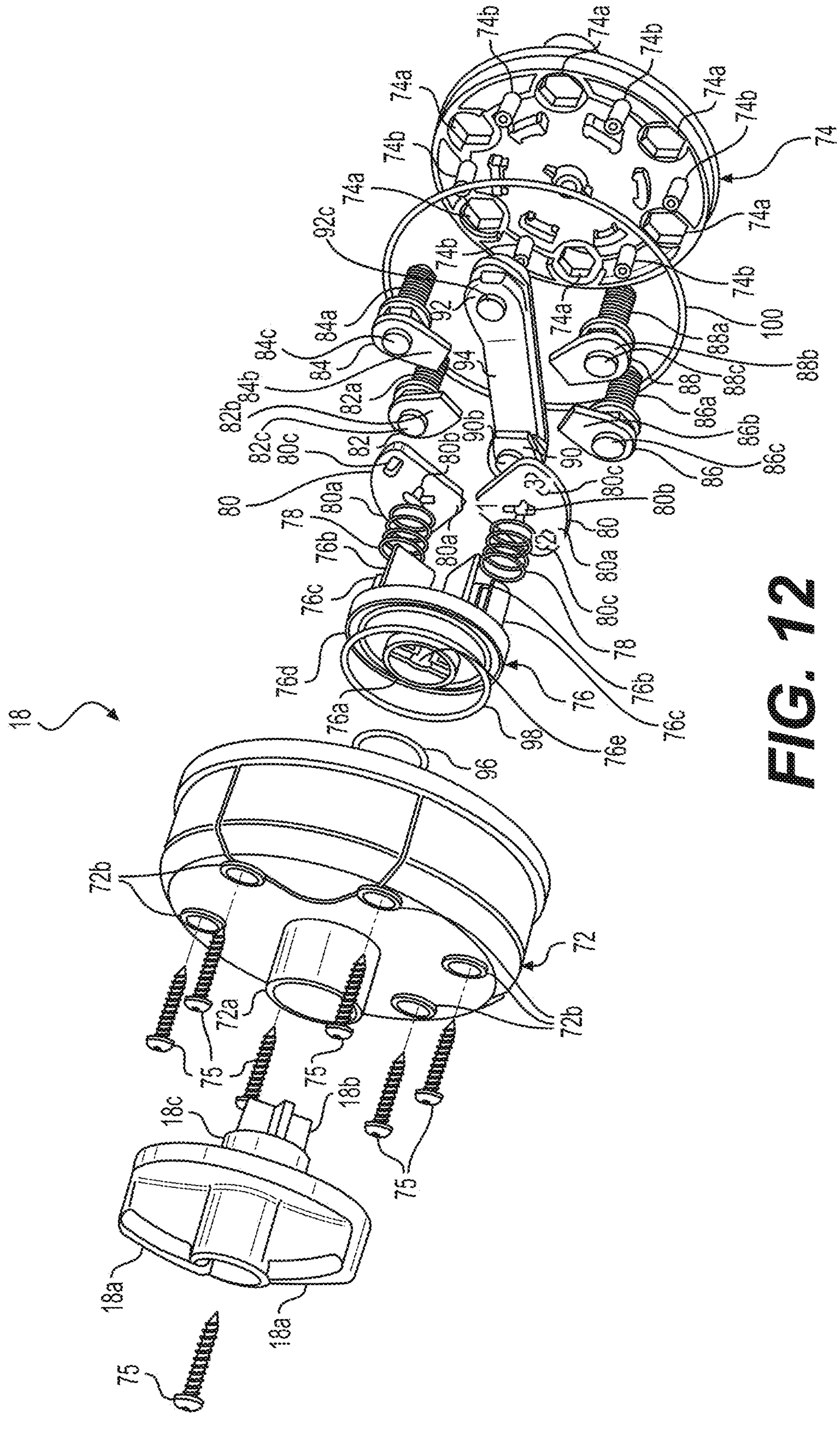
FIG. 12 is an exploded perspective view of the control switch installed on the front of the battery jump starting device shown in FIG. 1.

The O-rings 96, 98, 100, as shown in FIG. 12, seal the separate the various components of the control switch 18 as shown. After assembly of the control switch 18, a set of screws 75 connect with anchors 74*b* of the rear housing 74 to secure the front housing 72 to the rear housing 74 as shown in FIG. 12.

Figure 13:
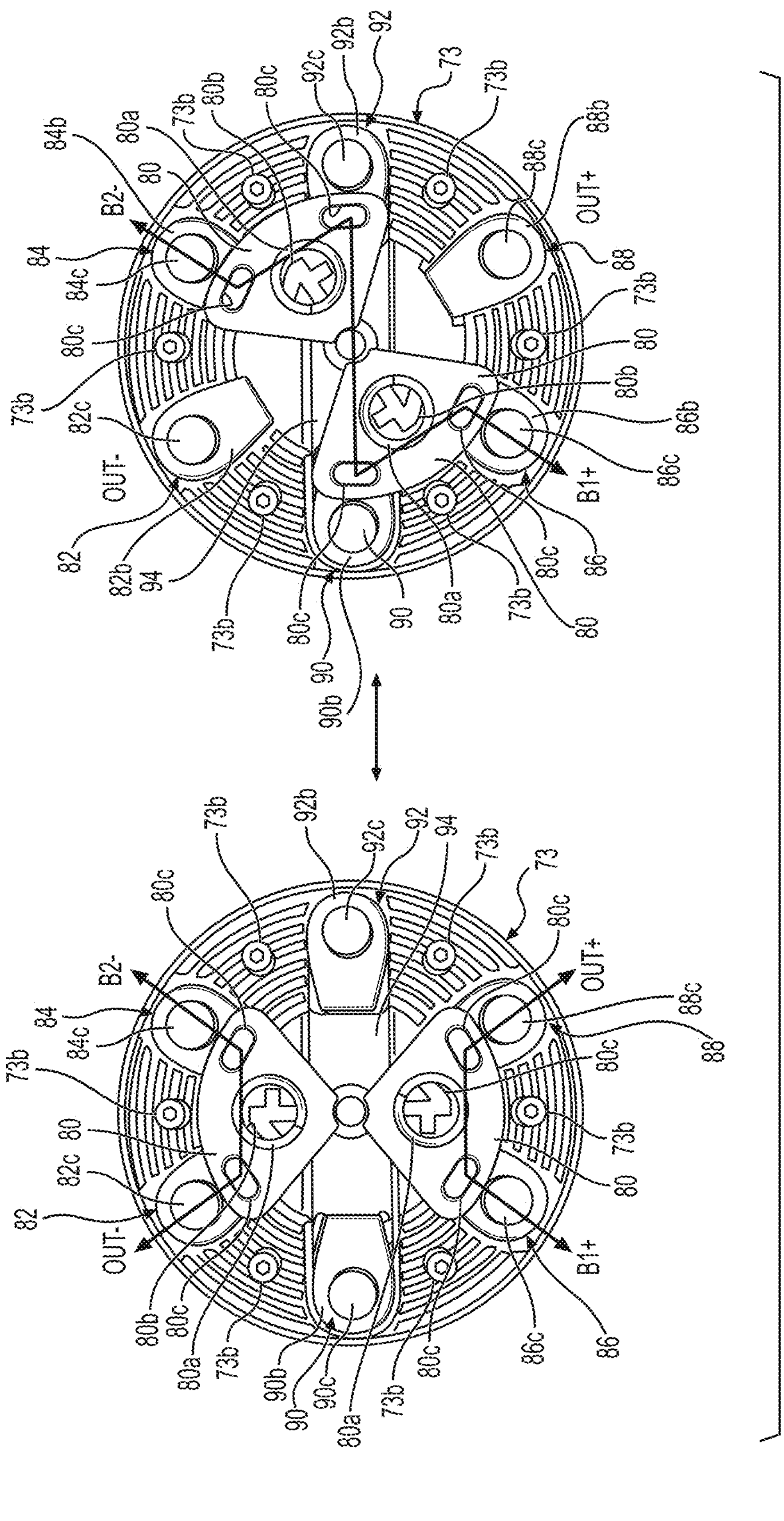
FIG. 13 is a front elevational view of the switch plate of the control switch shown in FIG. 12 operable between a first position and second position.

The control switch 18 is a 12V/24V selective type switch as shown in FIG. 13. The configuration of the pivoting contacts 80 in the first position or Position 1 (i.e. Parallel position) is shown on the left side of FIG. 13, and the second position or Position 2 (i.e. Series position) is shown on the right side of FIG. 13.

Figure 15:
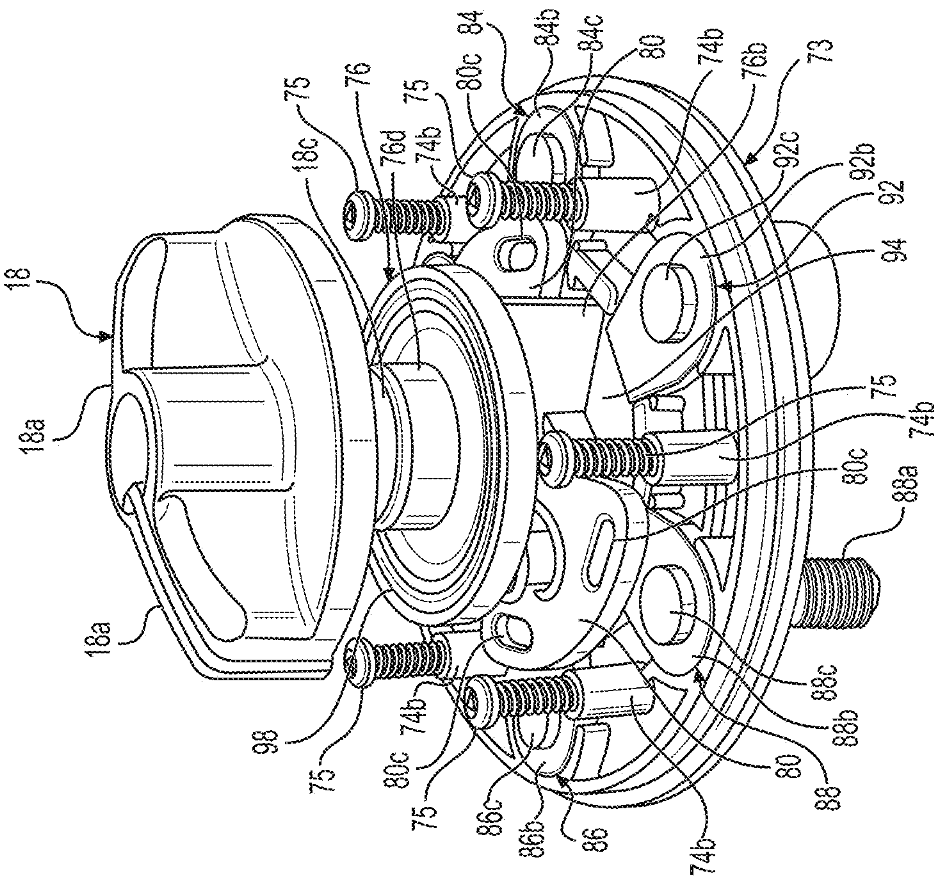
FIG. 15 is a perspective view of the control switch shown in FIG. 12.
Figure 14:
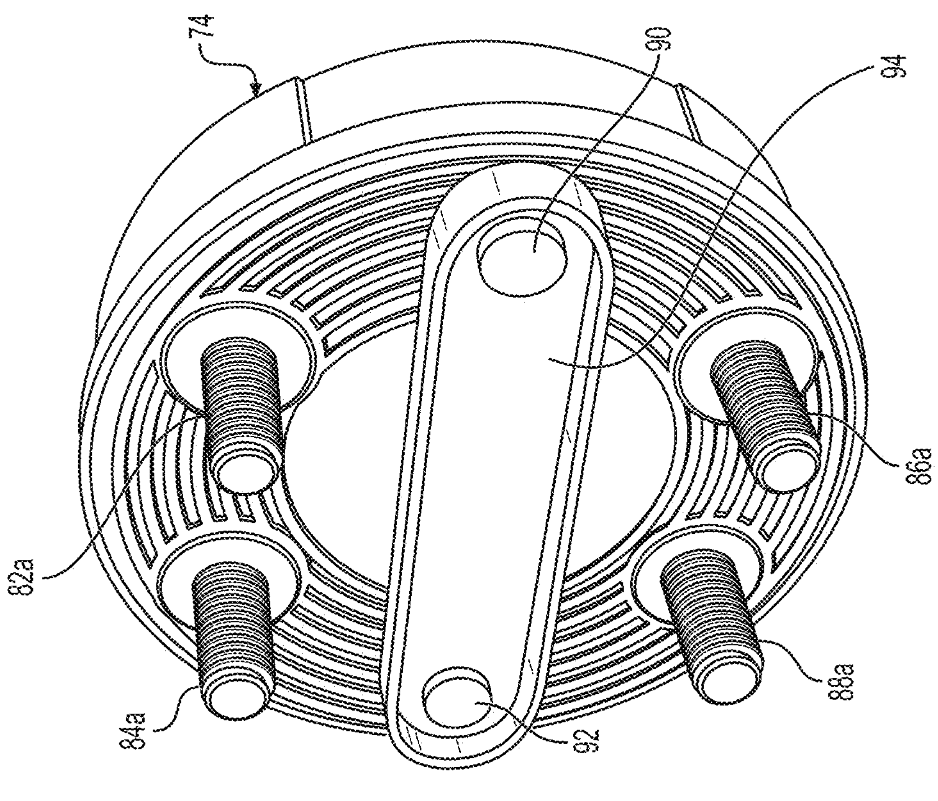
FIG. 14 is a rear perspective view of the switch plate shown in FIG. 13.

The rear side of the control switch 18 is shown in FIG. 14. Another highly conductive bar 94 is provided on the rear outer surface of the rear housing 74. The fully assembled control switch 18 is shown in FIG. 15.

The second embodiment of the battery jump starting device 110 is shown in FIGS. 16-25 with the cover 112 removed. The cover for the battery jump starting device 110, for example, is the same as the cover 12 of the battery jump starting device 10 shown in FIG. 1-8.

In the second embodiment of the battery jump starting device 110 (FIGS. 16-25) compared to the battery jump starting device 10 (FIGS. 1-8), the cable sections 34, 36, 40, 42, 44, 46 (FIG. 9) in the first embodiment are replaced with a highly conductive frame 170. The highly conductive frame 170 is constructed of highly conductive metal (e.g. copper, aluminum) frame members 170*a*-*h* configured as conductive metal rods having flattened ends connected together.

The battery jump starting device 110 comprises a pair of 12V Li-ion batteries 132 directly connected to the highly conductive rigid frame 170. Specifically, terminals 132*a*, 132*b* (e.g. highly conductive bars of copper or aluminum) of the Li-ion batteries are mechanically connected and/or soldered to the positive and negative tabs or foils, respectively, of the battery cells and then connected to the highly conductive rigid frame 170 by highly conductive fasteners 206 comprising a bolt 206*a* and nut 206*b* and/or soldering.

The highly conductive rigid frame 170 is constructed of multiple highly conductive rigid frame members 170*a*-*h* connected together by mechanical fasteners (e.g. metal nut and/or bolt fasteners) and/or soldering. For example, the highly conductive rigid frame members are made of highly conductive rigid metal rods having flattened ends with through holes. Alternatively, the highly conductive rigid metal rods can be replaced with highly conductive rigid metal plates, bars, tubing, or other suitably configured highly conductive metal material (e.g. copper or aluminum stock material). The highly conductive rigid frame members 170*a*-*h* can also be insulated (e.g. covered with heat shrink insulation) in at least the key areas to prevent any internal short circuiting.

The highly conductive rigid frame members 170*a*-*h* shown in FIGS. 16-25 are metal rods having flattened end portions (e.g. flattened using a hydraulic or mechanical press). The flattened end portions each have a through hole to provide a mechanical connection between adjoining highly conductive rigid frame members 170*a*-*h* and/or electrical components (e.g. battery 132, smart switch 150). The flattened end portions of adjoining highly conductive rigid frame members 170*a*-*h* are overlapped when being assembled together, and then a bolt is inserted through the overlapped through holes. A highly conductive nut is threaded onto the bolt fastener (e.g. copper or aluminum bolt and nut) and tightened. In the case of attaching a highly conductive rigid frame member 170*a*-*h* to an electrical component, the electrical component can be provided with a highly conductive plate base portion having a through hole for attachment to the frame member 170*a*-*h*. In addition, the end of the highly conductive rigid frame member 170*a*-*h* can be provided with a base portion (e.g. plate or bar portion) configured for connecting with or being a portion or part of one or more electrical components.

For example, the reverse flow diode assembly 148 is constructed of three (3) base portions of three (3) highly conductive frame members 170*d*, 170*e*, 170*f* of the highly conductive rigid frame 170, including:

1) an upper highly conductive rigid bar 148*a* (FIG. 16) is a flattened end portion of the highly conductive frame member 170*e* also having an opposite flattened end portion 148*ea* connected to the flattened end portion 132*aa* of the battery terminal 132*a* using a highly conductive fastener 206 (e.g. made of copper or aluminum) having a highly conductive bolt 206*a* and highly conductive nut 206*b;*
2) a lower highly conductive rigid bar 148*b* (FIG. 16) is a flattened end portion of highly conductive rigid frame member 170*d*; and
3) a center highly conductive rigid bar 148*c* (FIG. 16) is a flattened end portion of the highly conductive rigid frame member 1170*f.*

As another example, the smart switch 150 (FIG. 16) comprises a highly conductive rigid plate 150*a* serving as a base portion supporting the solenoid 150*b*. The highly conductive rigid plate 150*a* is provided with through holes for connecting highly conductive rigid frame members 170*a*, 170*h* to the smart switch 150 using highly conductive fasteners 206.

The stock material (e.g. copper or aluminum rod, plate, bar, tubing) selected for construction of the highly conductive rigid frame 170 has substantial gauge to provide high conductivity and substantial rigidity. The “rigid” nature of the highly conductive rigid frame 170 provides the advantage that the highly conductive rigid frame 170 remains structurally stiff and stable during storage and use of the battery jump starting device 110.

For example, the highly conductive rigid frame 170 is designed and constructed to sufficiently prevent flexing, movement, bending and/or displacement of the highly conductive rigid frame 170 during storage or use so as to prevent electrical shortages of the highly conductive rigid frame touching other internal electrical components or parts of the electronic assembly. This “rigid” nature is important due to the high conductivity path of electrical power from the Li-ion batteries 132 flowing through the power circuit and reaching the battery clamps 60, 62 (FIG. 9). It is a desired goal and feature of the present invention to conduct as much power as possible from the Li-ion batteries 132 to the battery being jump started by the battery jump starting device 110 by reducing or minimizing any electrical resistance by using the heavy duty and highly conductive rigid frame 170 arrangement disclosed.

As an alternative, the highly conductive rigid frame 170 can be constructed as a single piece having no mechanically fastened joints. For example, the highly conductive rigid frame 170 can be made from a single piece of stock material and then formed, bent, machined, or manufactured into the highly conductive rigid frame 170. For example, a billet of highly conductive copper can be machined (e.g. milled, lathed, drilled) into the highly conductive rigid frame 170. As another example, a copper sheet or plate can be bent and/or machined into the highly conductive rigid frame 170. As a further alternative, the highly conductive rigid frame 170 can be metal molded (e.g. loss wax process).

As another alternative, the highly conductive rigid frame 170 is made of multiple highly conductive rigid frame members 170*a-h* connected together into a unitary structure. For example, the highly conductive rigid frame 170 is made of highly conductive sections of stock material (e.g. copper or aluminum rod, plate, bar, tubing), which are extruded, machined and/or bent, and soldered and/or welded together.

Figure 17:
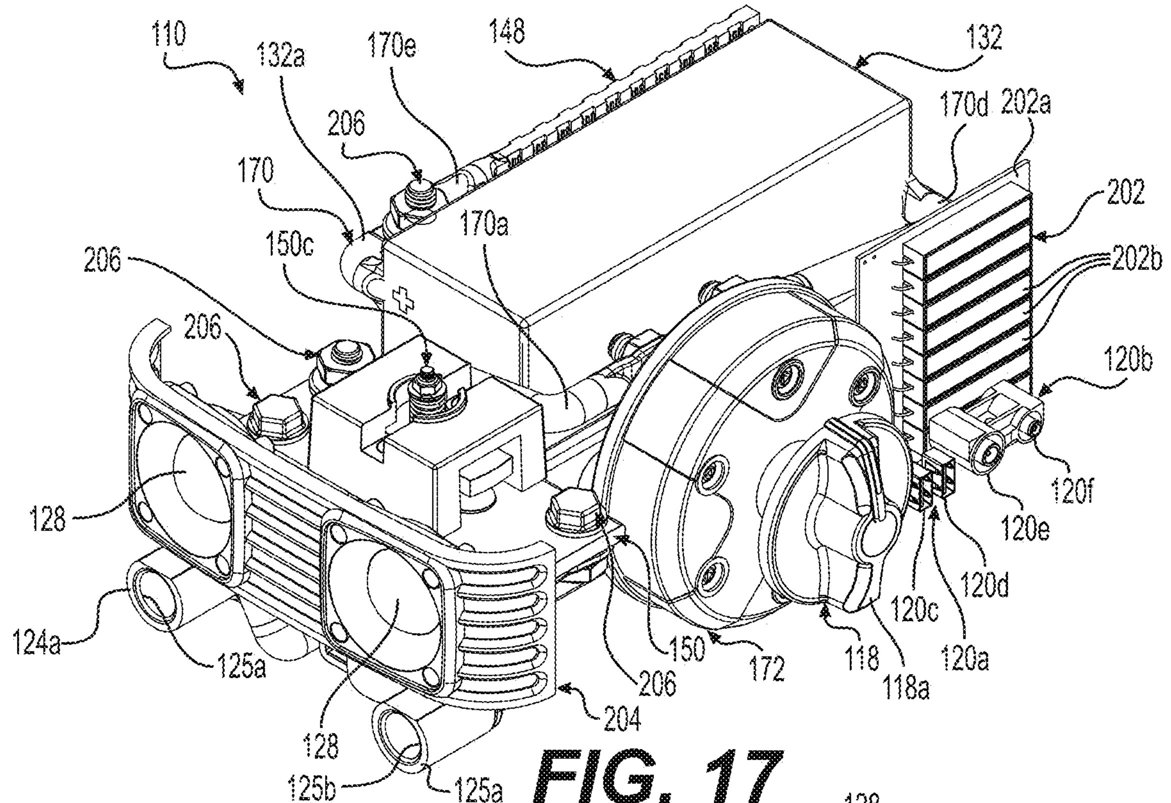
FIG. 17 is a front and left side perspective view of the battery jump starting device shown in FIG. 1 with the cover removed.
Figure 19:
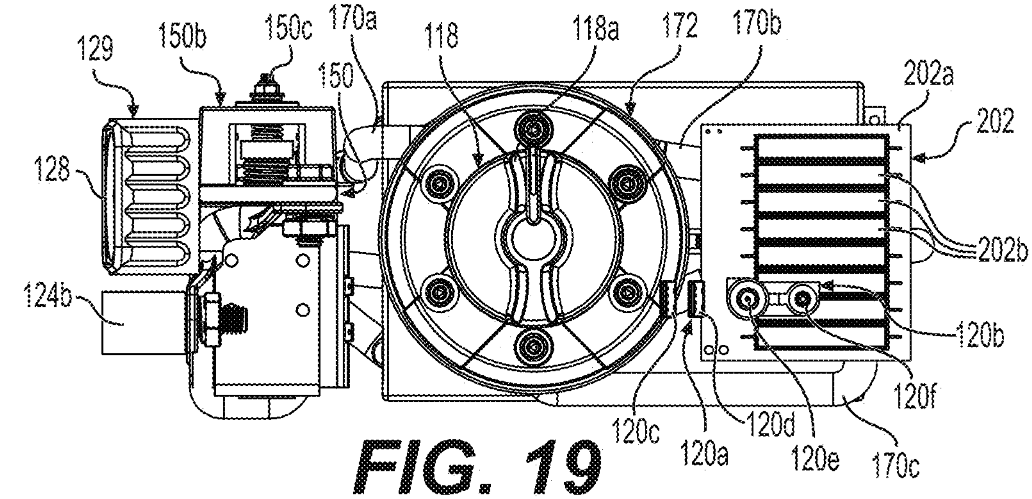
FIG. 19 is a front elevational view of the battery jump starting device shown in FIG. 1 with the cover removed.

The battery jump starting device 110 further comprises a resistor array 202 (e.g. 12 V 5A XGC) comprising a printed circuit board (PCB) 202*a* serving as a base supporting an array of individual resistors 202*b*, as shown in FIGS. 17 and 19. The PCB 202*a* also supports the dual 2.1 amp (A) USB OUT ports 120*c*, 120*d*, the 18 A 12V XGC OUT port 20*e*, and the 5 A 12V XGC IN port 20*e*.

The left side of the battery jump starting device 110 is also fitted with a pair of light emitting diodes 128 (LEDS) for using the battery jump starting device 110 as a work light. For example, the LEDs 128 are dual 1100 Lumen high-intensity LED floodlights), as shown in FIG. 16. The LEDs 128 are configured to have seven (7) operational modes, including 100% intensity, 50% intensity, 10% intensity, SOS (emergency protocol), Blink, Strobe, and Off.

The battery jump starting device 110 is fitted with a heat sink 129 (FIG. 16) for dissipating heat from the LEDs 128. For example, the heat sink 129 is made of a heat conductive material (e.g. molded or die cast metal plate). The heat sink 129 is provided with ribs 129*a* transferring heat to the surrounding atmosphere to prevent the LEDs 128 from overheating.

The battery jump starting device 110 is shown in FIG. 16 without any battery cables having battery clamps for connecting the battery jump starting device 110 to a battery of a vehicle to be jump started. The battery jump starting device can be configured to removably or detachably connect to a set of battery cables having battery clamps (e.g. positive battery cable with a positive clamp, negative battery cable with a negative clamp). For example, see the detachable battery cables 56, 58 and battery clamps 60, 62 in FIG. 9, which can be detachably connected to the cam-locks 124*a*, 124*b* of the battery jump starting device 110. Alternatively, the battery jump starting device 110 can be fitted with battery cables hard wired to the device and non-removable or non-detachable the same or similar to those shown in FIG. 10.

For example, the left side of the battery jump starting device 110 is provided with POSITIVE (+) cam-lock 124*a* and NEGATIVE (−) cam-lock 124*b*, as shown in FIG. 16. The cam-locks 124*a*, 124*b* include receptacles 125*a*, 125*b* configured for detachably connecting with connecting end 56*a* (FIG. 11) of the positive battery cable 56 and the connecting end 58*a* of negative battery cable 58, respectively. The cam-locks 124*a*, 124*b* can be fitted with sealing caps the same or similar to the sealing caps 26 (FIG. 1) for closing and sealing the receptacles 125*a*, 125*b* of the cam-locks 124*a*, 124*b*, respectively, during non-use of the battery jump starting device 110.

A third embodiment of the battery jump starting device 210 is shown in FIGS. 26-31. In this embodiment, the highly conductive rigid frame 270 is made from flat copper bar stock material having a rectangular-shaped cross-sectional profile. The flat copper bar is bent to at least partially wrap around and envelop the Li-ion batteries.

Further, the battery jump starting device 210 comprises a main printed circuit board 208 serving as a base for LEDs for the control knob 218*a* and interface 216, and for supporting other electrical components of the battery jump starting device 210.

Cam-Lock Connectors

Again, the battery cables 56, 58 (FIG. 9) can be detachably connected to the battery jump starting device 10 via cam-locks 24*a*, 24*b* (FIG. 1) or cam-locks 124*a*, 124*b* (FIG. 16).

The cam-locks 24*a*, 124*a*, 24*b*, 124*b* and cables 56, 58 (FIG. 9) having conductive ends 56*a*, 56*b* (FIG. 11) can each have the construction of the cam-lock connector 27, as shown in FIGS. 32-45.

The cam-lock connector 27 can be used for other applications for detachably connecting a conductive electrical cable to an electronic device other than the battery jump starting device according to the present invention.

The cam-lock connector 27 comprises a male cam-lock end 27*a* and a female cam-lock end 27*b* for detachable connecting the battery cables 56, 58 (FIG. 10), respectively, to the battery jump starting device 10.

The male cam-lock end 27*a* comprises a pin 27*aa* having a tooth 27*ab*. The female cam-lock end 27*b* comprises a receptacle 27*ba* having a slot 27*bb* together located in a hex portion 27*bc*. The receptacle 27*ba* is configured to accommodate the pin 27*aa* and tooth 27*ab* of the male cam-lock end 27*a*. Specifically, the pin 27*aa* and tooth 27*ab* of the male cam-lock end 27*a* can be inserted (FIG. 33) into the receptacle 27*ba* and slot 27*bb* a fixed distance until the tooth 27*ab* contacts an interior surface of the internal thread of the female cam-lock 27*b* to be described below. The male cam-lock end 27*a* can be rotated (e.g. clockwise) to tighten within the female cam-lock end 27*b* until the end face portion 27*ac* of the male cam-lock end 27*a* engages with the end face portion 27*bc* of the female cam-lock end 27*b*. The more the cam-lock 24 is tightened, the better the electrical connection is between the male cam-lock end 27*a* and the female cam-lock end 27*b*.

Figure 34:
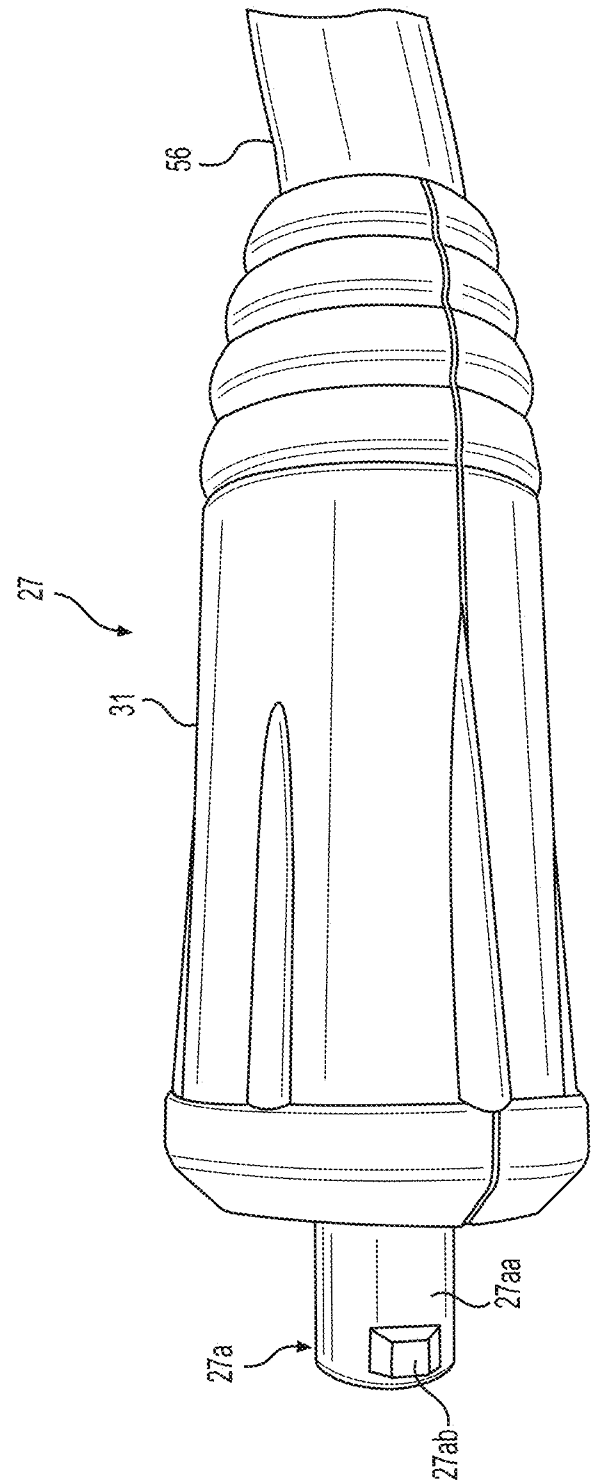
FIG. 34 is a perspective view of the male cam-lock end of the cam-lock connecting device shown in FIG. 32.

The male cam-lock end 27*a* is fitted with a rubber molded cover 31, as shown in FIG. 34, to insulate and improve the grip on the male cam-lock end 27*a*. The highly conductive cable 33 is electrically and mechanically connected to the male cam-lock end 27*a*, and is fitted through a passageway in the rubber molded cover 31.

Figure 35:
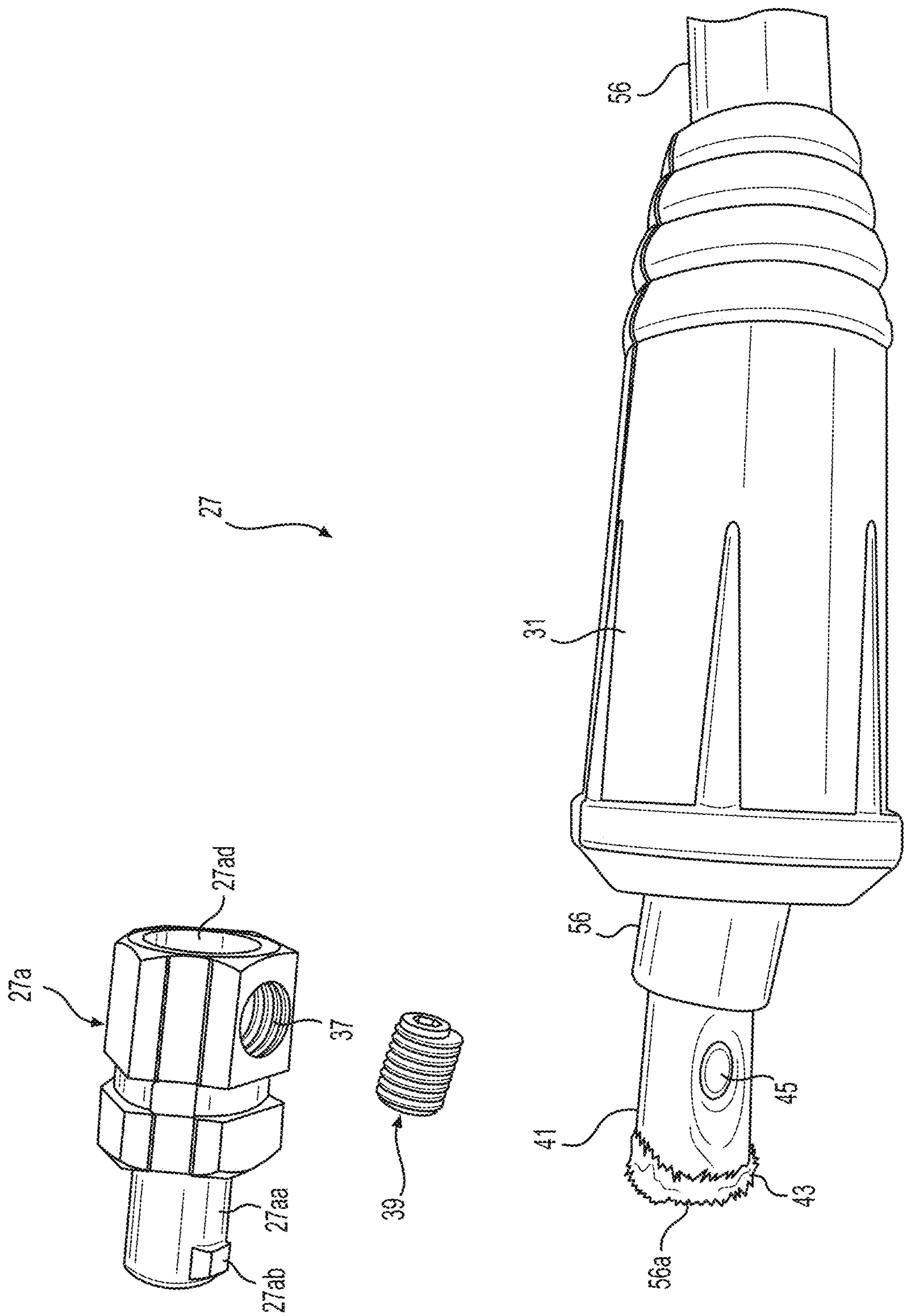
FIG. 35 is a disassembled perspective view of the male cam-lock end of the cam-lock connecting device shown in FIG. 32.

The assembly of the male cam-lock 27*a* is shown in FIG. 35. The male cam-lock 27*a* is provided with a thread hole 37 for accommodating Allen head fastener 39. The one end of the male cam-lock 27*a* is provided with a receptacle 27*ad* for accommodating the copper sleeve 41 fitted onto the end of the inner conductor 56*a* of the battery cable 56. The copper sleeve 41 is soldered onto the inner conductor 56*a* using solder 43.

Figure 36:
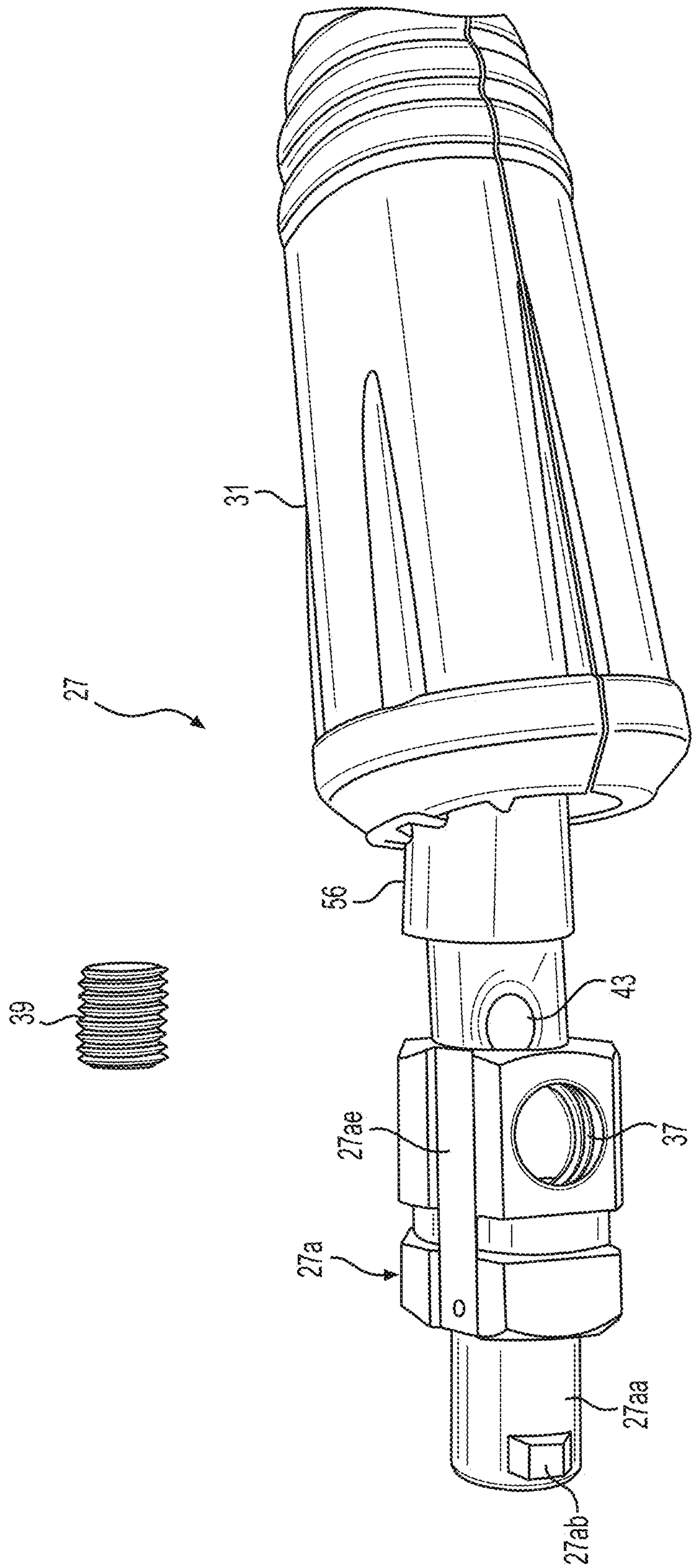
FIG. 36 is a partially assembled perspective view of the male cam-lock end of the cam-lock connecting device shown in FIG. 32.
Figure 37:
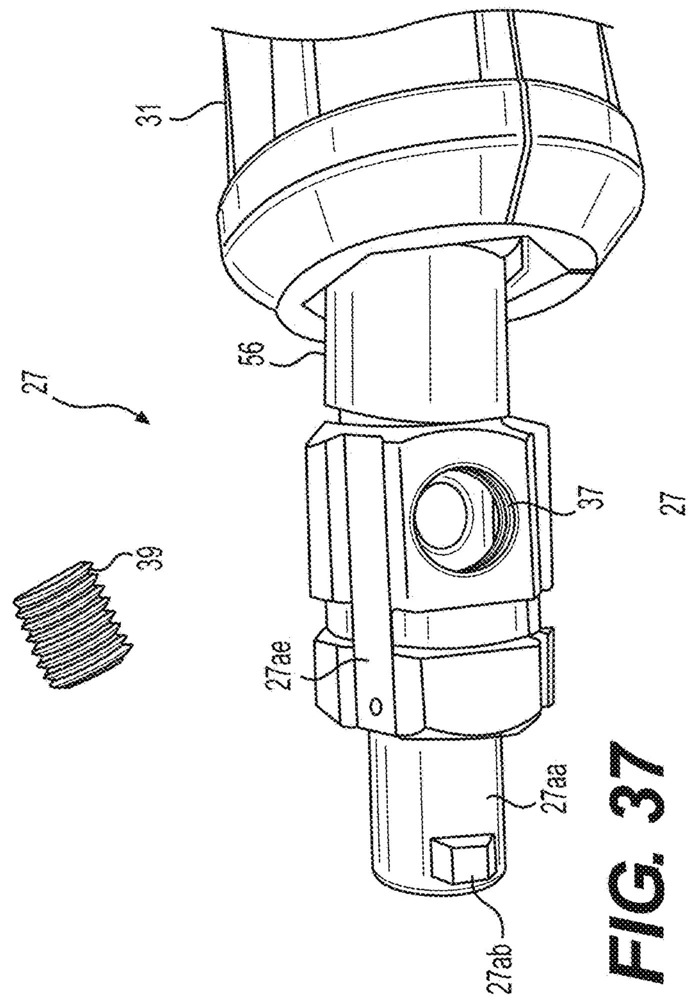
FIG. 37 is a partially assembled perspective view of the male cam-lock end of the cam-lock connecting device shown in FIG. 32.

The copper sleeve 41 is fitted into the receptacle 27*ad* of the male cam-lock end 27*a*, as shown in FIG. 36. When the copper sleeve 41 is fully inserted into the receptacle 27 of the male cam-lock end 27*a*, as shown in FIG. 36, then the Allen head fastener is threaded into the threaded hole 37 and tightened, as shown in FIG. 37.

It is noted that the inner end of the Allen head fastener makes an indent 45 when sufficiently tightened to firmly anchor the copper sleeve 41 and inner conductor 56*a* of the battery cable 56 to mechanically and electrically connect the cable 56 to the male cam-lock end 27*a*.

Figure 38:
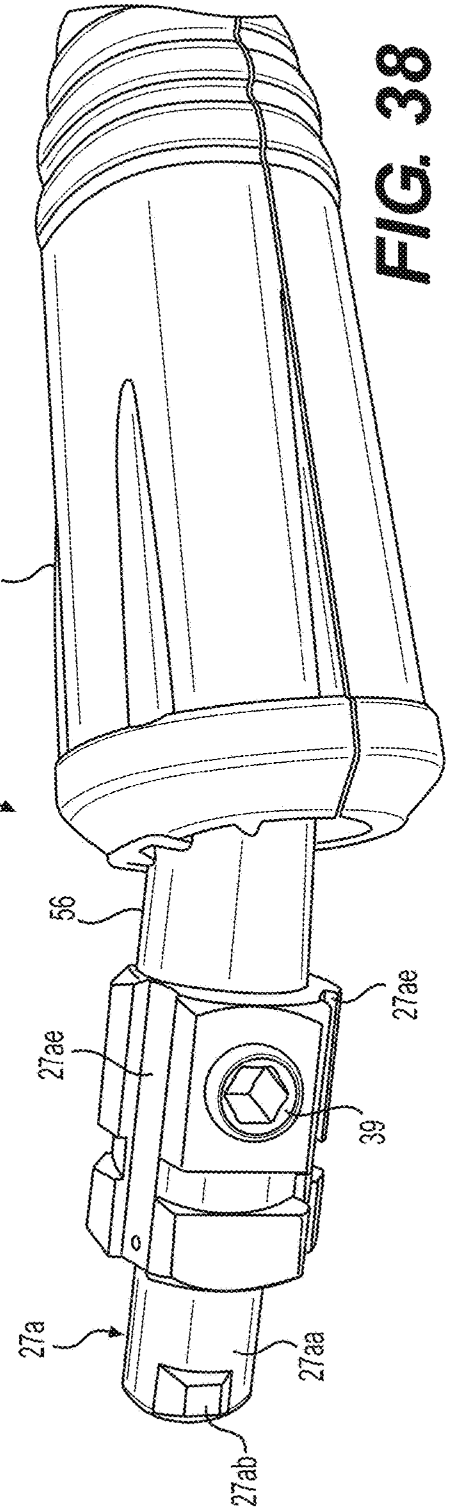
FIG. 38 is a fully assembled perspective view of the male cam-lock end of the cam-lock connecting device shown in FIG. 32.
Figure 39:
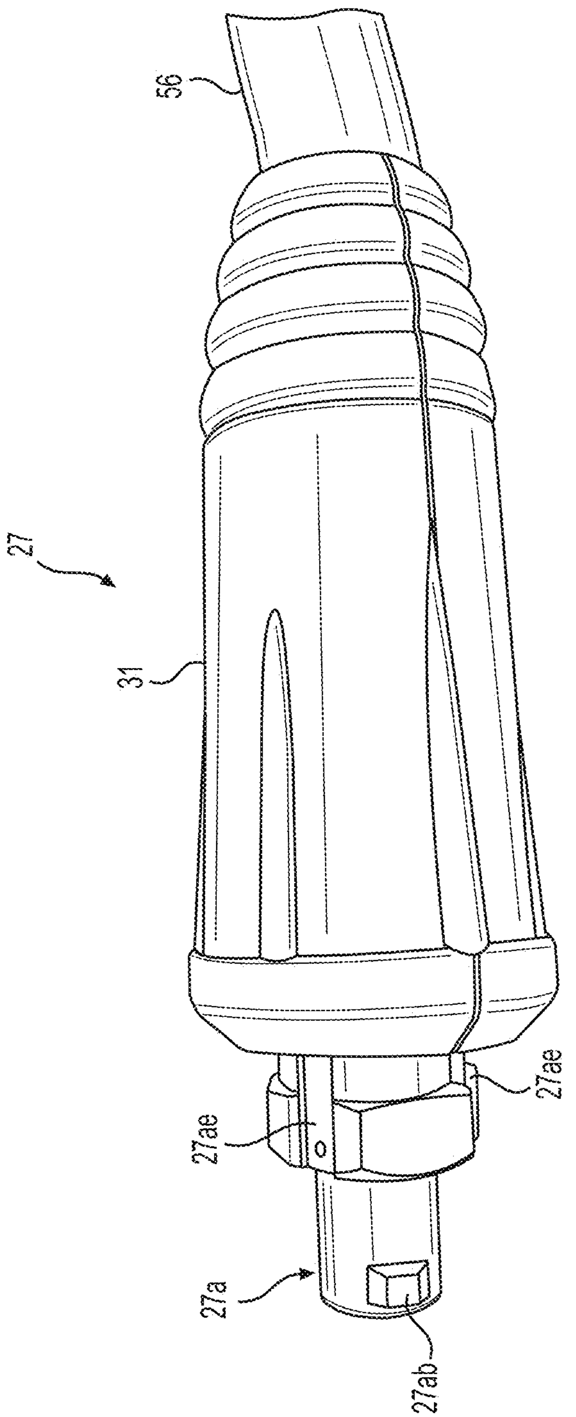
FIG. 39 is a partially assembled perspective view of the male cam-lock end of the cam-lock connecting device shown in FIG. 32.

The rubber molded cover 31 is provided with one or more inwardly extending protrusions 31*a* cooperating with one or more slots 27*ae* in an outer surface of the male cam-lock end 27*a* (FIG. 38).

Again, the male cam-lock end 27*a* and the female cam-lock end 27*b* are configured so as to tighten together when rotating the male cam-lock end 27*a* when inserted within the female cam-lock end 27*b*.

Figure 40:
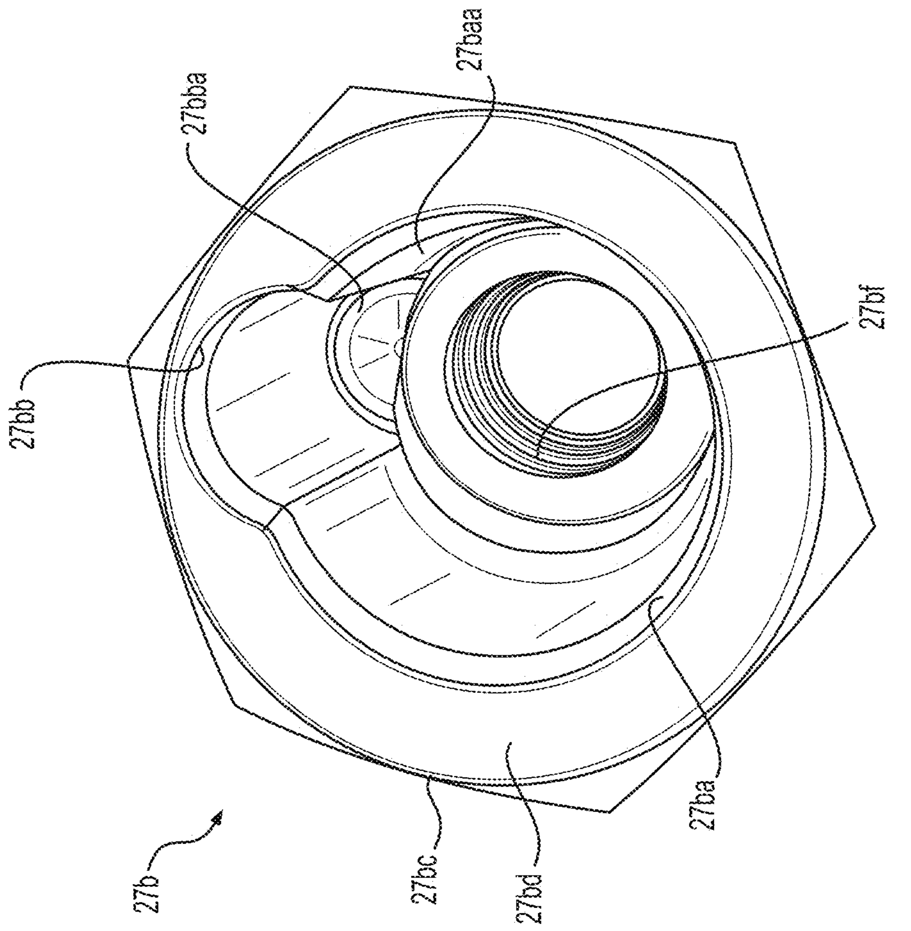
FIG. 40 is a disassembled perspective end view of the female cam-lock end of the cam-lock connecting device shown in FIG. 32.

The female cam-lock end 27*b*, as shown in FIG. 40, is provided with the receptacle 27*ba* and slot 27*bb* for accommodating the end of the male cam-lock end 27*a*. The slot 27*bb* is provided with a surface 27*bba* serving as a stop for the tooth 27*ab* of the male cam-lock end 27*a*. The receptacle 27*ba* is provided with inner threading 27*baa* for cooperating with the tooth 27*ab* of the male cam-lock end 27*a* to provide a threaded connection therebetween. Specifically, the tooth 27*ab* engages with the surface 27*bba* and is stopped from being further inserted into the receptacle 27*ba* of the female cam-lock end 27*b*. When the male cam-lock end 27*a* is rotated, the tooth 27*ab* engages and cooperates with the inner threading 27*baa* of the receptacle 27*ba* of the female cam-lock end 27*b* to begin tightening the male cam-lock end 27*a* within the female cam-lock end 27*b* with the tooth 27*ab* riding against an edge of the inner thread 27*baa*. The male cam-lock end 27*a* is further rotated to further tighten the connection with the female cam-lock end 27*b*. When the face 27*ac* (FIG. 32) of the male cam-lock end 27*a* engages with the face 27*bd* of the female cam-lock end 27*b*, then the cam-locks ends 27*a*, 27*b* are fully engage and rotation is stopped.

The female cam-lock end 27*b* is accommodated with a rubber molded cover 51 having cover portions 51*a*, 51*b*, as shown in FIGS. 42-45

The female cam-lock end 27*b* (FIGS. 40 and 41) is provided with inner threading 27*bf* (FIG. 40) to accommodate the bolt 47 and lock washer 49 (FIG. 41) for connecting the female cam-lock end 27*b* to the battery jump starting device 10 (e.g. connects to base plate for smart switch 50 (FIG. 9)).

Figure 41:
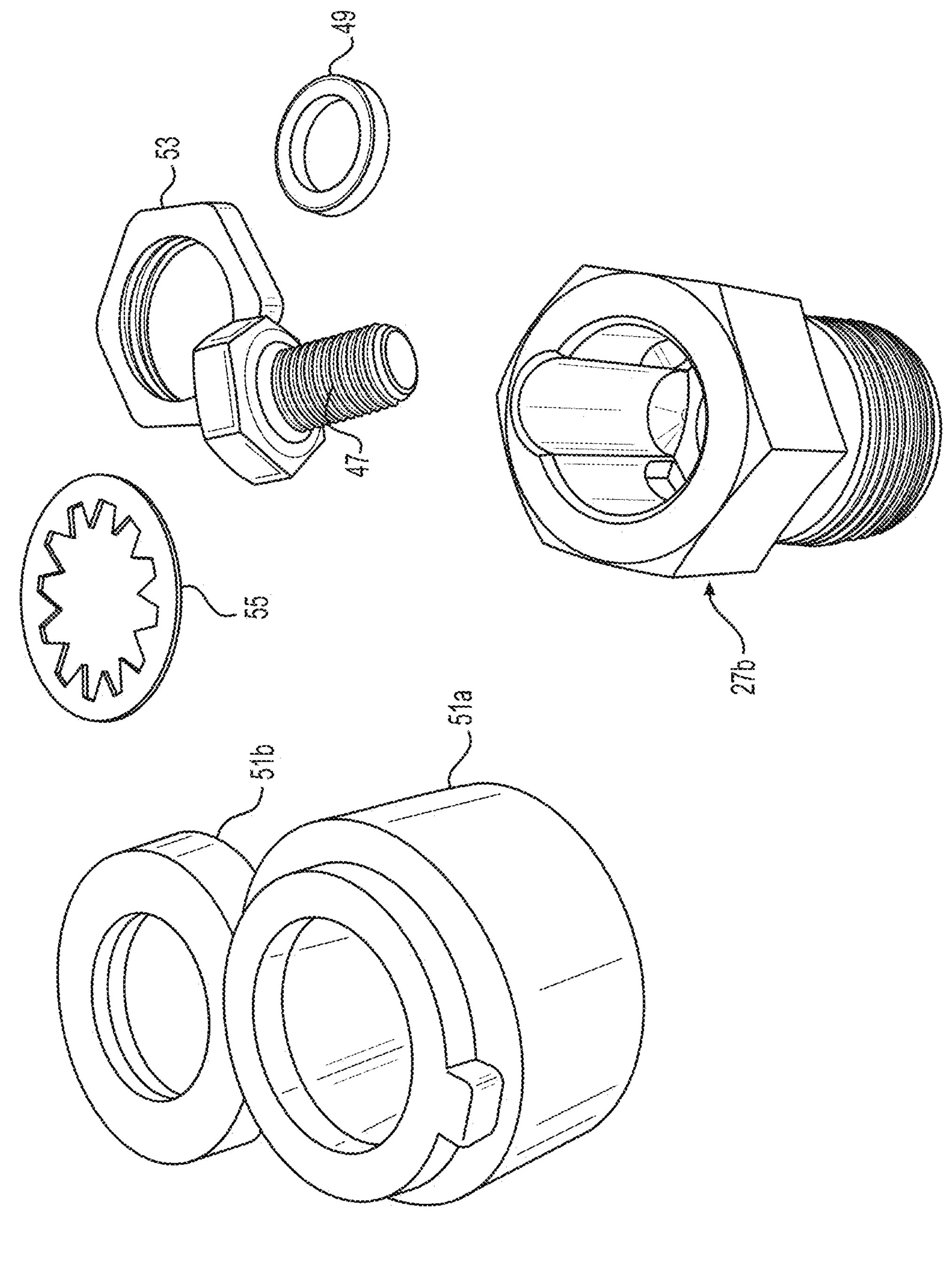
FIG. 41 is a disassembled perspective end view of the female cam-lock end of the cam-lock connecting device shown in FIG. 32.
Figure 42:
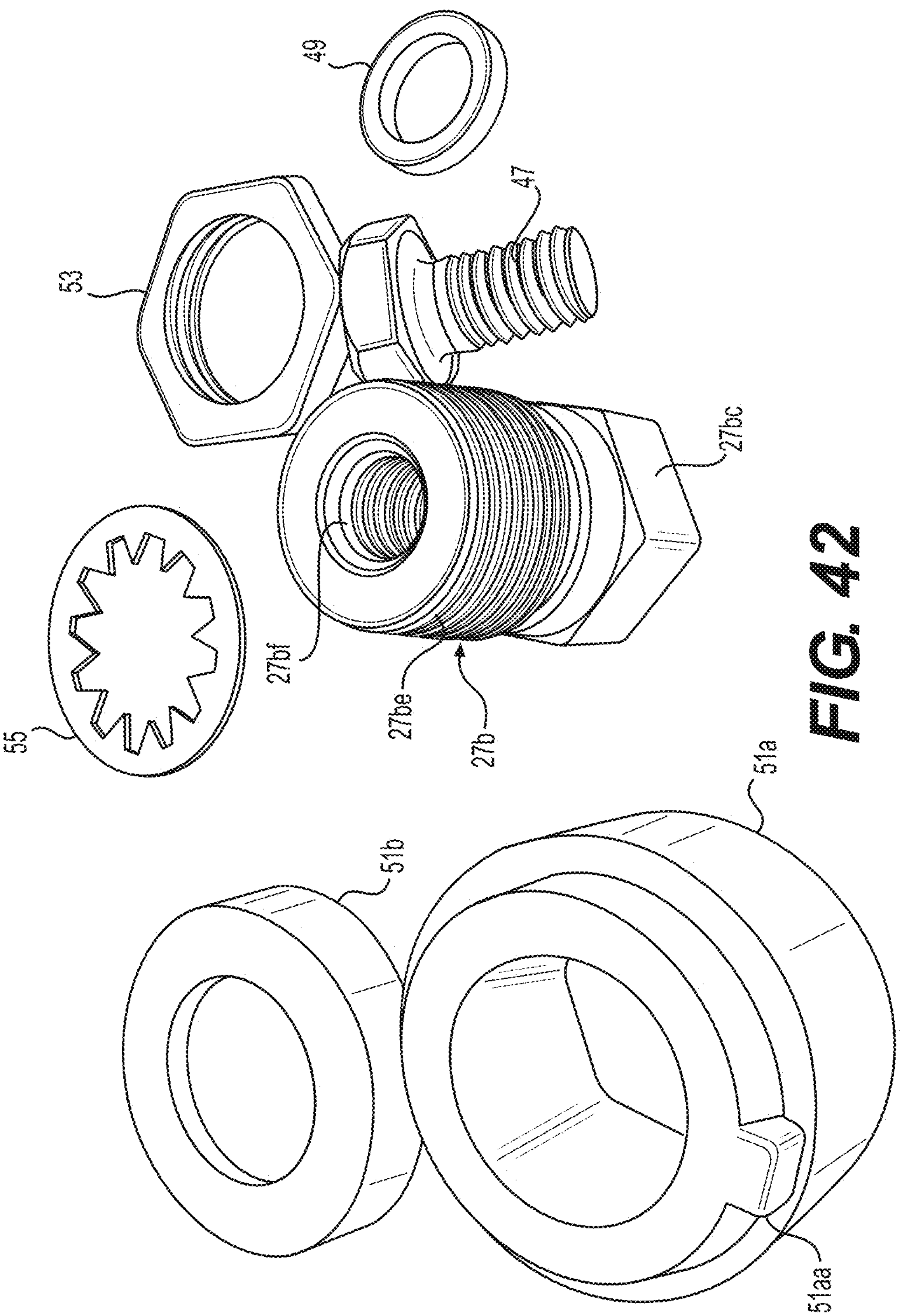
FIG. 42 is a disassembled perspective end view of the female cam-lock end of the cam-lock connecting device shown in FIG. 32.
Figure 43:
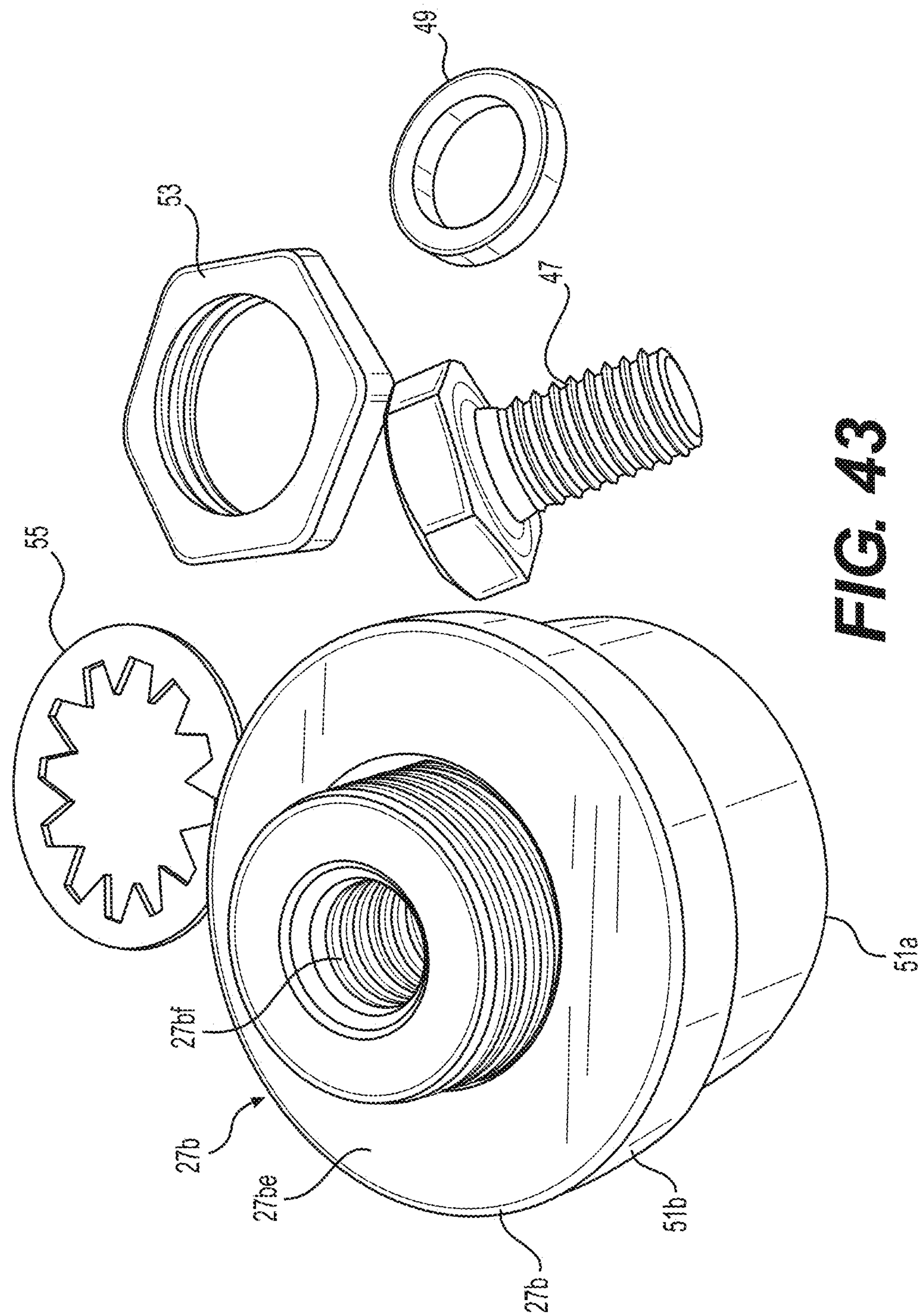
FIG. 43 is a partially assembled perspective end view of the female cam-lock end of the cam-lock connecting device shown in FIG. 32.
Figure 44:
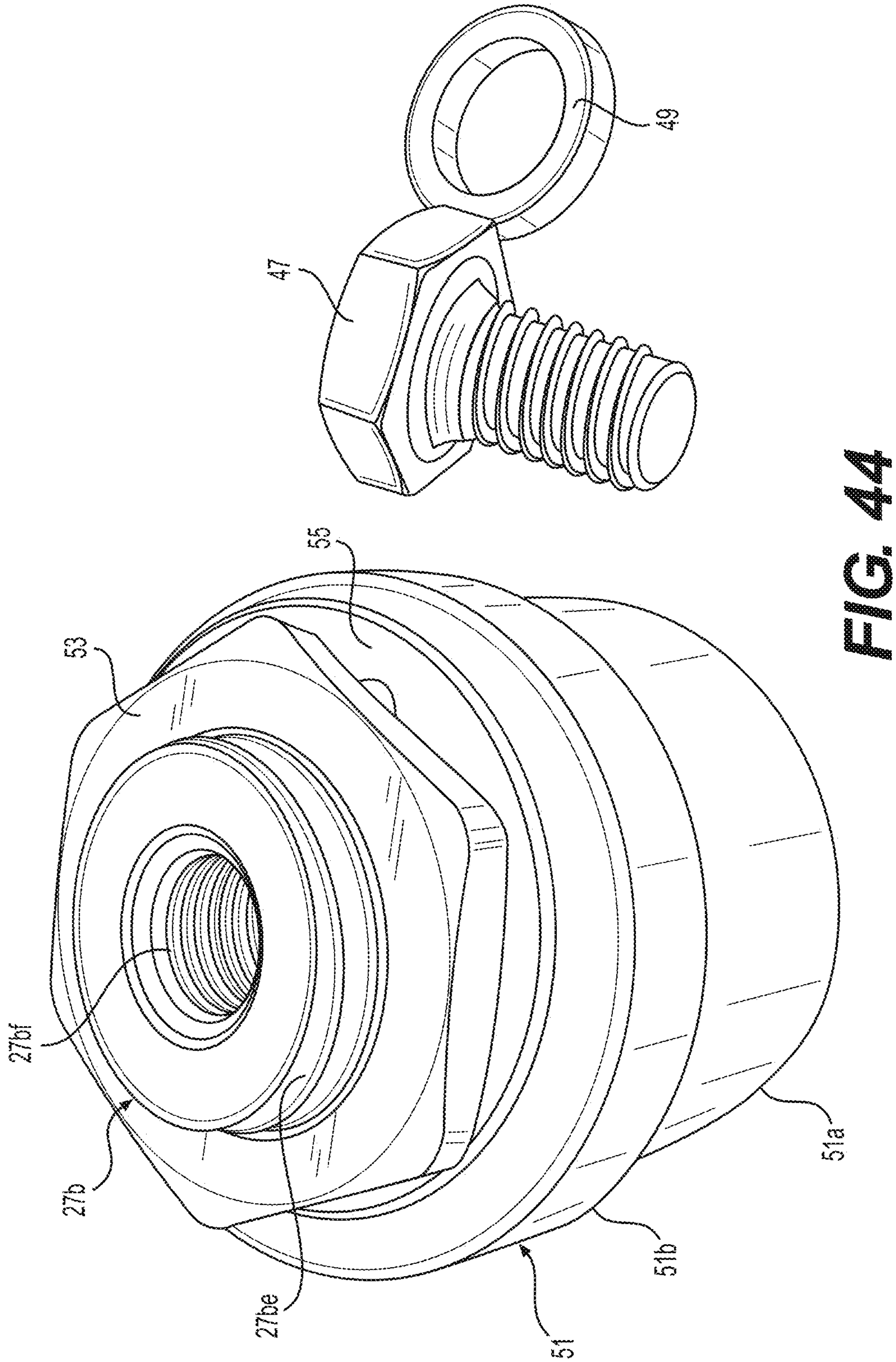
FIG. 44 is an assembled perspective end view of the female cam-lock end of the cam-lock connecting device shown in FIG. 32.
Figure 45:
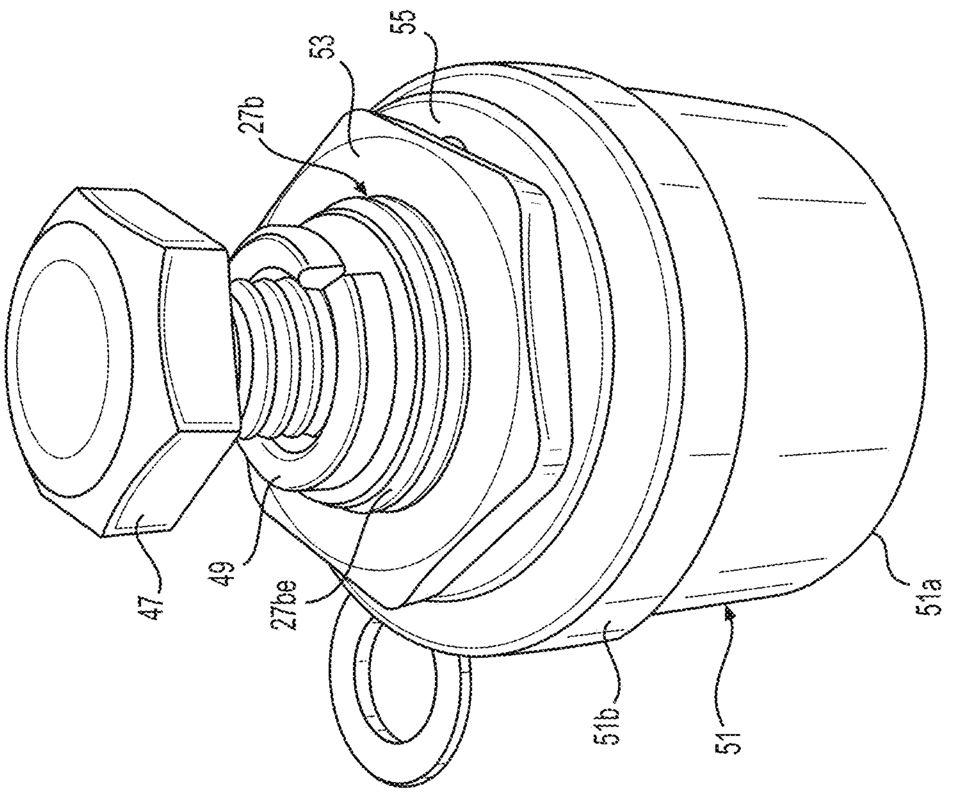
FIG. 45 is an assembled perspective end view of the female cam-lock end of the cam-lock connecting device shown in FIG. 32 along with a bolt for connecting to conductor such as a highly conductive frame of the battery jump starting device according to the present invention.
Figure 46:
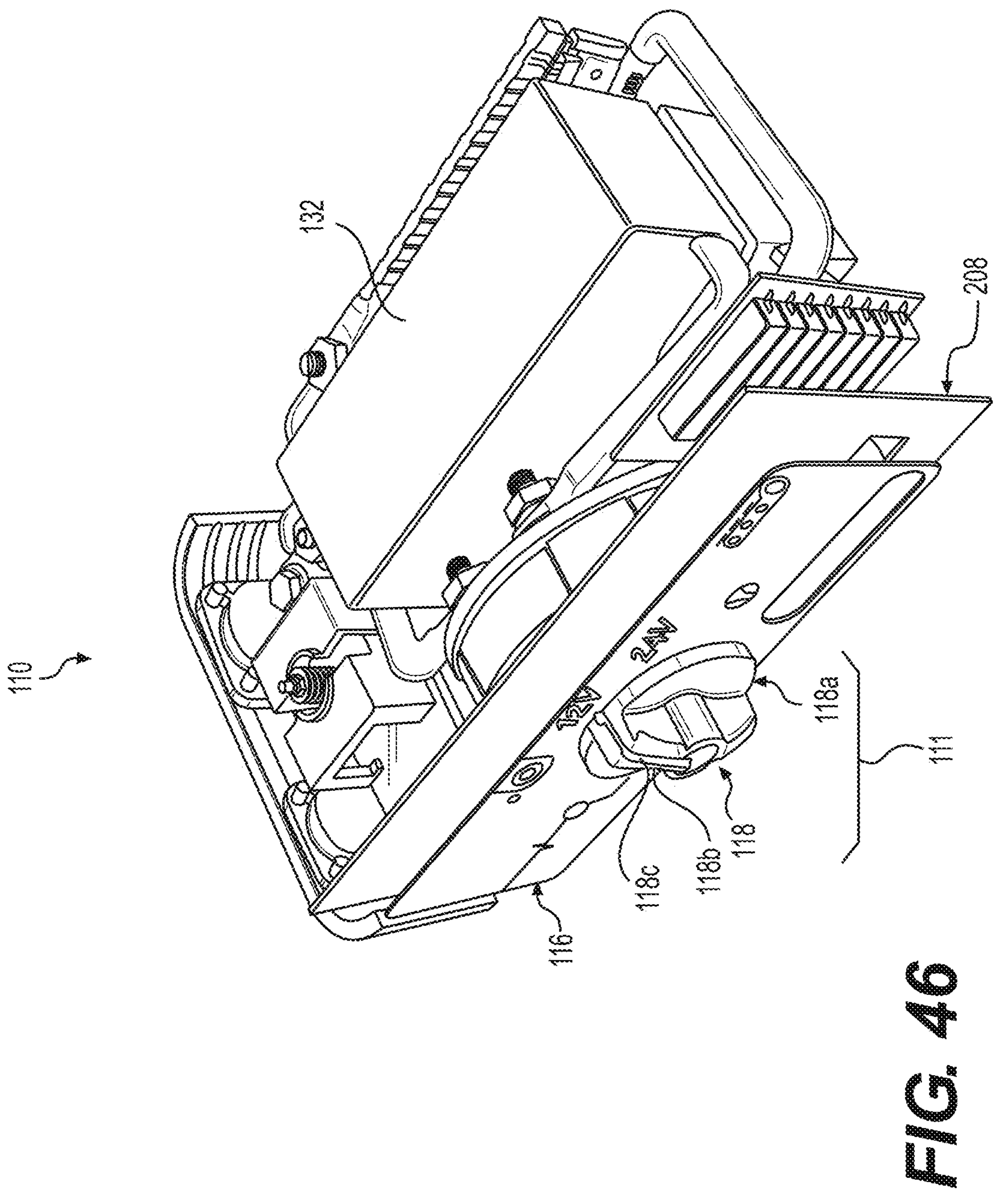
FIG. 46 is a front perspective view of the battery jump starting device shown in FIG. 16 with the cover removed showing the master control switch and interface backlight system according to the present invention.
Figure 48:
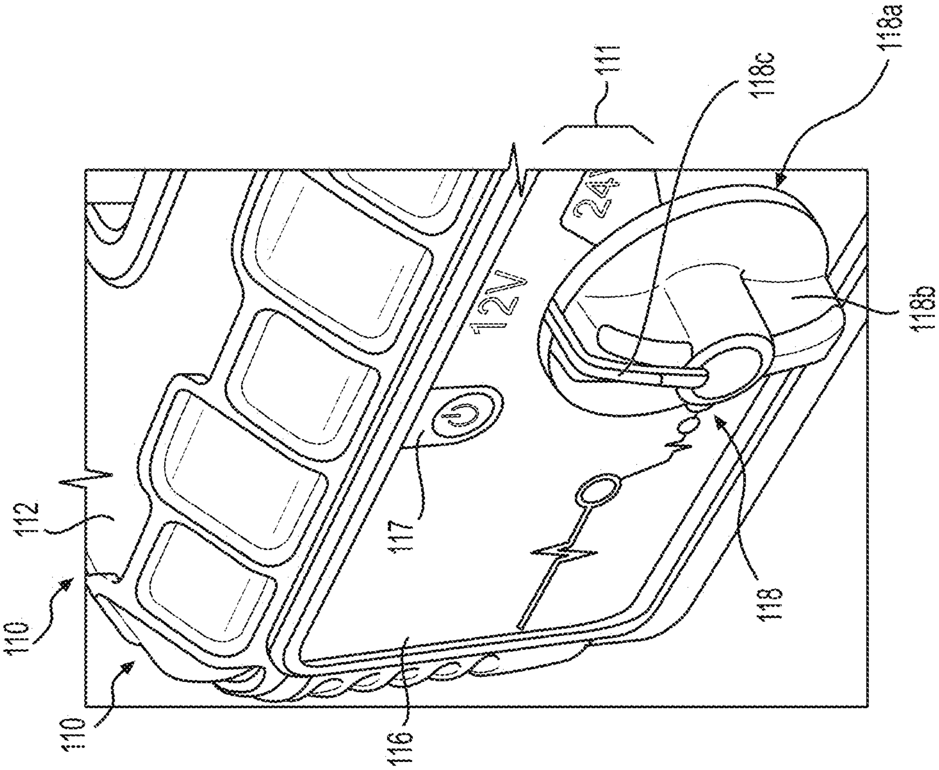
FIG. 48 is a partial front perspective view of the battery jump starting device shown in FIG. 16 with the backlight of the control knob of the control switch for 12V turned "off."
Figure 47:
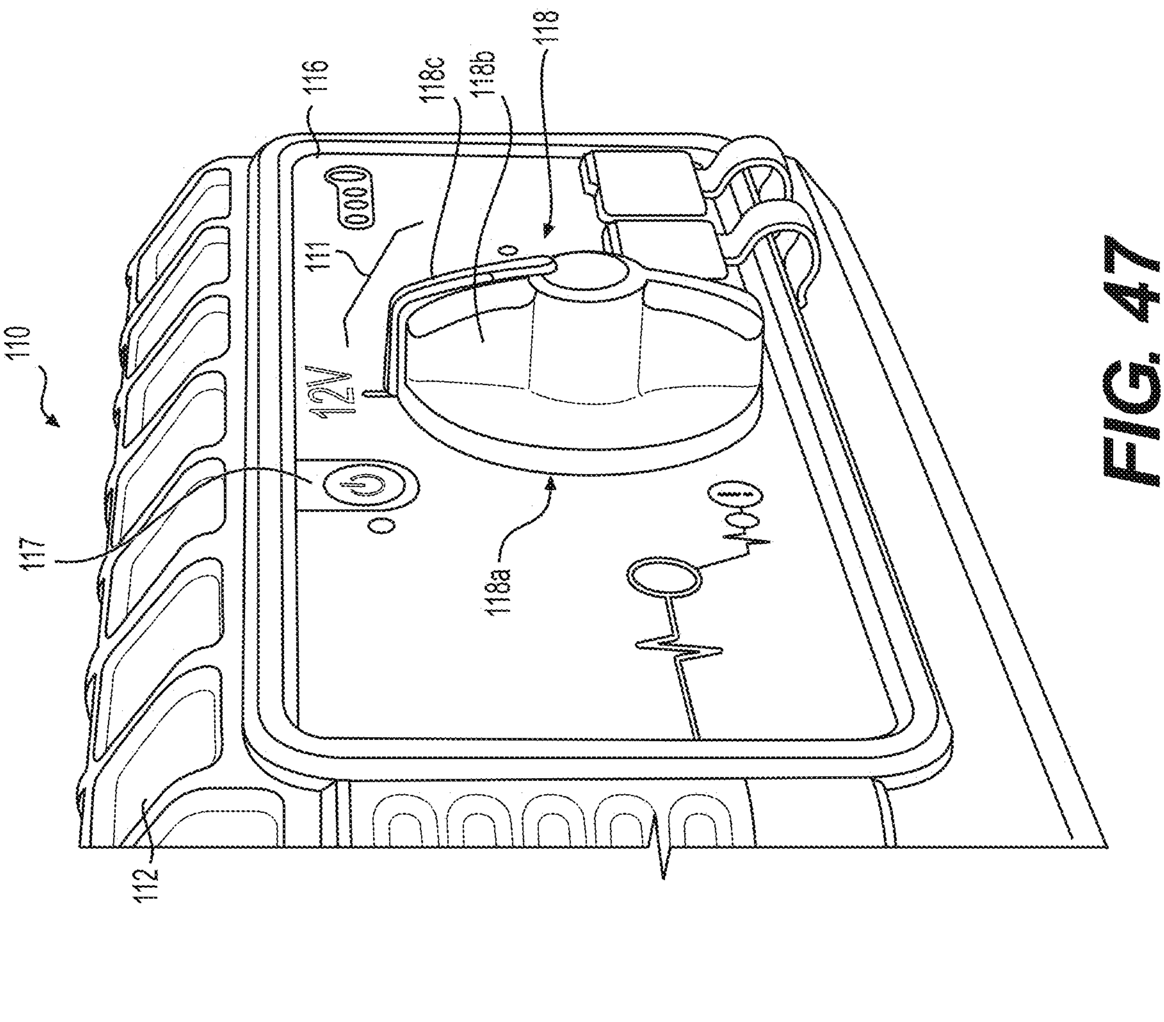
FIG. 47 is a partial front perspective view of the battery jump starting device shown in FIG. 16 with the backlight of the control knob of the control switch for 12V turned "on."

The female cam-lock end 27*b* is accommodated within the molded rubber cover portions 51*a*, 51*b*, as shown in FIGS. 41-43. The molded rubber cover portions 51*a*, 51*b* are fitted onto the threaded portion 27*be* of the female cam-lock end 27*b* (FIGS. 43-45), and then secured in place using nut 53 and lock washer 55. The molded rubber cover portion 51*a* includes an outwardly extending protrusion 51*aa*.

Electrical Control Switch Backlight System

The battery jump charging device 110 can be provided with an electrical control switch backlight system 111, as shown in FIGS. 46-50.

Figure 26:
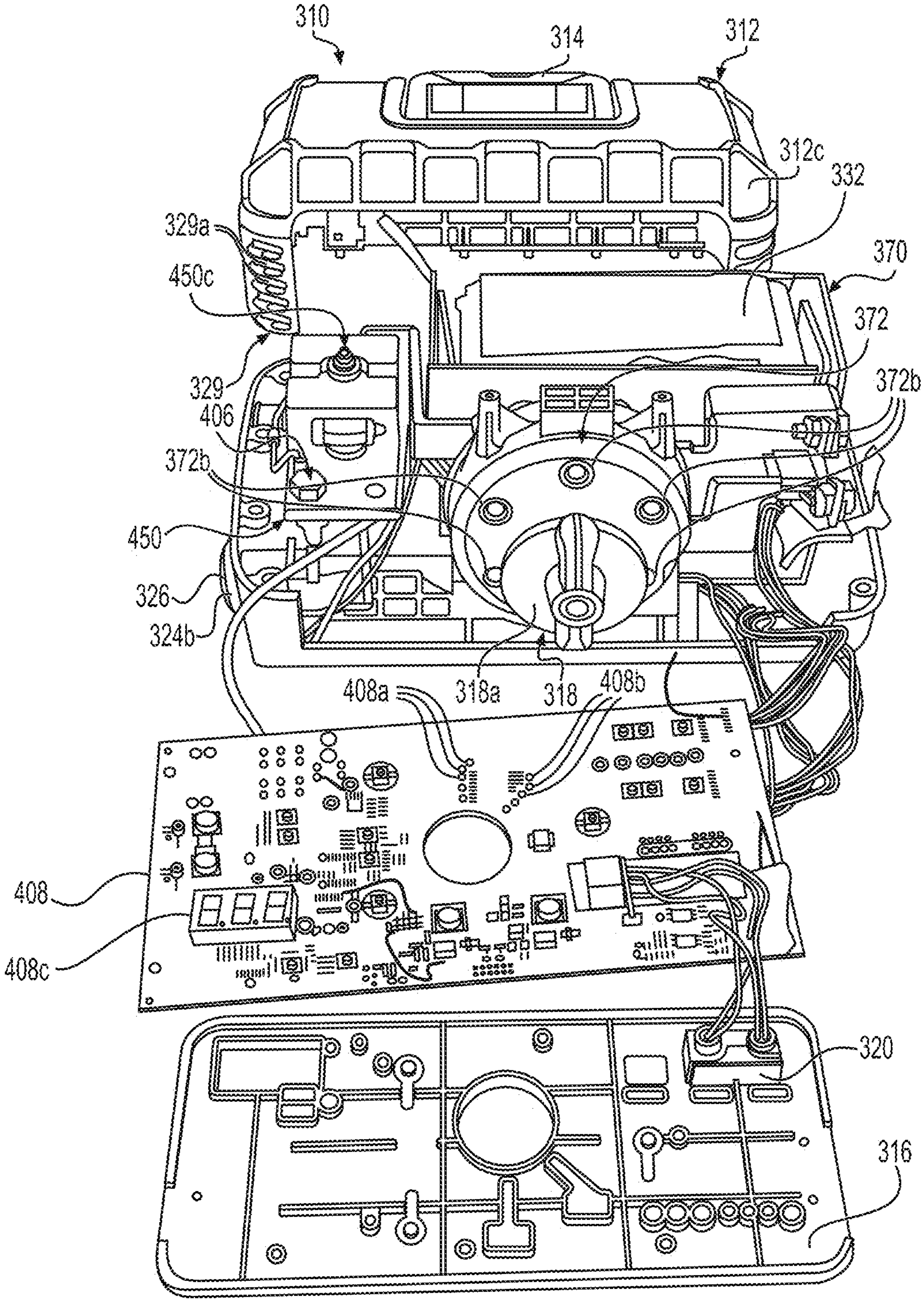
FIG. 26 is a disassembled front perspective view of a third embodiment of the battery jump starting device according to the present invention with the cover removed.
Figure 27:
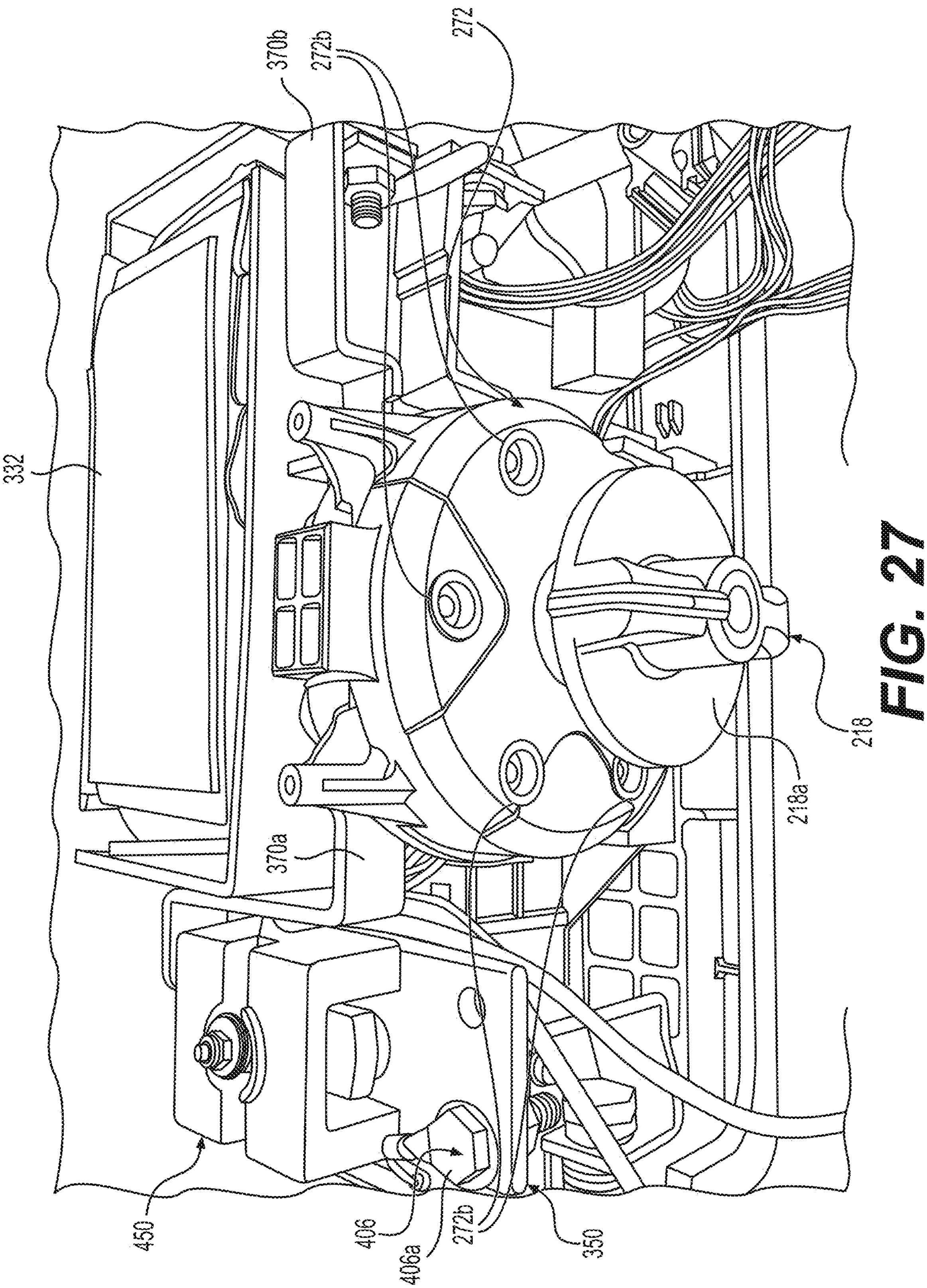
FIG. 27 is a disassembled partial front perspective view of the battery jump starting device shown in FIG. 26 with the cover removed.
Figure 28:
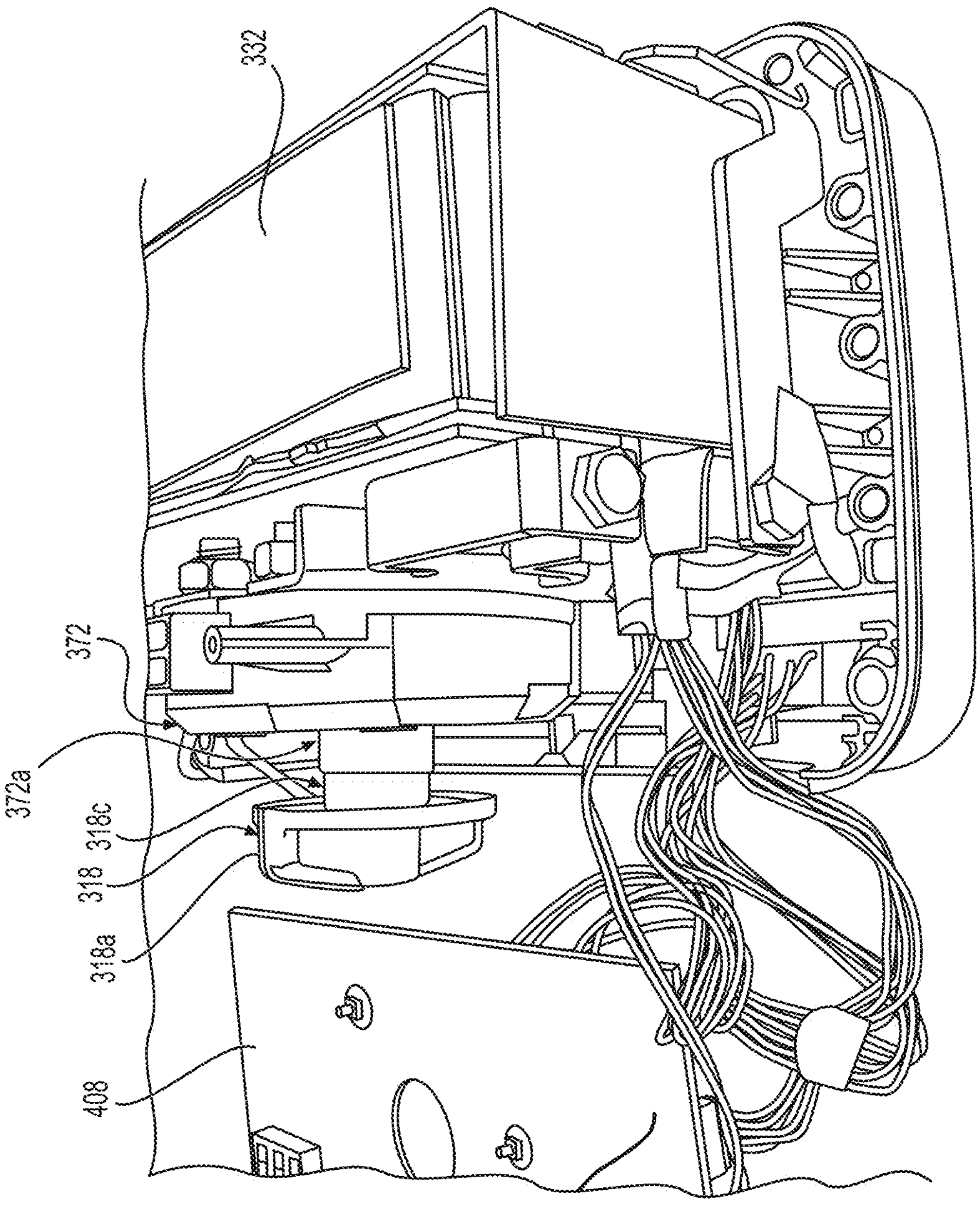
FIG. 28 is a disassembled partial right side perspective view of the battery jump starting device shown in FIG. 26 with the cover removed.
Figure 29:
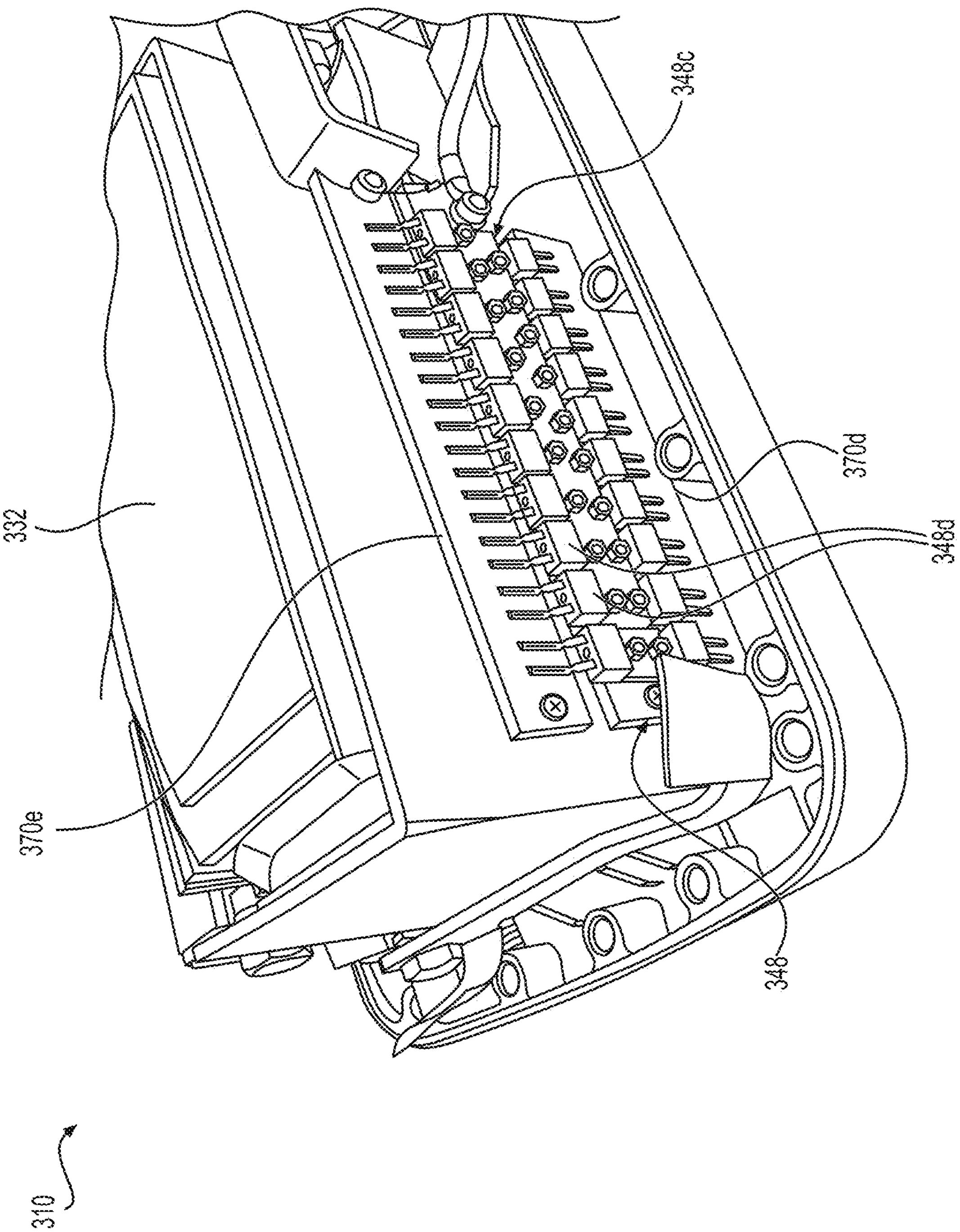
FIG. 29 is a partial rear perspective view of the battery jump starting device shown in FIG. 26 with the cover removed.
Figure 30:
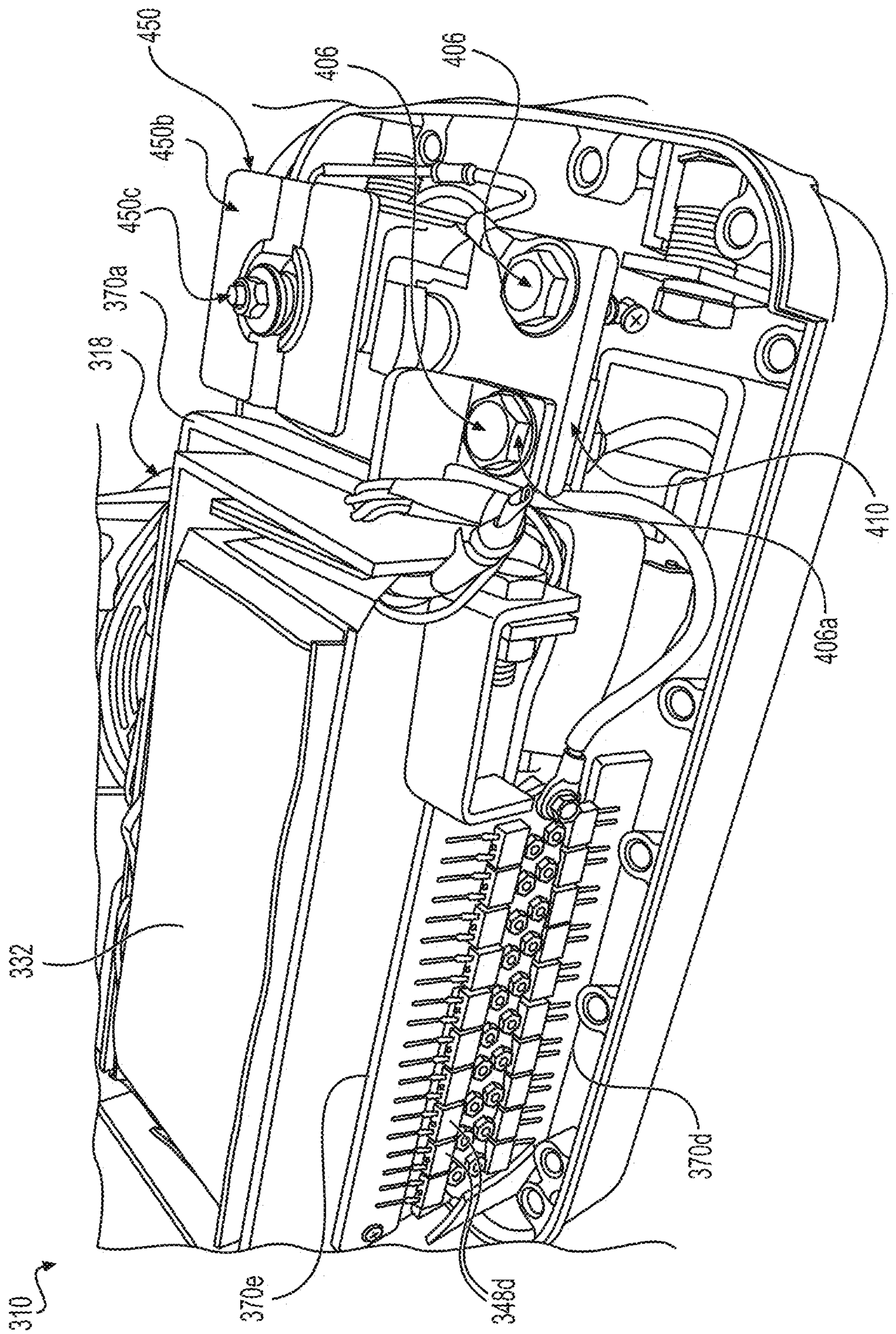
FIG. 30 is a partial rear perspective view of the battery jump starting device shown in FIG. 26 with the cover removed.

The electrical control switch backlight system 111, for example, comprises control switch 118 having the control knob 118*a*, the interface 116 (e.g. with black colored membrane label), and the main printed circuit board 408 (FIG. 26).

The control knob 118*a* comprises the finger grip 118*b* and light window 118*c*. For example, the control knob 118*a* is made of plastic (e.g. black colored injection molded plastic part). For example, the control knob 118*a* is mainly made of a colored (e.g. black colored) opaque plastic material selected to prevent the transmission of light through the control knob 118*a*, and provided with the light window 118*c* (e.g. a slot filled with light transmitting plastic such as clear plastic material or see through plastic material). For example, the light window 118*c* is insert molded with a clear or see through insert part). The light window 118*c* allows light from the backlight LEDs 408*a* or 408*b* mounted on the printed circuit board 408 (FIG. 26) to pass through light windows in the interface 116 and then the light window 118*c* of the control knob 118*a*. The LEDs 408*a* or 408*b* are selectively lite up when the power button 16*a* (FIG. 69) on the interface 16 (116) is turned on (e.g. touch power switch) selectively lighting up the LEDs 408*a* or 408*b*. Alternatively, the light window 118*c* can be an open slot (i.e. void) in the control knob 118*a* serving as the light window 118*c*.

The control switch 118 is rotatable between a first position (Position 1) for a 12V mode of operation of the battery jump starting device 110 and a second position (Position 2) for a 24V mode of operation of the battery jump starting device 110.

The interface 16 (116) is provided with a 12V backlight indicator 16*c* (FIG. 69), a 24V backlight indicator 16*d* (FIG. 69), and an operating voltage display 16*p* for indicating the actual or real time operating voltage of the battery jump charging device 10 (110), and a power "on" indicator 16*a* (FIG. 69).

The electrical control switch backlight system 111 (FIGS. 46-50) is configured to turn on the LEDs 408*a* (e.g. white LEDs) mounted on the printed circuit board 408 (FIG. 26) when the control switch 118 is located at Position 1 for the 12V mode of operation of the battery jump starting device 110, and turn on the LEDs 408*b* (e.g. blue LEDs) mounted on the printed circuit board 408 when the control switch 118 is located at Position 2 for the 24V mode of operation of the battery jump starting device 110. As show in FIGS. 46-50, the light window 118*c* is provided in the control knob 118*a* and lights up along with 12V backlight indicators on the interface 116 when the control knob 118 is in Position 1. The 24V backlight indicator lights up when the control knob 118*a* is in Position 2.

The rechargeable battery jump starting device 110 comprises the cover 112 and the interface 116 mounted on the cover. A power source for the electrical switch backlight system is disposed within the cover 112. For example, the power source is one or both of the Li-ion batteries 332 (FIG. 26).

Figure 49:
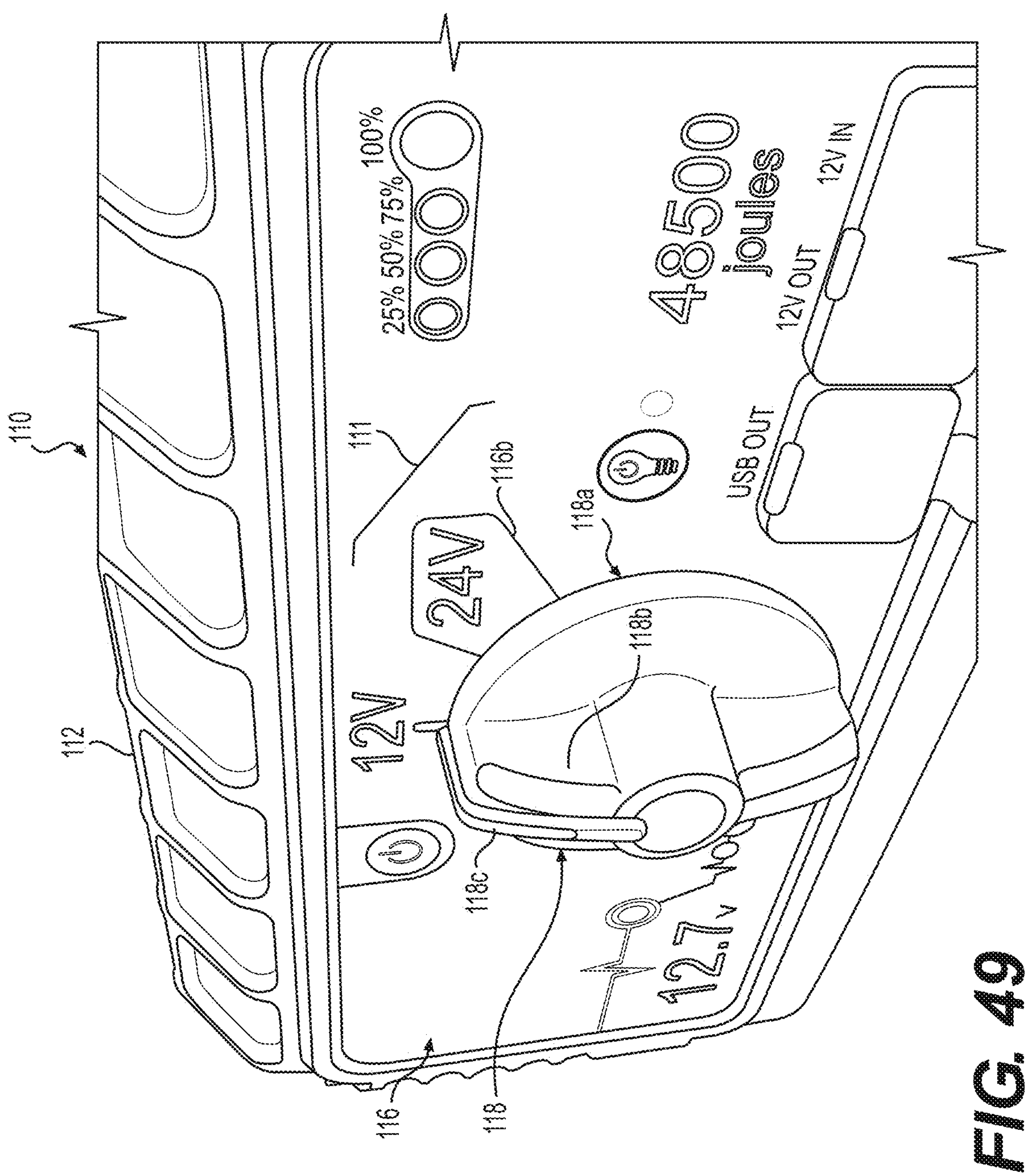
FIG. 49 is a partial front perspective view of the battery jump starting device shown in FIG. 16 with the backlight of the control knob of the control switch for 12V turned "on", the backlight indicator for 12V on the interface turned "on", the variable backlight indicator on the indicator showing 12.7V turned "on", and the backlight for power "on."
Figure 50:
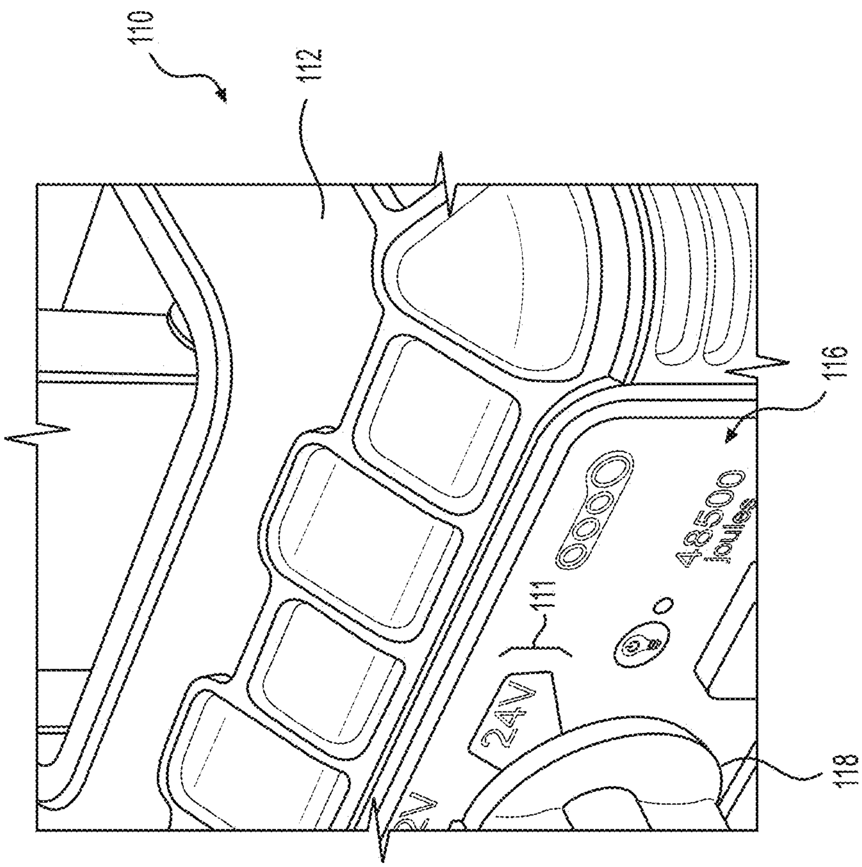
FIG. 50 is a partial front perspective view of the battery jump starting device shown in FIG. 16 with the backlight of the control knob of the control switch for 24V turned "on."

The printed circuit board 408 (FIG. 26) is provided with the backlights 408*a*, 408*b* located at different positions on the printed circuit board 408 (FIG. 26) and at different positions on the interface 116 (FIG. 49). The backlights 408*a*, 408*b* are selectively powered by the power source.

The electrical control switch 118 is mounted on the interface 116. The electrical control switch 118 is rotatable between different positions on the interface 116 (e.g. 12V position and 24V position).

The control knob 118*a* is mounted on the electrical control switch 118, and the control knob 118*a* is rotatable between the different positions on the interface 116. Again, the control knob 118*a* is provided with the light window 118*c*. The light window 118*c* of the control knob 118*a* lights up when the control knob 118*a* is selectively rotated to one of the different positions (e.g. 12V position or 24V position) on the interface 116 by one of the at least two backlights 408*a*, 408*b* (FIG. 26).

The interface 116 is provided with at least two visual indicators (e.g. 12V symbol and 24V symbol) each located at the different positions on the interface 116, respectively, to indicate different operating modes of the rechargeable battery jump starting device 110. The at least two visual indicators are configured to selectively light up when the control knob 118*a* is selectively rotated to one of the different positions on the interface 116 by the backlights 408*a*, 408*b*.

The at least two visual indicators 16*c*, 16*d* (FIG. 69) are provided by light windows through the interface 116 located at the different positions, respectively. Again, the at least two visual indicators 16*c*, 16*d* selectively light up when the control knob is selectively rotated to one of the different positions on the interface 116 by one of the at least two backlights 16*c*, 16*d*. One of the at least two visual indicators 16*c*, 16*d* (FIG. 69) is the symbol 12V to indicate 12 volt operation mode of the device and the other of the at least two visual indicators 16*c*, 16*d* (FIG. 69) is the symbol 24V to indicate 24 volt operation mode of the rechargeable battery jump starting device 110.

The interface 116 (316) comprises the printed circuit board 408 (FIG. 26) located on or adjacent to a back side of the interface 116 (316). The interface 116 (316) having at least two lights such as LEDs 408*a*, 408*b* located at the different positions on the interface 116 (316). For example, the at least two backlights are at least two light emitting diodes (LEDs) 408*a*, 408*b* connected to the printed circuit board 408.

The control knob 118*a* comprises a light blocking opaque portion having a clear portion or see through portion configured to serve as the light window 118*c*.

The rechargeable battery jump starting device 110 further comprises the first 12V battery 132 (332) disposed within the cover 310, as shown in FIG. 26, and a second 12V battery 332 located below the first 12V battery 332 and disposed within the cover.

The highly conductive frame 370 having a positive conductive pathway and a negative conductive pathway is selectively connected to the first 12V battery 332 and/or the second 12V battery 332 when the rechargeable battery jump starting device 110 device is jump charging a battery to be charged.

The positive battery cable 56 (FIG. 9) having the positive battery clamp 60 is connected to the positive conductive pathway of the highly conductive frame 370 (FIG. 26). The negative battery cable 58 (FIG. 9) having the negative battery clamp 62 is connected to the negative conductive pathway of the highly conductive rigid frame 370 (FIG. 26).

The control switch 318 (FIG. 26) is connected to the highly conductive frame 370 to selectively operate the first 12V battery 332 and/or the second 12V battery 332. The control knob 318*a* is configured to rotate between the 12V operating mode position (FIG. 49) and the 24V operating mode position to selectively operate the rechargeable battery jump starting device 110 in either the 12V mode or 24V mode.

The rechargeable battery jump starting device 110 is configured to light up one of the at least two backlights such as LEDs 408*a*, 408*b* (FIG. 26) on the interface 116 (316) when the rechargeable battery jump starting device 110 is turned on. Further, the interface 116 (316) is configured to display the real time operating voltage of the device during operation of the rechargeable battery jump starting device 110 (310). The first 12V battery 332 (FIG. 26) and second 12V battery 332 are Li-ion batteries.

The control knob 118*a* is made of an opaque material (e.g. black injection molded plastic polymer material), and the light window 118*c* is defined by the slot-shaped light window in the control knob 118*a* filled light transmitting material (e.g. clear or see through plastic material). The control knob 118*a* comprises a round outer edge, and the slot-shaped light window 118*c* is a radially oriented slot extending from the outer edge of the control knob inwardly. The control knob 118*a* comprises a finger grip 118*b*, and the slot-shaped light window 118*c* extends along a length axis of the finger grip 118*b*.

The rechargeable battery jump starting device 110 further comprises an electrical position switch located between the power source (e.g. Li-ion batteries 332) and the at least two backlights such as LEDs 408*a*, 408*b* (FIG. 26). The electrical position switch is configured to light up one of the at least two backlights when the control knob 118*a* is selectively rotated to one of the different positions on the interface 116.

Electrical System

Figure 67:
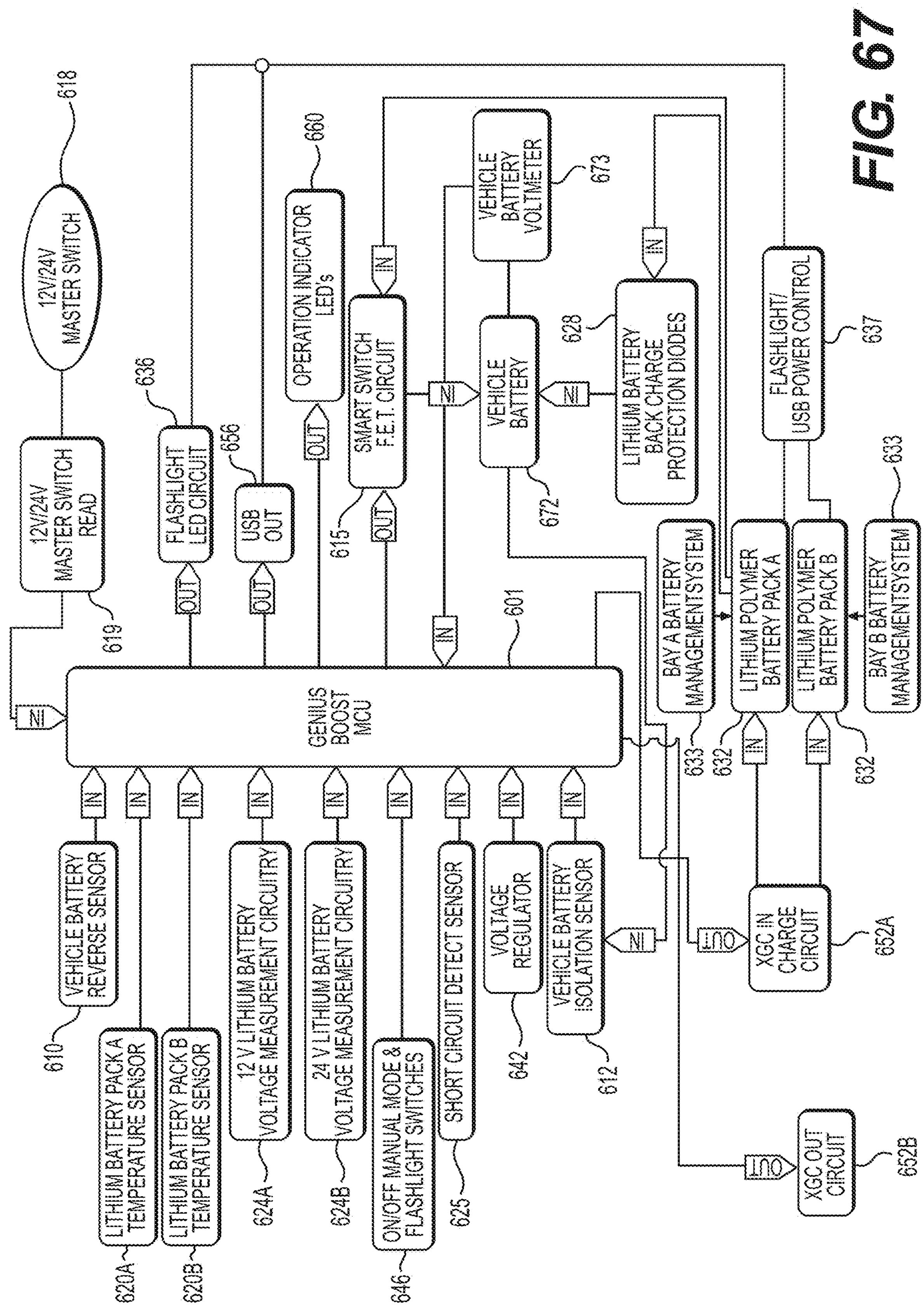
FIG. 67 is a functional block diagram of the rechargeable battery jump starting device shown in FIG. 26.
Figures 1, 68A:
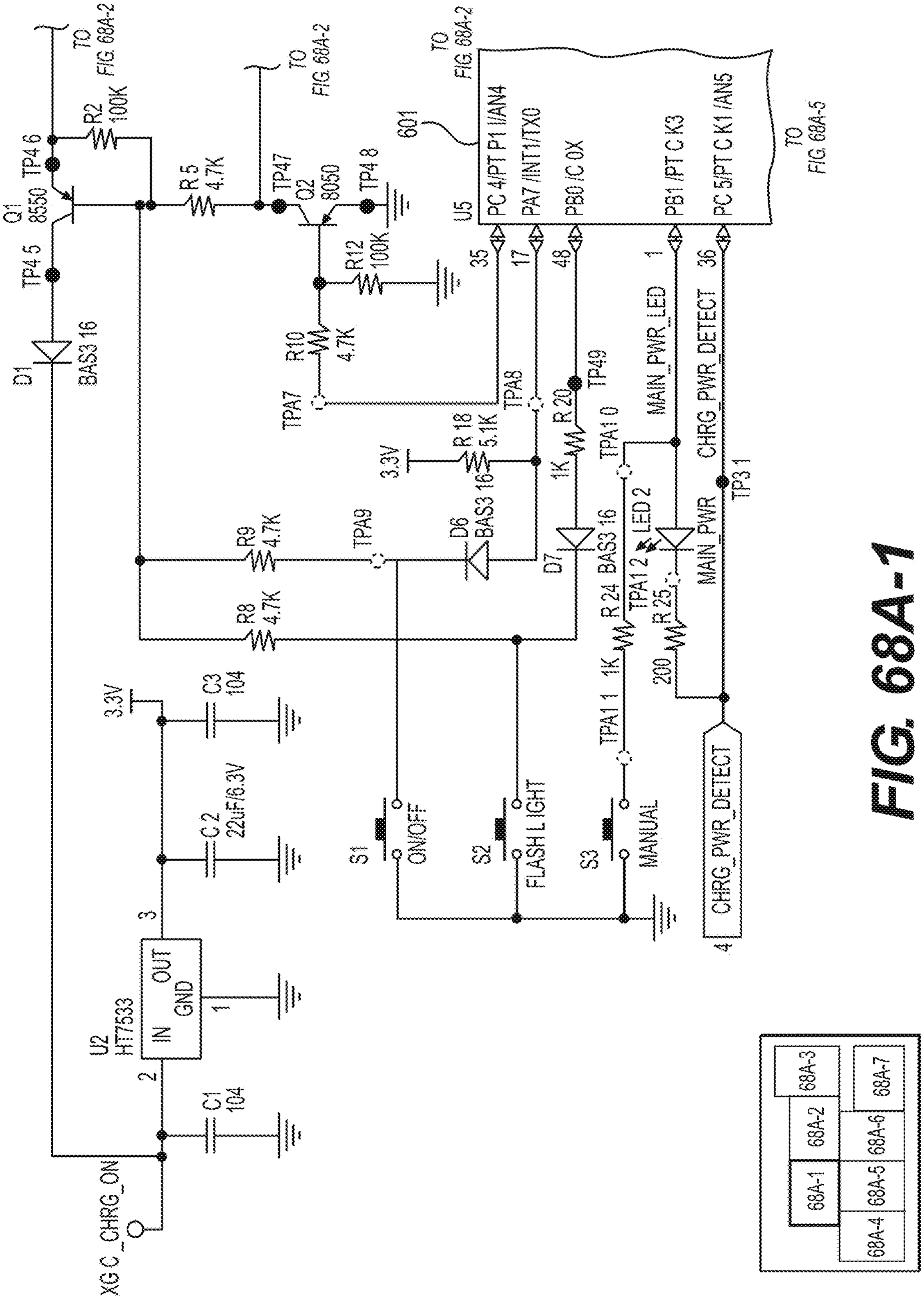
Figures 2, 68A:
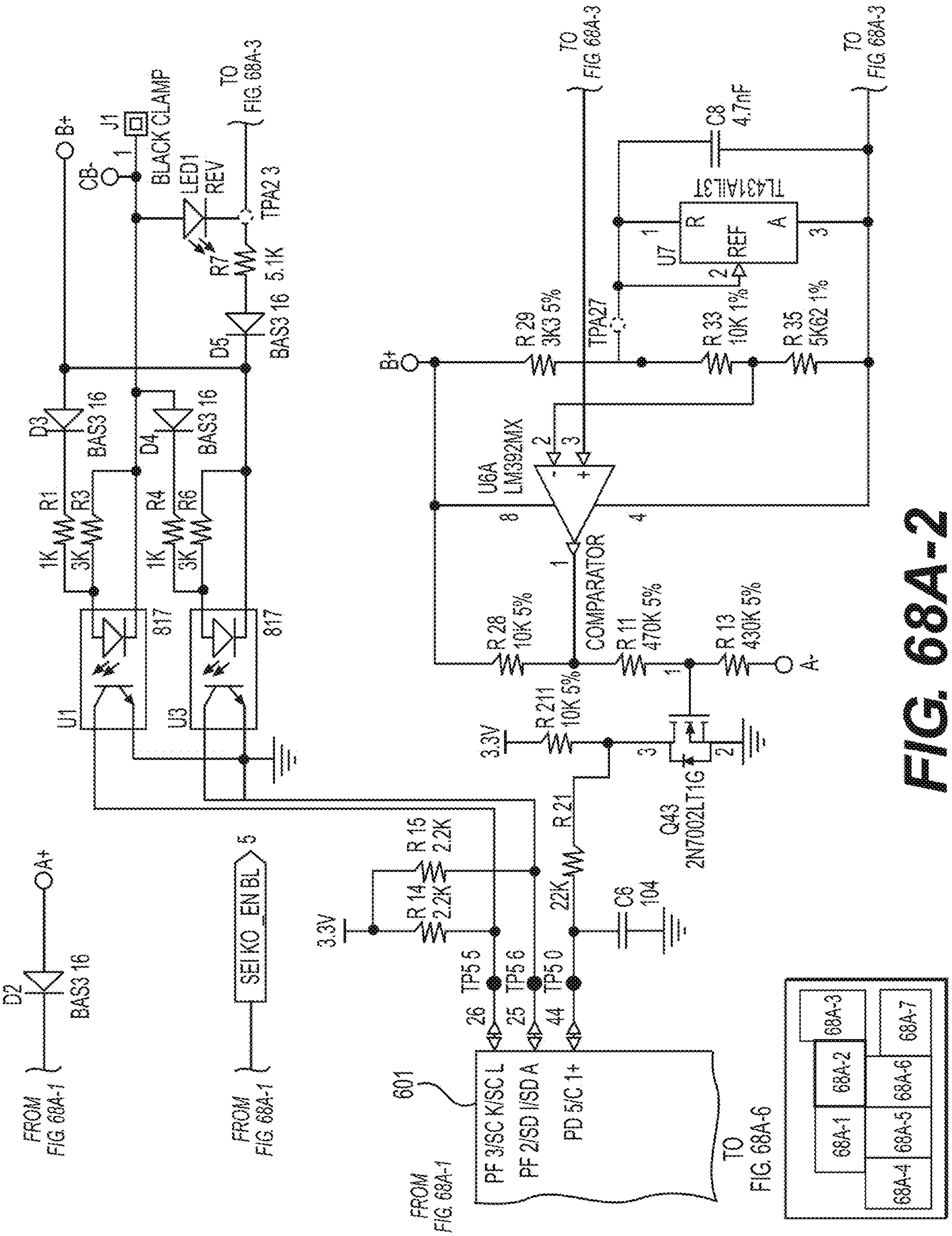
Figures 3, 68A:
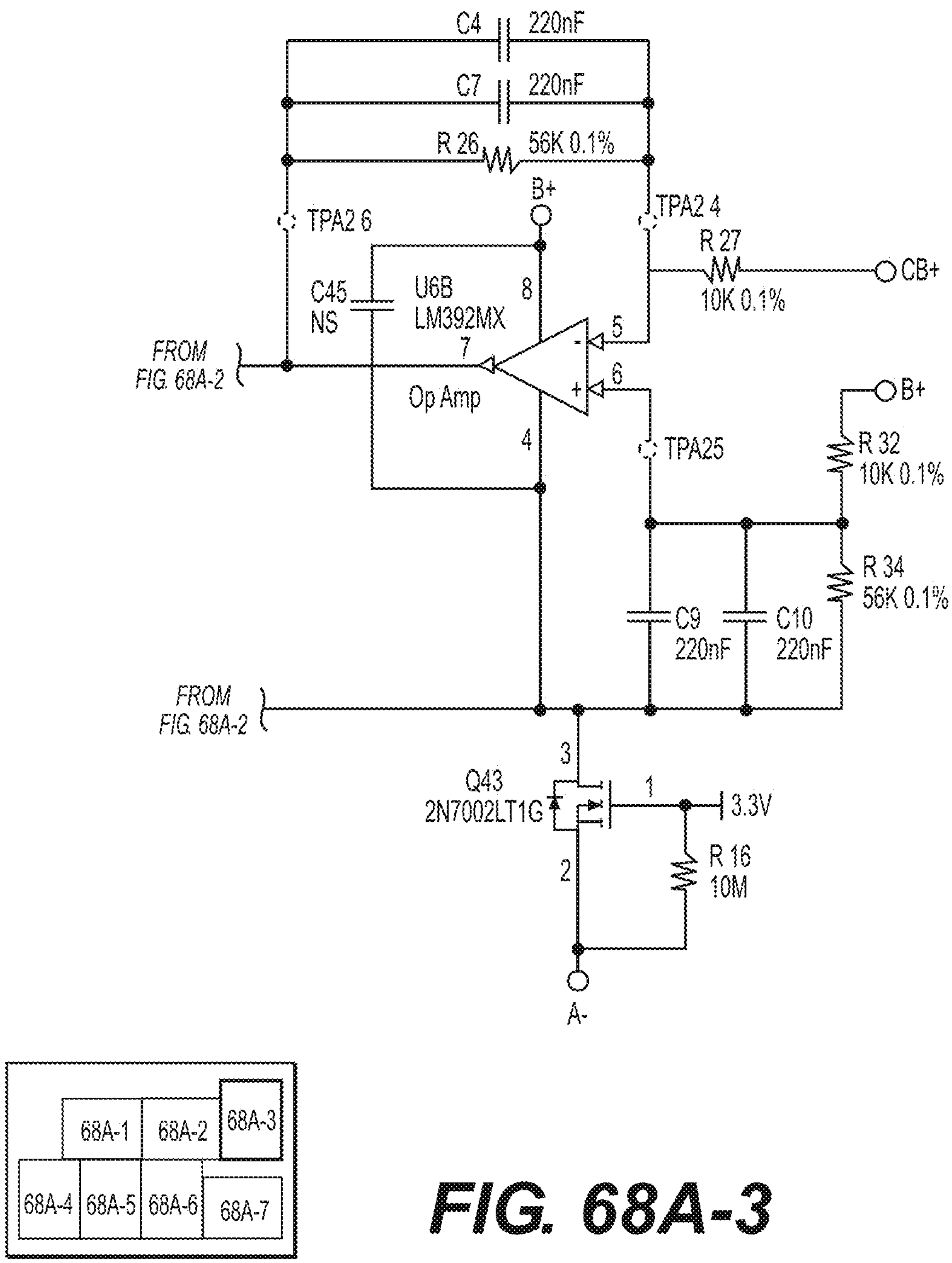
Figures 4, 68A:
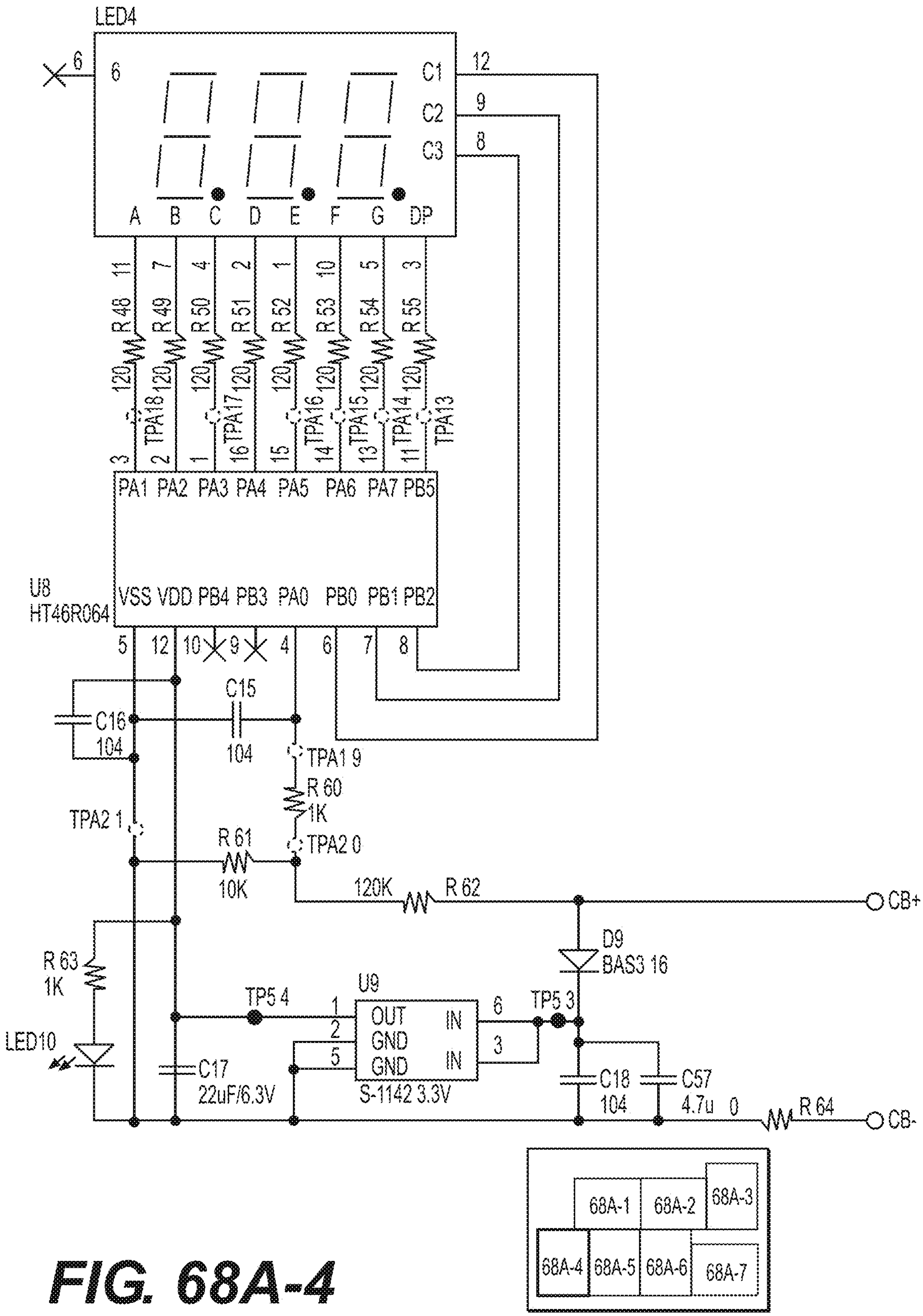
Figures 5, 68A:
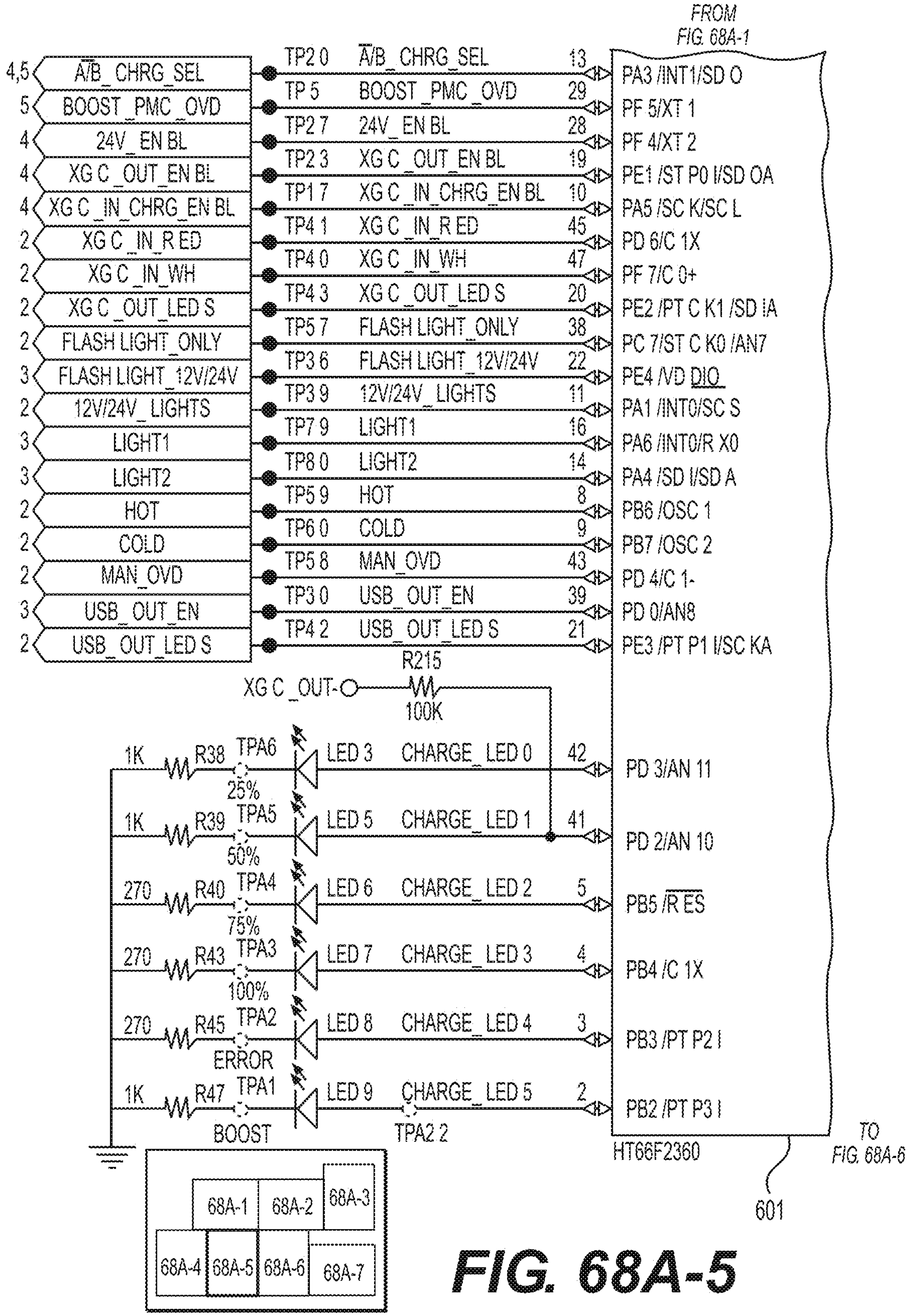
Figures 6, 68A:
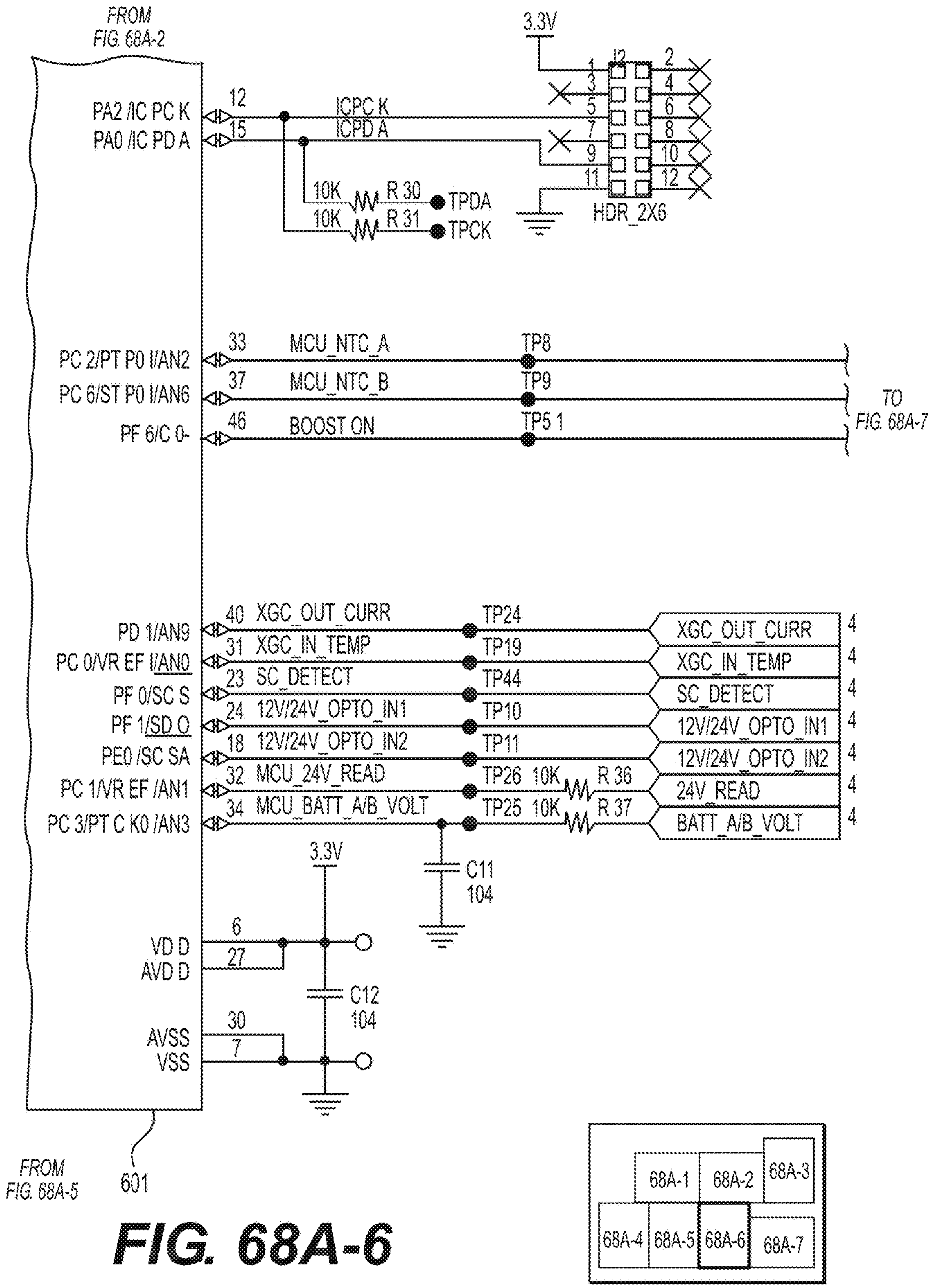
Figures 7, 68A:
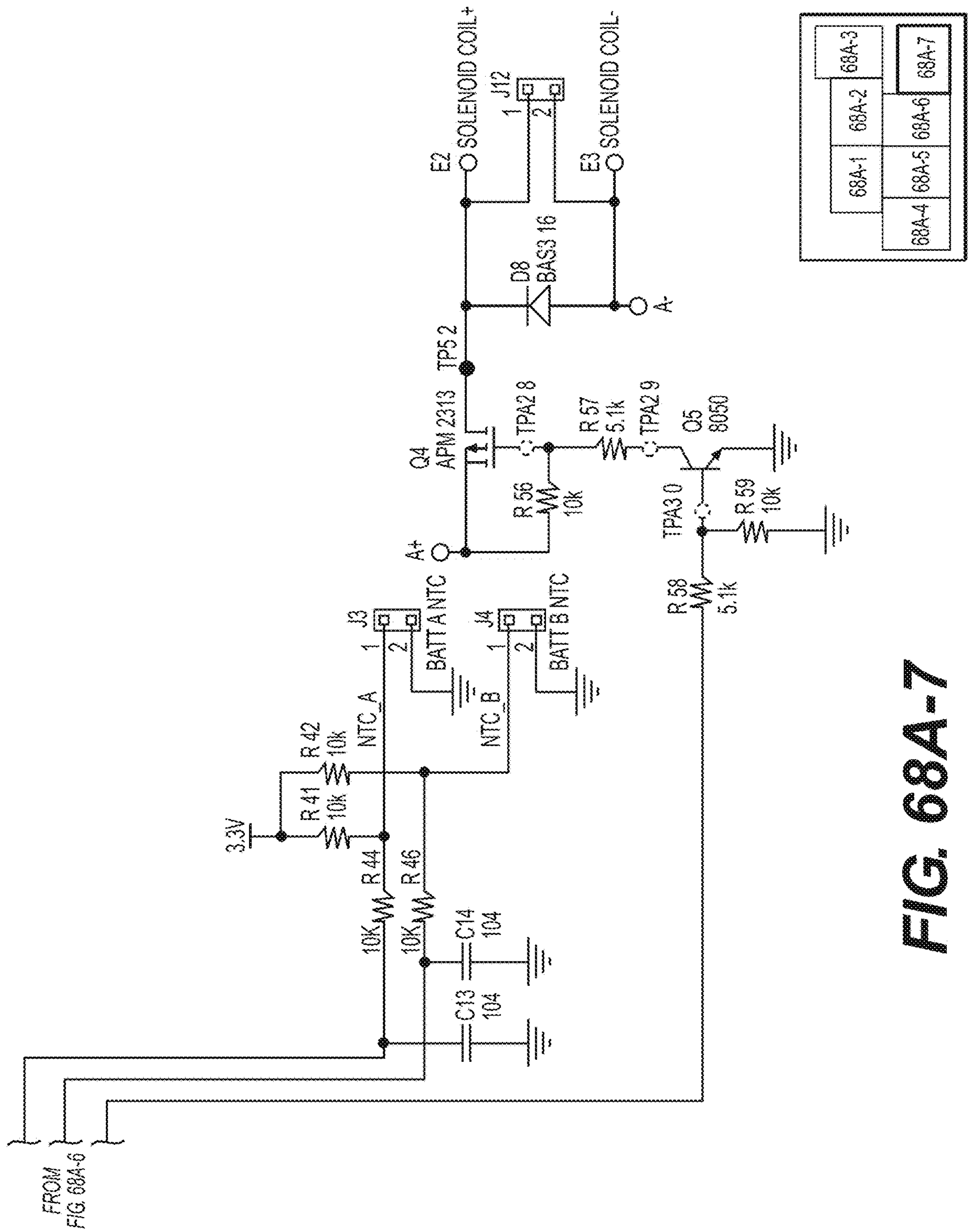
Figures 1, 68B:
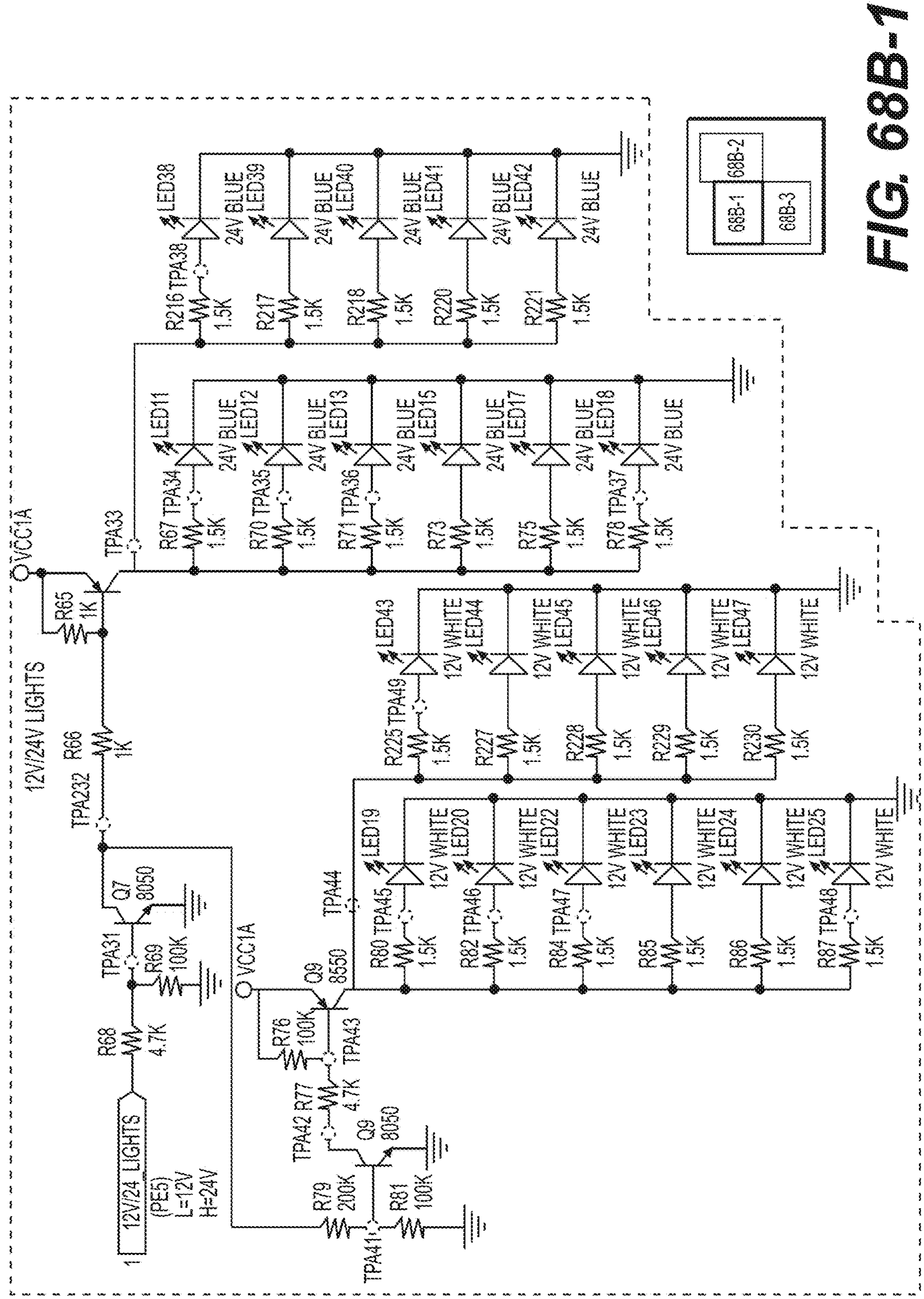
Figures 2, 68B:
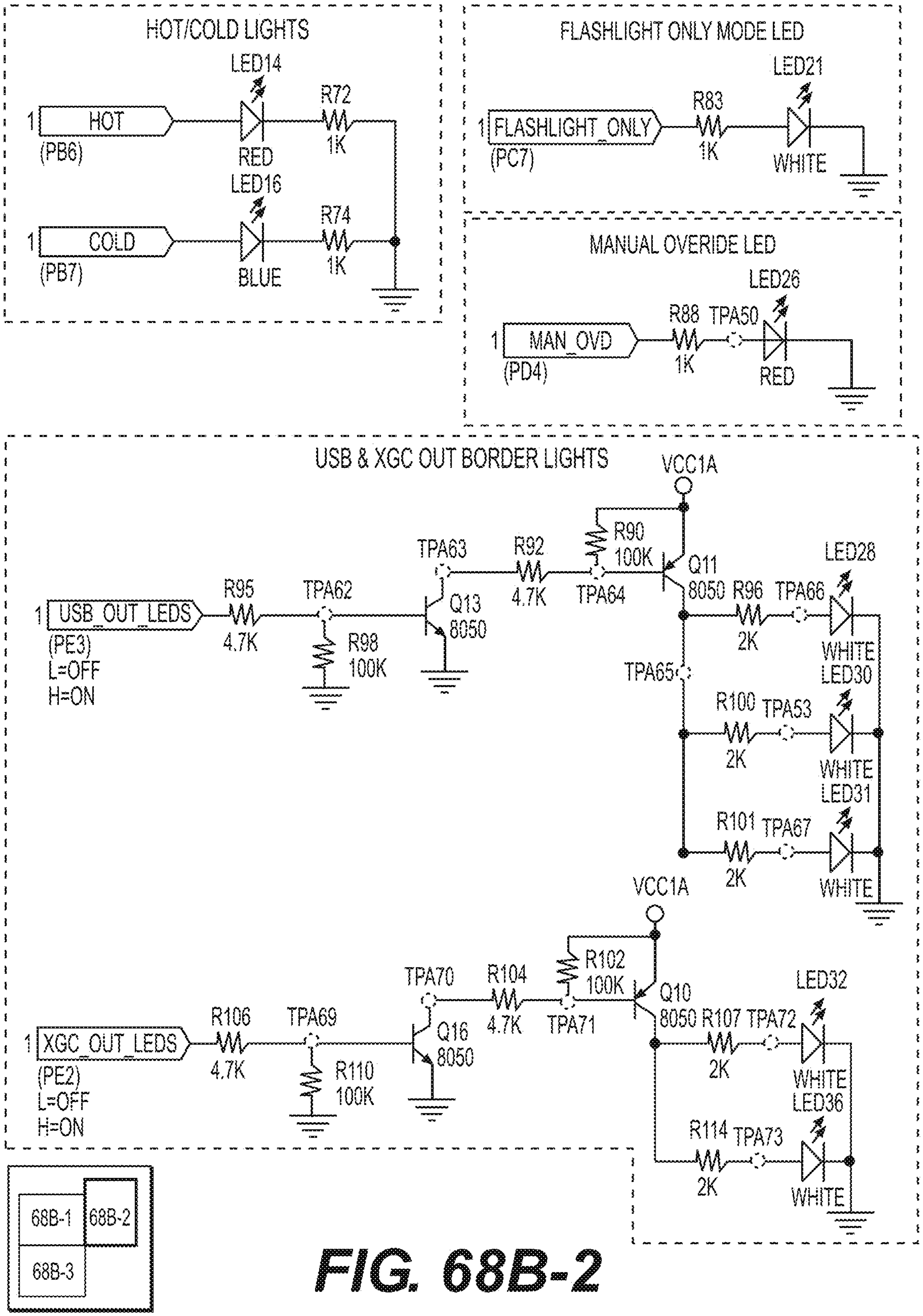
Figures 1, 68C:
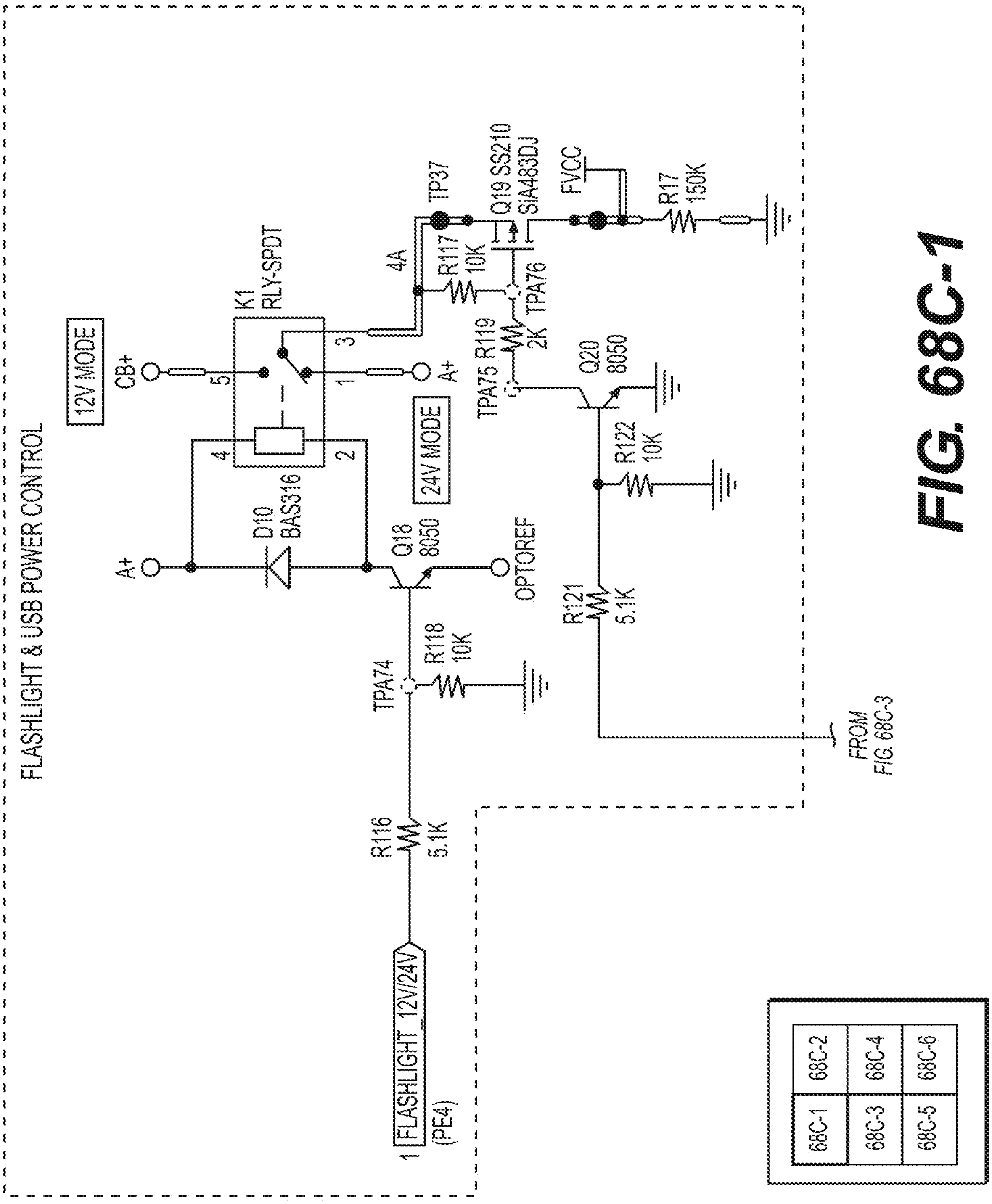
Figures 3, 68C:
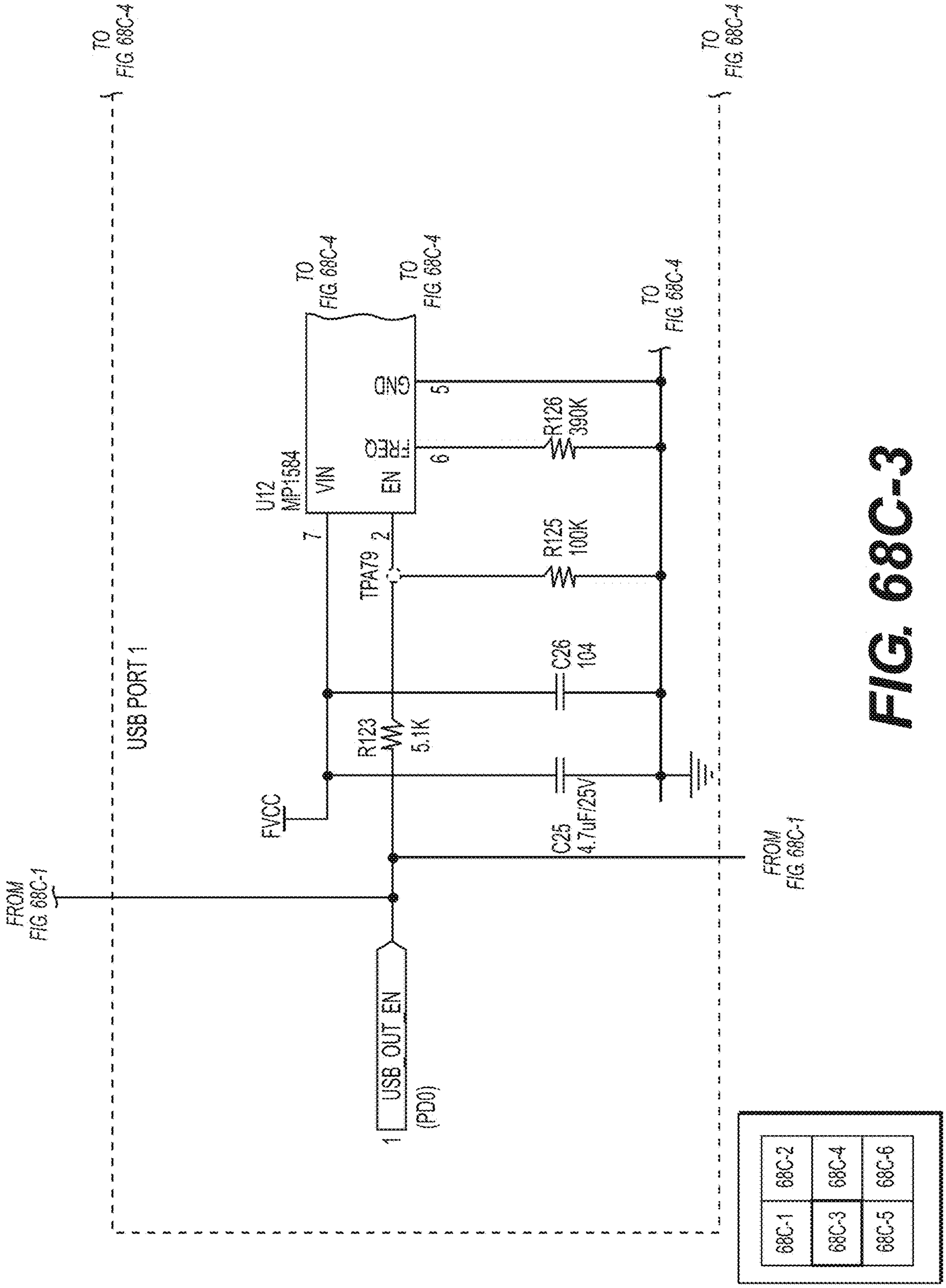
Figures 4, 68C:
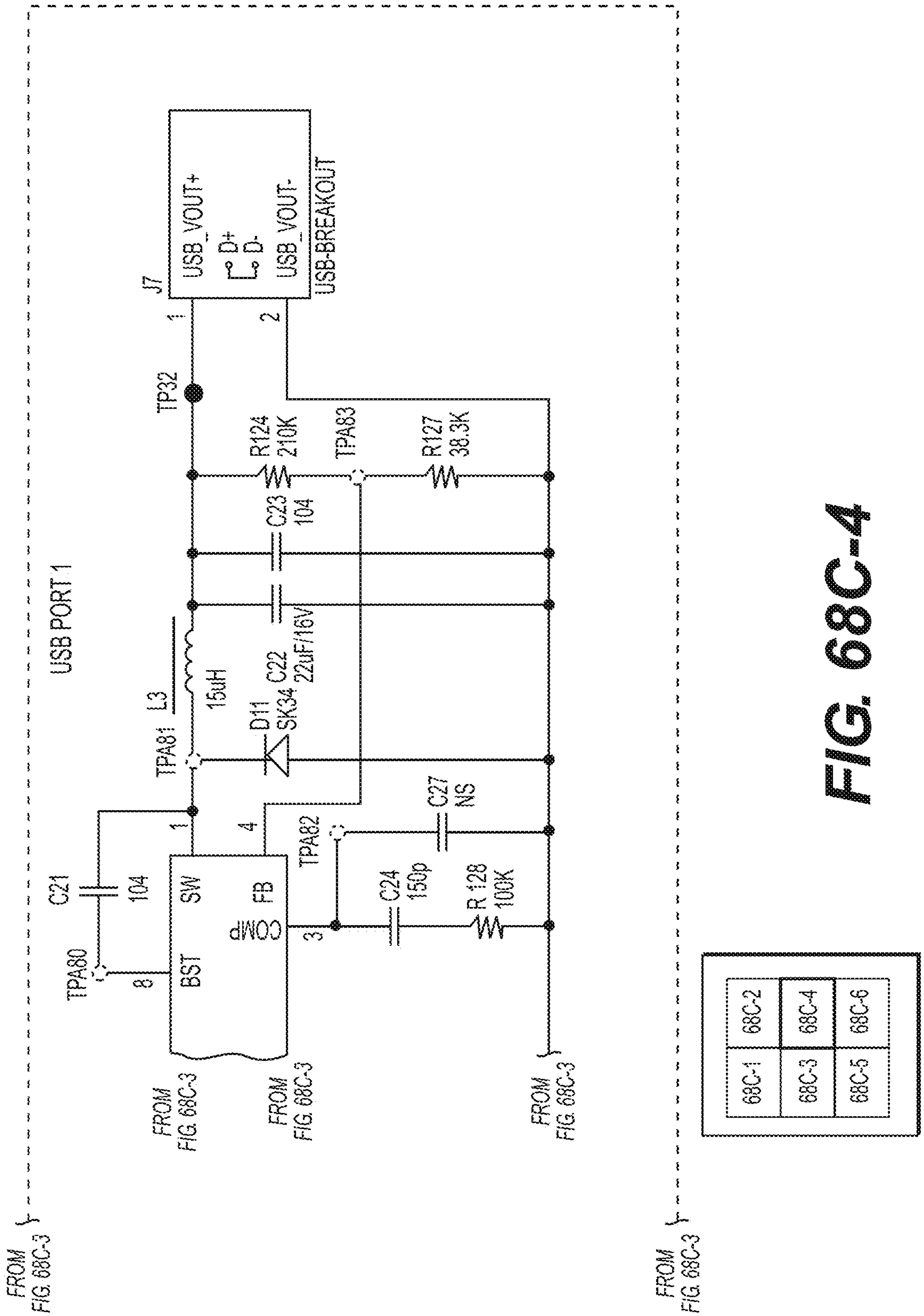
Figure 68C:
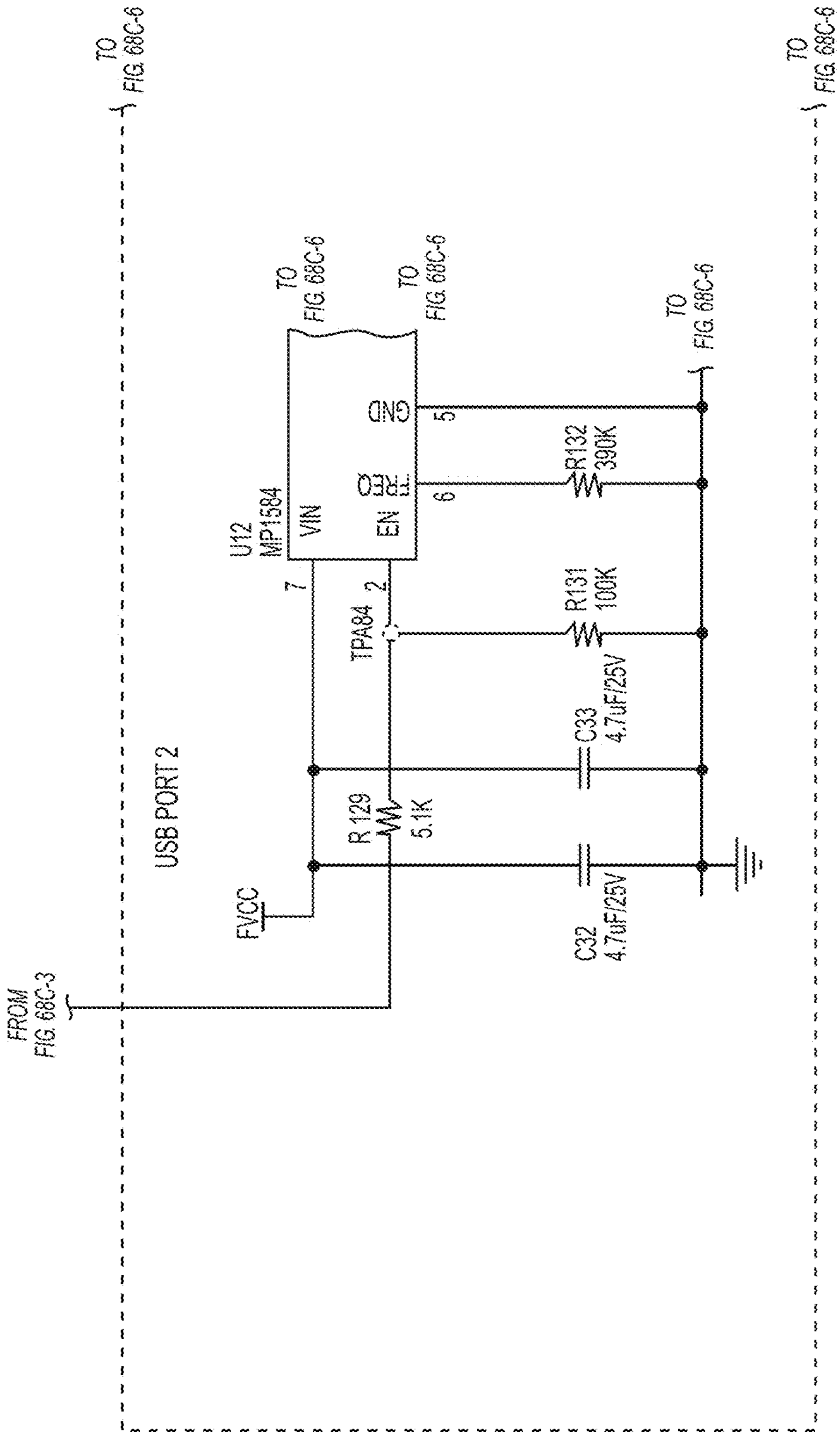
Figure 5:
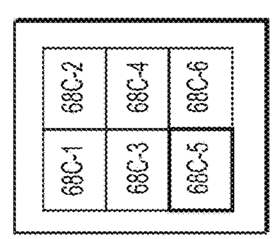
Figures 6, 68C:
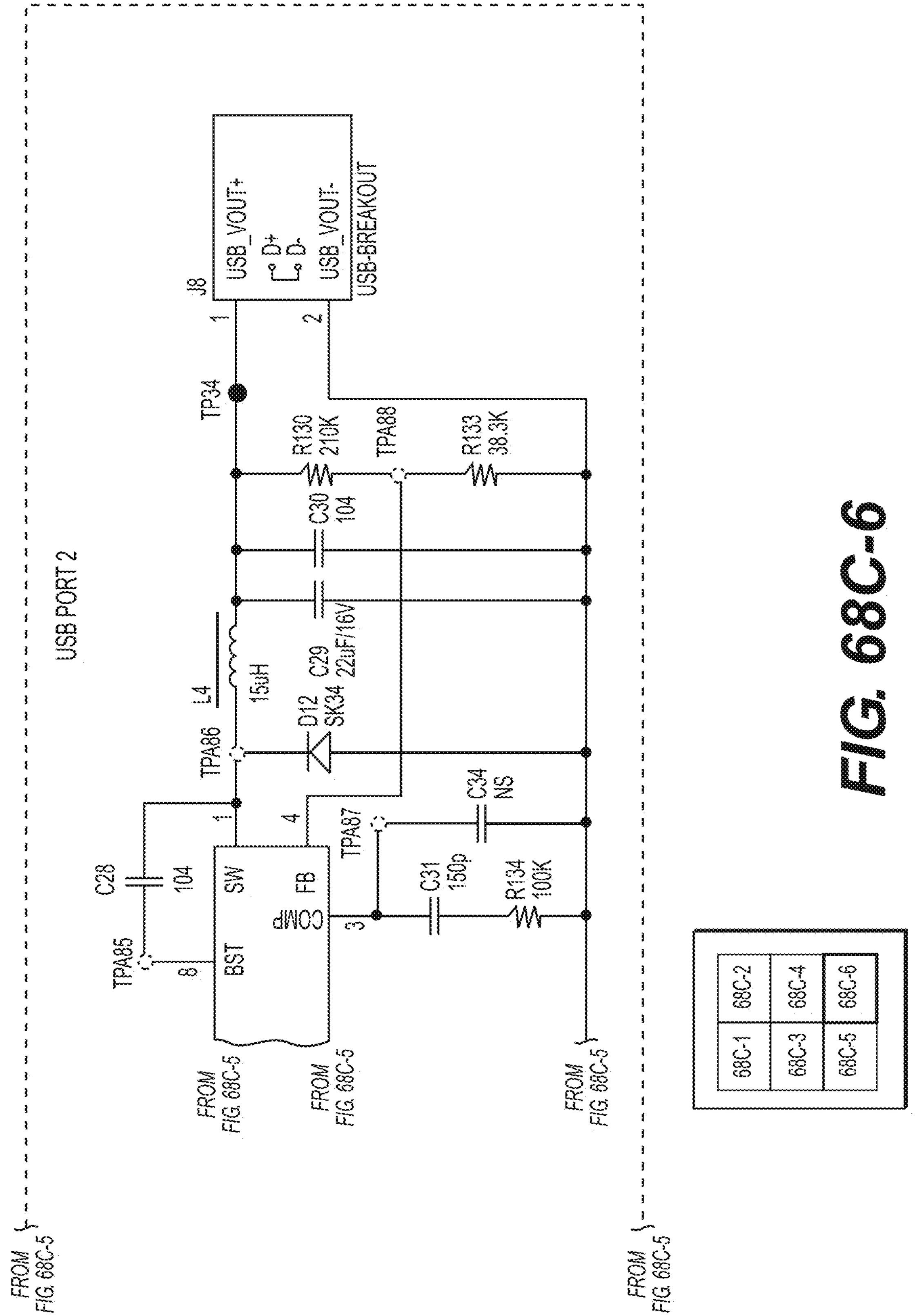
Figures 1, 68D:
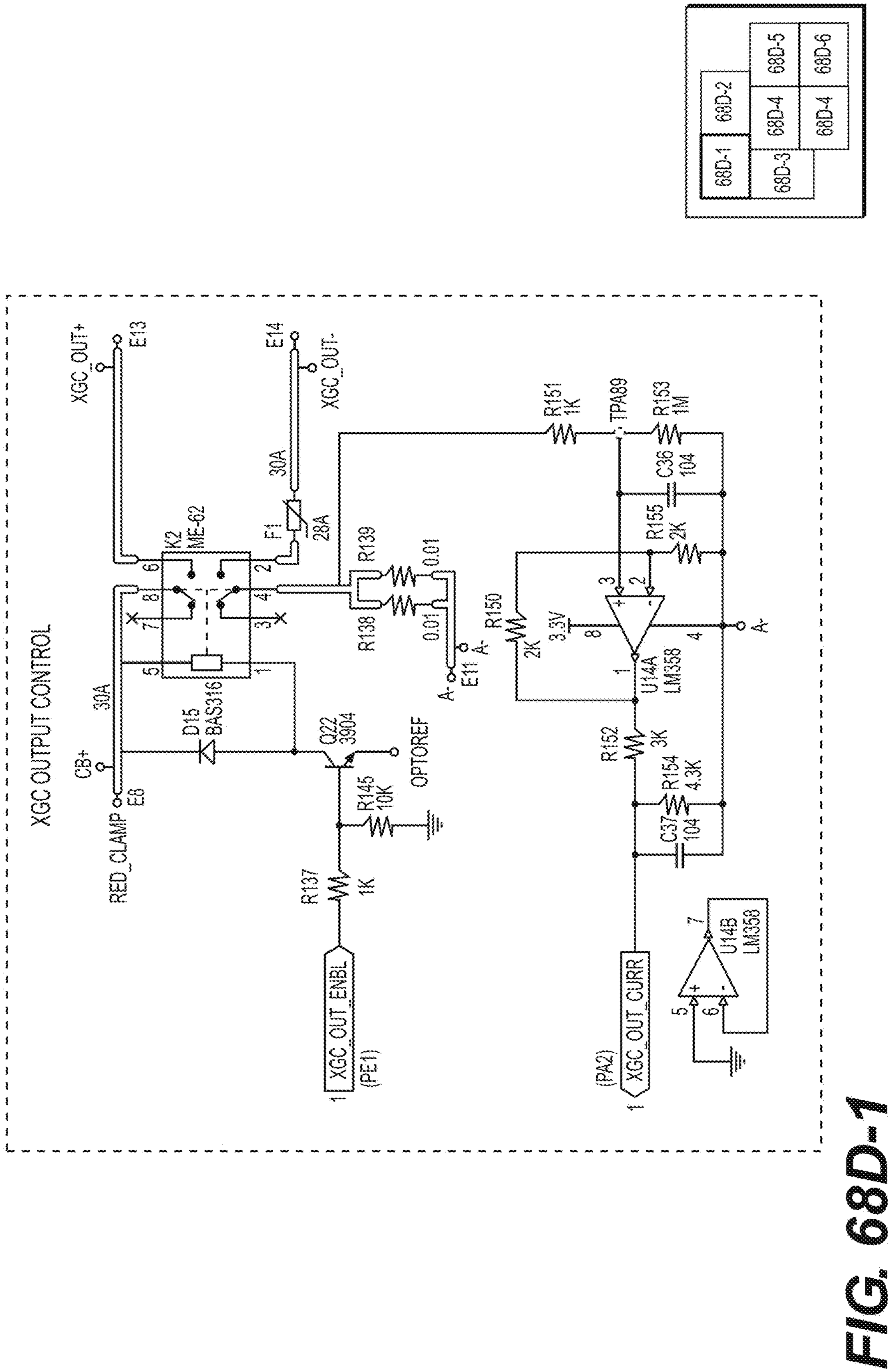
Figure 68D:
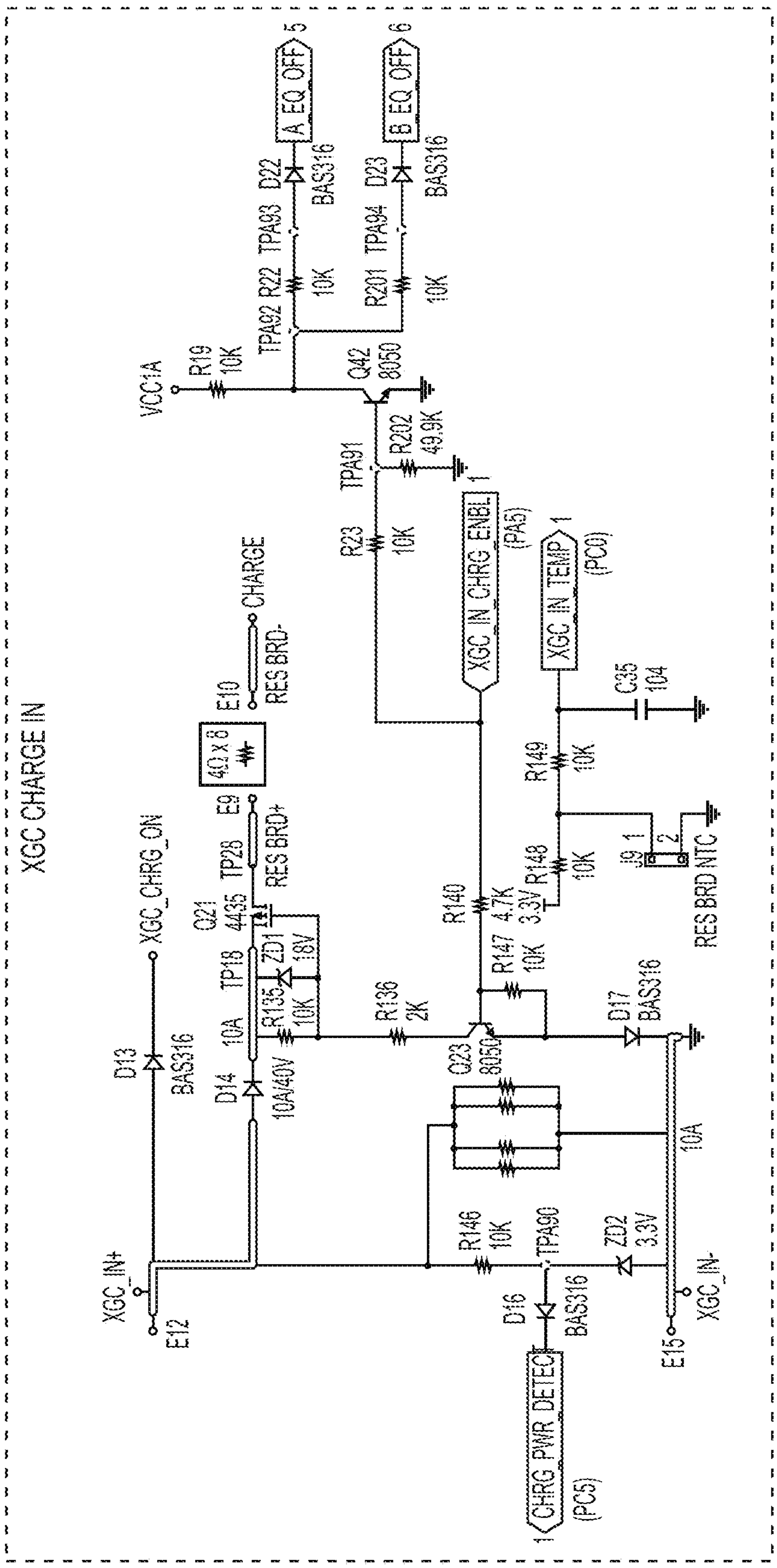
Figure 2:
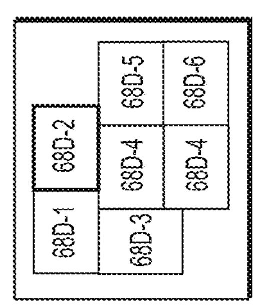
Figures 3, 68D:
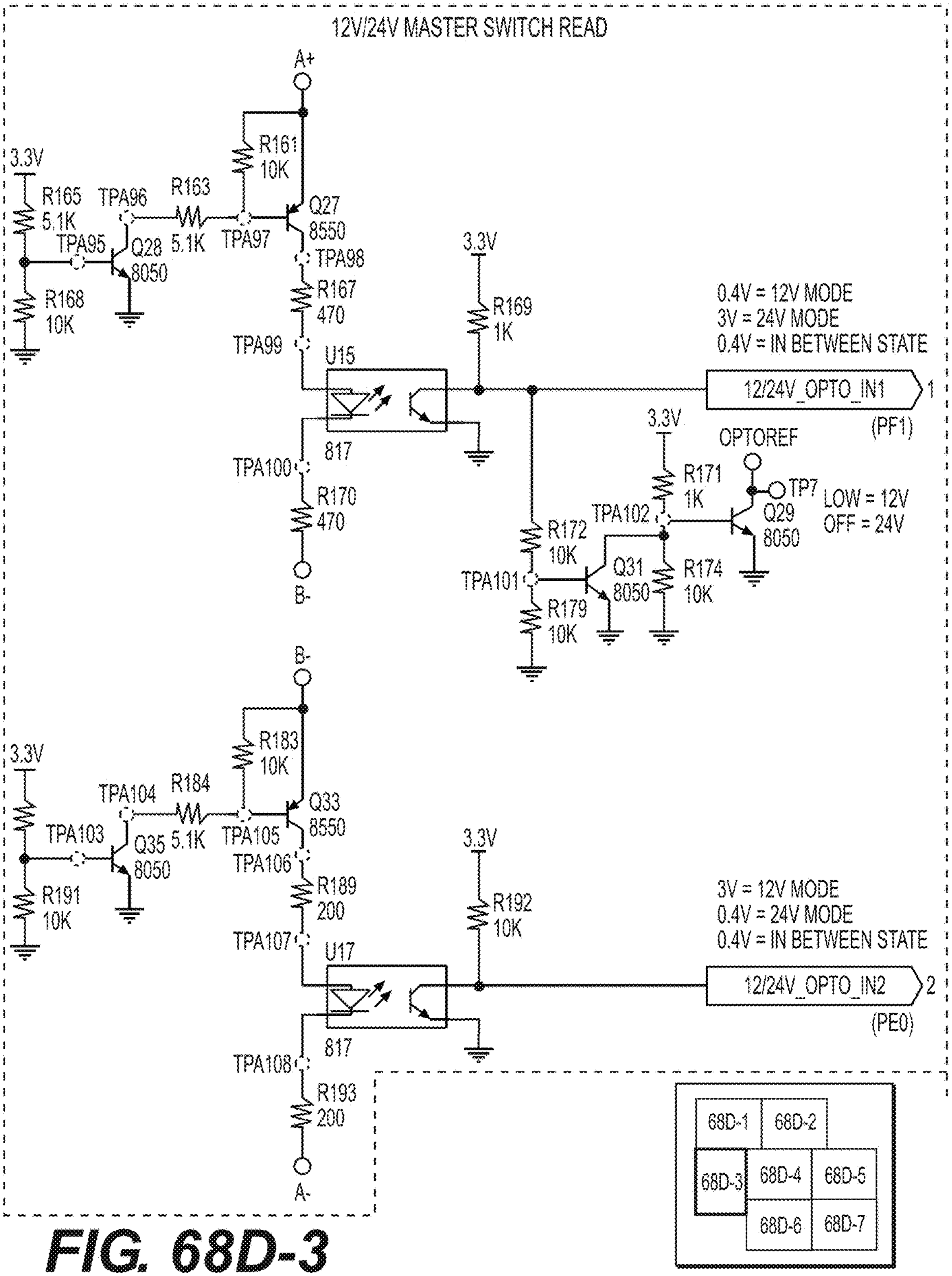
Figure 68D:
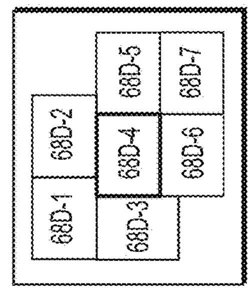
Figure 4:
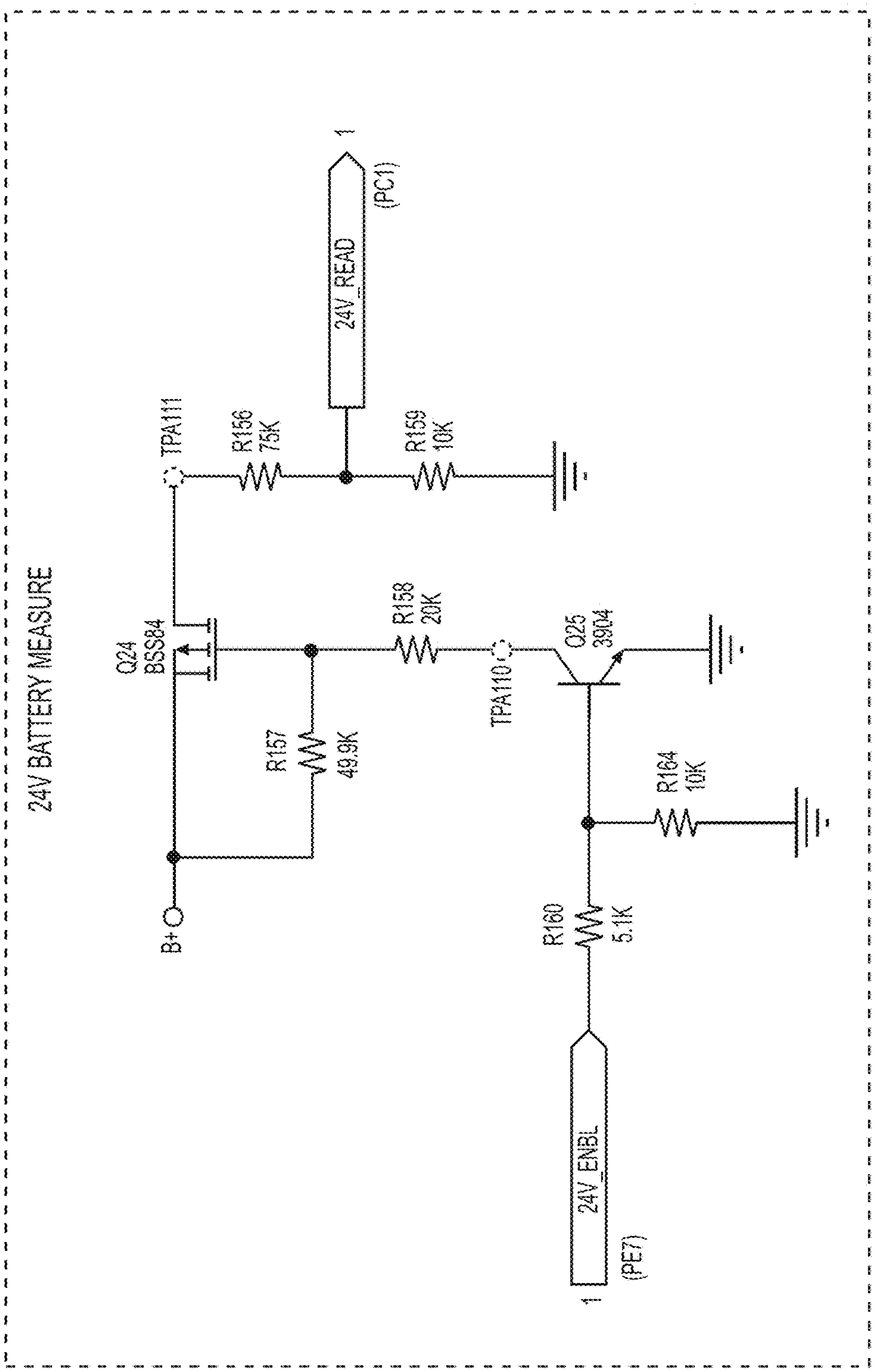
Figure 68D:
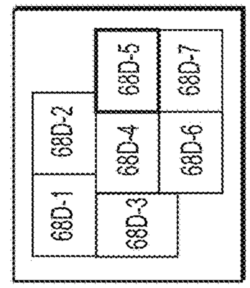
Figure 5:
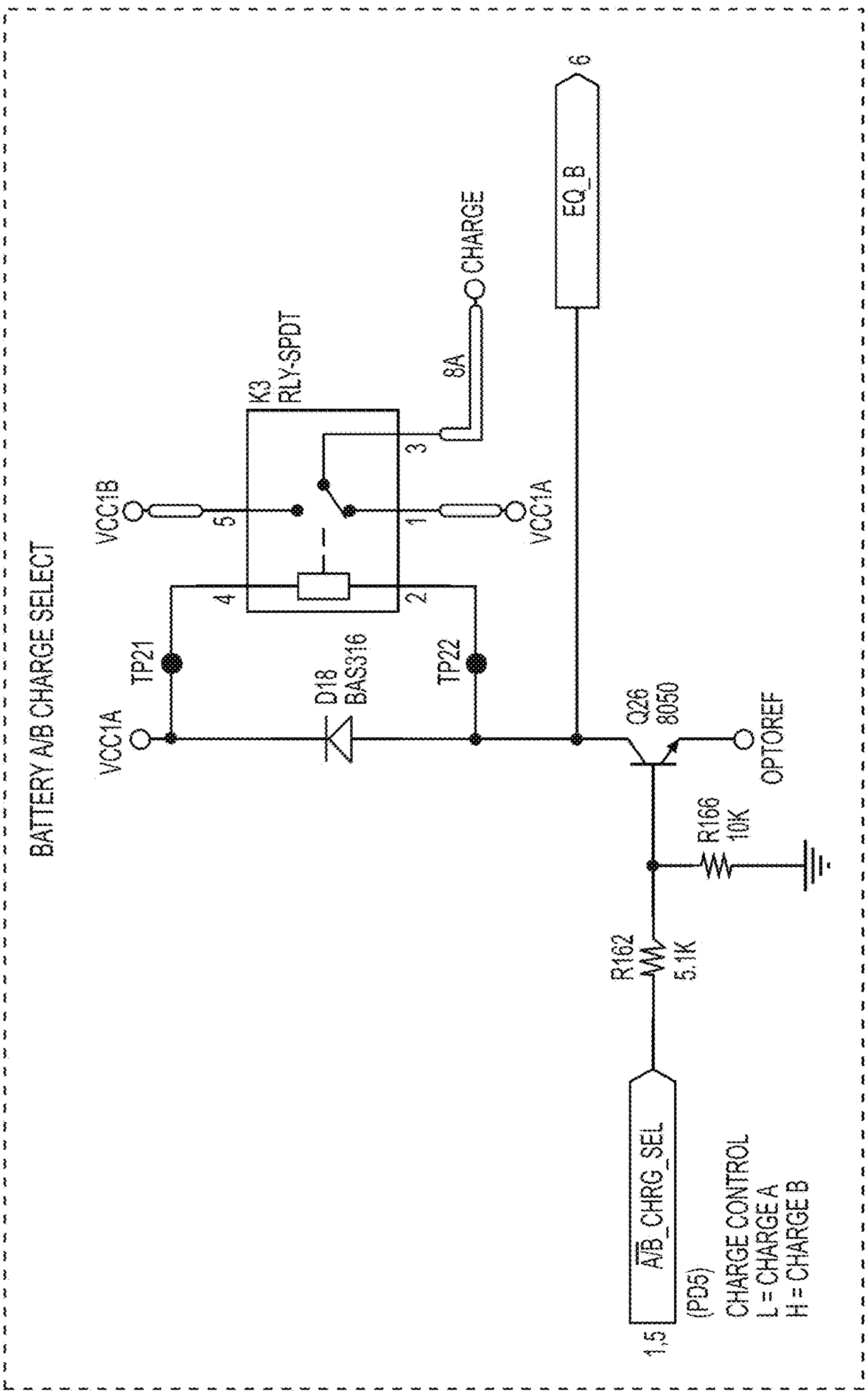
Figure 68D:
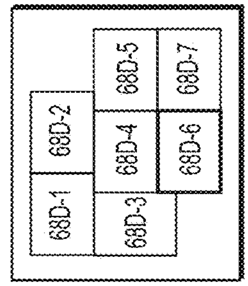
Figure 6:
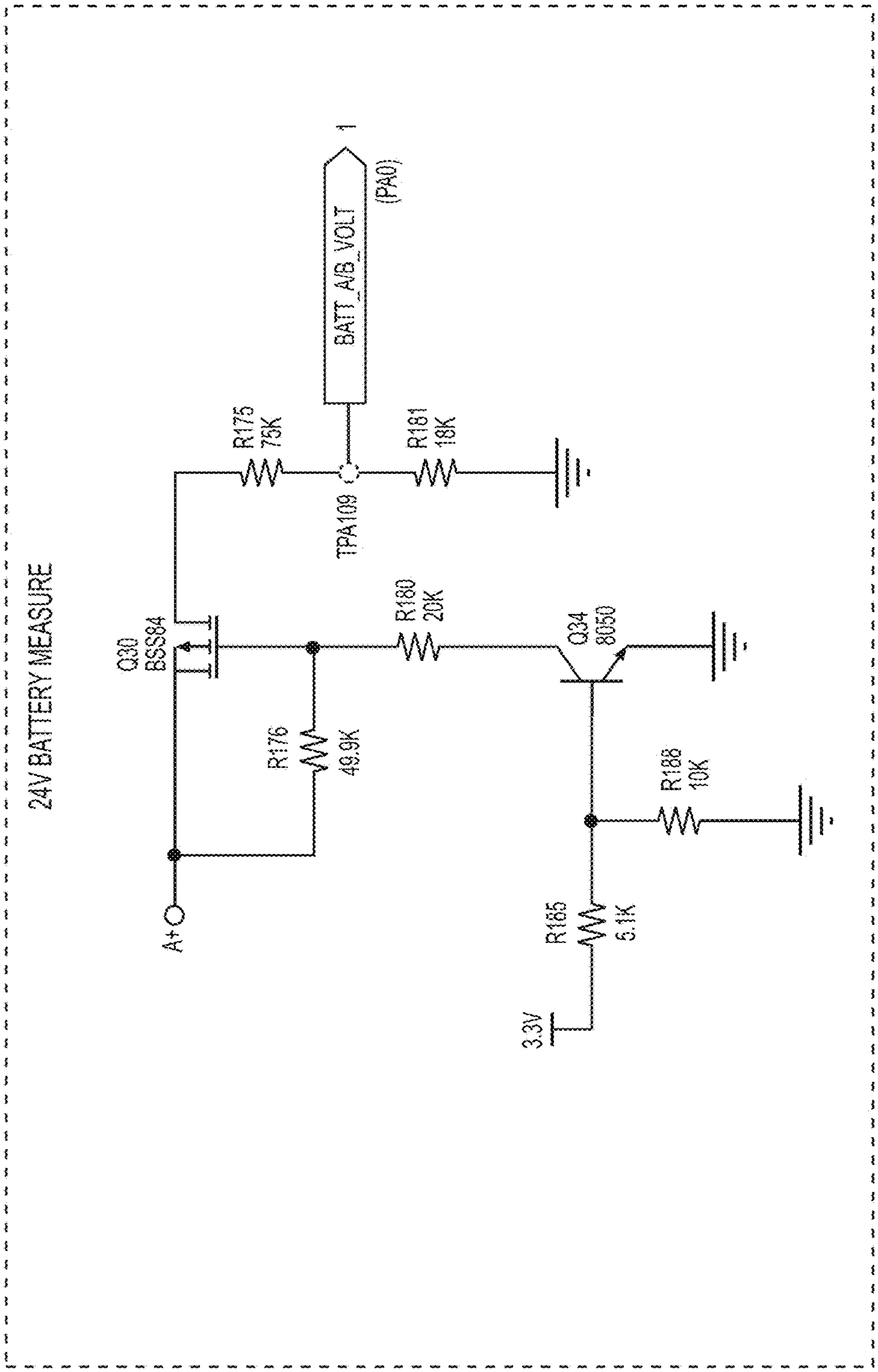
Figures 7, 68D:
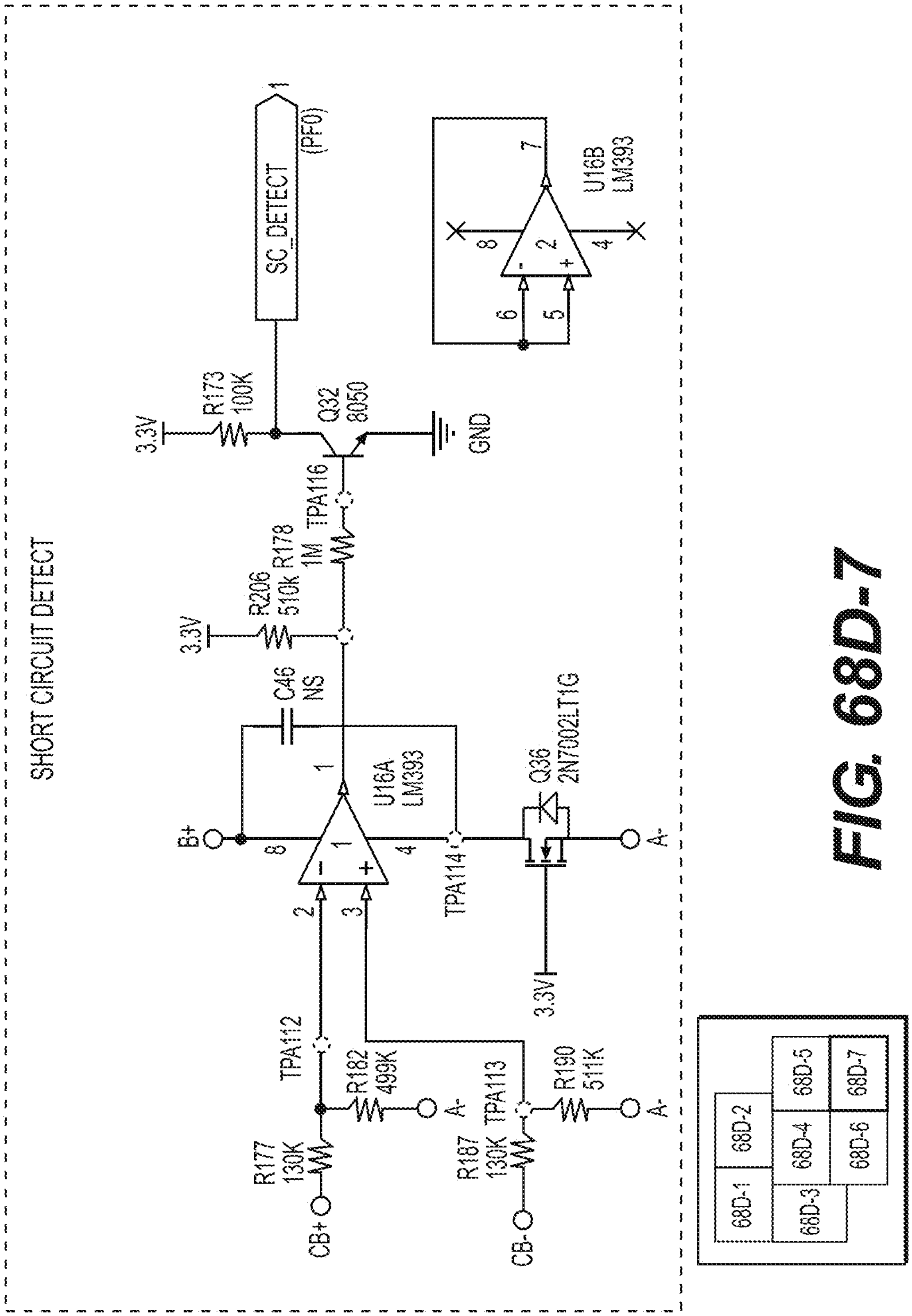
Figures 2, 68E:
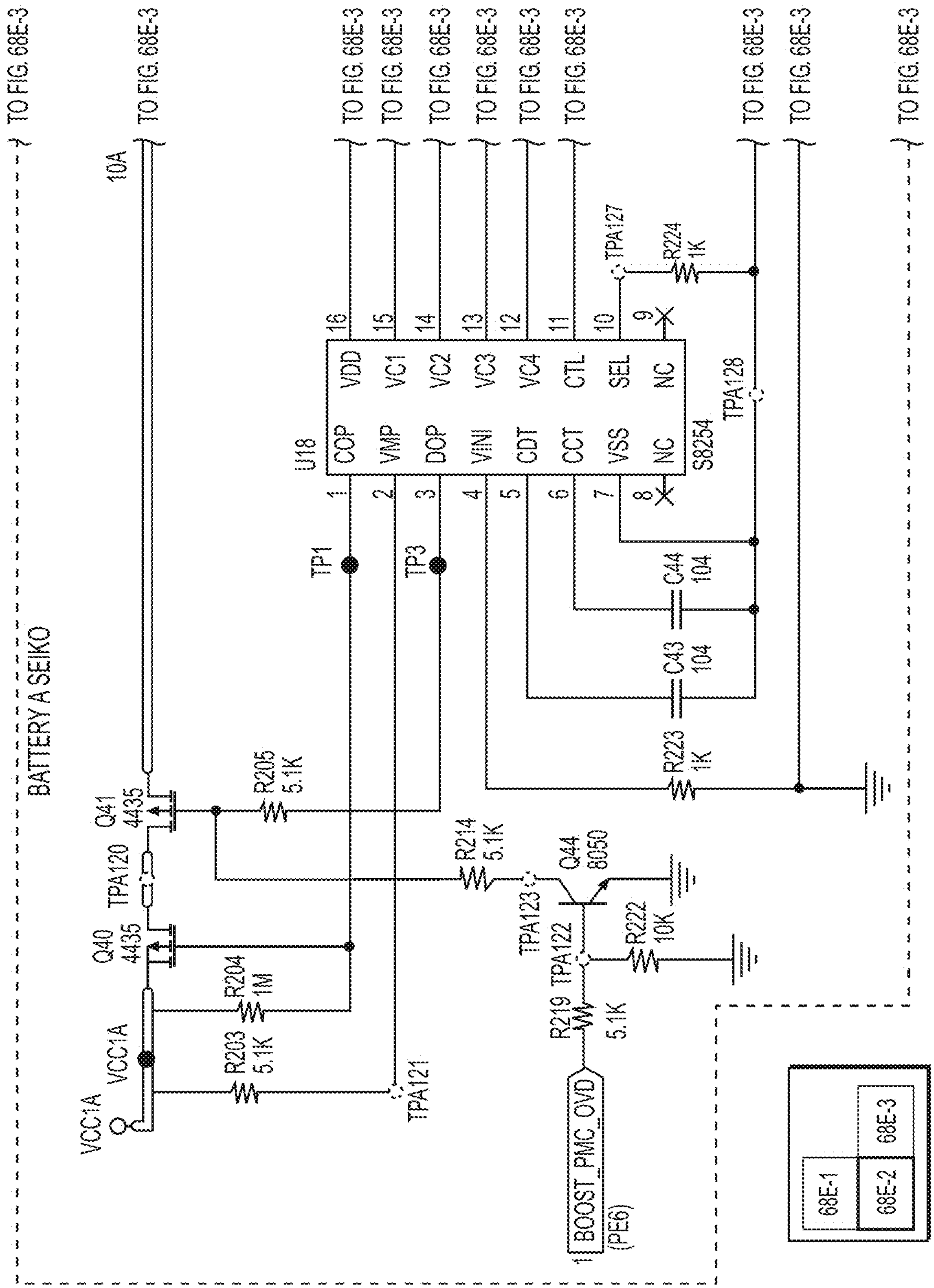
Figures 3, 68E:
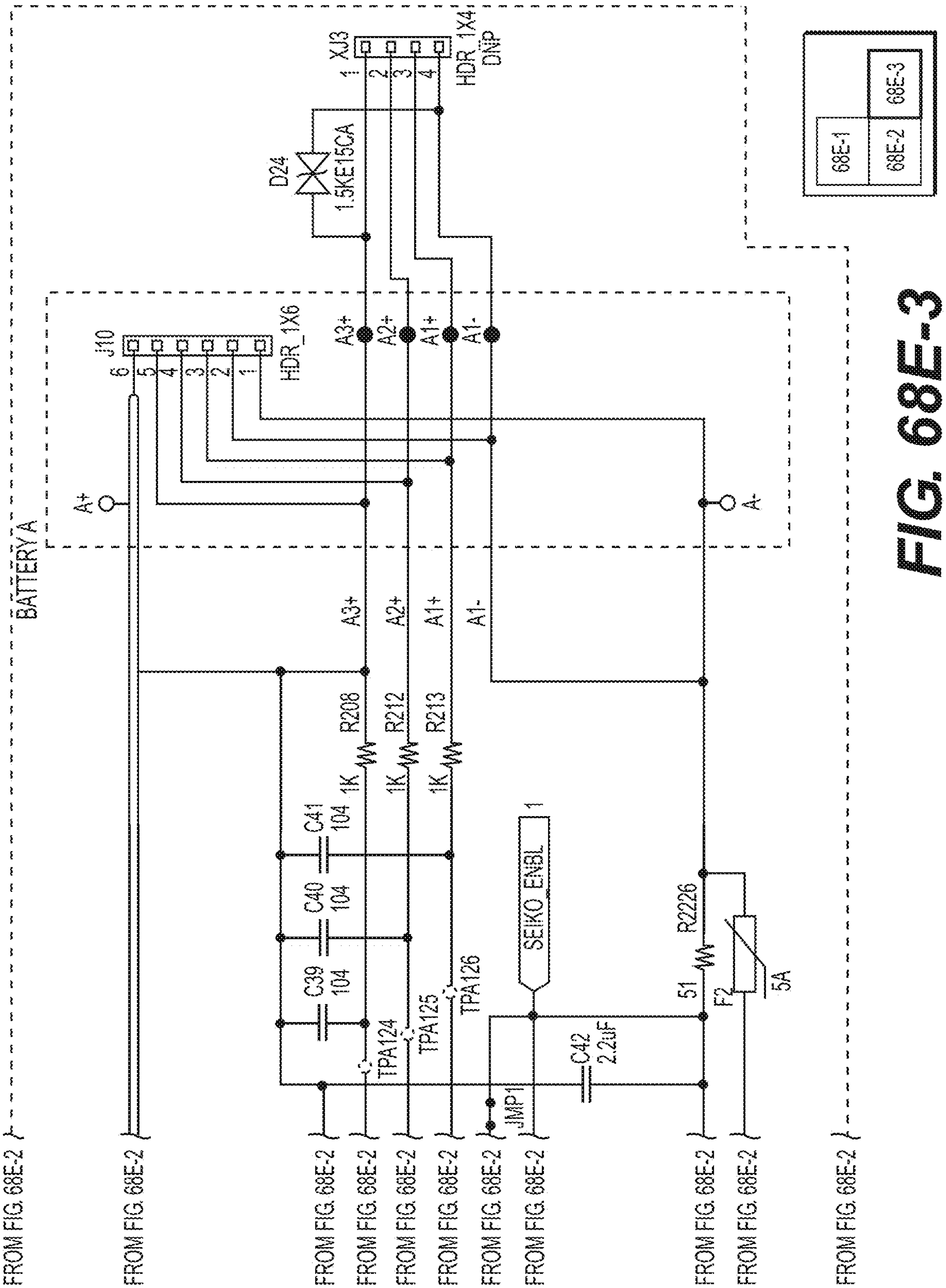
Figures 2, 68F:
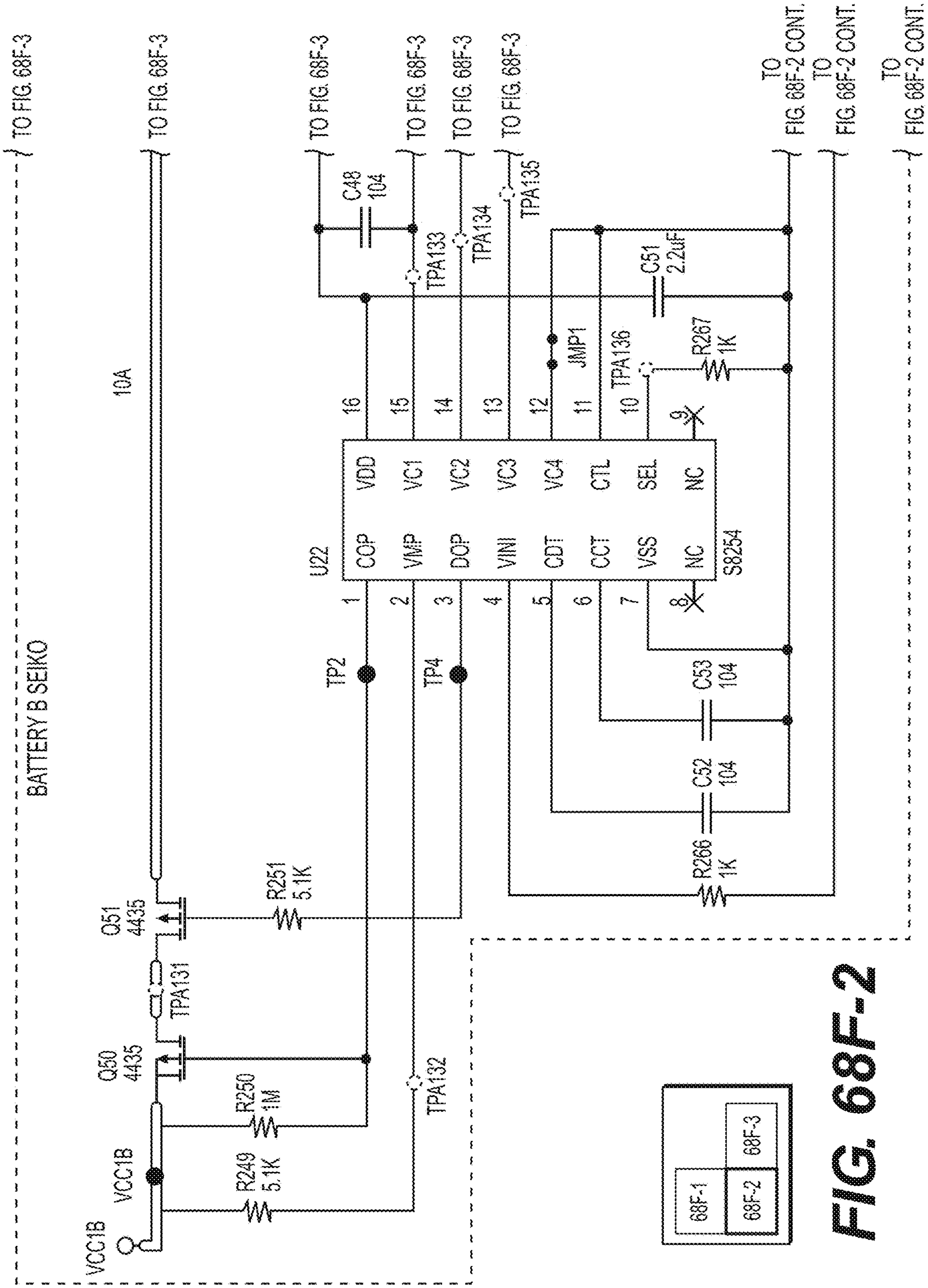
Figures 3, 68F:
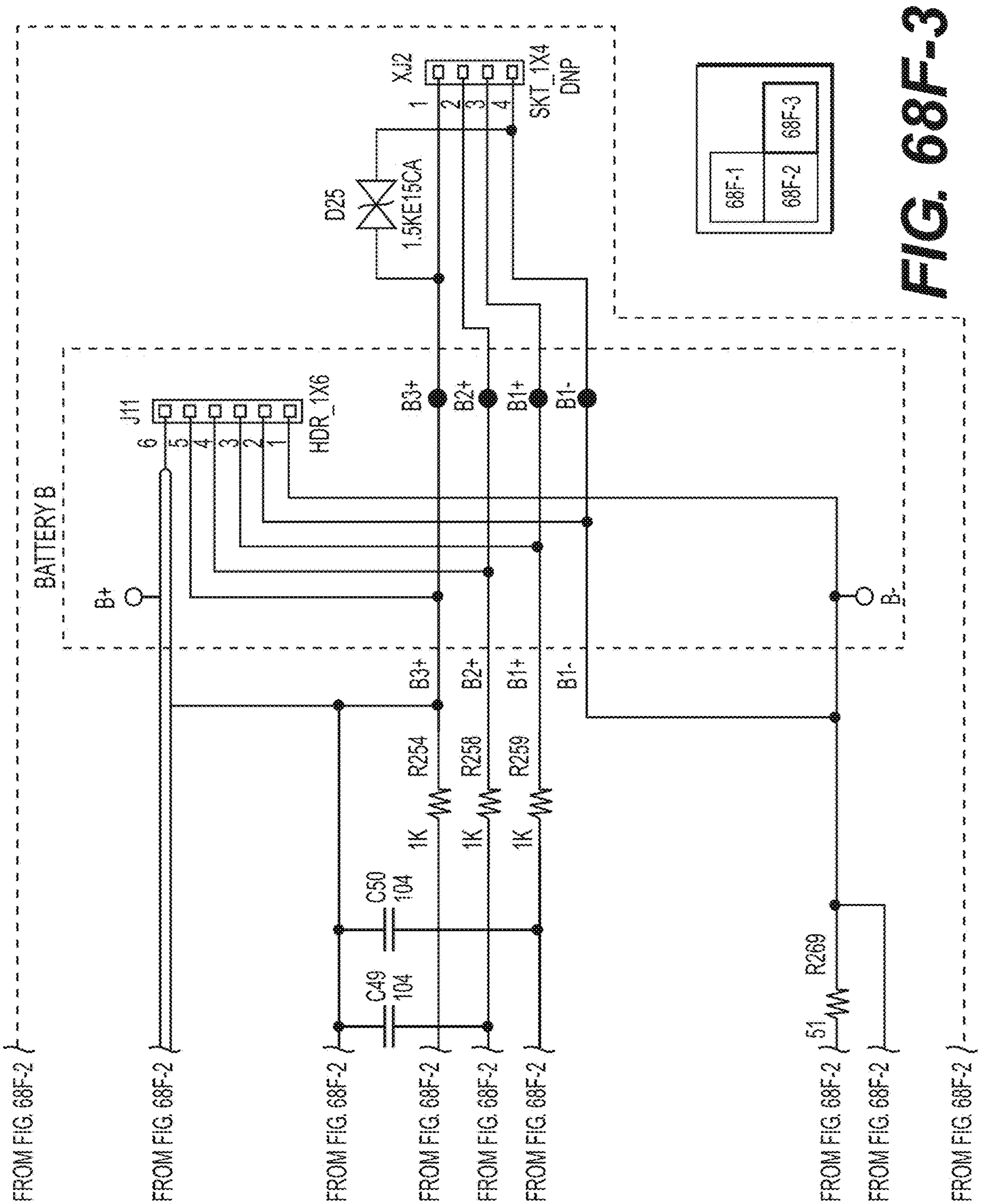

FIG. 67 is a functional block diagram of a rechargeable battery jump starting device according to one aspect of the invention. The rechargeable battery jump starting device includes two (2) lithium polymer battery packs 632 (PACK A and PACK B), which store sufficient energy to jump start a vehicle engine served by one or two conventional 12 volt lead-acid or valve regulated lead-acid battery(ies). A battery management system 333 (BAY A) is connected to one battery pack 632 and a battery management system 333 (BAY B) is connected to the other battery pack 632. In one example embodiment, the high-surge lithium polymer battery packs 632 include three 3.7V, 2666 mAh lithium polymer batteries in a 351P configuration. The resulting battery packs 632 each provide 11.1V, 2666 Ah (8000 Ah at 3.7V, 29.6 Wh). The continuous discharge current for each battery pack 632 is 25 C (or 200 amps), and burst discharge current is 50 C (or 400 amps). The maximum charging current of each battery pack 632 is 8000 mA (8 amps).

A programmable microcontroller unit (MCU) 601 receives various inputs and produces informational as well as control outputs. The programmable MCU 601 further provides flexibility to the system by allowing updates in functionality and system parameters, without requiring any change in hardware. According to one example embodiment, an 8 bit microcontroller with 2K×15 bits of flash memory is used to control the system. One such microcontroller is the HT67F30, which is commercially available from Holtek Semiconductor Inc.

A vehicle battery reverse sensor 610 monitors the polarity of the vehicle battery 672 when the rechargeable battery jump starting device is connected to the vehicle's electric system (e.g. vehicle battery 672). As explained below, the rechargeable battery jump starting device prevents the lithium battery packs 632 from being connected to the vehicle electric system (e.g. vehicle battery 672), for example, when the terminals of the vehicle battery 672 are connected to the wrong terminals of the rechargeable battery jump starting device. A vehicle battery isolation sensor 612 detects whether or not a vehicle battery 672 is connected to the rechargeable battery jump starting device, and prevents the lithium battery packs 672 from being connected to the output terminals (e.g. battery clamps) of the rechargeable battery jump starting device unless there is a good (e.g. chargeable) battery connected to the output terminals. A vehicle battery voltmeter 673 measures the voltage of the vehicle battery 672 and provides an input signal to the microcontroller unit 601.

A smart switch FET circuit 615 electrically switches the lithium battery packs 632 to connect to the vehicle battery only when the vehicle battery is determined by the MCU 601 to be present (in response to a detection signal provided by isolation sensor 612) and connected with the correct polarity (in response to a detection signal provided by reverse sensor 610). Lithium battery temperature sensors 620A, 620B each monitor the temperature of each lithium battery pack 632 to detect overheating due to high ambient temperature conditions and overextended current draw during jump starting. Lithium battery voltage measurement circuits 624A, 624B monitor the voltage of the lithium battery packs 632 (PACK A, PACK B) to prevent the voltage potential from rising too high during a charging operation and from dropping too low during a discharge operation. A short circuit detect sensor 625 is provided to detect a short circuit in the power supply from the rechargeable battery jump charging to the vehicle battery.

Lithium battery back-charge protection diodes 628 prevent any charge current being delivered to the vehicle battery 672 from flowing back to the lithium battery packs 632 of the rechargeable battery jump starting device from the vehicle's electrical system. A flashlight LED circuit 636 connected to a flashlight/USB power control 637 is provided to furnish a flashlight function for enhancing light under a vehicle's hood in dark conditions, as well as providing SOS and strobe lighting functions for safety purposes when a vehicle may be disabled in a potentially dangerous location. Voltage regulator 642 provides regulation of internal operating voltage for the microcontroller unit 601 and sensors. On/Off manual mode and flashlight switches 646 allow the user to control power-on for the rechargeable battery jump starting device, to control manual override operation if the vehicle has no battery, and to control the flashlight function. The manual button functions only when the rechargeable battery jump starting device is powered on. This button allows the user to jump-start vehicles that have either a missing battery, or the battery voltage is so low that automatic detection by the microcontroller unit 601 is not possible. When the user presses and holds the manual override button for a predetermined period time (such as three seconds) to prevent inadvertent actuation of the manual mode, the internal lithium ion battery power is switched to the vehicle battery connect port or battery clamps. The only exception to the manual override is if the vehicle battery provided by the lithium battery packs 632 is connected to the rechargeable battery jump starting device in reverse. If the vehicle battery is connected in reverse, the internal lithium battery power provided by the lithium battery packs 632 shall never be switched to provide power to the vehicle battery connect port or battery clamps.

The XGC charge circuit 652A converts power from any XGC charger power source, to provide charge voltage and current for charging the lithium battery packs 632 (PACK A, PACK B). The XGC out circuit 652B can connect the microcontroller unit 601 to an external device. The USB output 656 connected to the flashlight/USB power control 637 provides a USB portable charger for charging smartphones, tablets, and other rechargeable electronic devices.

The operation indicator LEDs 660 provide visual indication of lithium battery capacity status as well as an indication of smart switch activation status (i.e. indicating that power is being provided to the vehicle's electrical system or vehicle battery).

The 12V/24V master switch 618 connects to a 12V/24V master switch read list 619 providing input to the microcontroller unit 601.

Electrical Optical Position Sensing Switch System

Figure 51:
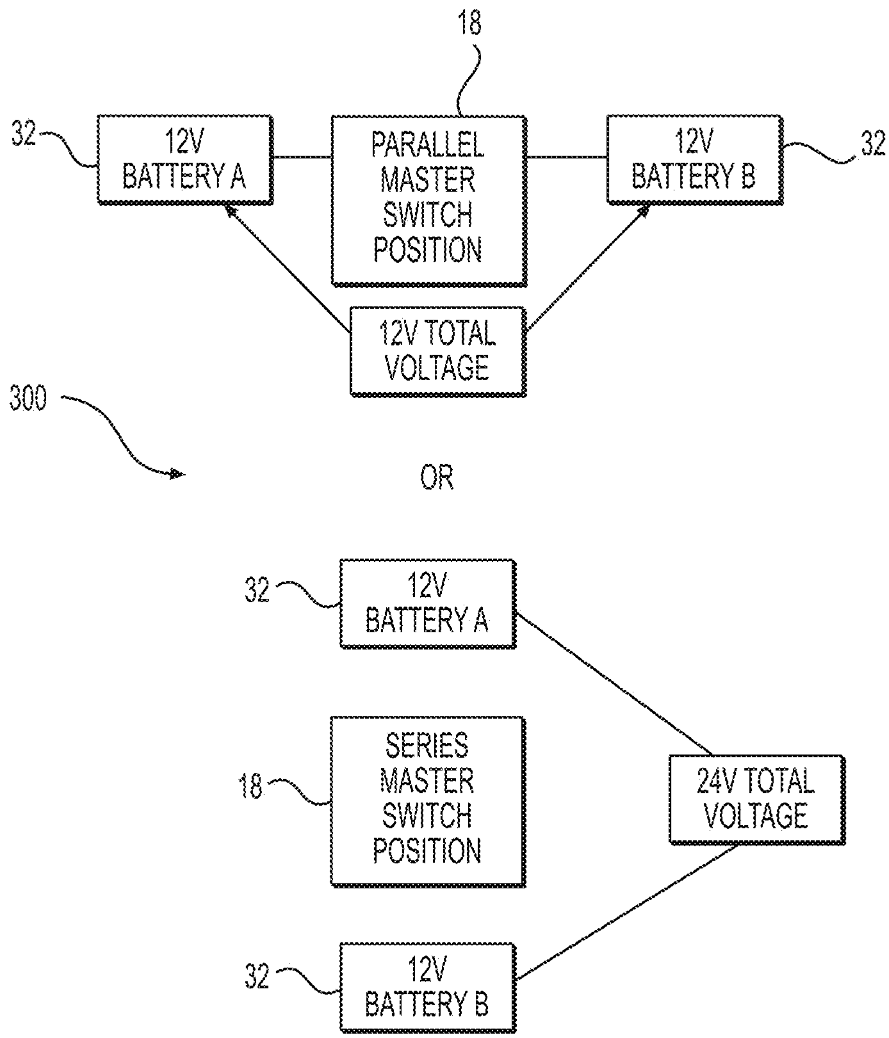
FIG. 51 is a block diagram showing the 12V or 24V jump starting operational modes.

The portable jump starting device 10 can be configured as a dual purpose rechargeable battery jump starting device to allow for jump starting either a 12V or 24V vehicle or equipment (e.g. heavy duty 24V vehicle or equipment). The lightweight portable rechargeable battery jump starting device utilizes the manual rotary control switch 18 with the control knob 18*a* for switching between 12V or 24V jump starting or operational modes. Any of the above described rechargeable battery jump starting devices according to the present invention can be provided with the electrical optical position sensing system 300, as shown in FIGS. 51-53.

The rechargeable battery jump starting device 10 uses two rechargeable 12V Li-ion batteries 32 that are connected in parallel for 12V jumpstarting and in series for 24V jump starting. The series or parallel connections are accomplished with the rotary control switch 18 shown in FIGS. 1 and 12-15, and indicated as the 12V/24V rotary control switch 618 ("master switch") in the functional block diagram shown in FIG. 51.

Figure 52:
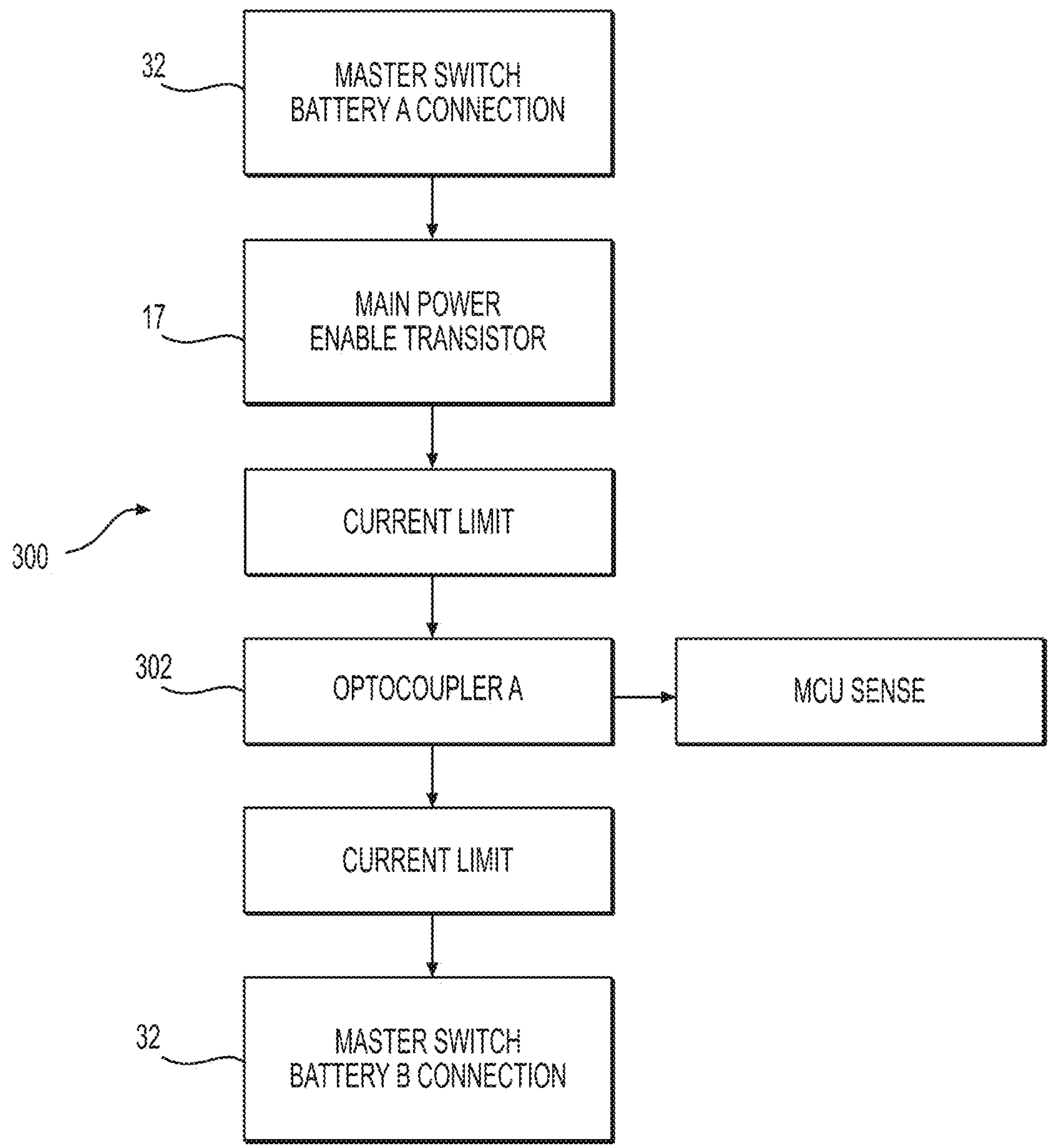
FIG. 52 is a block diagram showing the electrical optical position sensing system according to the present invention.
Figure 53:
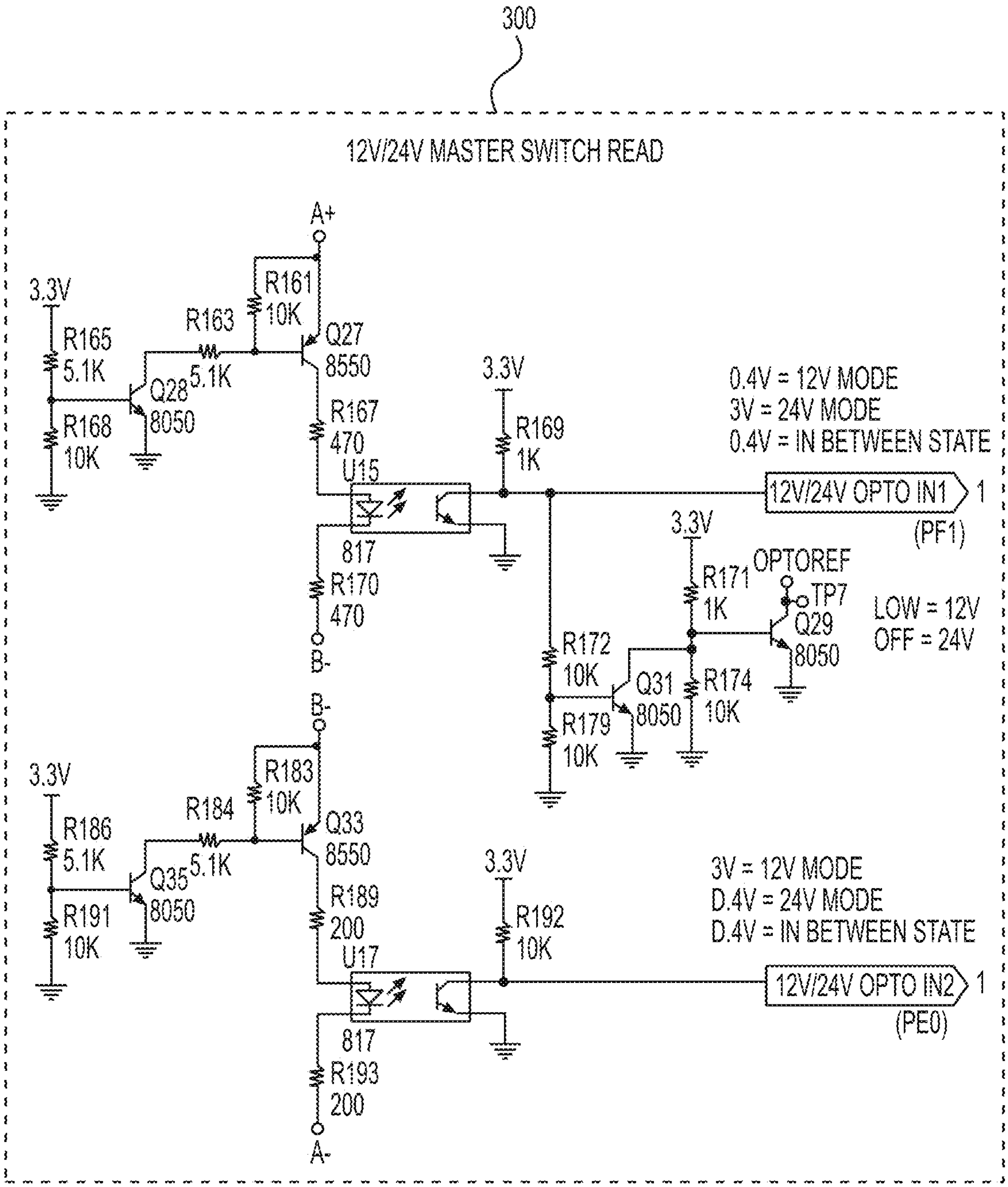
FIG. 53 is an electrical schematic diagram of the 12V/24V master switch read.

The electrical optical position sensing system 300 is shown in FIG. 52 (e.g. 12V/24V master switch read 619 shown in FIG. 67).

The optical position sensing system 300 is configured to allow for a safe and effective method for the system microcontroller unit (e.g. microcontroller unit 601 shown in FIG. 67) to read the position of the control switch 18. The optical position sensing system 300 comprises a sensor 302 (FIG. 52) using optical coupling to insure the integrity of isolation on the 12V to 24V rotary control switch 18.

A schematic of the circuit of the optical position sensing system 300 is shown in FIG. 53. The upper portion of the schematic includes transistor Q28 and resistors R165, R168, R161, and R163. This circuit acts as an electrical enable when the main system 3.3V power is turned "on." The purpose of this enable is to reduce parasite current when the portable jump starting device 10 is in the "off" state. When "on", this enables current from battery A+ to flow through Q27, which acts as an electrical switch.

If Q27 is "on", it allows current to flow from Battery A+ to Battery B− when the batteries are connected in parallel. When they are connected in series, no current flows because A+ and B− are connected together through the control switch 18.

The result of current flow or lack thereof, allows the optical coupler to provide a signal to the microcontroller unit telling it which position the master switch is in.

The lower portion of the schematic (i.e. schematic located just below the first schematic), allows the opposite signal to be provided to a separate input of the microcontroller. The result of this is to provide the microcontroller an effective method of determining when the switch is "In Between" meaning it is not in 12V position or 24V position and is in between those two positions. This allows the microcontroller to provide diagnostics in case a user leaves the switch in an unusable position.

Dual Battery Diode Bridge System

Figure 54:
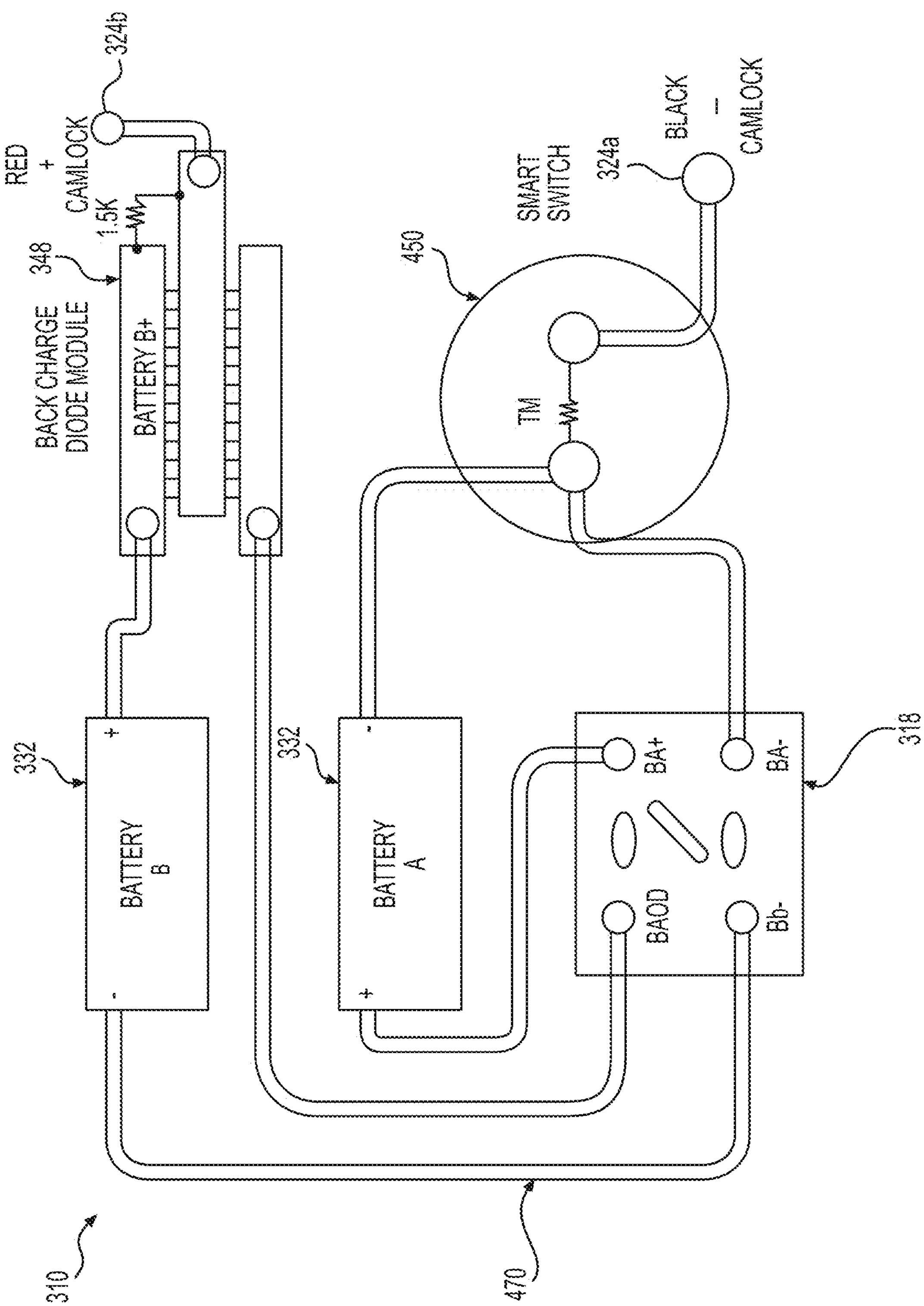
FIG. 54 is a diagrammatic view showing a single connection or dual connection arrangement of the battery jump starting device shown in FIG. 26.

The battery jump starting device, for example battery jump starting device 310 (FIG. 26-31), can be provided with a dual diode battery bridge system. For example, the dual battery bridge system comprises a back-charge diode module 348 configured for protecting against back-charge after a vehicle battery has been jump charged, as shown in FIG. 54. Any of the above described rechargeable battery jump starting devices according to the present invention can be provided with the electrical optical position sensing system 300, as shown in FIGS. 54 and 55.

The dual bridge battery bridge system, for example, includes a back-charge diode array or module 348 configured to provide two (2) channels 348*a*, 348*b* of diodes (FIG. 55) to support the two (2) battery system (e.g. two (2) 12V Li-ion batteries 332 of the rechargeable battery jump starting device 310), which are bridged together to provide peak current output during jump starts.

The single wiring connection and dual wiring connections of the battery jump starting device 310 is shown in FIG. 54. The components are connected together by the highly conductive rigid frame 370. The highly conductive frame members 370*a-h* (FIGS. 56-62) making up the highly conductive rigid frame 370 made of copper are more conductive than 2/0 copper cable. Further, the connection points between the highly conductive frame members 370*a-h* of the highly conductive rigid frame 370 are configured to reduce power losses compared to copper cable. The highly conductive frame members 370*a-h* of the highly conductive rigid frame 370 can be replaced with other highly conductive metals (e.g. aluminum, nickel, plated metal, silver plated metal, gold plated metal, stainless steel, and other suitable highly conductive metal alloys).

Figure 55:
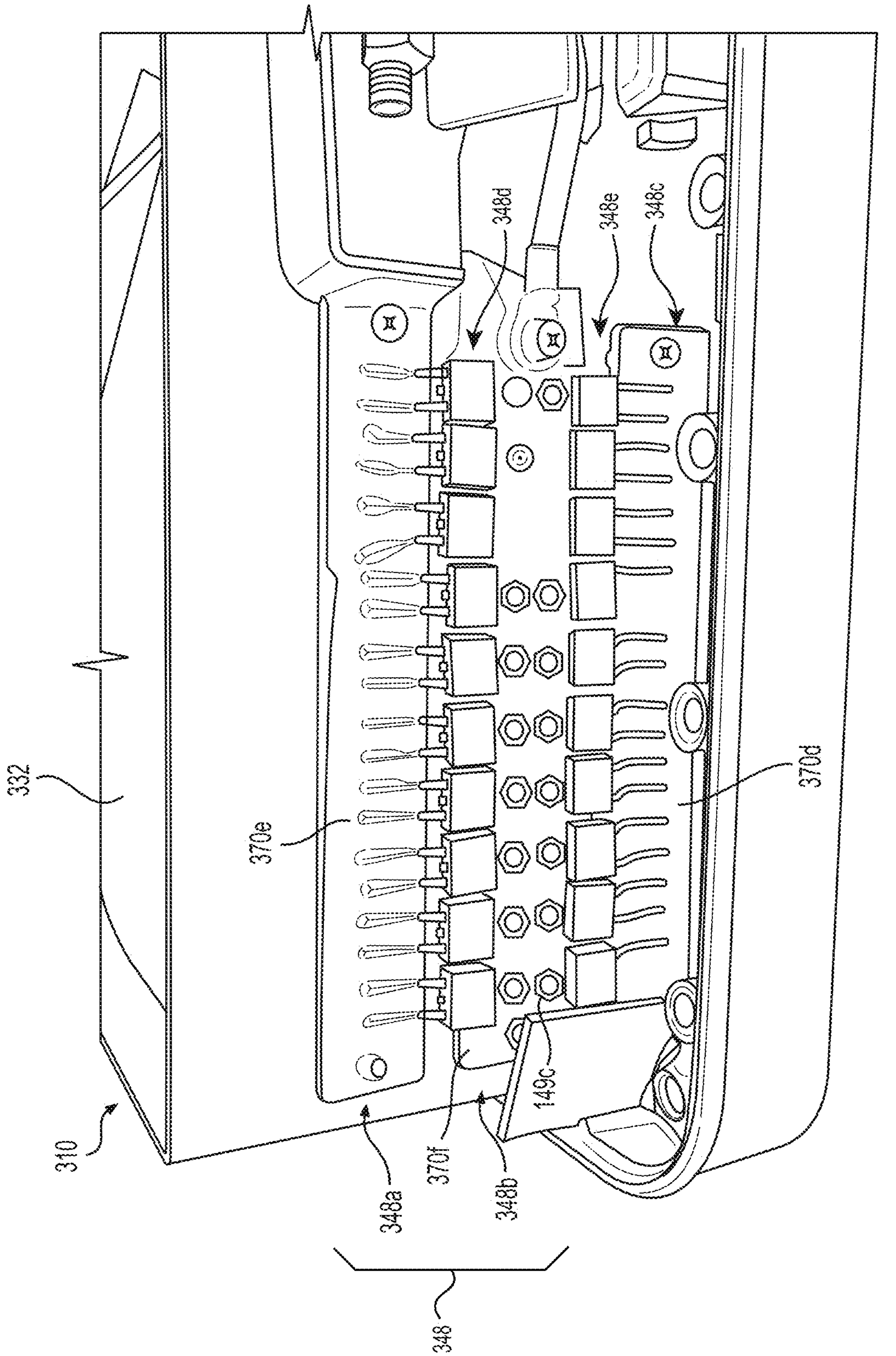
FIG. 55 is a rear elevational view of the battery jump starting device shown in FIG. 26, with the cover removed, showing the dual battery diode bridge according to the present invention.

The dual diode battery bridge in the form of the back-charge diode module 348 is shown in FIG. 55. The upper channel of diodes 348*a* connected to the frame member 370*e* supports current through one 12V battery 332. The lower channel of diodes 348*b* connected to the frame member 370*d* supports current through the second 12V battery 332. The combined current from both 12V batteries 332, 332 through the two (2) diode channels 348*a*, 348*b* exits the back-charge diode module 348 through the copper bar member 370*f* leading to the positive output (i.e. positive cam-lock) of the battery jump starting device 310.

The back-charge diode module 348 comprises the upper highly conductive plate 370*e*, the lower highly conductive plate 370*d*, and the center highly conductive plate 370*f* connected together by the channels of diodes 348*a*, 348*b*.

The rechargeable battery jump starting device 10 (FIG. 1) includes a having the reverse current diode array 48 (i.e. back-charge diode system) configured for protecting against a back-charge to the first 12V battery 32 and/or the second 12V battery 32 after a vehicle battery has been jump charged.

The rechargeable battery jump starting device 10 comprises the first 12V battery 32, the second 12V battery 32; the electrical control switch 18 electrically connected to the first 12V battery 32 and the second 12V battery 32. The electrical control switch 18 has a parallel switch position for connecting the first 12V battery 32 and second 12V battery 32 in parallel. The electrical control switch 18 has a series switch position for connecting the first 12V battery 32 and second 12V battery 32 in series. The reverse current diode array 48 is connected to the first 12V battery 32 and the second 12V battery 32. The reverse current diode array 48 is configured for protecting against a back-charge to the first 12V battery 32 and/or the second 12V battery 32 after a vehicle battery has been jump charged.

The reverse current diode array 48, for example, can be a back-charge diode module. The back-charge diode module can comprise a first channel of diodes accommodating current flow through the first 12V battery 32, and a second channel of diodes accommodating current flow through the second 12V battery 32.

Figure 56:
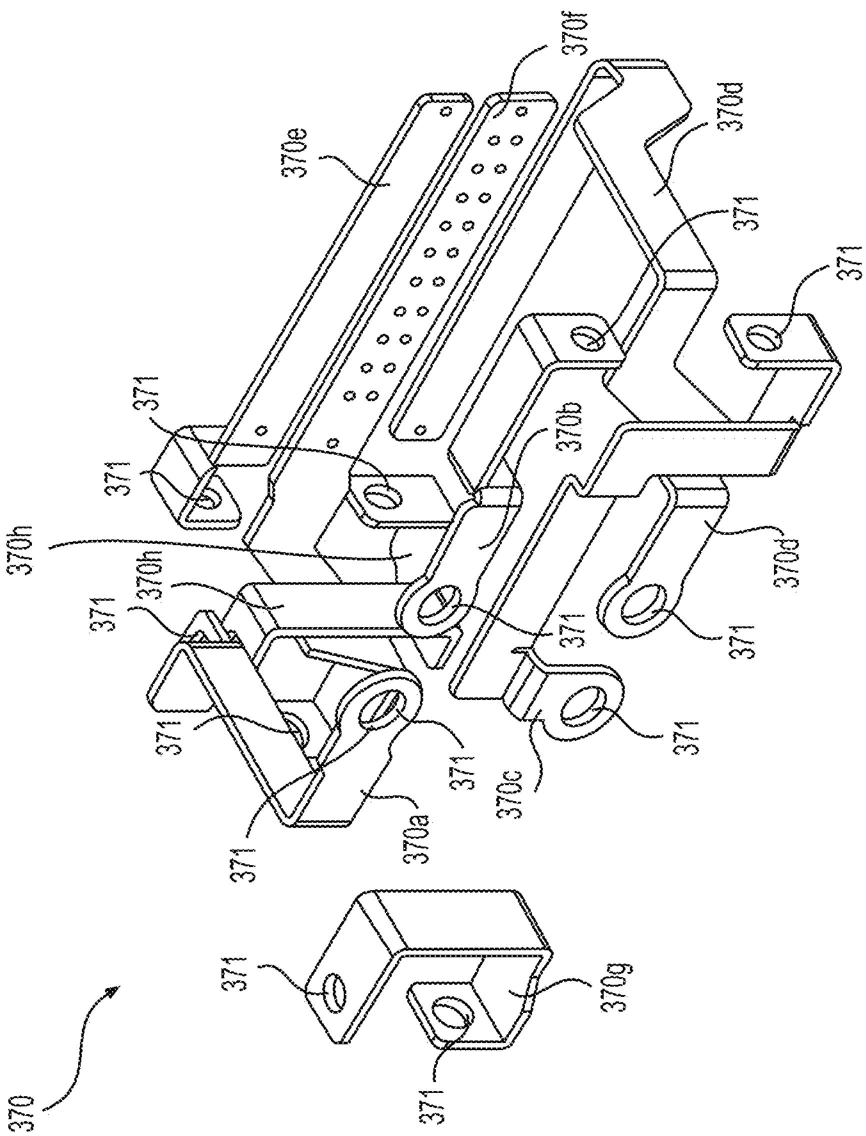
FIG. 56 is a front perspective view of the highly conductive frame according to the present invention used in the battery jump starting device shown in FIG. 26.
Figure 57:
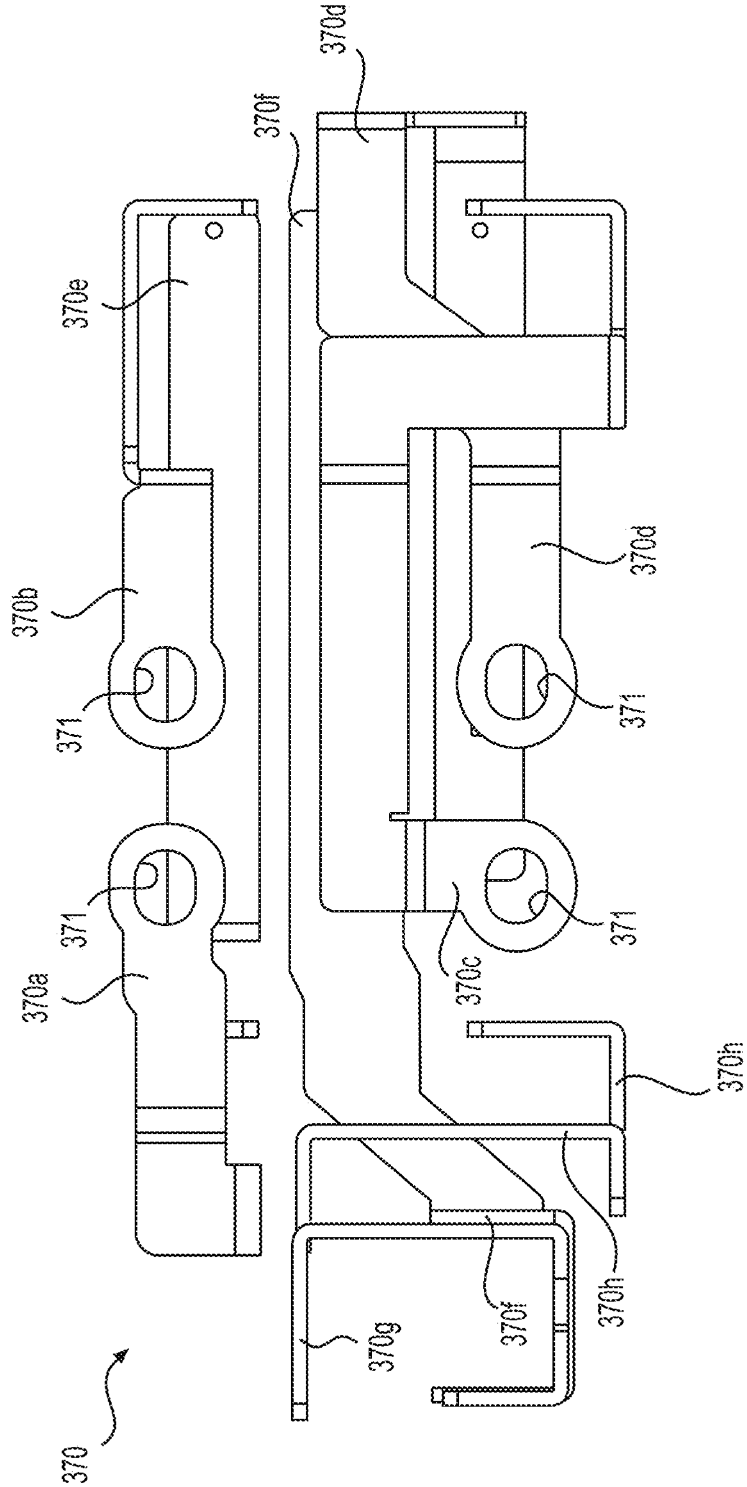
FIG. 57 is a front elevational view of the highly conductive frame shown in FIG. 56.
Figure 58:
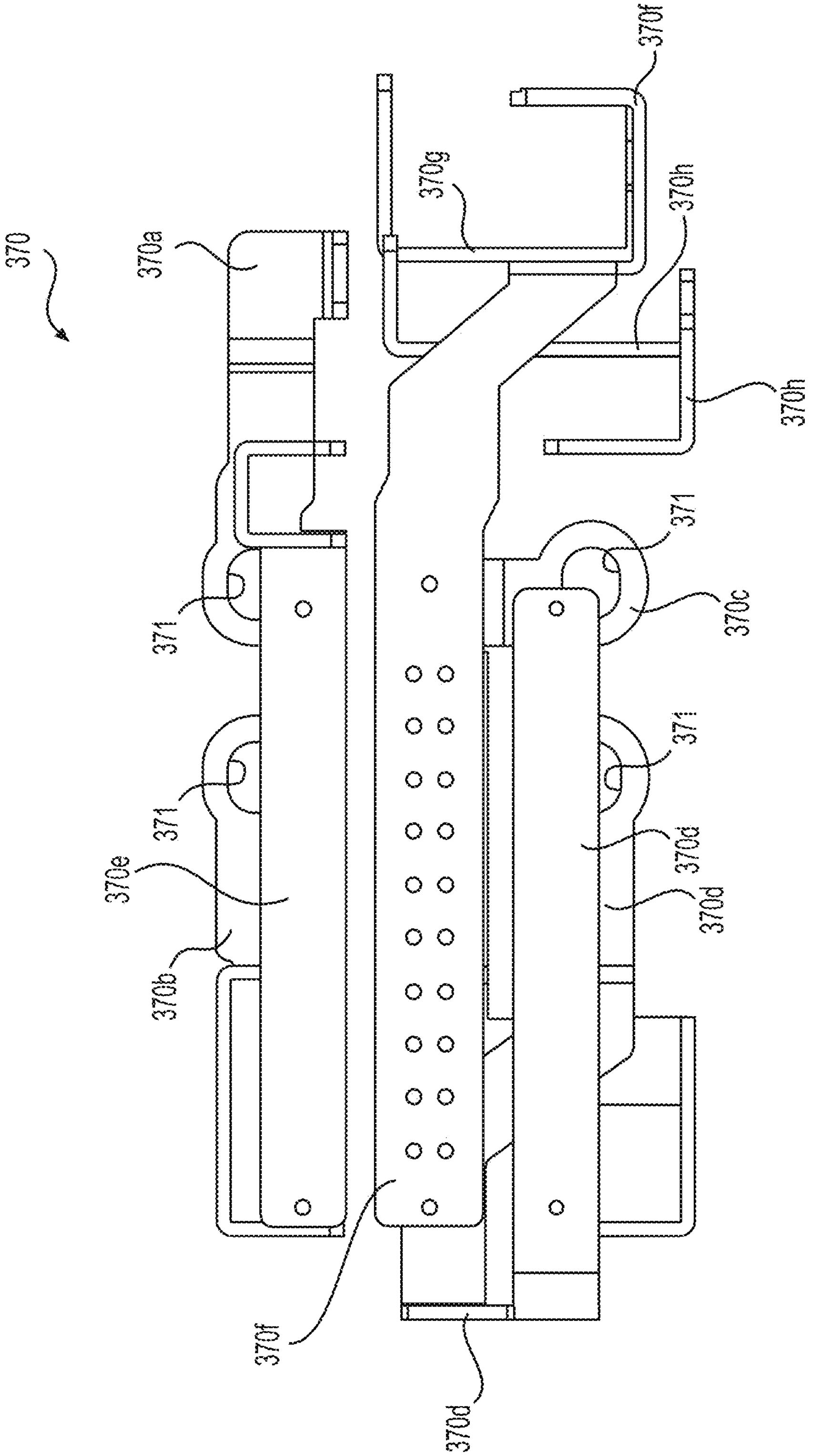
FIG. 58 is a rear elevational view of the highly conductive frame shown in FIG. 56.
Figure 59:
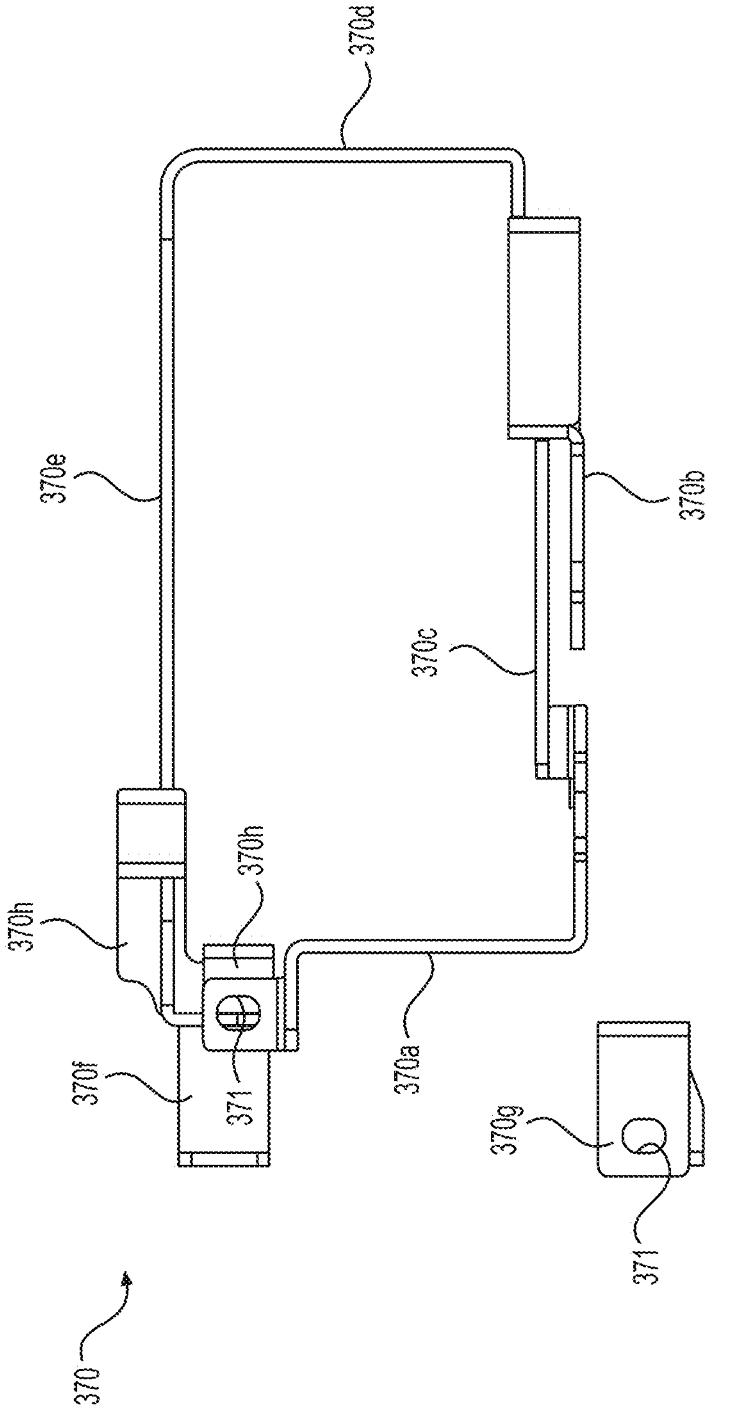
FIG. 59 is a top planar view of the highly conductive frame shown in FIG. 56.
Figure 60:
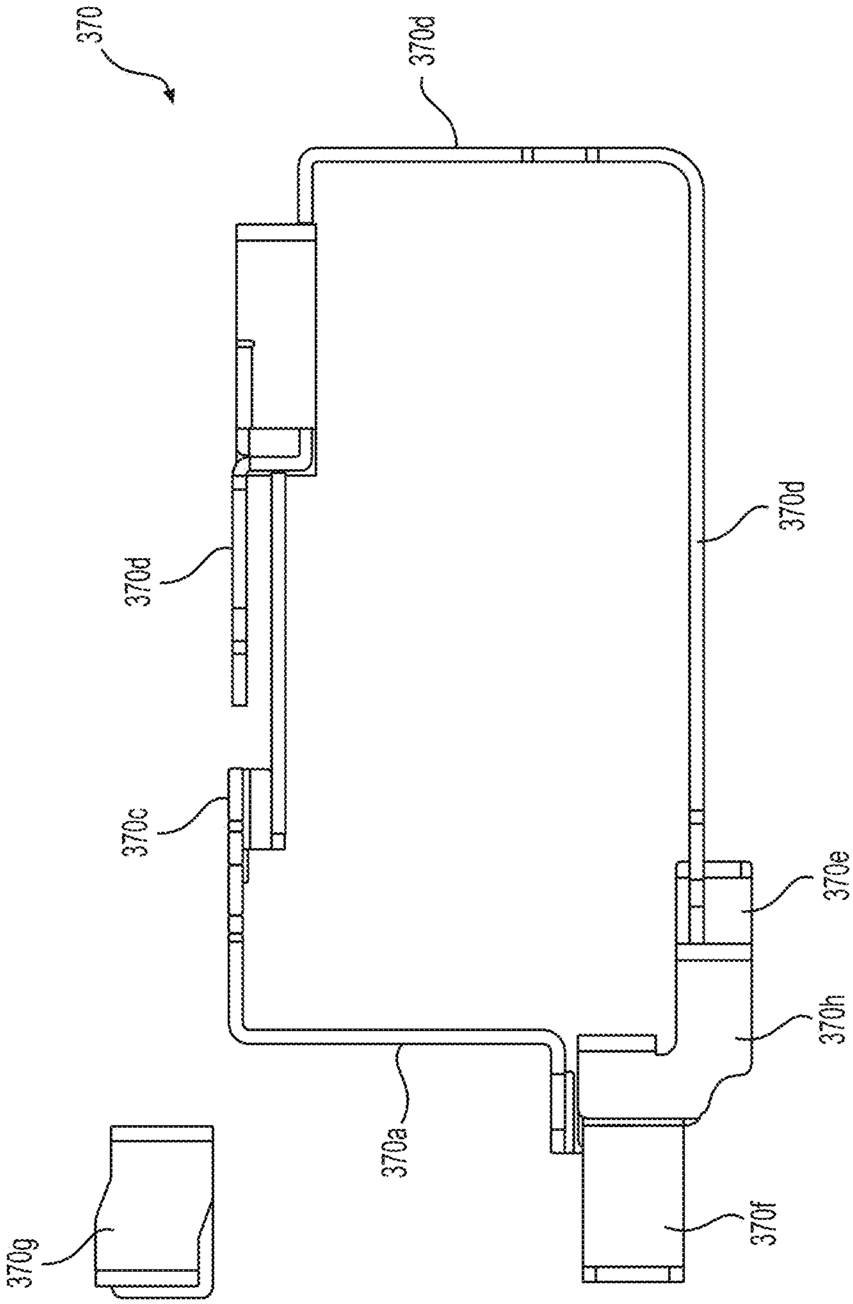
FIG. 60 is a bottom planar view of the highly conductive frame shown in FIG. 56.
Figure 61:
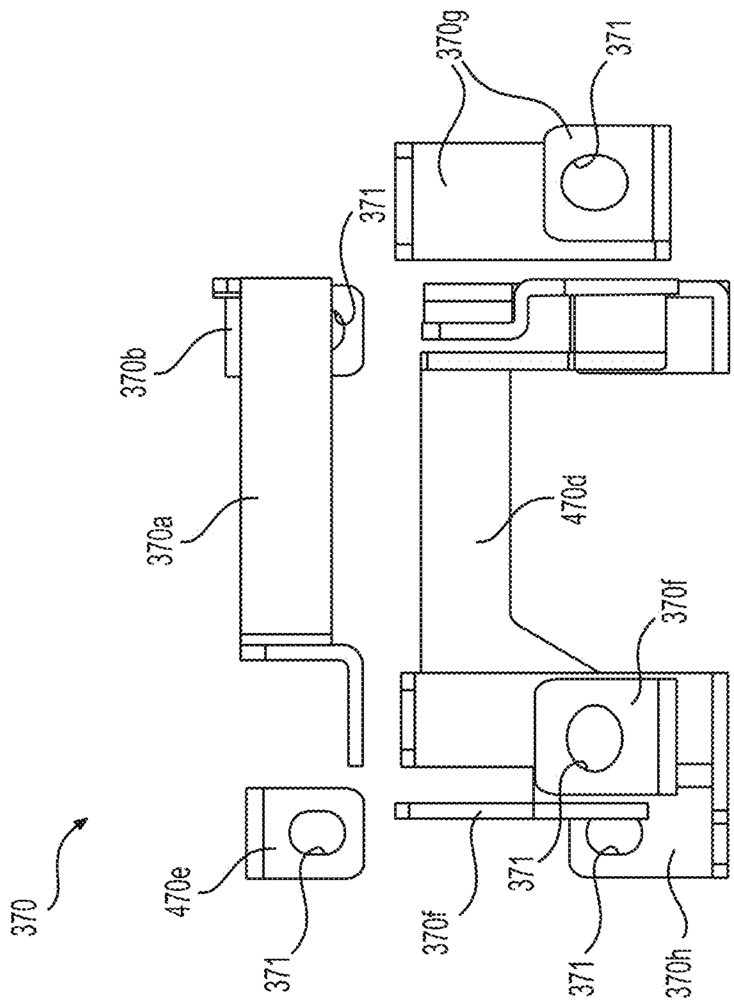
FIG. 61 is a left side elevational view of the highly conductive frame shown in FIG. 56.
Figure 62:
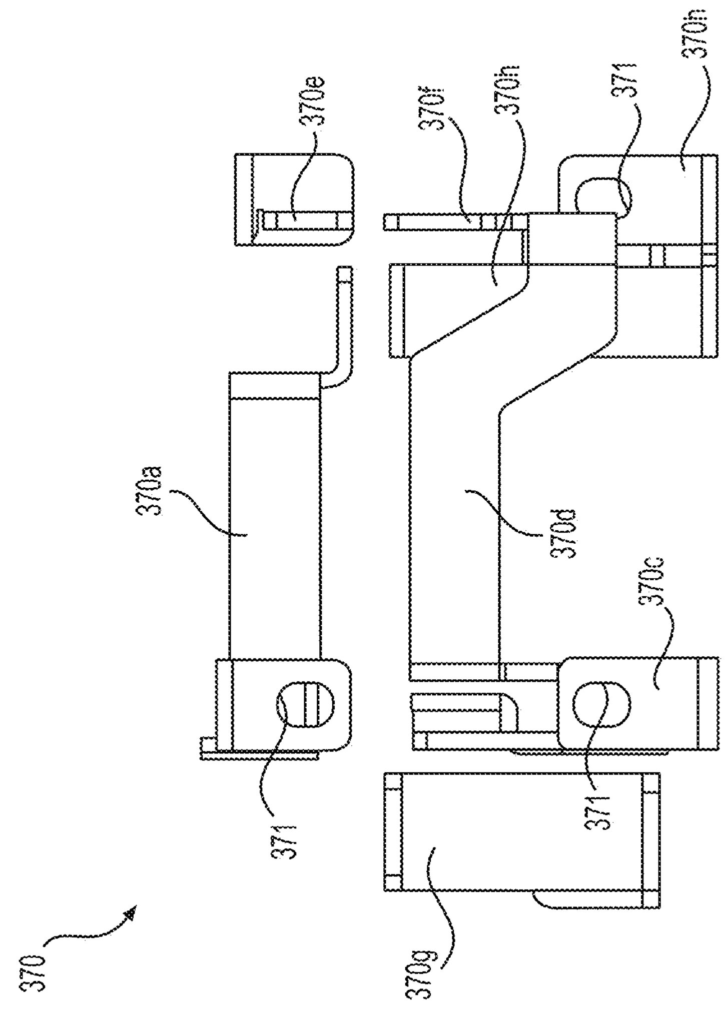
FIG. 62 is a right side elevational view of the highly conductive frame shown in FIG. 56.
Figure 63:
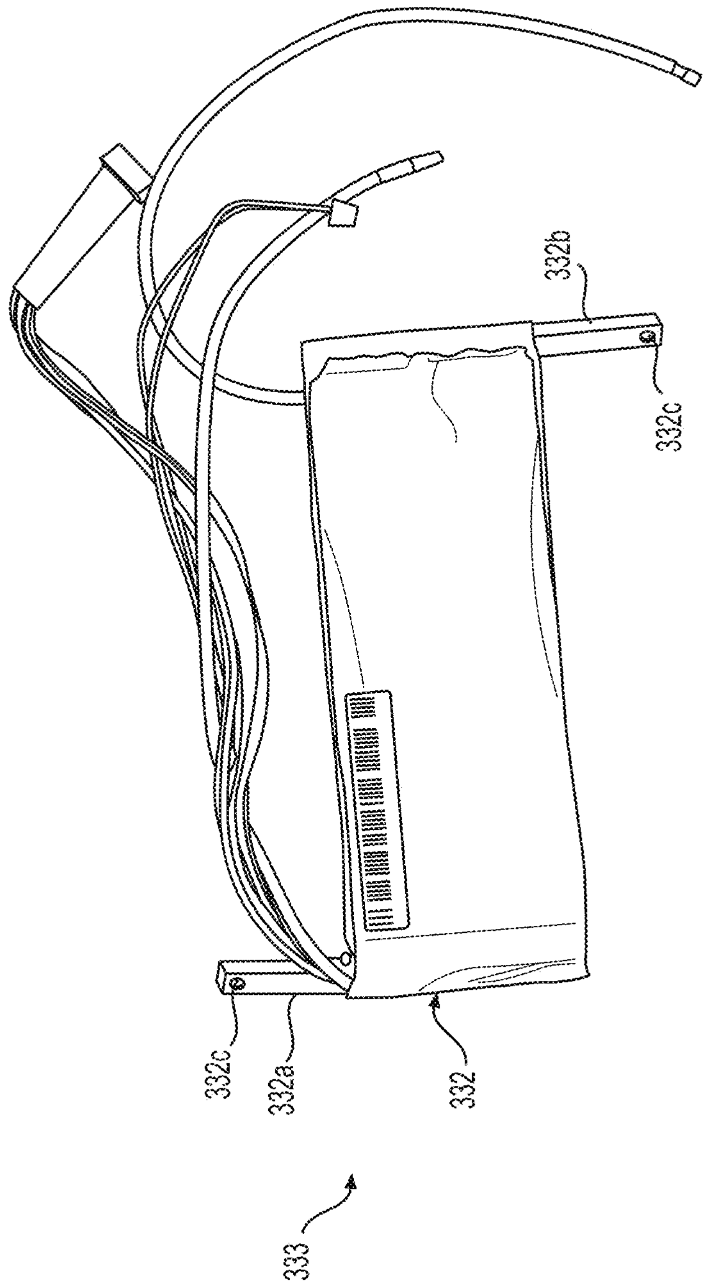
FIG. 63 is a top planar view of an assembled Li-ion battery assembly according to the present invention.

The cables 34, 36, 40, 42, 44, 46, 52, and 54 shown in FIG. 9 can be replaced with a highly conductive frame 370 comprising a plurality of highly conductive frame members 370*a-h*, as shown in FIG. 56. The highly conductive frame 370 is connected to the first 12V battery 32 (332), the second 12V battery 32 (332), and the electrical control switch 18 (318), as shown in FIG. 54.

The back-charge diode module 348 (FIG. 55) comprises highly conductive bars 348*a*, 348*b*, 348*c*. The highly conductive bars 348*a*, 348*b*, 348*c* are portions of the upper highly conductive frame member 370*e*, the lower highly conductive frame member 370*d*, and the center highly frame member 370*f*. The center highly conductive frame member 370*f* is located between the upper highly conductive frame member 370*e* and the lower highly conductive frame member 370*d* and spaced apart from each other. The first channel of diodes 348*d* are connected between the upper highly conductive frame member 370*e* and center highly conductive frame member 370*f*. The second channel of diodes 348*e* are connected between the lower highly conductive frame member 370*d* and the center highly conductive frame member 370*f*.

The center highly conductive frame member 370*e* is connected to a positive battery cable (e.g. positive battery cable 56 shown in FIG. 9). Specifically, the center highly conductive frame member 370*f* is connected to the positive cam lock (e.g. positive cam lock 25*a* shown in FIG. 9) configured for releasably connecting the positive battery cable to the positive cam lock.

The rechargeable battery jump starting device 10 further comprises a smart switch (e.g. smart switch 50 shown in FIG. 9 or smart switch 450 shown in FIG. 54) connected to the first 12V battery 32 (332) and the second 12V battery 32 (332). The smart switch 50 (450) is configured for switching on current flow from the first 12V battery 32 (332) and/or the second 12V battery 32 (332) only upon detecting that the positive battery clamp (e.g. positive battery clamp 60 shown in FIG. 9) and negative battery clamp (e.g. negative battery clamp 62 shown in FIG. 9) are correctly connected to the correct polarity battery terminals of the vehicle battery being jump started.

As shown in FIG. 54, the negative terminal of the first 12V battery 332 (BATTERY A) is permanently connected to the smart switch 450, and the negative terminal of the second 12V battery 332 (BATTERY B) is selectively connected to the smart switch 450 via the electrical control switch 318.

As further shown in FIG. 54, the positive terminal of the second 12V battery 332 (BATTERY B) is permanently connected to the back-charge diode module 348, and the positive terminal of the first 12V battery 332 (BATTERY A) is selectively connected to the back-charge diode module 348 via the electrical control switch 318.

Leapfrog Charging System

The rechargeable battery jump starting devices 10, 110, and 310 use two (2) 12V Li-ion batteries used for jump starting vehicles or equipment, and other system functions.

These two (2) 12V individual Li-ion batteries are used in both series or parallel depending on whether the operator is jumpstarting a vehicle or equipment with a 12V battery system or a 24V battery system.

The battery jump starting device 10, 110, 310 can be charged using a charging device having a plug-in cord (e.g. 114 V to 126 V (RMS) AC charger) and a charging control device (e.g. programmable micro-controller). Each battery is charged on its own (i.e. independently) by the rechargeable battery jump starting device 10, 110, 310 separate from the other battery, but the batteries are kept close in potential during the charging process using "leapfrog charging". Leapfrog charging insures that both batteries are close to the same potential even if the rechargeable battery jump starting device 10, 110, 310 is removed from charging early. This provides for equal power delivery during jumpstarts as well as other system functions.

The battery jump starting device 310 is provided with a charging device. For example, the circuit board 408 shown in FIG. 26 can be provided with charging components and a charging circuit for recharging the two (2) Li-ion batteries 332. The components, for example, includes a programmable microcontroller for controlling the recharging circuit for recharging the Li-ion batteries 332

This method is accomplished by charging one Li-ion battery 332, starting with the lowest charged battery, until it is approximately 100 mv higher than the other battery 332, and then switching to charge the other battery 332. This process continues until both batteries 332 are completely charged.

Safeguards are provided in the rechargeable battery jump starting device 310 to protect against any of the batteries 332 being overcharged as well as sensing if a battery cell is shorted. These safeguards include peak voltage shutoff as well as charge timeouts in software.

The leapfrog charging system and method can be design or configured to charge the rechargeable batteries 332 (e.g. Li-ion batteries) in a charging sequence. The charging sequence can be designed or configured to ensure that both batteries become fully charge regardless of the operations of the battery jump starting device 310. In this manner, the batteries are fully charged on a regular basis to maximize the use and life of the batteries.

Further, the charging sequence can be tailored to most effectively charge particular types of rechargeable battery, in particular Li-ion batteries taking into account particular charging properties of the batteries (e.g. reduce heat generation of batteries over a time interval, apply best charging rate(s) for batteries, charging in a sequence increase life of batteries. The charging sequence, for example, can be to partially charge the batteries 332, one at a time, and back-and-forth. For example, the charging sequence can be configured to incrementally charge the batteries 332 in a back-and-forth sequence until both batteries are fully charged. For example, a voltage increase increment can be selected (e.g. 100 mV) for charging the batteries in a back-and-forth sequence.

In addition, the charging sequencing between the two batteries 332 can be selected or programmed to provide back-to-back charging of one battery two or more increments before switching to the other battery for charging. Also, the charging sequence can include one or more pauses to prevent the charging battery 332 from becoming too hot (e.g. temperature limit) or so that the charging sequence matches with the charging chemistry of the charging battery.

Figure 70:
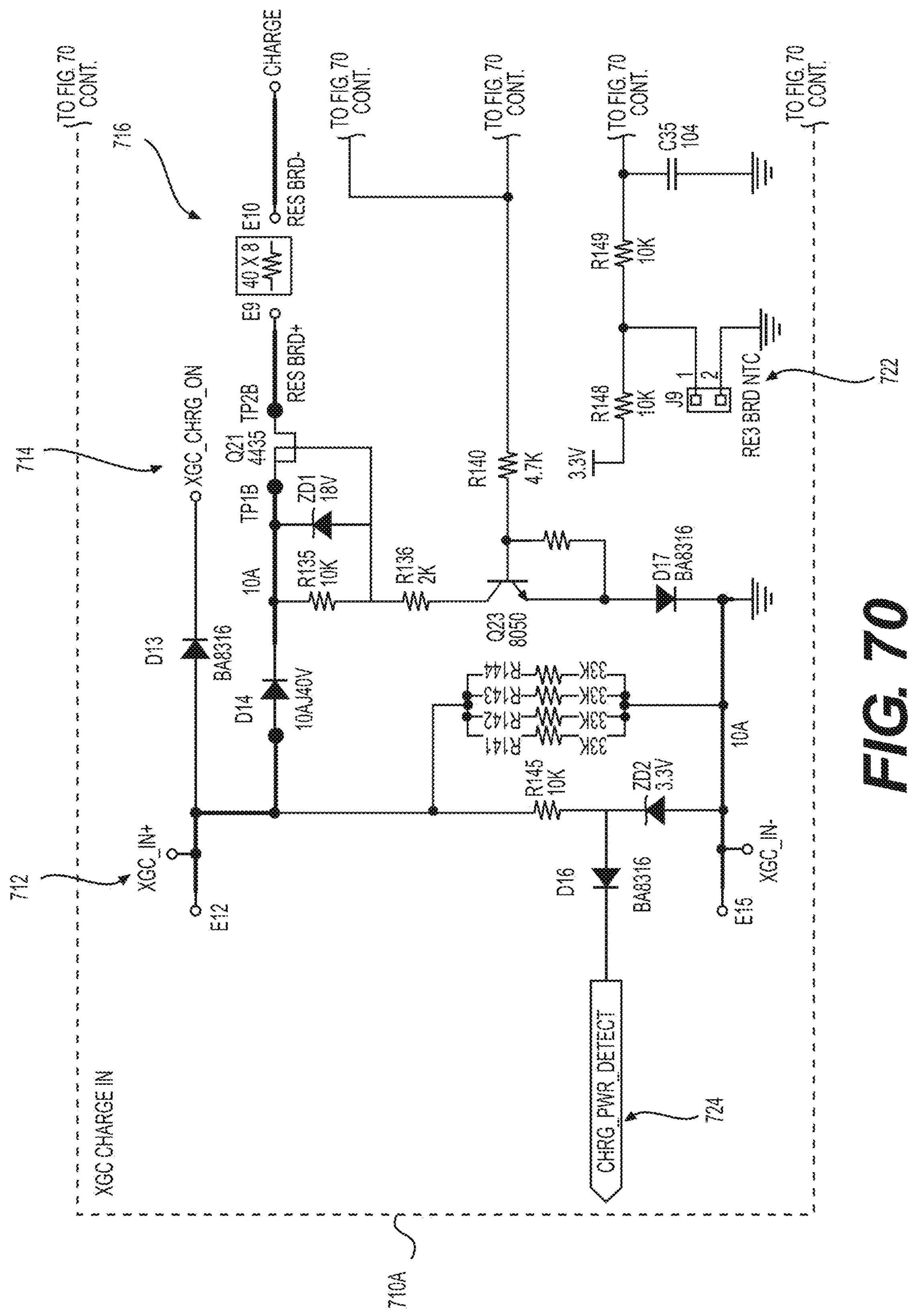
FIG. 70 is an electrical schematic diagram of the leapfrog charging system.
Figure 70:
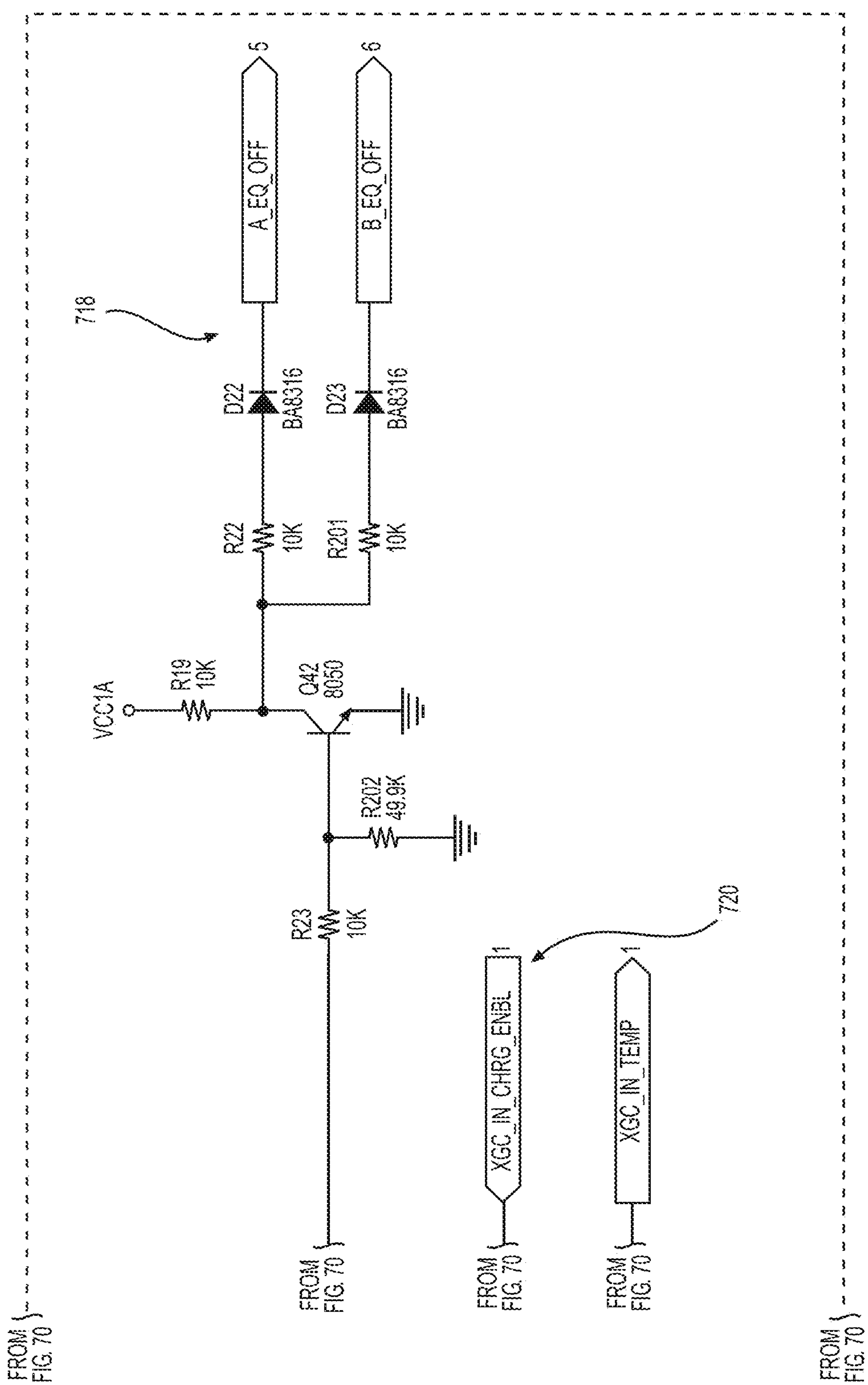

An example of a leapfrog charging system 710A, 710B for use in a rechargeable battery jump starting device, for example, rechargeable battery jump starting devices 10, 110, and 310, is shown in FIGS. 70, 70 CONT. and 71.

Figure 71:
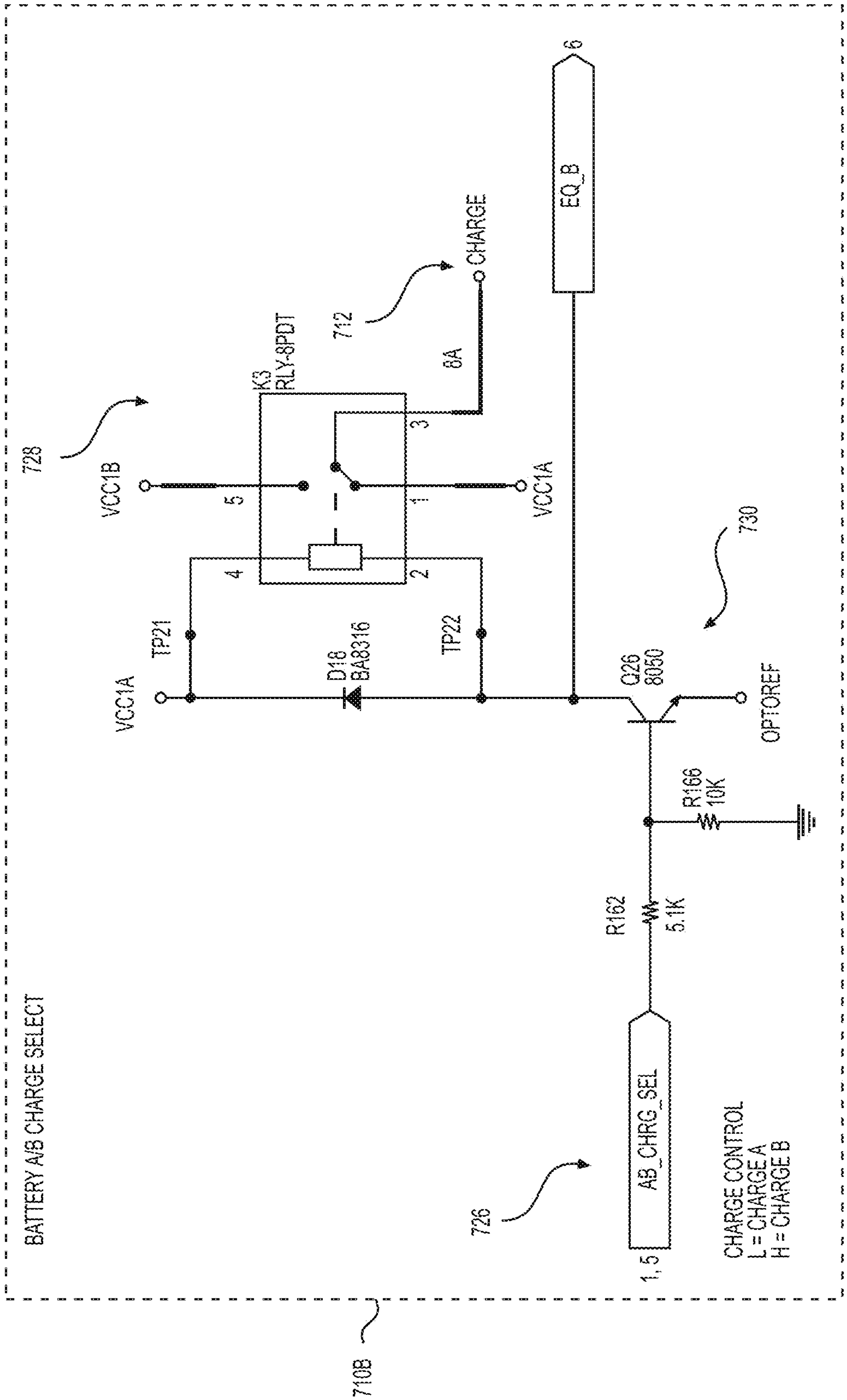
FIG. 71 is another electrical schematic diagram of the leapfrog charging system.

The leapfrog charging system 710A shown in FIGS. 70 and 71 CONT. comprises:

1) CHARGE SOURCE 712: The power for this input comes from the vehicle itself or an AC/DC charge adapter that outputs 14.4V @ 4 amps;
2) CHARGE ENABLE SWITCH 714: The charge current for the internal 12V lithium batteries is gated by a FET switch controlled by the system MCU;
3) CURRENT LIMIT MODULE 716: The charge current to the batteries is limited by this high power resistor module;
4) BATTERY CELL EQUALIZATION ENABLE 718: This circuit assists in enabling equalization for the individual batteries (A and B). Equalization provides a method for keeping the battery cell capacity even during charge;
5) CHARGE ENABLE FROM MCU 720: This signal is provided from the Micro Controller Unit (MCU), for example the Microcontroller Unit (MCU) 601 shown in FIG. 67, to enable the FET switch for charge current delivery;
6) CURRENT LIMIT TEMPERATURE SENSE 722: This circuit connects a temperature sensor to the MCU for reading the temperature of the CURRENT LIMIT MODULE (716) which allows the MCU to shut off charge current in case of overheating;
7) CHARGE SOURCE DETECT 724: This signal is sent to the MCU letting it know that the charge source has been connected;

The leapfrog charging system 710B shown in FIG. 71 comprises:

8) BATTERY A OR B CHARGE SELECT 726: This signal comes from the MCU and is used to select which battery is being charged;
9) CHARGE RELAY FOR BATTERY A OR B 728: This relay is used to switch charge between battery A or B;
10) CHARGE SOURCE 712 FROM FIG. 70: This is the main charge source; and
11) CONTROL TRANSISTOR FOR RELAY COIL 730: This transistor is used to control the relay coil for switching the relay contact from battery A or B for charging.

Improved Battery Detection System

Hand-held jump starters for vehicles or equipment are safer if their jumper terminal are not left "live", inadvertently, with the fully charged jumper or booster battery connected across them, and with the capability of delivering a large amount of electrical energy in a short period of time. Such a situation may arise immediately after jump starting a vehicle, when a user is disconnecting the jump cables from a vehicle battery and accidently drops the jump starter, or walks away from the jump starter before turning the jump starter off. Live jump terminal left unattended may post a shock hazard or a fire hazard if the "live" terminals get short circuited accidently or connected through a low resistance path (e.g. human or animal body or an electrically conductive wet surface.

There exists a hand held jump starter already have a circuit and mechanism included within the jump starter that prevents this scenario (e.g. U.S. Pat. No. 9,007,015). The circuit of the existing jump starter accomplishes detection of the vehicle battery during the jump-start process by amplifying the small voltage drop across the "smart-switch" contacts (due to current flow through the contacts when the vehicle battery is connected to the jumper cables). When there is not enough current flow through the "smart switch"

contacts, the microcontroller unit (MCU) opens a smart-switch, for example, every three seconds to enable the "vehicle battery isolation sensor" to detect the presence or absence of the vehicle battery. The circuit of the existing jump starter works well in smaller models of jump starters. In larger capacity jump starters, the "smart switch" also gets bigger to handle more current, which causes a louder clicking sound when its contacts open and close. A user unfamiliar with the reason for the sound might perceive the unit as defective, or it might be an annoyance to the user unaccustomed to such a sound.

The improved circuit described below overcomes the above issues. This circuit detects the vehicle battery by sensing forward voltage drop across the "back-charge" diodes. If a vehicle battery is connected to jumper cables, and is being charged by an internal booster battery (e.g. such as Li-ion battery pack), then there will be forward current through diodes, causing a positive forward voltage drop from anode to the cathode terminals of diodes.

Figure 72:
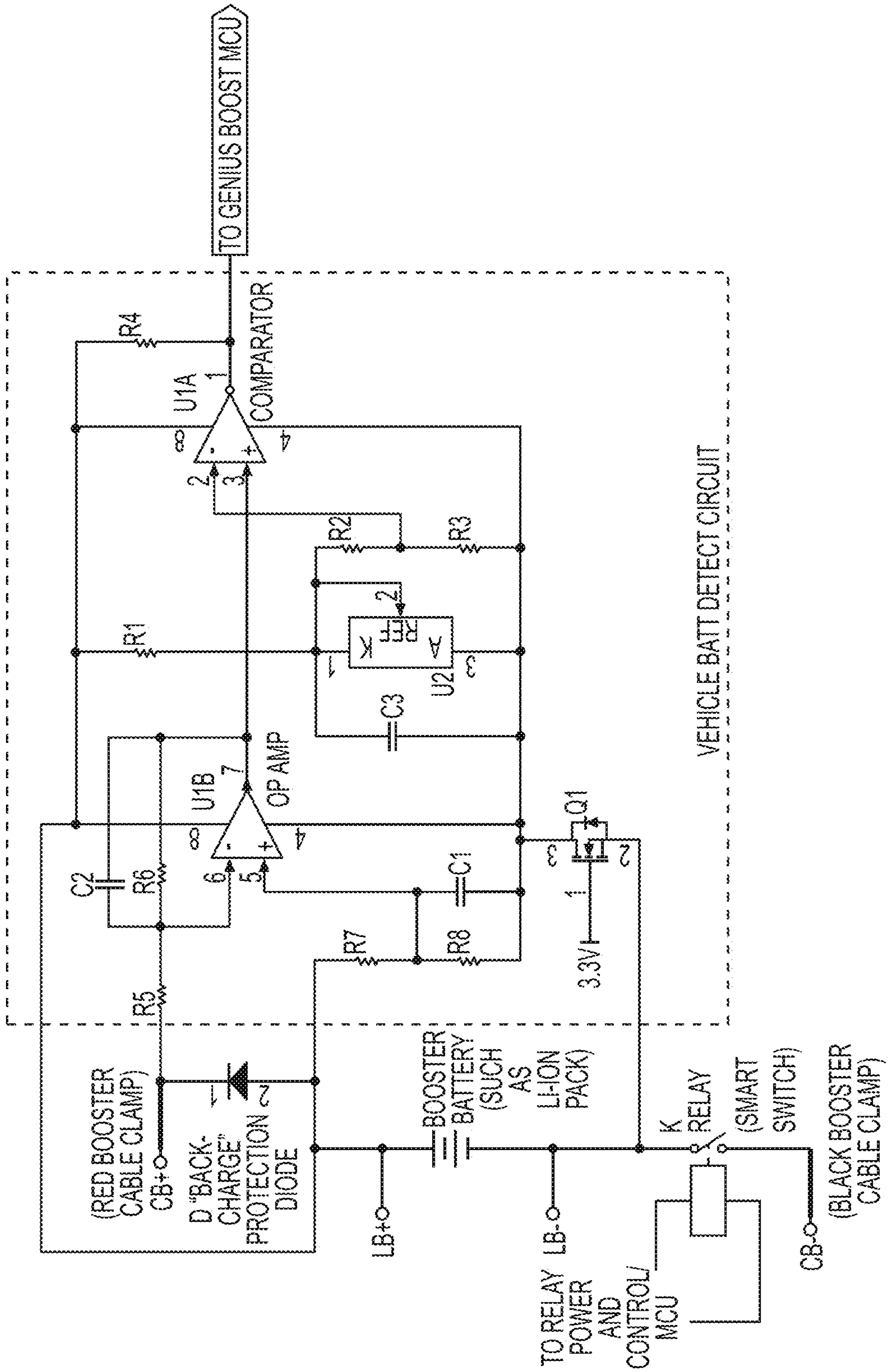
FIG. 72 is an electrical schematic diagram of the improved battery detection system.

The schematic shown in FIG. 72 shows the improved circuit to detect the forward voltage drop across the "back-charge" diodes, D. The circuit includes an op amp subtractor or difference amplifier whose output is fed into a comparator. If a forward voltage drop is detected across diodes D, and is above a certain threshold, meaning, an external load (vehicle battery) is connected to the jumper cables, then the comparator U1A puts out a "high" signal, allowing the jump starter to continue normal operation, i.e., internal jumper battery terminals continue being connected to the jumper cables through the "smart-switch" and the "back-charge" diodes, specifically, the internal battery negative terminal (LB−) remains connected to the black jumper cable. If the forward voltage drop sensed is below a certain threshold, then the comparator U1A puts out a "low" signal, instructing the jump starter logic (controlled by the micro-controller unit, MCU) to open the "smart-switch", disconnecting battery terminal LB− from the black or negative jumper cable, thus removing the internal battery voltage from being applied across the jumper cables and rendering the cable terminals inactive or dead.

The latter situation (forward voltage drop below a certain threshold) arises where there is negligible or no current from the internal booster battery to the vehicle battery. This scenario occurs when the jumper cables are open or disconnected from the vehicle battery, or when the vehicle battery has been charged (by the vehicle alternator) to a voltage higher than the booster battery.

Referring to FIG. 72, the forward voltage drop across the "back-charge" diodes D, is sensed by Op Amp U1B and resistors R5, R6, R7, R8, which together make up the difference amplifier or subtractor circuit. This section of the circuit subtracts the voltage potential at LB+ (anode terminals of diodes, D) from the voltage potential at CB+ (cathode terminal of D). Capacitors C1, C2 are added to filter the noise or voltage ripple arising when the vehicle alternator turns on, which can cause output of U1B to undesirably fluctuate.

Op Amp U1B output is fed into the non-inverting terminal of comparator U1A (pin 3). A voltage reference, U2, biased through R1, with capacitor C3 to stabilize its operation, is applied to its inverting input (pin 2) through voltage divider R2, R3. Comparator U1A compares the voltage at its non-inverting input pin 3 to this reference voltage at pin 2 and changes its output voltage state depending on the comparison outcome. Comparator U1A used in this circuit happens to have an open collector transistor output stage, hence R4 is added between the collector to the power supply node to allow the output transistor to turn ON when needed.

Op amp U1B's output (pin 7) represents the forward voltage drop across "back-charge" diodes (D), including an offset voltage due to op amp circuitry. Voltage at pin 7 of U1B is applied to non-inverting input U1A (pin 3). If a detectable forward voltage drop is present across diodes D, the Op Amp U1B's output voltage goes above the reference voltage present at comparator U1A's pin 2, causing the comparator to put out a "high" signal, allowing the jump starter to continue normal operation, i.e., jumper battery terminals continue to be connected to the jumper cables through the "smart-switch" and diodes D. If the forward voltage drop sensed is below a certain threshold, the Op Amp output voltage falls below the reference level at comparator's pin 2, causing the comparator to put out a "low" signal, instructing the jump starter logic controlled by the micro-controller unit (MCU) to open the "smart-switch", disconnecting the booster battery's negative terminal from the black or negative jumper cable, thus rendering the cable terminals inactive or dead.

The booster battery serves as the circuit's power supply (power supply pins 8 of U1B and U1A connected to LB+). To prevent the circuitry to draw current from the booster battery when the unit is not in use, the circuit ground is connected to the booster battery ground terminal, LB−, through an enhancement mode MOSFET switch Q1, which is turned ON by a 3.3V signal that gets generated and is applied between the gate to source terminals of Q1, only when the boost unit is powered ON, only then allowing the circuitry to start drawing current.

Highly Conductive Frame

The highly electrically conductive frame 370 ("highly conductive frame"), is shown in FIGS. 56-62. The highly conductive frame 370 comprises highly conductive frame members 370*a-h*.

The highly conductive frame 370 can replace the electrically conductive cables 34, 36, 40, 42, 44, 46, 52, 54 (FIGS. 9 and 10) of the portable battery jump starting device 10, or the highly conductive frame 170 (FIG. 16) of the battery jump starting device 110.

The highly conductive frame 370 comprises a positive conductive frame 371*a* and negative conductive frame 371*b*, as shown in FIG. 56. The positive conductive frame 371*a* comprises highly conductive frame members 170*c*, 170*d*, 170*e*, 170*f* providing a positive conductive pathway between the rechargeable batteries 332 and the positive cam-lock 324*a*. The negative conductive frame 371*b* comprises highly conductive frame members 170*a*, 170*b*, 170*g*, 170*h* providing a negative conductive pathway between the rechargeable batteries 332 and the negative cam-lock 324*b* of the rechargeable battery jump starting device 310. The highly conductive frame members 370*a-h* each carry or transfer power a distance between connecting ends of the highly conductive frame members 370*a-h*.

The highly electrically conductive frame 370 comprises the multiple electrically conductive frame members 370*a-h* electrically and mechanically connected together. For example, the highly electrically conductive frame members 370*a-h* are each provided with connecting ends having through holes 371 to allow a fastener (e.g. highly electrically conductive nuts and bolts) to connect the electrically conductive frame members 370*a-h* to each other or to other electrical components (e.g. rechargeable batteries 332, cam-locks 324*a*, 324*b*, back-charge diode module 348, smart switch 450). The highly electrically frame members 370*a-h*, for example, are flat highly electrically conductive bars (e.g. copper or aluminum bars) bent along multiple spaced apart axes to provide a three dimensionally (3D) arrangement of each highly electrically conductive bar 370*a-h*, which cooperate together to define a three dimensional (3D) highly electrically conductive frame 370. As shown in FIG. 56, one or both ends of the electrically conductive frame members 370*a-h* have bent ends each provided with a through hole 371.

The highly electrically conductive frame 370, for example, can be a highly electrically conductive semi-rigid or rigid frame 370 made of semi-rigid or rigid highly conductive material (e.g. copper, aluminum, plated metal, gold plated metal, silver plated metal, steel, coated steel, stainless steel). The highly electrically conductive frame 370 is structurally stable (i.e. does not move or flex) so that it does not contact and electrically short with components or parts of the portable jump starting device. The more rigid the highly electrically conductive frame 370 typically the more structurally stable is the highly electrically conductive frame 370.

The highly electrically conductive frame 370 electrically connects together the two (2) batteries 332, for example Li-ion batteries 332 with the cam-locks 324*a*, 324*b*. The cam-locks 324*a*, 324*b* connect to the removable or detachable positive and negative battery cables 56, 58 (FIG. 9).

The highly electrically conductive frame 370 comprises multiple highly electrically conductive frame members 370*a-h*. For example, highly electrically conductive frame members 370*a*, 370*b*, 370*c*, 370*d* are connected to the control switch 318 via the terminals 382*a*, 384*a*, 386*a*, 388*a* (also see terminals 82*a*, 84*a*, 86*a*, 88*a* of the control switch 18 shown in FIG. 14).

Figure 18:
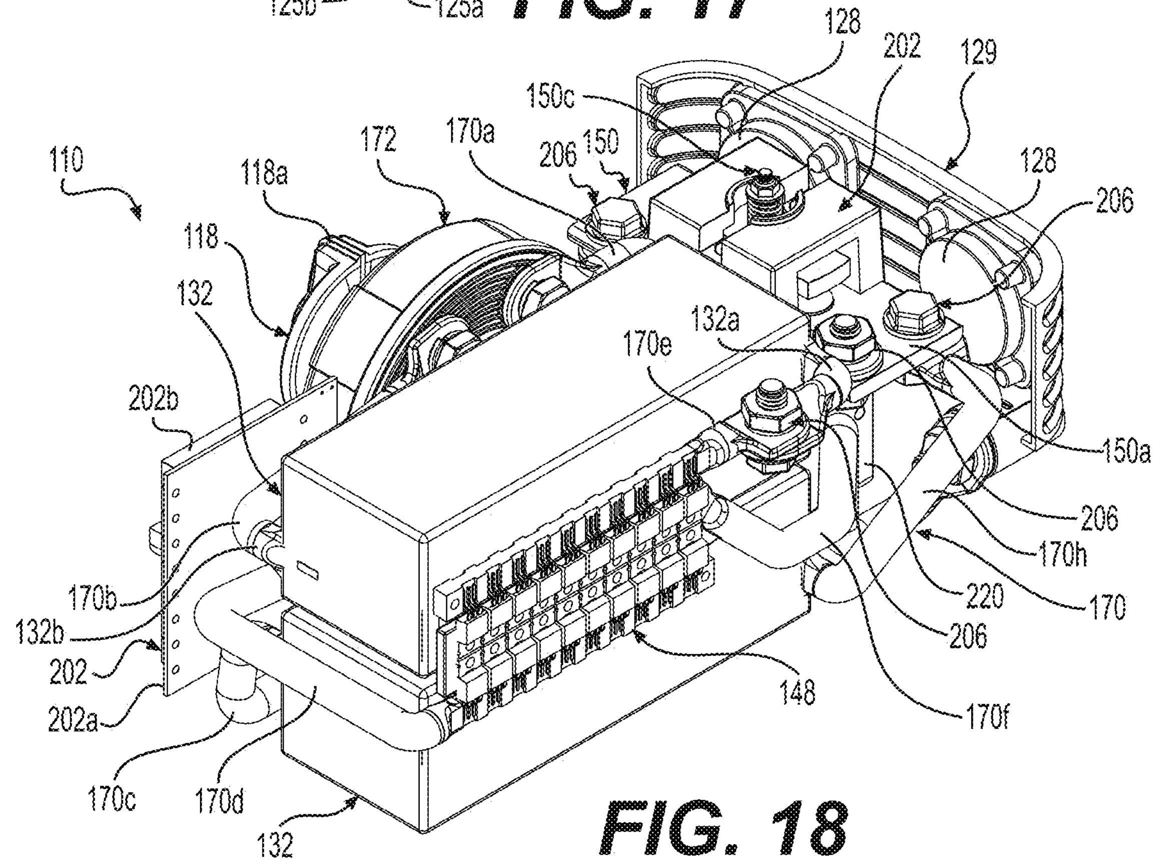
FIG. 18 is a rear and right side perspective view of the battery jump starting device shown in FIG. 1 with the cover removed.

The highly electrically conductive frame members 370*d*, 370*e*, 370*f* are part of the reverse flow diode assembly 348 (see reverse flow diode assembly 148 in FIG. 18).

Figure 20:
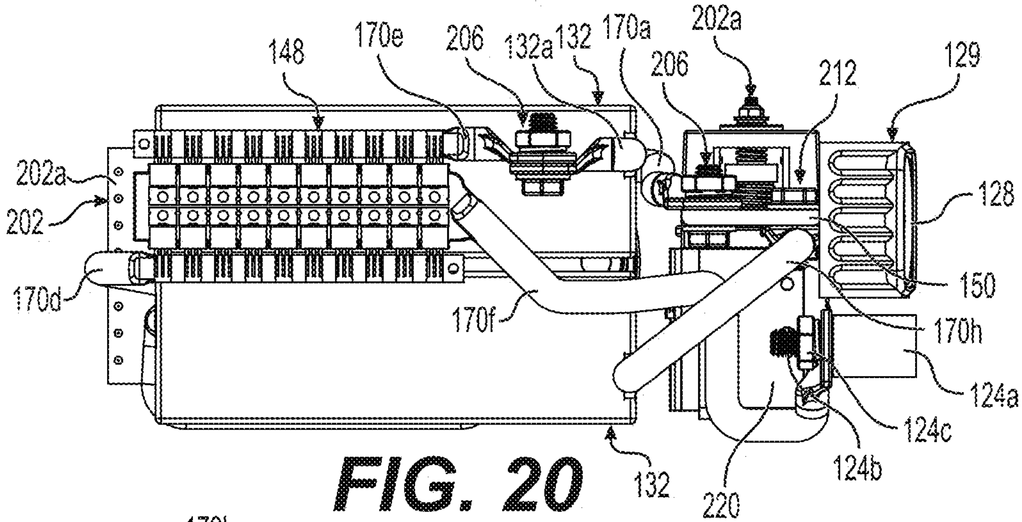
FIG. 20 is a rear elevational view of the battery jump starting device shown in FIG. 1 with the cover removed.
Figure 21:
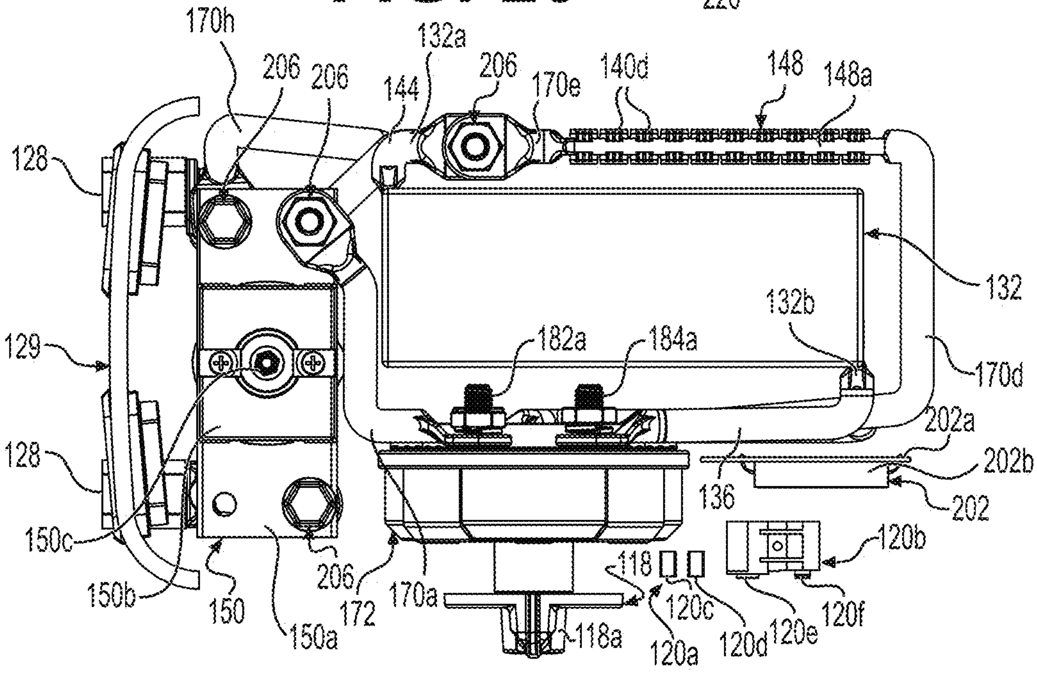
FIG. 21 is a top planar view of the battery jump starting device shown in FIG. 1 with the cover removed.
Figure 22:
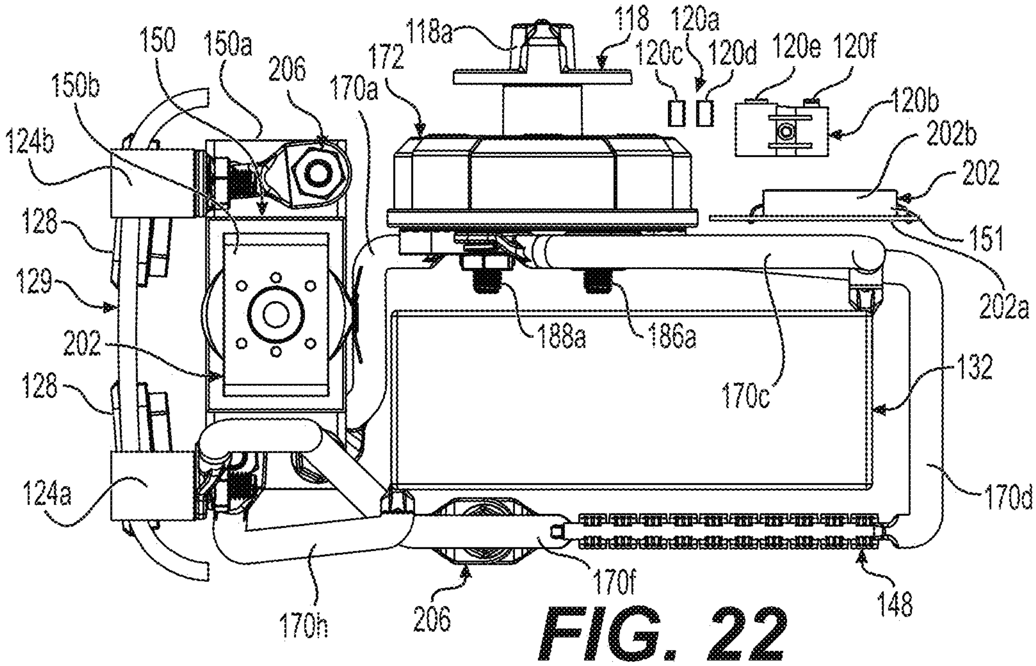
FIG. 22 is a bottom planar view of the battery jump starting device shown in FIG. 1 with the cover removed.
Figure 23:
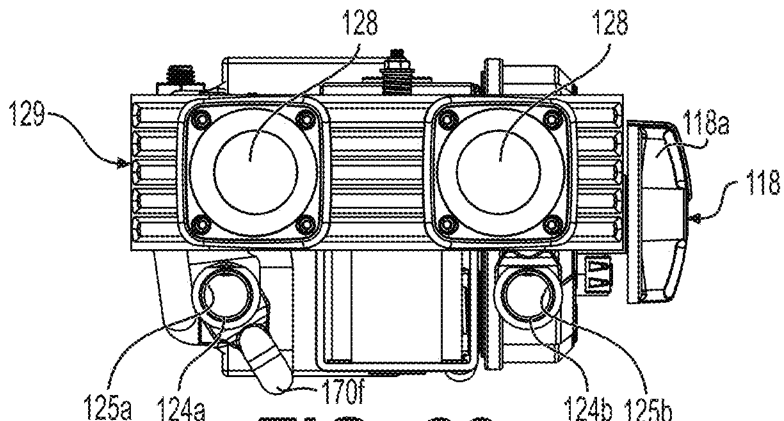
FIG. 23 is a left side elevational view of the battery jump starting device shown in FIG. 1 with the cover removed.
Figure 24:
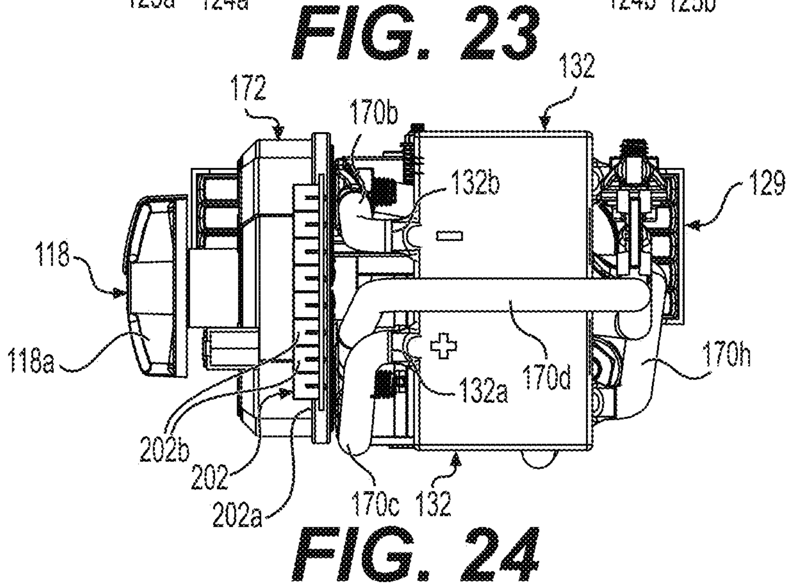
FIG. 24 is a right side elevational view of the battery jump starting device shown in FIG. 1 with the cover removed.
Figure 25:
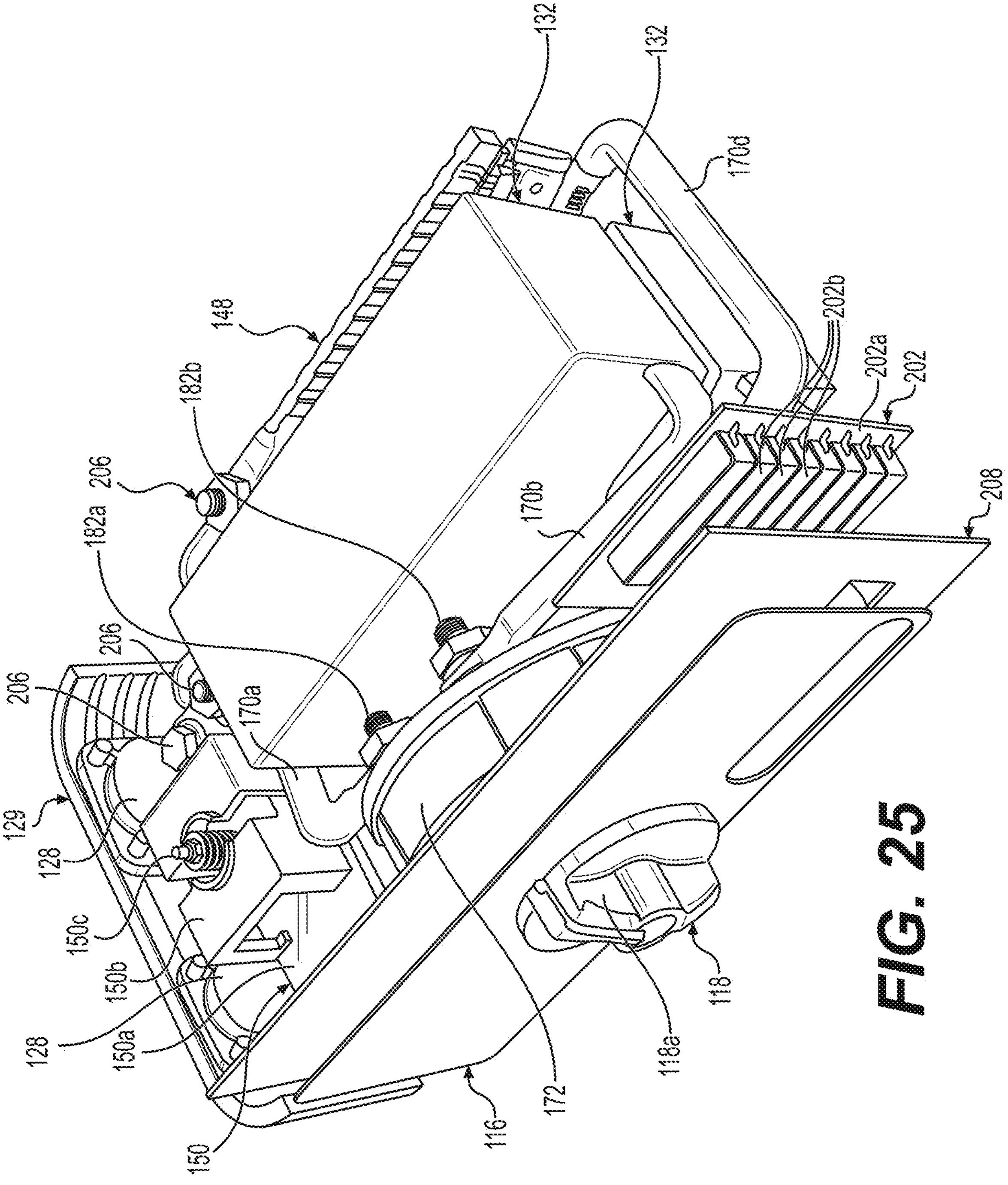
FIG. 25 is a front and top perspective view of the battery jump starting device shown in FIG. 1 with the cover removed.

The highly electrically conductive frame member 370*f* is connected to the positive cam-lock 324*a* (also see positive cam-lock 24*a* shown in FIGS. 1 and 9 and positive cam-lock 124*a* shown in FIG. 20).

The highly electrically conductive frame member 370*g* is connected to the negative cam-lock 324*b* (see negative cam-lock 24*b* shown in FIG. 1 or negative cam-lock 124*b* shown in FIG. 19).

The highly electrically conductive frame member 370*h* connects to the smart switch 450 (also see smart switch 150 shown in FIG. 18).

The highly electrically conductive frame 370 is a three-dimensional (3D) structure configured to wrap around and partially or fully enclose the Li-ion batteries 332 (also see the rechargeable Li-ion batteries 132 shown in FIGS. 16-25). This arrangement provides the shortest conductive pathways from the rechargeable Li-ion batteries 332 to the other internal electrical components of the portable jump starting device 310 to maximize the power output to the positive cam-lock 324*a* and negative cam-lock 324*b*. The highly electrically conductive frame members 370*a-h* have multiple bends along multiple spaced apart axes.

The highly electrically conductive frame members 370*a-h* are provided with ends having through holes to accommodate highly conductive fasteners 406 (e.g. see conductive fasteners 206, including bolts 206*a* and nuts 206*b* shown in FIGS. 16-25). Further, the highly electrically conductive frame members 370*a-h* are made of flat bar stock bent at one or more locations so as to wrap around the Li-ions batteries 332. For example, the highly electrically conductive frame members 370*a-h* are bent at multiple locations to form a three-dimensional (3D) frame structure. For example, the highly electrically conductive frame members 370*a-h* can have bent ends provided with ring-shaped through holes. Alternatively, the high electrically conductive frame 370 can be made as a single piece (e.g. single piece of plate or bar bent into shape, multiple pieces welded or soldered together, machined from a block of stock material). Further, the highly electrically conductive frame members 370*a-h* are located adjacent to the sides of the Li-ion batteries 332 to make the combination of the Li-ion battery assembly and highly electrically conductive frame 370 as compact as possible.

The highly electrically conductive frame 370 is made from flat highly electrically conductive plate stock material (e.g. flat bars or strips of copper or aluminum stock material cut to length, bent, and drilled).

Battery Assembly

The Li-ion battery assembly 333 according to the present invention is shown in FIGS. 63-66.

The Li-ion battery assembly 333 comprises the one or more rechargeable Li-ion batteries 332. For example, the rechargeable battery jump starting device comprises two (2) rechargeable batteries 332.

The Li-ion batteries 332 each comprise multiple battery cells 335 connected together in series (i.e. positive tab of one rechargeable battery cell 335 connected to negative tab of adjoining rechargeable battery cell 335) resulting in one rechargeable battery cell 335 situated at one end of the multiple battery cells 335 having a positive terminal (+) and another rechargeable battery cell 335 situated at an opposite end of the multiple battery cells 335 having a negative terminal (−).

A positive highly conductive battery member 332*a* is connected to the positive terminal (+), and a negative highly conductive battery member 332*b* is connected to the negative terminal (−). The positive highly conductive battery member 332*a* and the negative highly conductive battery members 332*b* can be highly electrically conductive bars, plates, rods, and tubes. The rods and tubes can have flattened ends to facilitate connection with the highly electrically conductive frame 370 (FIG. 56).

Figure 64:
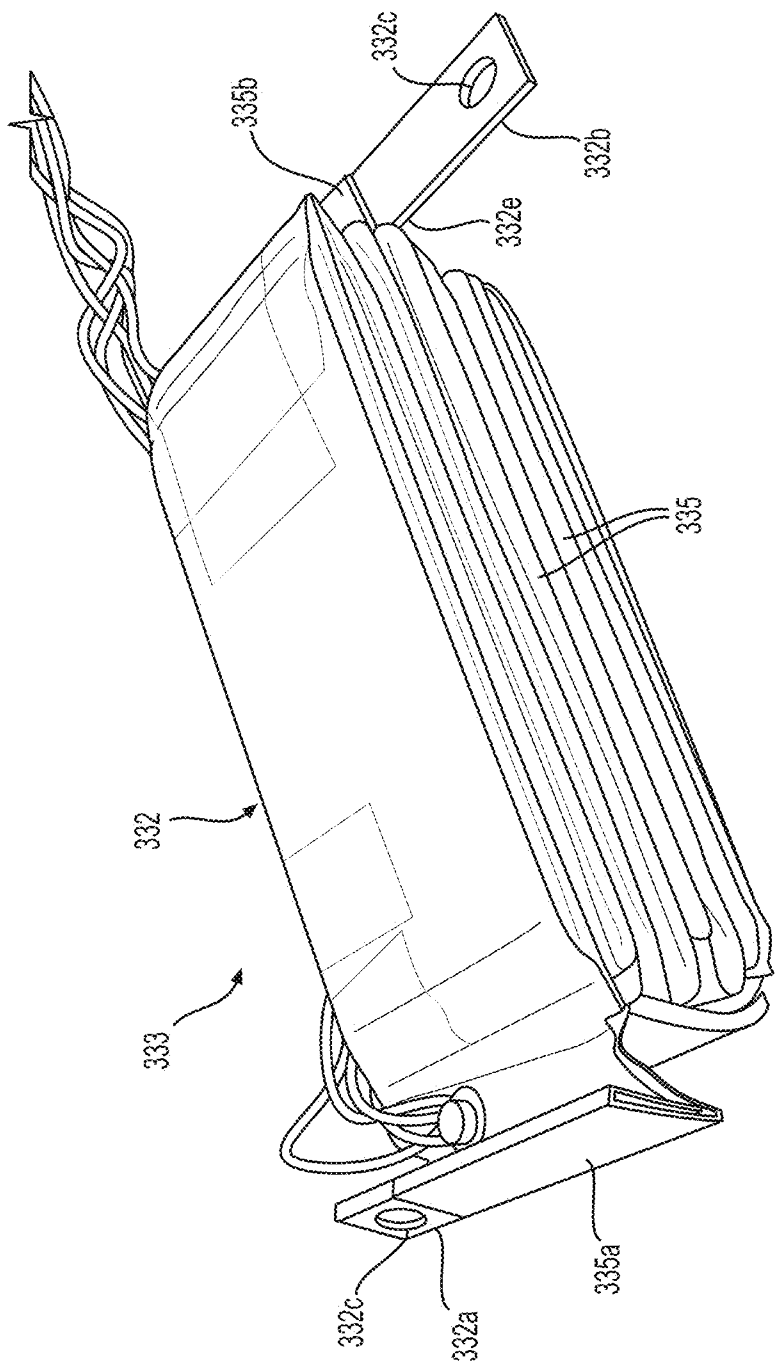
FIG. 64 is a perspective view of the Li-ion battery assembly shown in FIG. 63 with the covering removed.
Figure 65:
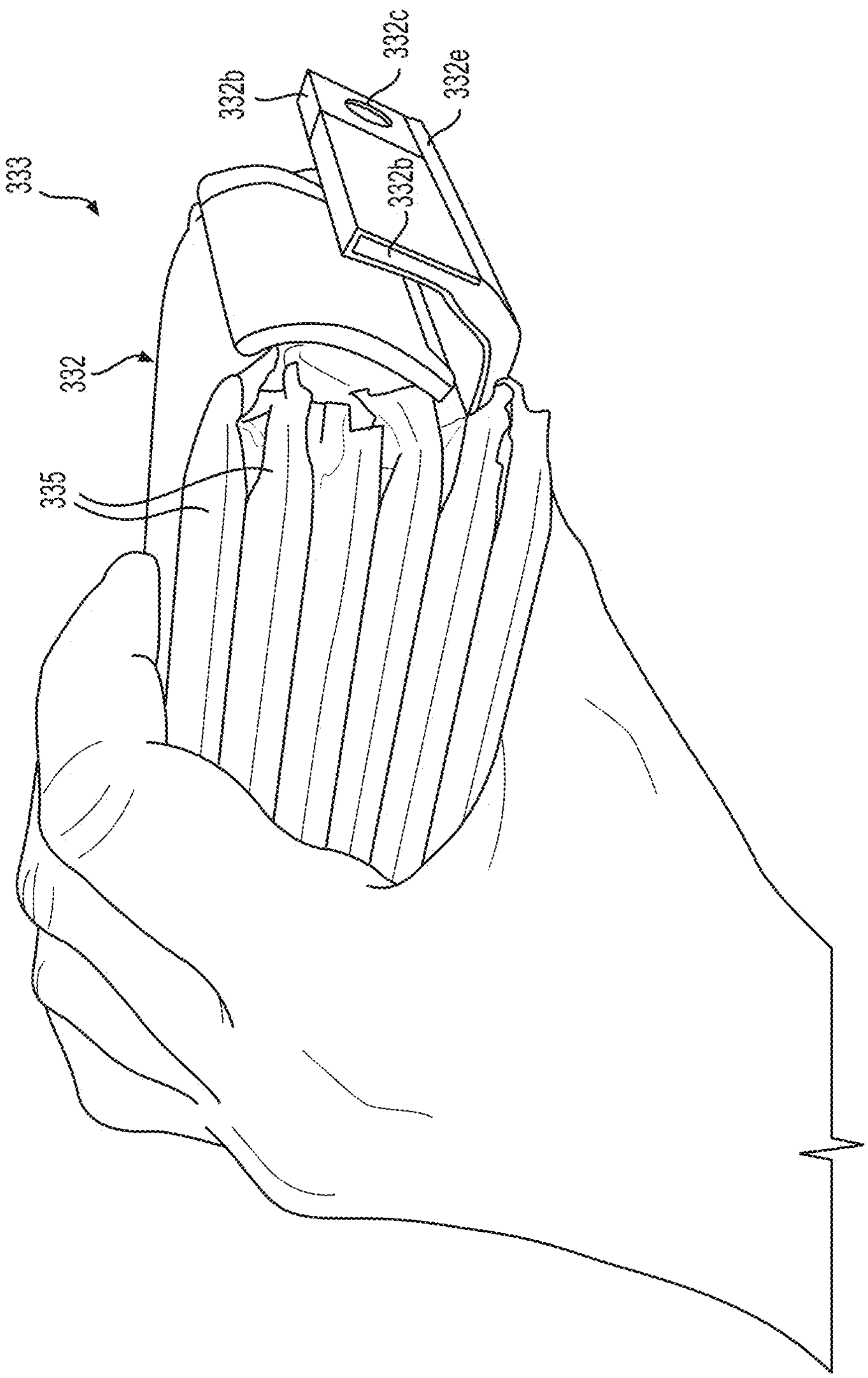
FIG. 65 is a perspective view of the Li-ion battery assembly shown in FIG. 63 with the covering removed.
Figure 66:
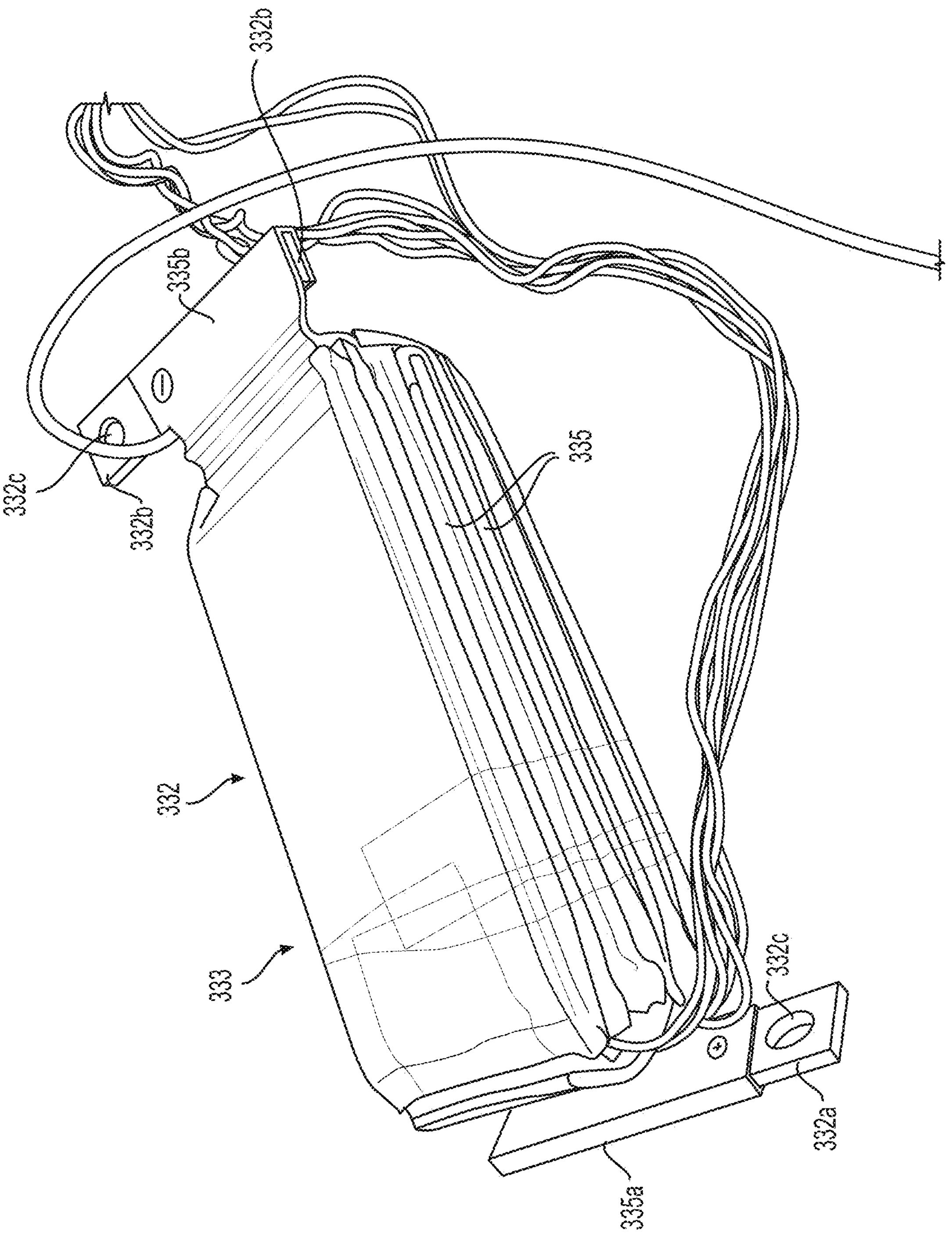
FIG. 66 is a perspective view of the Li-ion battery assembly shown in FIG. 63 with the covering removed.

Each Li-ion battery 332 comprises multiple Li-ion battery cells 332*c* layered one on top of the other, as shown in FIGS. 64-66 (i.e. stacked arrangement).

The positive foil tab or end 335*a* of the positive terminal (+) of the Li-ion battery cells 335 is connected (e.g. soldered, welded, and/or mechanically fastened) to the positive highly conductive battery member 332*a*. The negative foil tab or end 335*b* of the negative terminal (−) of the Li-ion battery cells 335 is connected (e.g. soldered, welded, and/or mechanically fastened) to the negative highly conductive battery member 332*b*.

The positive highly conductive battery member 332*a* and the negative highly conductive battery member 332*b* are made from highly conductive flat plate or bar stock material (e.g. copper plate, copper bar, aluminum plate, aluminum bar, steel plate, steel bar, metal coated plate, gold plated plate, silver plated plate). The positive highly conductive battery member 332*a* is provided with a through hole 332*c* located at an end extending a distance outwardly from a side of the rechargeable Li-ion battery 332 (i.e. transverse to longitudinal axis or length the rechargeable battery cells 335 and the rechargeable Li-ion battery 332). The negative highly conductive battery member 332*b* is provided with a through hole 332*c* located at an end extending a distance outwardly from and oriented transversely relative to the rechargeable battery cells 335 and the rechargeable Li-ion battery 332.

The highly conductive battery members 332*a*, 332*b* are made of relatively thick plate or bar material. The foil tabs or ends 335*a*, 335*b* of the battery cells 332*c* can at least partially or fully wrap around the highly conductive battery members 332*a*, 332*b*, as shown in FIGS. 64-66. Further, the highly conductive battery members 332, 332*b* are connected flat against the foil tabs or ends 335*a*, 335*b*, respectively, to maximize contact area therebetween.

The rechargeable battery cells 335 are covered with protective heat shrink material to package the rechargeable batteries 332.

The highly conductive battery members 332*a*, 332*b* are connected by highly conductive fasteners (e.g. nuts and bolts) to the highly electrically conductive frame such as highly electrically conductive frame 370 (FIGS. 56-62) of the portable jump starting devices 310.

Figure 31:
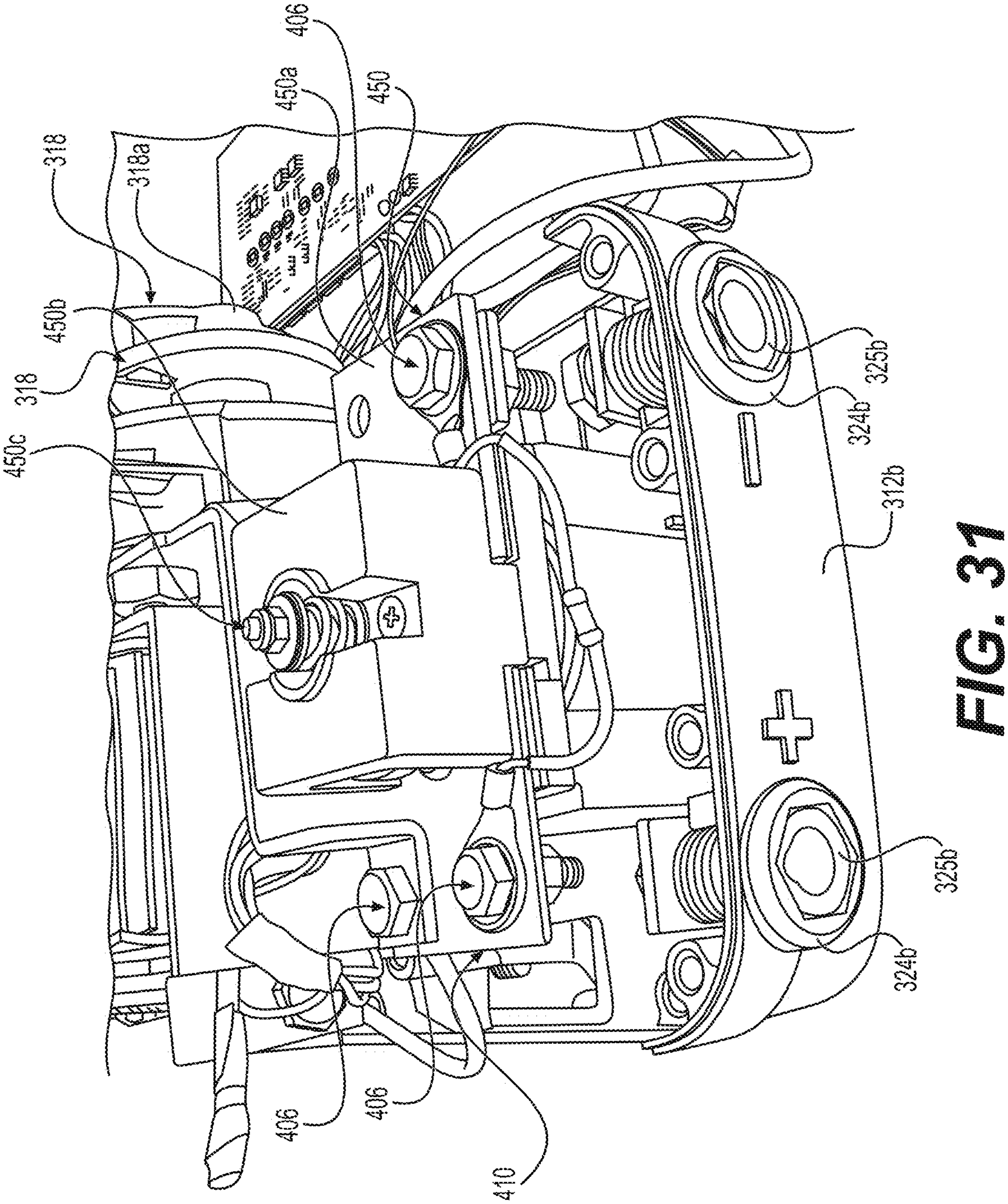
FIG. 31 is a disassembled partial left side perspective view of the battery jump starting device shown in FIG. 26 with the cover removed.
Figure 32:
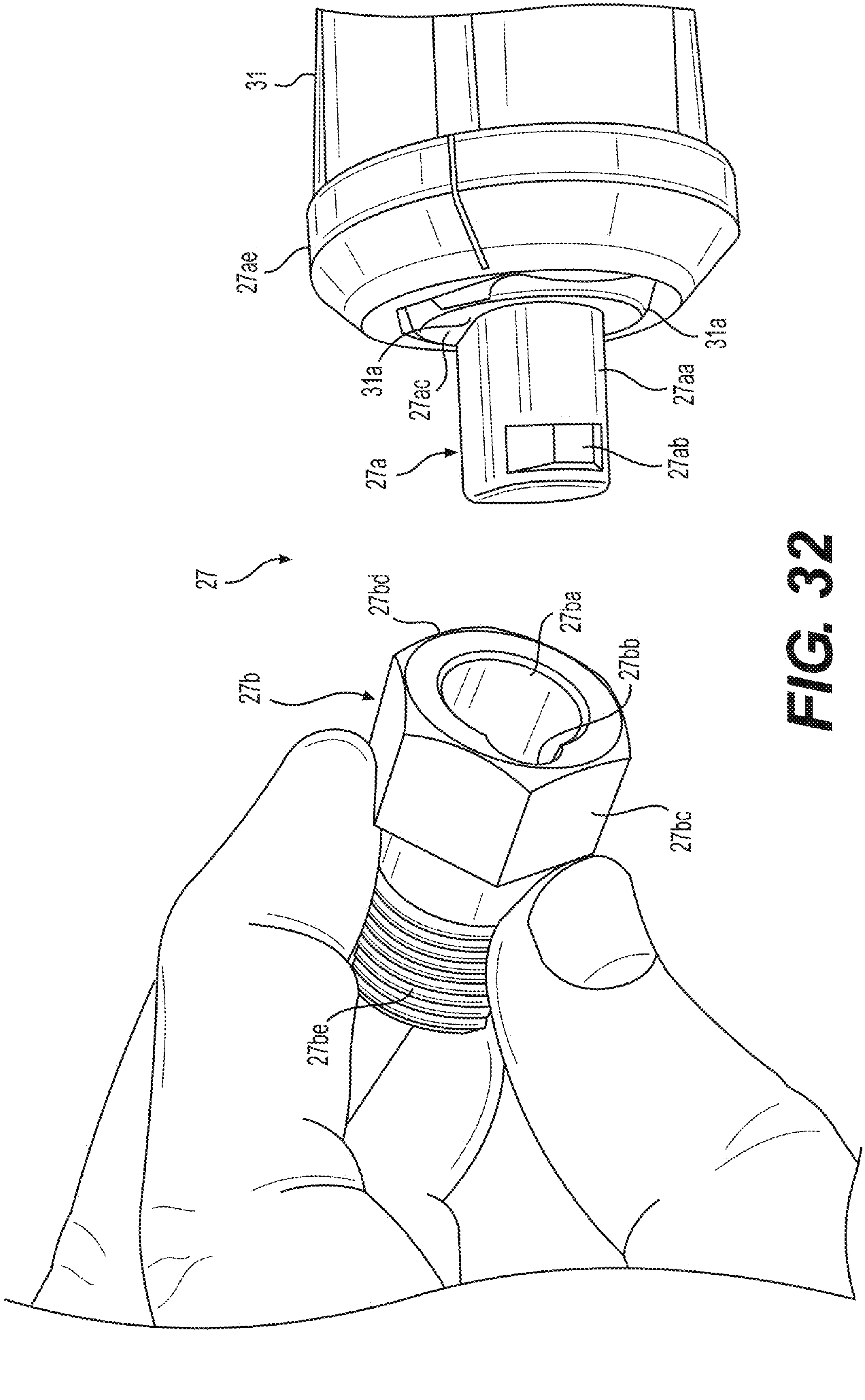
FIG. 32 is a perspective view of the cam-lock connecting device according to the present invention for use, for example, with the battery jump starting device according to the present invention shown with the male cam-lock end disconnected from the female cam-lock end.
Figure 33:
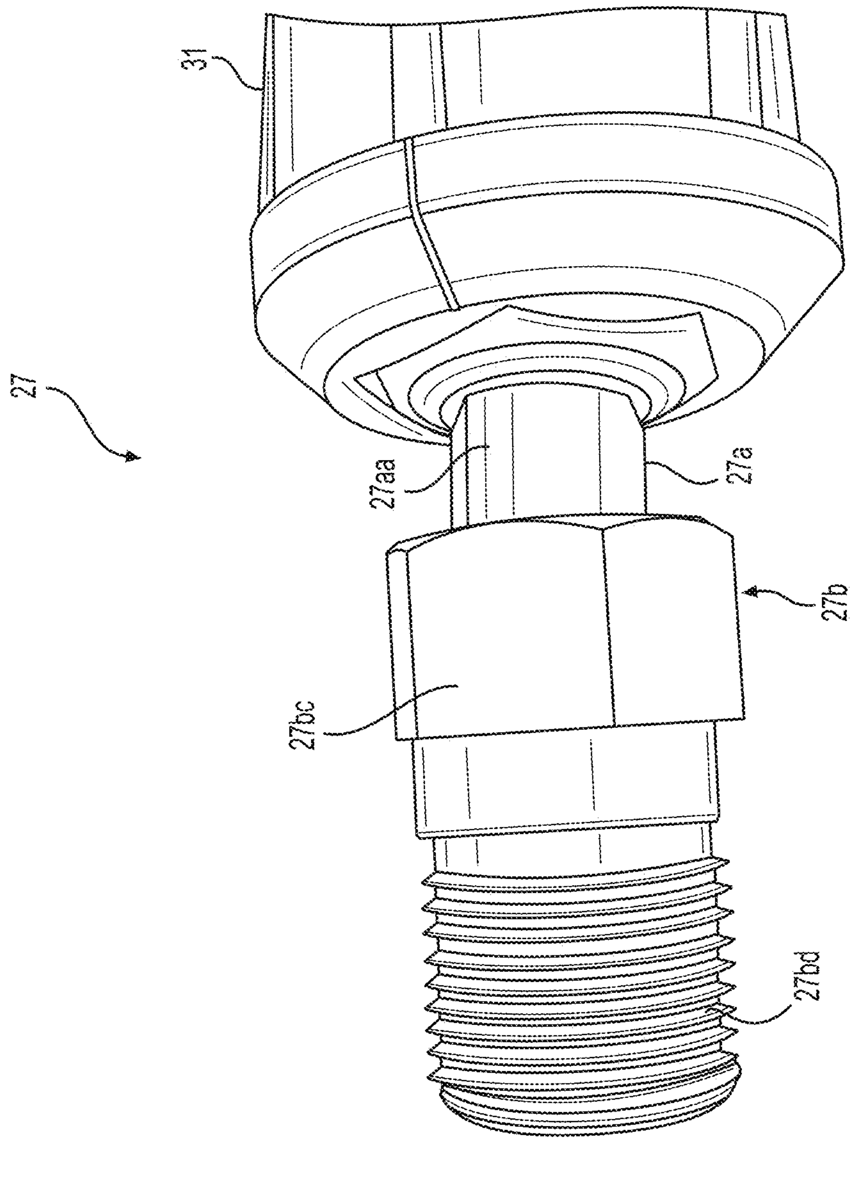
FIG. 33 is a perspective view of the cam-lock connecting device shown in FIG. 32 with the male cam-lock end partially connected to the female cam-lock end.

The rechargeable battery jump starting device 310 (FIG. 26-31) comprises the rechargeable battery assembly comprising one or more rechargeable battery cells having a positive terminal connector tab or end 335*a* (FIGS. 64-66) and a negative terminal connector tab or end 335*b*. A positive electrically conductive bar 332*a* is connected to the positive terminal connector tab or end 335*a* and a negative electrically conductive bar 332*b* is connected to the negative terminal connector tab or end 335*b*. The highly electrically conductive frame 370 (FIG. 56-62) is connected to the battery assembly 333 (FIG. 64-66). The positive battery cable 56 (FIGS. 9 and 10) is connected to the highly electrically conductive frame 370, for example, directly or through cam-locks 324*a*, 324*b* (FIG. 31). The negative battery cable 58 (FIGS. 9 and 10) is electronically connectable to the highly electrically conductive frame 370 via the smart switch 150 (also see smart switch 50 in FIGS. 9 and 10). The positive battery clamp 60 is connected to the positive battery cable 56 and the negative battery clamp 62 is connected to the negative battery cable 58.

The highly electrically conductive frame 370 comprises positive conductive pathways from the positive terminal connectors 332*a*, 332*a* of the rechargeable batteries 332, 332 of the rechargeable battery assembly 333 to the connection with the positive battery cable 56 (e.g. direct cable connection or via cam-lock 324*a*) and negative conductive pathways from the negative terminal connectors 332*b*, 332*b* of the rechargeable batteries 332, 332 of the rechargeable battery assembly 33 to the connection with the negative battery cable (e.g. direct cable connection or via cam-lock 324*b*).

As shown in FIGS. 64-66, the positive electrically conductive member 332*a* (e.g. highly conductive bar) and the negative electrically conductive member 332*b* (e.g. highly conductive bar) are both oriented transversely relative to a length or longitudinal axis of the rechargeable battery cells 335 of each rechargeable battery 332. More specifically, the positive electrically conductive member 332*a* and negative electrically conductive member 332*b* protrude from opposite sides of the rechargeable batteries 332 and the rechargeable battery assembly 333. Further, the positive electrically conductive member 332*a* and the negative electrically conductive member 332*b* are wider (FIG. 64) relative to a width of the rechargeable battery cells 335 and protrude from the opposite sides of the rechargeable battery cells 335 and the rechargeable battery assembly 333.

The positive terminal connector tab or end 332*a* is a positive terminal foil tab or end of the rechargeable battery cells 335 connected in series at one end and the negative terminal connector tab or end 332*b* is a negative foil tab or end of the rechargeable battery cells 335 connected in series at an opposite end. A side of the positive electrically conductive member 332*a* (i.e. highly electrically conductive bar 332*a*) is connected flat against the positive foil tab or end 335*a* of the series of rechargeable battery cells 335 and a side of the negative electrically conductive member 332*b* (i.e. highly conductive bar 332*b*) is connected flat against the negative foil tab or end 335*b* of the series of rechargeable battery cells 335. For example, the positive foil tab or end 335*a* and the negative foil tab or end 335*b* are soldered to the positive electrically conductive member 332*a* and the negative electrically conductive member 332*b*, respectively. Further, the positive electrically conductive member 332*a* (i.e. highly conductive bar 332*a*) and negative electrically conductive member 332*b* (i.e. highly conductive bar 332*b*) are each provided with a through hole 332*c* for connection with the highly electrically conductive frame 370 (FIG. 56).

To enhance the conductivity between the series of rechargeable battery cells 335 and the positive electrically conductive member 332*a* (i.e. highly conductive bar 332*a*) and negative electrically conductive member 332*b* (i.e. highly conductive bar 332*b*), the positive foil tab or end 335*a* and the negative foil tab or end 335*b* are at least partially or fully wrapped around the positive electrically conductive member 332*a* (i.e. highly conductive bar 332*a*) and negative electrically conductive member 332*b* (i.e. highly conductive bar 332*b*), respectively, and also soldered and/or welded thereto. The ends of the positive electrically conductive member 332*a* (i.e. highly conductive bar 332*a*) and negative electrically conductive member 332*b* (i.e. highly conductive bar 332*b*) protrude from the sides of the positive foil tab or end 335 and the negative foil tab or end 335*b*, respectively.

Again, the rechargeable battery cells 335 are connected in series and layered one on top of the other to provide the rechargeable battery assembly, as shown in FIGS. 64-66, to provide a stacked arrangement to make the rechargeable battery assembly 333 compact in size. The multi-layered battery cells 335 then covered with heat shrink material to package same.

The rechargeable battery assembly 332 used in a rechargeable jump starting device 310 comprises one or more rechargeable battery cells having a positive terminal connector; a negative terminal connector; a positive electrically conductive bar connected to the positive terminal connector; and a negative electrically conductive bar connected to the negative terminal connector.

Functional Block Diagram and Circuits

The functional block diagram of the rechargeable battery jump starting device 310 (FIG. 26) is shown in FIG. 67. The schematic circuit diagrams of the rechargeable battery jump starting device 310 are shown in FIGS. 68A-1 thru 68F-3.

Figure 73:
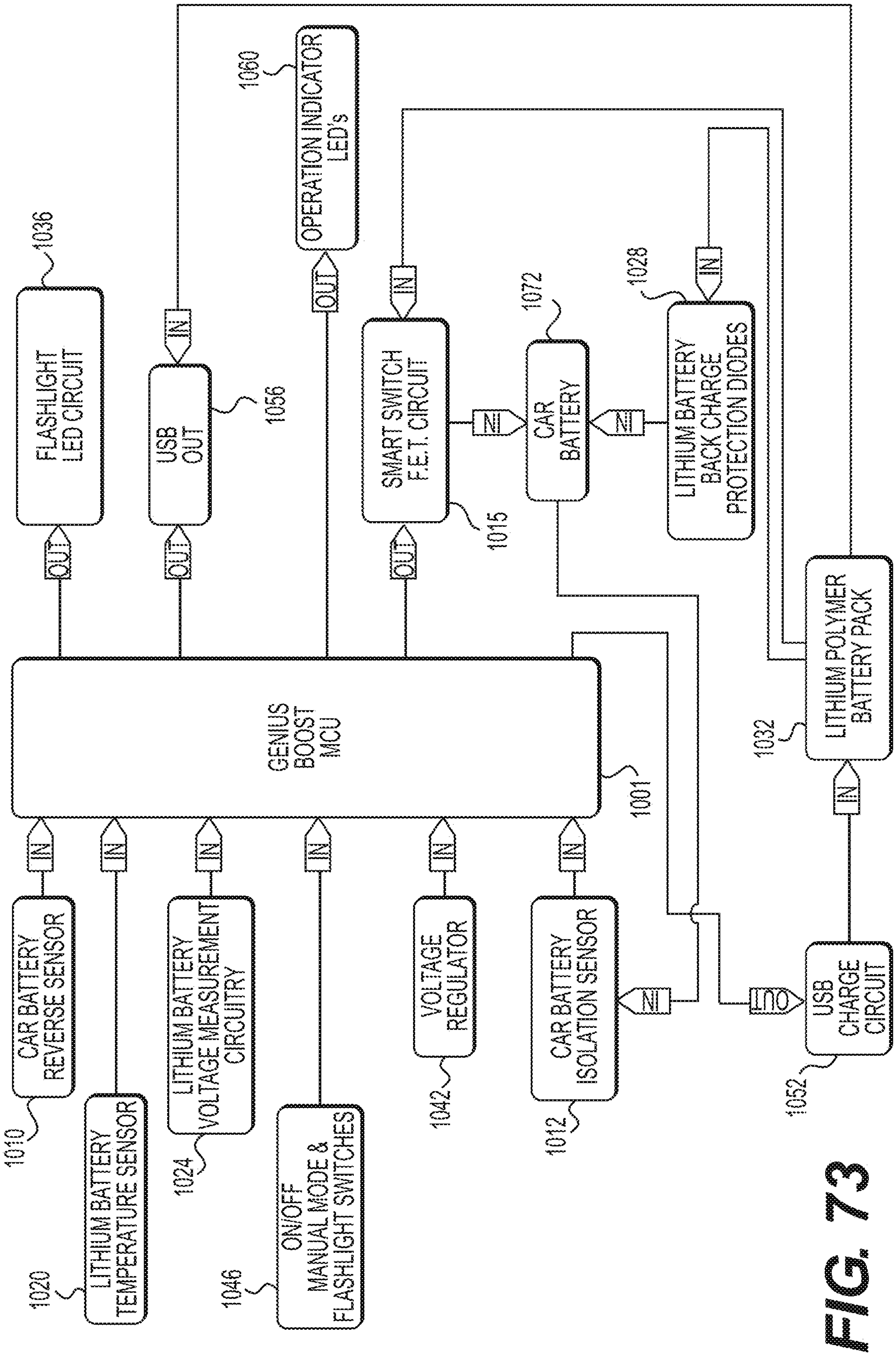
FIG. 73 is a functional block diagram of a handheld vehicle battery boost apparatus in accordance with one aspect of the present invention.

FIG. 73 is a functional block diagram of a handheld battery booster according to one aspect of the invention. At the heart of the handheld battery booster is a lithium polymer battery pack 1032, which stores sufficient energy to jump start a vehicle engine served by a conventional 12 volt lead-acid or valve regulated lead-acid battery. In one example embodiment, a high-surge lithium polymer battery pack includes three 3.7V, 2666 mAh lithium polymer batteries in a 3S1P configuration. The resulting battery pack provides 11.1V, 2666 Ah (8000 Ah at 3.7V, 29.6 Wh). Continuous discharge current is 25 C (or 200 amps), and burst discharge current is 50 C (or 400 amps). The maximum charging current of the battery pack is 8000 mA (8 amps).

The lithium polymer battery pack 1032 optionally can be fitted with one or more extra lithium polymer batteries to temporarily and selectively increase the operating voltage of the lithium polymer battery pack 1032 to provide a discharged vehicle battery pre-conditioning stage or step as described below. A switch (e.g. dial switch) of the handheld battery booster can be modified or added to the handheld battery booster to selectively operate the pre-conditioning stage or mode in which the one or more extra lithium polymer batteries are connected with the three (3) lithium poly batteries to enhance the operating voltage of the lithium polymer battery pack 1032. Alternatively, the handheld battery booster can be configured so that the handheld battery booster automatically conducts a pre-conditioning stage or mode (e.g. prior to jump starting stage or mode). The handheld battery booster can be configured to allow programming of the pre-condition stage or mode to control speed of recharging of the discharged battery, control level of recharging of the discharged battery; control temperature of discharged battery being recharged. In addition, the rising voltage of the discharged battery can be used to automatically turn off the pre-conditioning stage or mode, automatically turn on jump starting stage or mode, automatically turn off handheld charger (e.g. discharged battery is not taking on charge or discharged battery is heating up too fast or too much).

The handheld battery booster can be configured or include one or more sensors or detectors or circuits for detecting the operational parameters (e.g. voltage, current, temperature, battery condition, battery life) of the battery(ies) of the handheld battery booster and/or the discharged vehicle battery during the pre-conditioning stage or mode and/or during the jump starting stage or mode to control the effective and safe operation of the handheld battery booster.

A programmable microcontroller unit (MCU) 1001 receives various inputs and produces informational as well as control outputs. The programmable MCU 1001 further provides flexibility to the system by allowing updates in functionality and system parameters, without requiring any change in hardware. According to one example embodiment, an 8 bit microcontroller with 2K.times.15 bits of flash memory is used to control the system. One such microcontroller is the HT67F30, which is commercially available from Holtek Semiconductor Inc.

A car battery reverse sensor 1010 monitors the polarity of the vehicle battery 1072 when the handheld battery booster device is connected to the vehicle's electric system. As explained below, the booster device prevents the lithium battery pack from being connected to the vehicle battery 1072 when the terminals of the battery 1072 are connected to the wrong terminals of the booster device. A car battery isolation sensor 1012 detects whether or not a vehicle battery 1072 is connected to the booster device, and prevents the lithium battery pack from being connected to the output terminals of the booster device unless there is a good (e.g. chargeable) battery connected to the output terminals.

A smart switch FET circuit 1015 electrically switches the handheld battery booster lithium battery to the vehicle's electric system only when the vehicle battery is determined by the MCU 1001 to be present (in response to a detection signal provided by isolation sensor 1012) and connected with the correct polarity (in response to a detection signal provided by reverse sensor 1010). A lithium battery temperature sensor 1020 monitors the temperature of the lithium battery pack 1032 to detect overheating due to high ambient temperature conditions and overextended current draw during jump starting. A lithium battery voltage measurement circuit 1024 monitors the voltage of the lithium battery pack 1032 to prevent the voltage potential from rising too high during a charging operation and from dropping too low during a discharge operation.

Lithium battery back-charge protection diodes 1028 prevent any charge current being delivered to the vehicle battery 1072 from flowing back to the lithium battery pack 1032 from the vehicle's electrical system. Flashlight LED circuit 1036 is provided to furnish a flashlight function for enhancing light under a vehicle's hood in dark conditions, as well as providing SOS and strobe lighting functions for safety purposes when a vehicle may be disabled in a potentially dangerous location. Voltage regulator 1042 provides regulation of internal operating voltage for the microcontroller and sensors. On/Off manual mode and flashlight switches 1046 allow the user to control power-on for the handheld battery booster device, to control manual override operation if the vehicle has no battery, and to control the flashlight function. The manual button functions only when the booster device is powered on. This button allows the user to jump-start vehicles that have either a missing battery, or the battery voltage is so low that automatic detection by the MCU is not possible. When the user presses and holds the manual override button for a predetermined period time (such as three seconds) to prevent inadvertent actuation of the manual mode, the internal lithium ion battery power is switched to the vehicle battery connect port. The only exception to the manual override is if the car battery is connected in reverse. If the car battery is connected in reverse, the internal lithium battery power shall never be switched to the vehicle battery connect port.

USB charge circuit 1052 converts power from any USB charger power source, to charge voltage and current for charging the lithium battery pack 1032. USB output 56 provides a USB portable charger for charging smartphones, tablets, and other rechargeable electronic devices. Operation indicator LEDs 1060 provides visual indication of lithium battery capacity status as well as an indication of smart switch activation status (indicating that power is being provided to the vehicle's electrical system).

Figure 74A:
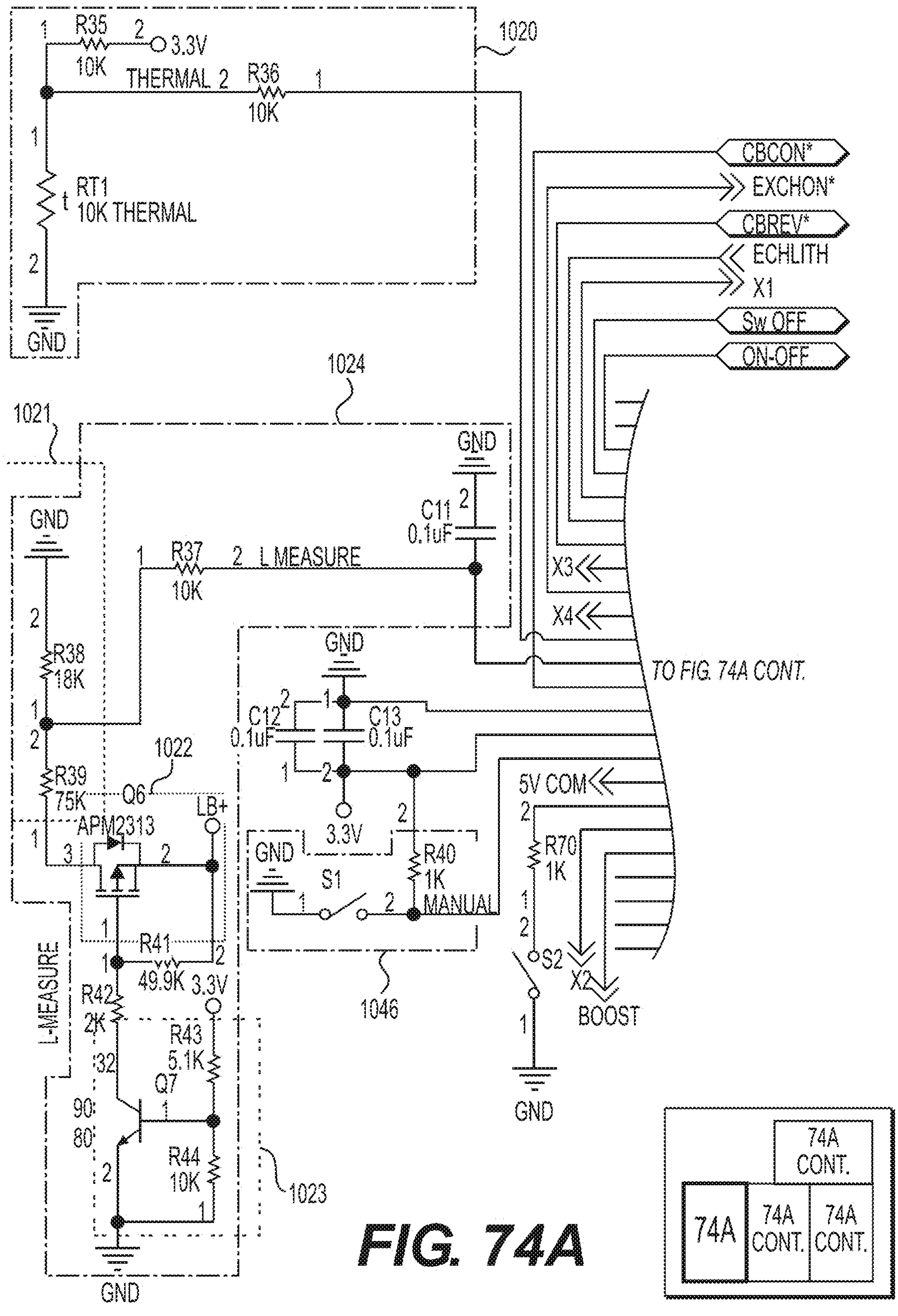
Figure 74A:
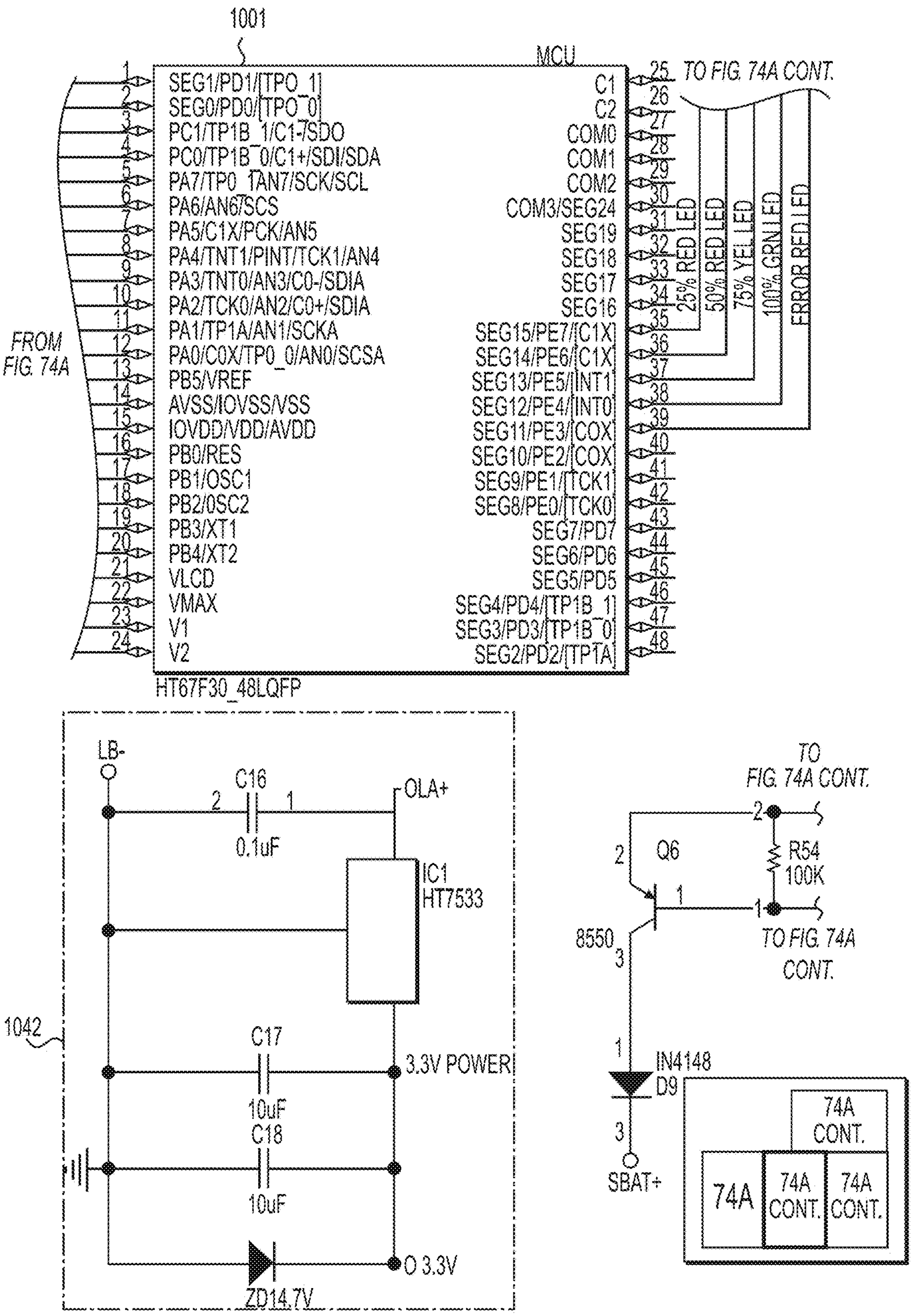
Figure 74A:
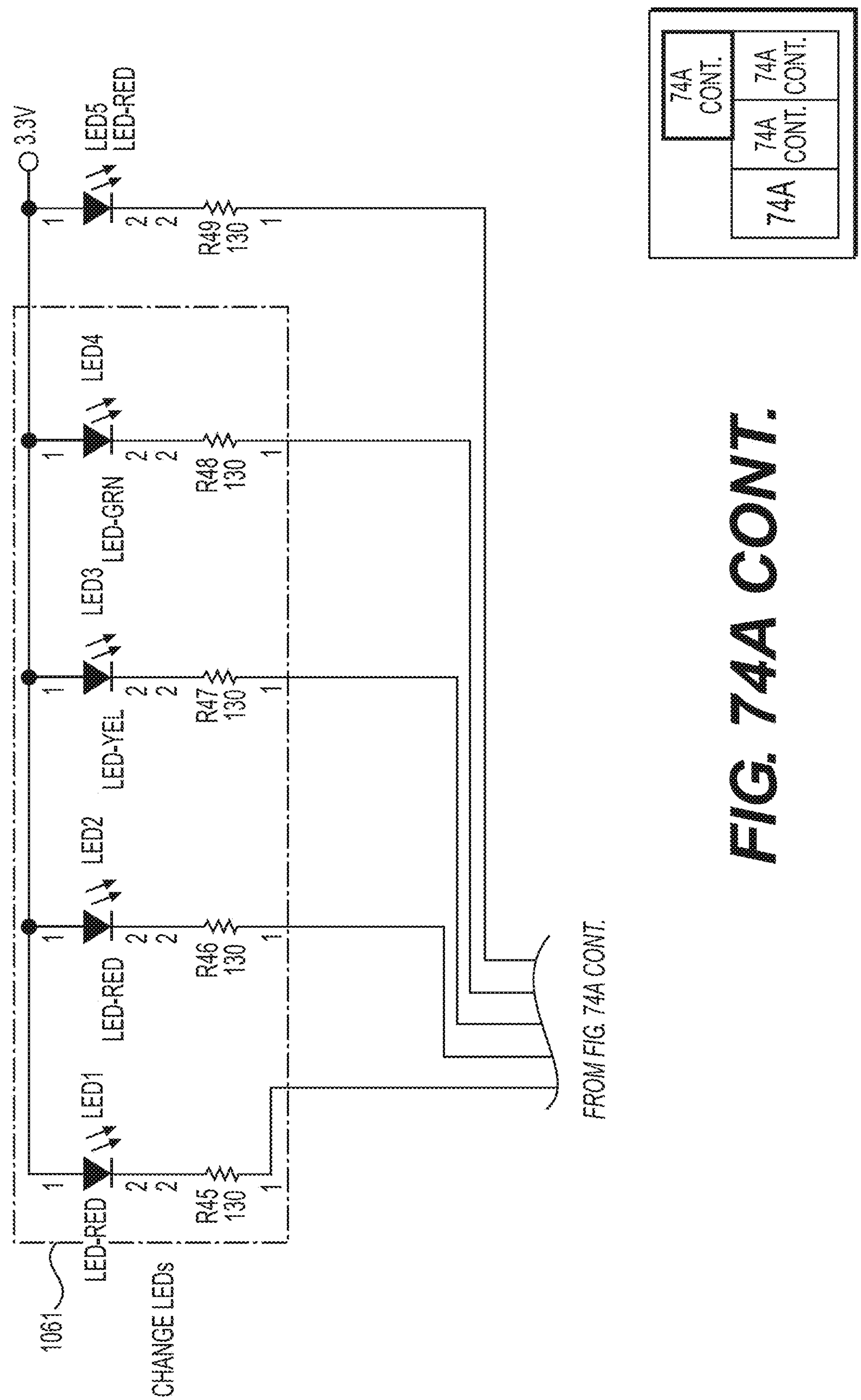

Detailed operation of the handheld booster device will now be described with reference to the schematic diagrams of FIGS. 74A-2C. As shown in FIG. 74A, the microcontroller unit 1001 is the center of all inputs and outputs. The reverse battery sensor 1010 comprises an optically coupled isolator phototransistor (4N27) connected to the terminals of vehicle battery 1072 at input pins 1 and 2 with a diode D8 in the lead conductor of pin 1 (associated with the negative terminal CB−), such that if the battery 1072 is connected to the terminals of the booster device with the correct polarity, the optocoupler LED 1011 will not conduct current, and is therefore turned off, providing a "1" or high output signal to the MCU 1001. The car battery isolation sensor 1012 comprises an optically coupled isolator phototransistor (4N27) connected to the terminals of vehicle battery 1072 at input pins 1 and 2 with a diode D7 in the lead conductor of pin 1 (associated with the positive terminal CB+), such that if the battery 1072 is connected to the terminals of the booster device with the correct polarity, the optocoupler LED 1011A will conduct current, and is therefore turned on, providing a "0" or low output signal to the MCU 1001, indicating the presence of a battery across the jumper output terminals of the handheld booster device.

If the car battery 1072 is connected to the handheld booster device with reverse polarity, the optocoupler LED 1011 of the reverse sensor 1010 will conduct current, providing a “0” or low signal to microcontroller unit 1001. Further, if no battery is connected to the handheld booster device, the optocoupler LED 1011A of the isolation sensor 1012 will not conduct current, and is therefore turned off, providing a “1” or high output signal to the MCU 1001, indicating the absence of any battery connected to the handheld booster device. Using these specific inputs, the microcontroller software of MCU 1001 can determine when it is safe to turn on the smart switch FET 1015, thereby connecting the lithium battery pack to the jumper terminals of the booster device. Consequently, if the car battery 1072 either is not connected to the booster device at all, or is connected with reverse polarity, the MCU 1001 can keep the smart switch FET 1015 from being turned on, thus prevent sparking/short circuiting of the lithium battery pack.

Figure 74B:
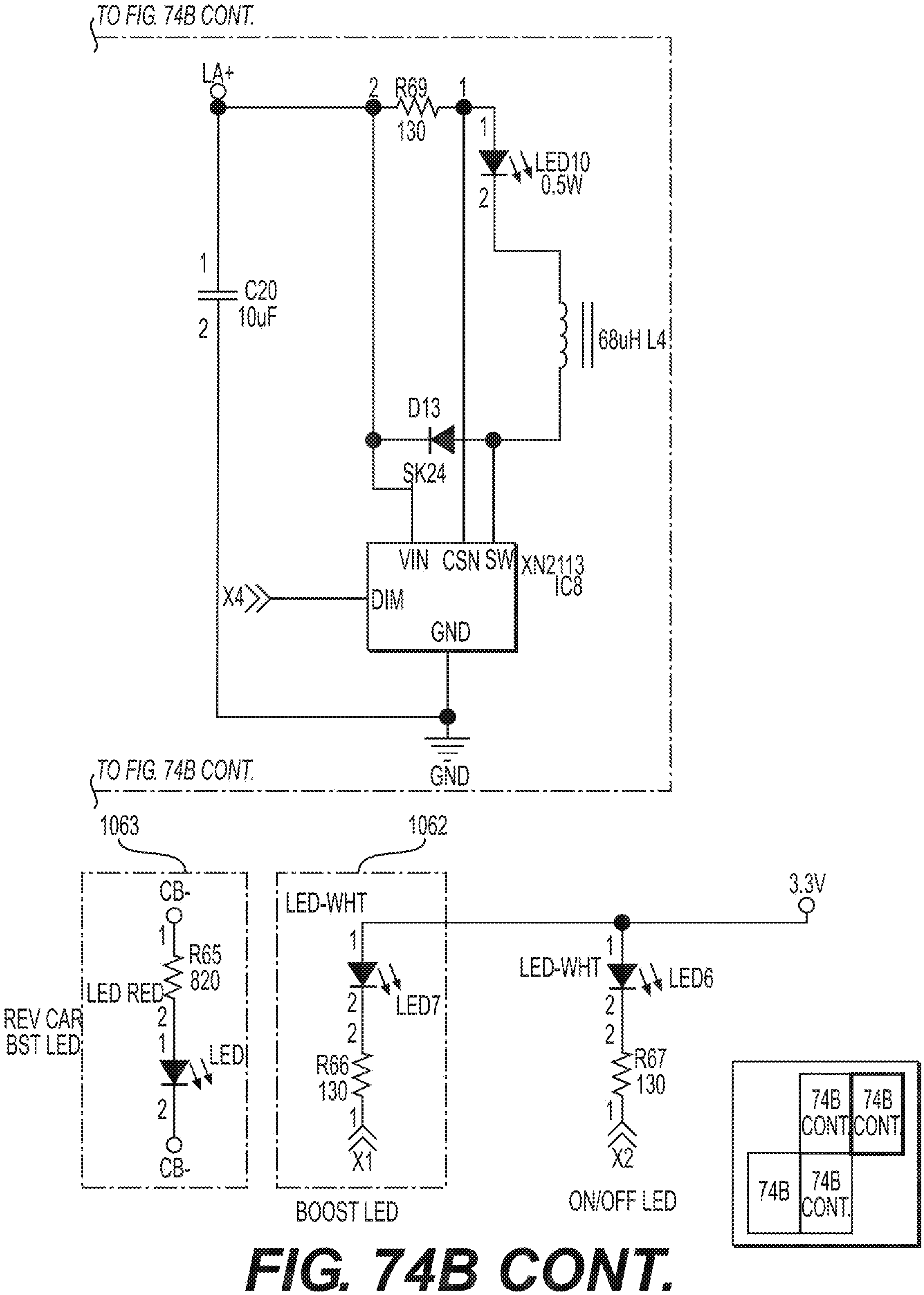

As shown in FIG. 74B, the FET smart switch 1015 is driven by an output of the microcontroller 1001. The FET smart switch 1015 includes three FETs (Q15, Q18, and Q19) in parallel, which spreads the distribution of power from the lithium battery pack over the FETs. When that microcontroller output is driven to a logic low, FETs 1016 are all in a high resistance state, therefore not allowing current to flow from the internal lithium battery negative contact 1017 to the car battery 1072 negative contact. When the micro controller output is driven to a logic high, the FETs 1016 (Q15, Q18, and Q19) are in a low resistant state, allowing current to flow freely from the internal lithium battery pack negative contact 1017 (LB−) to the car battery 1072 negative contact (CB−). In this way, the microcontroller software controls the connection of the internal lithium battery pack 1032 to the vehicle battery 1072 for jumpstarting the car engine.

Referring back to FIG. 74A, the internal lithium battery pack voltage can be accurately measured using circuit 1024 and one of the analog-to-digital inputs of the microcontroller 1001. Circuit 1024 is designed to sense when the main 3.3V regulator 1042 voltage is on, and to turn on transistor 1023 when the voltage of regulator 1042 is on. When transistor 1023 is conducting, it turns on FET 1022, thereby providing positive contact (LB+) of the internal lithium battery a conductive path to voltage divider 1021 allowing a lower voltage range to be brought to the microcontroller to be read. Using this input, the microcontroller software can determine if the lithium battery voltage is too low during discharge operation or too high during charge operation, and take appropriate action to prevent damage to electronic components.

Still referring to FIG. 74A, the temperature of the internal lithium battery pack 1032 can be accurately measured by two negative temperature coefficient (NTC) devices 1020. These are devices that reduce their resistance when their temperature rises. The circuit is a voltage divider that brings the result to two analog-to-digital (ND) inputs on the microcontroller 1001. The microcontroller software can then determine when the internal lithium battery is too hot to allow jumpstarting, adding safety to the design.

The main voltage regulator circuit 1042 is designed to convert internal lithium battery voltage to a regulated 3.3 volts that is utilized by the microcontroller 1001 as well as by other components of the booster device for internal operating power. Three lithium battery back charge protection diodes 1028 (see FIG. 2B) are in place to allow current to flow only from the internal lithium battery pack 1032 to the car battery 1072, and not from the car battery to the internal lithium battery. In this way, if the car electrical system is charging from its alternator, it cannot back-charge (and thereby damage) the internal lithium battery, providing another level of safety. The main power on switch 1046 (FIG. 74A) is a combination that allows for double pole, double throw operation so that with one push, the product can be turned on if it is in the off state, or turned off if it is in the on state. This circuit also uses a microcontroller output 1047 to “keep alive” the power when it is activated by the on switch. When the switch is pressed the microcontroller turns this output to a high logic level to keep power on when the switch is released. In this way, the microcontroller maintains control of when the power is turned off when the on/off switch is activated again or when the lithium battery voltage is getting too low. The microcontroller software also includes a timer that turns the power off after a predefined period of time, (such as, e.g. 8 hours) if not used.

The flashlight LED circuit 1045 shown in FIG. 74B controls the operation of flashlight LEDs. Two outputs from the microcontroller 1001 are dedicated to two separate LEDs. Thus, the LEDs can be independently software-controlled for strobe and SOS patterns, providing yet another safety feature to the booster device. LED indicators provide the feedback the operator needs to understand what is happening with the product. Four separate LEDs 1061 (FIG. 74A) are controlled by corresponding individual outputs of microcontroller 1001 to provide indication of the remaining capacity of the internal lithium battery. These LEDs are controlled in a “fuel gauge” type format with 25%, 50%, 75% and 100% (red, red, yellow, green) capacity indications. An LED indicator 1063 (FIG. 74B) provides a visual warning to the user when the vehicle battery 1072 has been connected in reverse polarity. “Boost” and on/off LEDs 1062 provide visual indications when the booster device is provide jump-start power, and when the booster device is turned on, respectively.

Figure 74C:
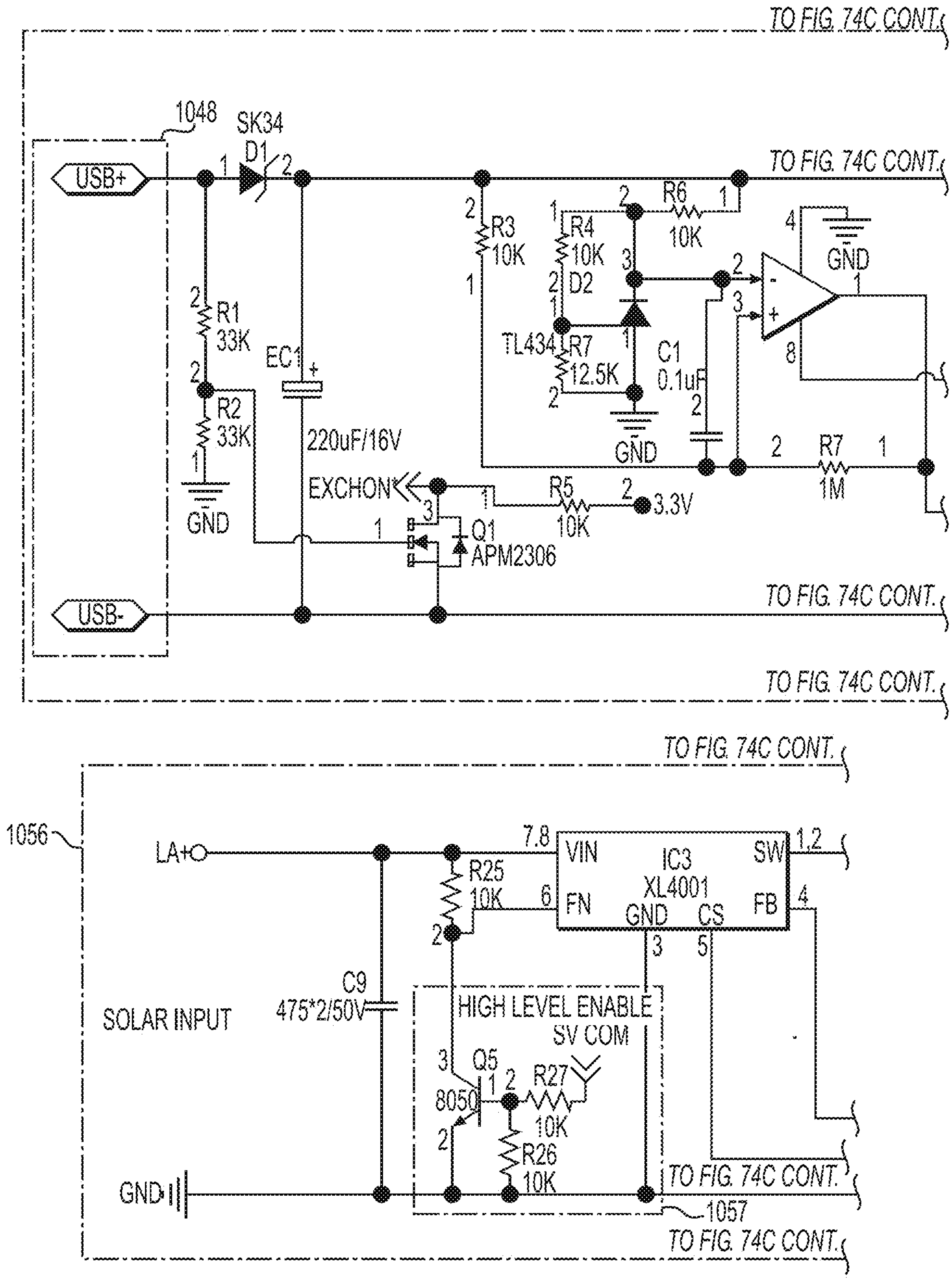

A USB output 1056 circuit (FIG. 74C) is included to provide a USB output for charging portable electronic devices such as smartphones from the internal lithium battery pack 1032. Control circuit 1057 from the microcontroller 1001 allows the USB Out 1056 to be turned on and off by software control to prevent the internal lithium battery getting too low in capacity. The USB output is brought to the outside of the device on a standard USB connector 1058, which includes the standard voltage divider required for enabling charge to certain smartphones that require it. The USB charge circuit 1052 allows the internal lithium battery pack 1032 to be charged using a standard USB charger. This charge input uses a standard micro-USB connector 1048 allowing standard cables to be used. The 5V potential provided from standard USB chargers is up-converted to the 12.4 VDC voltage required for charging the internal lithium battery pack using a DC-DC converter 1049. The DC-DC converter 1049 can be turned on and off via circuit 1053 by an output from the microcontroller 1001.

In this way, the microcontroller software can turn the charge off if the battery voltage is measured to be too high by the A/D input 1022. Additional safety is provided for helping to eliminate overcharge to the internal lithium battery using a lithium battery charge controller 1050 that provides charge balance to the internal lithium battery cells 1051. This controller also provides safety redundancy for eliminating over discharge of the internal lithium battery.

Figure 75:
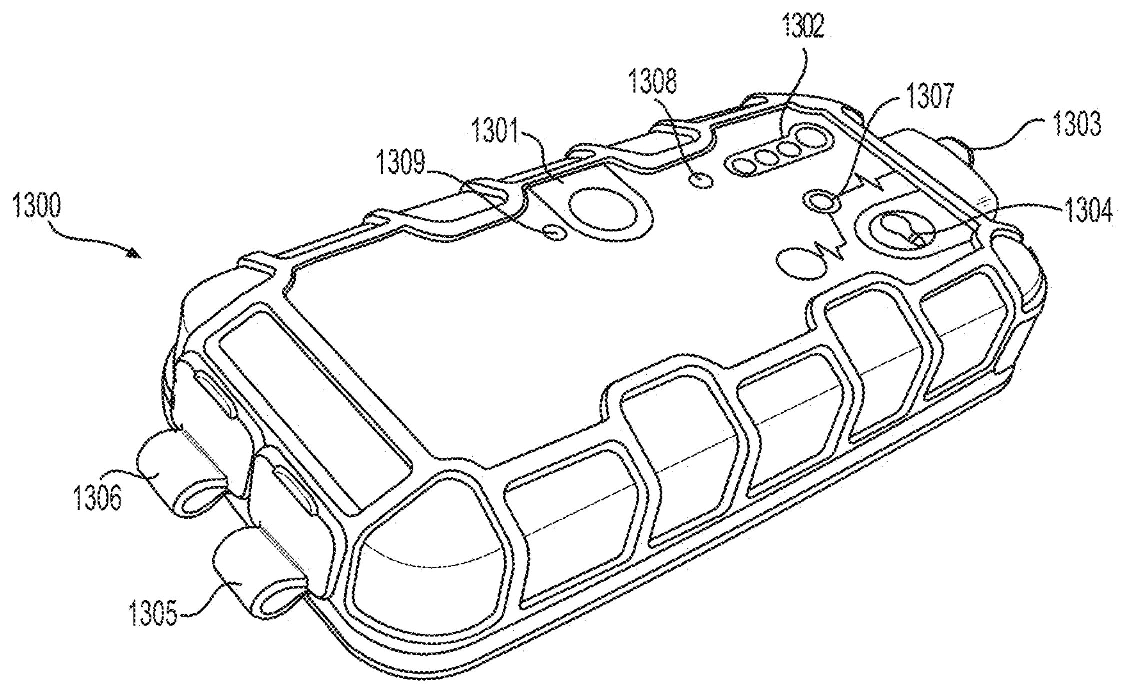
FIG. 75 is a perspective view of a handheld jump starter booster device in accordance with one example embodiment of the invention.

FIG. 75 is a perspective view of a handheld device 1300 in accordance with an exemplary embodiment of the invention. 1301 is a power on switch. 1302 shows the LED “fuel gauge” indicators 1361. 1303 shows a 12 volt output port connectable to a cable device 1400, described further below.

1304 shows a flashlight control switch for activating flashlight LEDs 1345. 1305 is a USB input port for charging the internal lithium battery, and 1306 is a USB output port for providing charge from the lithium battery to other portable devices such as smartphones, tablets, music players, etc. 1307 is a "boost on" indicator showing that power is being provided to the 12V output port. 1308 is a "reverse" indicator showing that the vehicle battery is improperly connected with respect to polarity. 1309 is a "power on" indicator showing that the device is powered up for operation.

Figure 76:
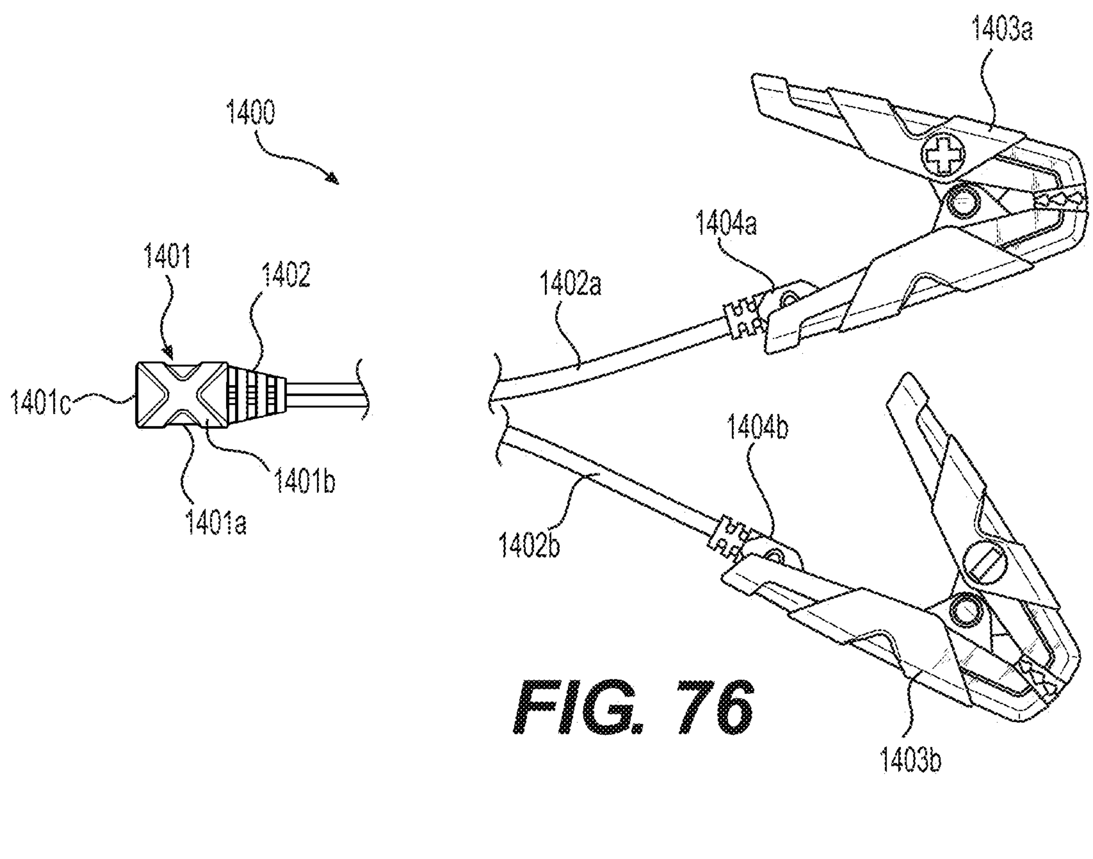
FIG. 76 is a plan view of a jumper cable usable with the handheld jump starter booster device in accordance with another aspect of the invention.

FIG. 76 shows a jumper cable device 1400 specifically designed for use with the handheld device 1300. Device 1400 has a plug 1401 configured to plug into 12 volt output port 1303 of the handheld device 1300. A pair of cables 1402*a* and 1402*b* are integrated with the plug 1401, and are respectively connected to battery terminal clamps 1403*a* and 1403*b* via ring terminals 1404*a* and 1404*b*. The port 1303 and plug 1401 may be dimensioned so that the plug 1401 will only fit into the port 1303 in a specific orientation, thus ensuring that clamp 1403*a* will correspond to positive polarity, and clamp 1403*b* will correspond to negative polarity, as indicated thereon. Additionally, the ring terminals 1404*a* and 1404*b* may be disconnected from the clamps and connected directly to the terminals of a vehicle battery. This feature may be useful, for example, to permanently attach the cables 1302*a*-1302*b* to the battery of a vehicle. In the event that the battery voltage becomes depleted, the handheld booster device 1300 could be properly connected to the battery very simply by plugging in the plug 1401 to the port 1303.

Discharged Battery Pre-Conditioning System

When a vehicle or equipment battery is depleted or discharged, it is common to jumpstart the discharged vehicle or equipment battery using jumper cables connected to another well charged battery. The better the charge that the second battery has, the batter are the chances of for a successful jump start. If the second battery is not well charged, it is much more difficult to jump start to boost charge the discharged vehicle or equipment battery.

When the well charged battery is connected to the discharged battery, the well charged battery begins delivering current to the depleted or discharged battery. The larger the difference in potential between the connected batteries, the larger the current flowing between the connected batteries when jump starting. As the current is being delivered, the voltage of the depleted or discharged battery starts to increase and the voltage of the fully charged battery starts decreasing until the voltages of the connected batteries become very close to each other over time. As this occurs, the current flowing or transferring between the connected batteries decreases.

When the vehicle starter is engaged, the majority of the current flows from the connected fully charged battery and some of the current flows from the depleted or discharged battery. The more current that transfers from the fully charged battery to the low or discharged battery, the more the low or discharge battery participates with the jump start process. In difficult jump start situations such as cold weather or large engines (e.g. heavy duty fuel or diesel engines), this participation by the low or discharge battery is critical because the low or discharged battery always has good solid conductivity to the starter motor (i.e. low or discharged battery is cabled to the battery and starter motor by conductive connectors).

The current transfer (pre-conditioning) effect can be maximized using a technique that increases the fully charged battery (e.g. fully charge battery of jump starter) voltage potential during the initial phase prior to the actual jump start process. If the fully charged battery has a much higher potential than the low or discharged battery, the "pre jump" charge of the low or discharged battery is improved allowing for more success jump starting of the vehicle or equipment during the actual jump starting stage or step.

The discharged battery pre-condition system can be used or applied to a jump starter, in particular to any of the "jump-starters", including rechargeable battery jump starting devices, booster devices, or otherwise apparatus or devices described herein. The discharge battery pre-condition system can be used with batteries, in particular rechargeable battery systems (e.g. jump-starters with Li-ion battery systems). Further, the discharged battery pre-condition system or method can be added to any of the systems or methods, respectively, described herein.

The discharged battery pre-condition system, for example, combines a microcontroller unit (MCU) controlled switching of an additional battery or battery cell to be used in a "pre-conditioning" stage or step of the battery to be jumped. Also included is the controlled impedance of a conductive section for this pre-conditioning stag e or step. The controlled impedance provides safety for this stage or step.

The switching in of the additional battery or battery cell (e.g. 4V Li-ion battery cell shown in FIG. 77), is only temporary. It is used specifically for the pre-conditioning stage or step and the controlled impedance, as shown in FIG. 78, to provide safety if the actual vehicle jump start is attempted during this phase. The controlled impedance is the combination of current limit module, cable impedance, and switch impedance, as shown in FIG. 78. These three (3) elements will be "tuned" for maximum safe current delivery during the pre-conditioning stage or step.

The pre-conditioning step is controlled by the operator by selecting this function, for example, using a switch provided on a panel of the jump-starter. When this function is selected, for example, an extra Li-ion battery cell is added to the three (3) Li-ion battery cells temporarily making it a jumpstart battery with four (4) Li-ion battery cells. When this occurs, the pre-conditioning voltage is converted from approximately 12V to 16V. This extra voltage potential provides extra current to the discharged vehicle or equipment battery bringing up the charge voltage faster, which allows the discharged vehicle or equipment battery to assist more in the difficult jump-start phase.

When the extra Li-ion battery cell is switched in, a short circuit detect feedback is employed to provide safety feedback in case a switch gets stuck closed. This makes sure the extra Li-ion battery cell is never accidentally shorted.

This pre-conditioning step is only provided for a limited time as the extra Li-ion battery cell empties its charge into the low or discharged vehicle or equipment battery. This technique, for example, allows the extra Li-ion battery cell to be smaller than the three (3) combined Li-ion battery cells. This is key for two reasons, including containing costs of making the device as well as providing for a relatively quick pre-conditioning step.

After the pre-conditioning step is complete, the regular jump-start stage or step is ready. As a result of the pre-conditioning stage or step, the regular jump starting phase or step takes less energy because the low discharged vehicle or equipment battery is now partially charged to a higher capacity and potential. This allows for a greater chance of success on the jump start.

Figure 77:
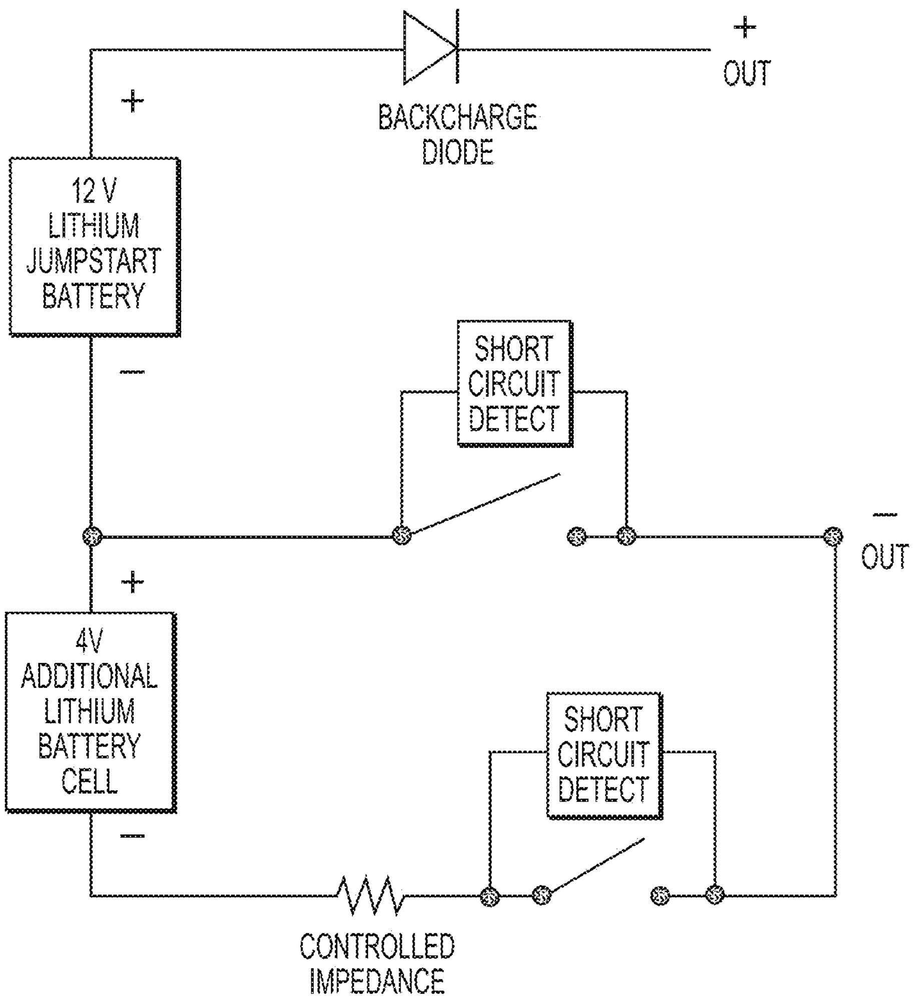
FIG. 77 is a pre-conditioning schematic circuit diagram that can optionally be added to the portable or handheld vehicle battery boost apparatus shown in FIGS. 1-3.
Figure 78:
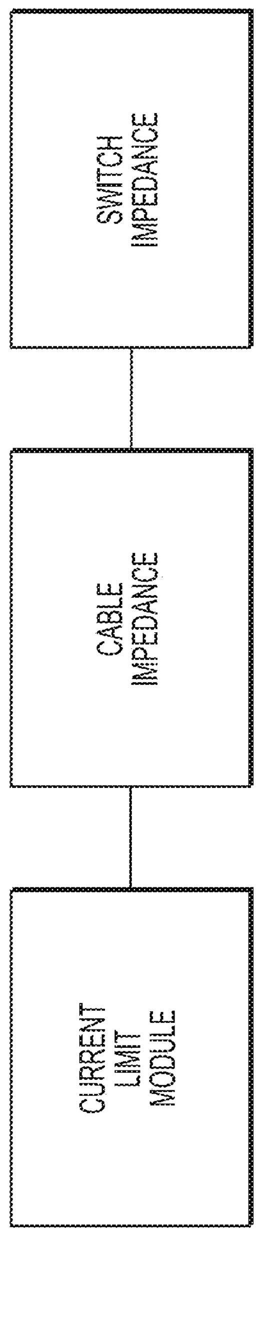
FIG. 78 is a controlled impedance schematic circuit diagram that can optionally be added to the portable or handheld vehicle battery boost apparatus shown in FIGS. 1-3.

A circuit for a low or discharged battery pre-condition system is shown in FIG. 77. The circuit comprises a 12V LITHIUM (i.e. LI-ion) JUMPSTART BATTERY connected to a 4V ADDITIONAL LITHIUM (i.e. Li-ion) BATTERY CELL. The circuit further comprises a BACKCHARGE DIODE (i.e. back-charge diode array) to prevent reverse current flow, for example, when the low or discharge battery is being charged or charged, and a resistor to provided controlled impedance. In addition, the circuit comprises two (2) SHORT CIRCUIT DETECTORS, which are controlled by the MCU to open to prevent damage to the 12V and 4V batteries, respectively, in the event of a short circuit.

The various features described above (e.g. in particular the main features described under headings) can be combined in various combinations (e.g. two features, three or more features, all features) and in various manners, and any and all features can be combined into the electronic devices, jump starters and/or battery booster devices or apparatus described herein.

The invention having been thus described, it will be apparent to those skilled in the art that the same may be varied in many ways without departing from the spirit or scope of the invention. Any and all such variations are intended to be encompassed within the scope of the following claims.

The invention claimed is:

1. A rechargeable battery jump starting device, comprising:

- a first 12V battery;
- a second 12V battery;
- a supplemental power supply, wherein the supplemental power supply is a 4V battery;
- a first switching circuit electrically coupled to the first and second 12V batteries and configured to select the first 12V battery and/or the second 12V battery to provide either a 12V operating voltage or a 24V operating voltage;
- a second switching circuit for switching in the supplemental power supply with the first 12V battery and/or the second 12V battery for increasing the 12V operating voltage or the 24V operating voltage for jump starting a depleted or discharged vehicle battery; and
- a battery connection device for connecting the rechargeable battery jump starting device to the depleted or discharged battery.

2. The rechargeable battery jump starting device of claim 1, wherein the supplemental power supply increases the 12V operating voltage to 16V or the 24V operating voltage to 28V for jump starting the depleted or discharged vehicle battery.

3. The rechargeable battery jump starting device of claim 1, wherein the first switching circuit comprises an electrical control switch electrically connected to the first 12V battery and the second 12V battery, the electrical control switch having a series switch position for connecting the first 12V battery and the second 12V battery in series to provide the 24V operating voltage.

4. The rechargeable battery jump starting device of claim 3, wherein the electrical control switch further includes a parallel switch position for connecting the first 12V battery and the second 12V battery in parallel to provide the 12V operating voltage.

5. The rechargeable battery jump starting device of claim 1, wherein the second switching circuit is configured to automatically switch in the supplemental power supply prior to jump starting the depleted or discharged vehicle battery.

6. The rechargeable battery jump starting device of claim 1, wherein the battery connection device is configured for connecting the jump starting device to a positive terminal and negative terminal of the depleted or discharged battery.

7. The rechargeable battery jump starting device of claim 1, wherein the second switching circuit is configured for selectively switching in and out the supplemental power supply during a pre-conditioning stage of boosting the depleted or discharged vehicle battery.

8. A rechargeable battery jump starting device, comprising:

- a first 12V battery;
- a second 12V battery;
- a supplemental power supply;
- a first switching circuit electrically coupled to the first and second 12V batteries and configured to select the first 12V battery and/or the second 12V battery to provide either a 12V operating voltage or a 24V operating voltage;
- a second switching circuit for switching in the supplemental power supply with the first 12V battery and/or the second 12V battery for increasing the 12V operating voltage or the 24V operating voltage for jump starting a depleted or discharged vehicle battery; and
- a battery connection device for connecting the rechargeable battery jump starting device to the depleted or discharged battery;
- wherein the first switching circuit comprises an electrical control switch electrically connected to the first 12V battery and the second 12V battery, the electrical control switch having a series switch position for connecting the first 12V battery and the second 12V battery in series to provide the 24V operating voltage.

9. The rechargeable battery jump starting device of claim 8, wherein the supplemental power supply is a 4V battery.

10. The rechargeable battery jump starting device of claim 9, wherein the supplemental power supply increases the 12V operating voltage to 16V or the 24V operating voltage to 28V for jump starting the depleted or discharged vehicle battery.

11. The rechargeable battery jump starting device of claim 8, wherein the electrical control switch further includes a parallel switch position for connecting the first 12V battery and the second 12V battery in parallel to provide the 12V operating voltage.

12. The rechargeable battery jump starting device of claim 8, wherein the second switching circuit is configured to automatically switch in the supplemental power supply prior to jump starting the depleted or discharged vehicle battery.

13. The rechargeable battery jump starting device of claim 8, wherein the battery connection device is configured for connecting the jump starting device to a positive terminal and negative terminal of the depleted or discharged battery.

14. The rechargeable battery jump starting device of claim 8, wherein the second switching circuit is configured for selectively switching in and out the supplemental power supply during a pre-conditioning stage of boosting the depleted or discharged vehicle battery.

15. A rechargeable battery jump starting device, comprising:

- a first 12V battery;
- a second 12V battery;
- a supplemental power supply;
- a first switching circuit electrically coupled to the first and second 12V batteries and configured to select the first 12V battery and/or the second 12V battery to provide either a 12V operating voltage or a 24V operating voltage;

a second switching circuit for switching in the supplemental power supply with the first 12V battery and/or the second 12V battery for increasing the 12V operating voltage or the 24V operating voltage for jump starting a depleted or discharged vehicle battery; and a battery connection device for connecting the rechargeable battery jump starting device to the depleted or discharged battery;

wherein the second switching circuit is configured to automatically switch in the supplemental power supply prior to jump starting the depleted or discharged vehicle battery.

16. The rechargeable battery jump starting device of claim 15, wherein the supplemental power supply is a 4V battery.

17. The rechargeable battery jump starting device of claim 16, wherein the supplemental power supply increases the 12V operating voltage to 16V or the 24V operating voltage to 28V for jump starting the depleted or discharged vehicle battery.

18. The rechargeable battery jump starting device of claim 15, wherein the first switching circuit comprises an electrical control switch electrically connected to the first 12V battery and the second 12V battery, the electrical control switch having a series switch position for connecting the first 12V battery and the second 12V battery in series to provide the 24V operating voltage.

19. The rechargeable battery jump starting device of claim 18 wherein the electrical control switch further includes a parallel switch position for connecting the first 12V battery and the second 12V battery in parallel to provide the 12V operating voltage.

20. The rechargeable battery jump starting device of claim 15, wherein the battery connection device is configured for connecting the jump starting device to a positive terminal and negative terminal of the depleted or discharged battery.

* * * * *